(12) United States Patent
Nakahara et al.

(10) Patent No.: US 12,527,775 B2
(45) Date of Patent: Jan. 20, 2026

(54) HETEROAROMATIC DERIVATIVES HAVING SEROTONIN RECEPTOR BINDING ACTIVITY

(71) Applicant: Shionogi & Co., Ltd., Osaka (JP)

(72) Inventors: Kenji Nakahara, Osaka (JP); Kouki Fuchino, Osaka (JP); Kotaro Nagatani, Osaka (JP)

(73) Assignee: SHIONOGI & CO., LTD., Osaka (JP)

( * ) Notice: Subject to any disclaimer, the term of this patent is extended or adjusted under 35 U.S.C. 154(b) by 655 days.

(21) Appl. No.: 17/913,378

(22) PCT Filed: Mar. 25, 2021

(86) PCT No.: PCT/JP2021/012446
§ 371 (c)(1),
(2) Date: Sep. 21, 2022

(87) PCT Pub. No.: WO2021/193790
PCT Pub. Date: Sep. 30, 2021

(65) Prior Publication Data
US 2023/0143664 A1    May 11, 2023

(30) Foreign Application Priority Data

Mar. 26, 2020 (JP) ................. 2020-056826
Aug. 6, 2020  (JP) ................. 2020-133635

(51) Int. Cl.
*A61K 31/438*   (2006.01)
*A61K 31/4439*  (2006.01)
*A61K 31/444*   (2006.01)

(52) U.S. Cl.
CPC ........ *A61K 31/438* (2013.01); *A61K 31/4439* (2013.01); *A61K 31/444* (2013.01)

(58) Field of Classification Search
CPC . A61K 31/438; A61K 31/4439; A61K 31/444
See application file for complete search history.

(56) References Cited

U.S. PATENT DOCUMENTS

| | | |
|---|---|---|
| 8,377,959 B2 | 2/2013 | Weiner et al. |
| 2021/0299099 A1 | 9/2021 | Kato et al. |

FOREIGN PATENT DOCUMENTS

| | | |
|---|---|---|
| CN | 109111385 | 1/2019 |
| CN | 113214141 | 8/2021 |
| CN | 113214231 | 8/2021 |
| CN | 113214289 | 8/2021 |
| CN | 113549006 | 10/2021 |
| WO | 01/66521 | 9/2001 |
| WO | 03/057698 | 7/2003 |
| WO | 2004/000808 | 12/2003 |
| WO | 2004/000840 | 12/2003 |
| WO | 2004/064738 | 8/2004 |
| WO | WO 2005/112927 | * 12/2005 |
| WO | 2007/124136 | 11/2007 |
| WO | 2009/039461 | 3/2009 |
| WO | 2010/111353 | 9/2010 |

(Continued)

OTHER PUBLICATIONS

Patani et al. (Chemical Reviews 1996 (8) , 3147-3178).*
Meanwell (j. of Medicinal Chemistry, 61(14); 2018).*
Vanover et al. (The J. Pharmacology and Experimental Therapeutics, 317(2); 910-918 2006).*
Hee-Yeol Lee et al., "Identification of novel aminopiperidine derivatives for antibacterial activity against Gram-positive bacteria", Bioorganic & Medicinal Chemistry Letters, vol. 26, No. 13, pp. 3148-3152 (Apr. 30, 2016).
File Registry On STN_RN 335628-57-4_Entered STN (May 16, 2001).
File Registry On STN_RN1360213-03-1_Entered STN (Mar. 7, 2012).
File Registry On STN_RN1394859-17-6_Entered STN (Sep. 18, 2012).
File Registry On STN RN2108980-29-4_Entered STN (Aug. 6, 2017).

(Continued)

*Primary Examiner* — Shirley V Gembeh
(74) *Attorney, Agent, or Firm* — Wenderoth, Lind & Ponack, L.L.P.

(57) ABSTRACT

Provided are compounds having a serotonin 5-HT2A receptor inverse agonism, pharmaceutically acceptable salts thereof, and a composition comprising them,
A composition comprising the compounds of Formula (I):

(I)

$$R^1 \underset{R^2\ R^3}{\overset{R^4}{\underset{n}{\rceil}}} N \underset{O}{\overset{}{\rceil}} L \underset{R^5\ R^6}{\overset{}{\underset{p}{\rceil}}} R^7$$

or pharmaceutically acceptable salts thereof,
wherein: $R^1$ is substituted or unsubstituted aromatic heterocyclyl or the like; $R^2$ is each independently a hydrogen atom or the like; $R^3$ is each independently a hydrogen atom or the like; n is 1 or 2; $R^4$ is substituted or unsubstituted non-aromatic nitrogen-containing heterocyclyl or the like; L is —$NR^8$— or the like; $R^8$ is a hydrogen atom or the like; $R^5$ is each independently a hydrogen atom or the like; $R^6$ is each independently a hydrogen atom or the like; p is 1 or 2; and $R^7$ is a group represented by Formula:

$$(R^{11})_m \underset{}{\overset{}{\rceil}} \underset{R^{10}}{\overset{R^9}{\rceil}}$$

wherein $R^9$ is substituted or unsubstituted alkyloxy or the like; $R^{10}$ is a hydrogen atom or the like; $R^{11}$ is halogen or the like; and m is 0 or 1.

13 Claims, No Drawings

(56) References Cited

FOREIGN PATENT DOCUMENTS

| WO | 2018/131672 | 7/2018 |
|---|---|---|
| WO | 2019/040104 | 2/2019 |
| WO | 2019/040105 | 2/2019 |
| WO | 2019/040106 | 2/2019 |
| WO | 2019/040107 | 2/2019 |
| WO | 2021/147818 | 7/2021 |
| WO | 2021/147909 | 7/2021 |
| WO | 2021/218863 | 11/2021 |
| WO | 2022/017440 | 1/2022 |

OTHER PUBLICATIONS

International Preliminary Report on Patentability issued Sep. 22, 2022 in International Patent Application No. PCT/JP2021/012446.
International Search Report issued May 18, 2021 in International (PCT) Application No. PCT/JP2021/012446.
Pievani, Michela et al., "Brain connectivity in neurodegenerative diseases-from phenotype to proteinopathy", Nature Reviews Neurology, Nov. 2014, vol. 10, pp. 620-633.
Mishriky, Raafat Samir Labib et al., "Pharmacological alternatives to antipsychotics to manage BPSD", Progress in Neurology and Psychiatry, 2018, vol. 22, Iss. 1, pp. 30-35.
Barone, Paolo et al., "The Priamo Study: A Multicenter Assessment of Nonmotor Symptoms and Their Impact on Quality of Life in Parkinson's Disease", Movement Disorders, 2009, vol. 24, No. 11, pp. 1641-1649.
Postuma, R.B. et al., "Predicting Parkinson's disease—why, when, and how?", Parkinsonism and Related Disorders, 2009, vol. 15S3, pp. S105-S109.
Marsh, L. et al., "Psychiatric comorbidities in patients with Parkinson disease and psychosis", Neurology, 2004, vol. 63, No. 2, pp. 293-300.
Weintraub, Daniel et al., "Association of Antipsychotic Use With Mortality Risk in Patients With Parkinson Disease", JAMA Neurology, 2016, vol. 73, No. 5, pp. 535-541.
Cummings, Jeffrey et al., "Pimavanserin for patients with Parkinson's disease psychosis: a randomised, placebo-controlled phase 3 trial", The Lancet, Feb. 8, 2014, vol. 383, pp. 533-540.
Vanover, Kimberly E. et al., "Pharmacological and Behavioral Profile of N-(4-Fluorophenylmethyl)-N-(1-methylpiperidin-4-y1)-N'-(4-(2-methylpropyloxy)phenylmethyl) Carbamide (2R,3R)-Dihydroxybutanedioate (2:1) (ACP-103), a Novel 5-Hydroxytryptamine$_{2A}$ Receptor Inverse Agonist", The Journal of Pharmacology and Experimental Therapeutics, May 2006, vol. 317, No. 2, pp. 910-918.
Stahl, Stephen M. et al., "Mechanism of action of pimavanserin in Parkinson's disease psychosis: targeting serotonin 5HT2A and 5HT2C receptors", CNS Spectrums, 2016, vol. 21, pp. 271-275.
File Registry On STN, RN 2125438-68-6, Entered STN: Sep. 5, 2017, pp. 1-2.
File Registry On STN, RN 1360405-98-6, Entered STN: Mar. 7, 2012, pp. 1-2.
File Registry On STN, RN 904183-12-6, Entered STN: Aug. 24, 2006, pp. 1-2.
File Registry On STN, RN 904182-24-7, Entered STN: Aug. 24, 2006, pp. 1-2.
File Registry On STN, RN 903212-18-0, Entered STN: Aug. 22, 2006, pp. 1-2.
File Registry On STN, RN 903209-39-2, Entered STN: Aug. 22, 2006, pp. 1-2.

\* cited by examiner

HETEROAROMATIC DERIVATIVES HAVING SEROTONIN RECEPTOR BINDING ACTIVITY

TECHNICAL FIELD

The present invention relates to a compound having serotonin receptor inverse agonism and useful in the treatment and/or prevention of a disease caused by serotonin 5-HT2A receptor or a pharmaceutically acceptable salt thereof, and a pharmaceutical composition comprising them.

BACKGROUND ART

Neurodegenerative disorder (ND) is a group of related human diseases that exhibit a common pathophysiological feature, namely progressive degeneration of selective neuronal populations that occurs over time. These neurodegenerative diseases include, but are not limited to, for example, Alzheimers disease and related dementia, Parkinson's disease, Huntington's disease, Lewy bodies disease and related movement disorders. Each of these disorders has its own unique clinical aspects, such as age of onset, time course of progression, neurologic signs and symptoms, neuropsychiatric symptoms, and susceptibility to known therapeutic agents. In addition, the pathophysiological basis of each of these disorders is caused by a genetic mechanism peculiar to each disease (Non-Patent Document 1).

Despite the considerable progress in elucidating the genetic causes underlying these essentially different disorders, comparatively little is known about the biochemical mechanisms, that cause selective neuronal degeneration that are common to all of them.

In addition, for the most common disorders of these ones, including Parkinson's disease and Alzheimers disease, genetic factors that cause these rare familial diseases have been discovered, but for the majority of sporadic cases, the pathophysiological basis is not known yet. Therefore, there is currently no specific therapeutic agent capable of directly altering the progression of the disease. Instead, clinicians utilize a variety of existing agents to achieve symptom relief of the motional manifestations, cognitive manifestations and neuropsychiatric manifestations that, characterize these disorders (Non-Patent Document 2 and 3).

Of the various neurological symptoms that characterize ND, the appearance, of neuropsychiatric symptoms, including slow motion, abnormal motor function, including dyskinesia and chorea, and emotional symptoms such as psychosis and anxiety and depression, are common symptoms, seriously affects the functional status and quality of life of patients (Non-Patent Documents 4 and 5). Most existing therapeutic agents, including antipsychotics and antidepressants, are often effective in these patients, but their tolerability is significantly poor (Non-Patent Document 6). Also, available Parkinson's disease therapeutic agents, including L-dopa and dopamine agonists, are generally effective, but cause the emergence of treatment-restricting side effects that are currently too severe to be addressed by drug therapy.

Although there has been no ND-specific approved drug for a long time, the 5-HT2A receptor inverse agonist pimavanserin was first approved in the United States in 2016 for the indication of Parkinson's disease-related hallucinations and delusions (Non-Patent Document 7). Unlike existing antipsychotic drugs, this drug has not been reported to have side effects of worsening motor symptoms or cognitive decline. The main pharmacological action of pimavanserin is serotonin 5-HT2A receptor inverse agonism/antagonism, but it also has serotonin 5-HT2C receptor inverse agonism (Non-Patent Document 8). The results of 5-HT2A occupancy measured in the PET test of pimavanserin in humans and the results of clinical trials of pimavanserin suggest that pimavanserin exerts its medicinal effect via 5-HT2A and 5-HT2C (Non-Patent Document 9). In addition, pimavanserin has a large adverse effect on the cardiovascular system, and its use is restricted.

These findings require the development of novel therapeutic agents specifically designed to be not only effective for these specific symptoms which cause physical disability, but also tolerated in these specific patient populations. This can be achieved by improving the selectivity of drug-target interactions of new therapeutic agents. Specifically, it can be achieved by having strong activity and selectivity for target 5-HT2A and 5-HT2C, and reducing adverse effects on the cardiovascular system.

Patent Documents 3 to 14 describe the compounds having serotonin 5-HT2A receptor inverse agonism, but any of the documents doesn't describe or suggest the compounds related to the present invention.

PRIOR ART REFERENCES

Patent Documents

[Patent Document 1] International Publication WO2018/131672 1
[Patent Document 2] US Patent Publication US8377959 2
[Patent Document 3] International Publication WO2001/006521 3
[Patent Document 4] International Publication WO2004/064738 4
[Patent Document 5] International Publication WO2019/040104 5
[Patent Document 6] International Publication WO2019/040105 6
[Patent Document 7] International Publication WO2019/040106 7
[Patent Document 8] International Publication WO2019/040107 8
[Patent Document 9] International Publication WO2010/111353 9
[Patent Document 10] International Publication WO2004/000808 1 0
[Patent Document 11] International Publication WO2003/057098 1 1
[Patent Document 12] China Patent Application Publication CN109111385 1 2
[Patent Document 13] International Publication WO2009/039461 1 3
[Patent Document 14] International Publication WO2007/124130

Non-Patent Documents

[Non-patent Document 1] Nature Reviews Neurology, volume 10, pages 620-633 (2014)
[Nonpatent Document 2] Progress in Neurology and Psychiatry, Vol. 22, Iss. 1, 30-35, 2018
[Nonpatent Document 3] Movement Disorders, Vol. 24, No. 11, 2009, pp. 1641-1649
[Nonpatent Document 4] Parkinsonism and Related Disorders, 15S3, 2009, S105-S100
[Nonpatent Document 5] Neurology, 2004; 63(2): 293-300
[Nonpatent Document 6] JAMA Neurol., 2016; 73(5): 535-541

[Nonpatent Document 7] Lancet; 383:533-540 (2014)
[Nonpatent Document 8] Journal of Pharmacology and Experimental Therapeutics, May 2006, 317 (2), 910-918
[Nonpatent Document 9] CNS Spectrums, (2016), 21, 271-275

SUMMARY OF THE INVENTION

Problems to be Solved by the Invention

An object of the present invention is to provide a novel compound having serotonin 5-HT2A inverse agonism activity and a composition for serotonin 5-HT2A receptor inverse agonism. More preferably the present invention is to provide a novel compound having an effect on serotonin-related disease such as Parkinson's disease and/or dementia-related hallucinations and delusions by having a serotonin 5-HT2A receptor inverse agonism, and a composition comprising thereof.

Means for Solving the Problem

The present invention relates to the following items (1α) to (20α), (1) to (17) (1'), (3'), (7'), (9'), (7") and (7''').

(1α) A compound represented by Formula (11);

[Chemical formula 1]

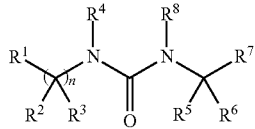

wherein $R^1$ is substituted or unsubstituted aromatic heterocyclyl;
$R^2$ is each independently a hydrogen atom, halogen, hydroxy, substituted or unsubstituted alkyl, or substituted or unsubstituted alkyloxy;
$R^3$ is each independently a hydrogen atom, halogen, hydroxy, substituted or unsubstituted alkyl, or substituted or unsubstituted alkyloxy,
n is 1 or 2;
$R^4$ is substituted or unsubstituted non-aromatic nitrogen-containing heterocyclyl;
$R^8$ is a hydrogen atom or substituted or unsubstituted alkyl;
$R^5$ is a hydrogen atom, halogen, hydroxy, substituted or unsubstituted alkyl, or substituted or unsubstituted alkyloxy,
$R^6$ is a hydrogen atom, halogen, hydroxy, substituted or unsubstituted alkyl, or substituted or unsubstituted alkyloxy;
$R^7$ is a group represented by Formula:

[Chemical formula 2]

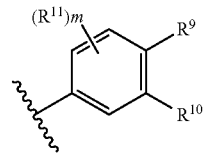

wherein $R^9$ is substituted or unsubstituted alkyloxy substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;
$R^{10}$ is a hydrogen atom, halogen or substituted or unsubstituted alkyl; or
$R^9$ and $R^{10}$ are taken together to form a substituted or unsubstituted non-aromatic heterocycle;
$R^{11}$ is halogen, hydroxy, substituted or unsubstituted alkyl, or substituted or unsubstituted alkyloxy;
m is 0 or 1;
provided that the following compounds are excluded;

[Chemical formula 3]

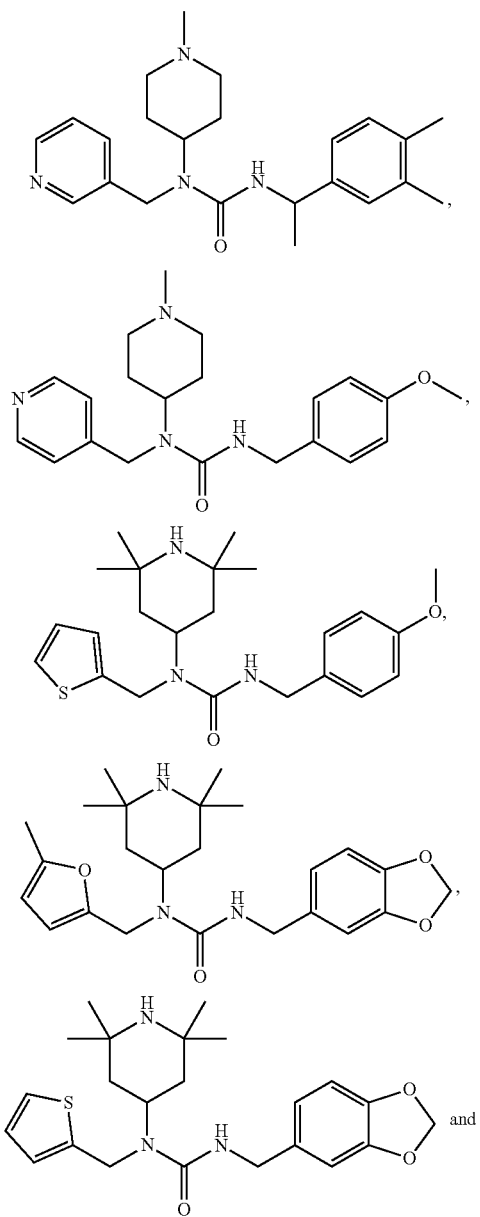

-continued

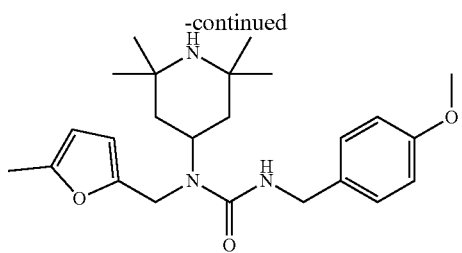

or a pharmaceutically acceptable salt thereof.
(2α) The compound according to the above item (1α), wherein $R^1$ is substituted or unsubstituted aromatic; nitrogen-containing heterocyclyl,
or a pharmaceutically acceptable salt thereof.
(3α) The compound according to the above item (1α) or (2α), wherein $R^1$ is substituted or unsubstituted 6-membered aromatic nitrogen-containing heterocyclyl, or substituted or unsubstituted 5-membered aromatic nitrogen-containing heterocyclyl,
or a pharmaceutically acceptable salt thereof.
(4α) The compound according to any one of the above items (1α) to (3α), wherein $R^2$ and $R^3$ are hydrogen atoms,
or a pharmaceutically acceptable salt thereof.
(5α) The compound according to any one of the above items (1α) to (4α), wherein n is 1,
or a pharmaceutically acceptable salt thereof.
(6α) The compound according to any one of the above items (1α) to (5α), wherein $R^4$ is substituted or unsubstituted 4 to 7-membered non-aromatic nitrogen-containing heterocyclyl,
or a pharmaceutically acceptable salt thereof.
(7α) The compound according to any one of the above items (1α) to (6α) wherein $R^4$ is substituted or unsubstituted piperidinyl,
or a pharmaceutically acceptable salt thereof.
(8α) The compound according to any one of the above items (1α) to (7α), wherein $R^4$ is a group represented by Formula:

[Chemical formula 4]

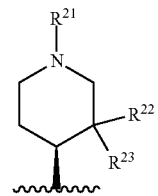

wherein $R^{21}$ is a hydrogen atom or substituted or unsubstituted alkyl;
$R^{22}$ is a hydrogen atom, halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle,
or a pharmaceutically acceptable salt thereof.
(9α) The compound according to any one of the above items (1α) to (8α), wherein $R^4$ is a group represented by Formula:

[Chemical formula 5]

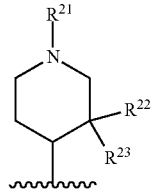

wherein $R^{21}$, $R^{22}$ and $R^{23}$ have the same meaning as the above item (8α),
or a pharmaceutically acceptable salt thereof.
(10α) The compound according to any one of the above items (1α) to (9α), wherein $R^{22}$ is halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle;
or a pharmaceutically acceptable salt thereof.
(11α) The compound according to any one of the above items (1α) to (10α), wherein $R^8$ is a hydrogen atom,
or a pharmaceutically acceptable salt thereof.
(12α) The compound according to any one of the above items (1α) to (11α), wherein $R^7$ and $R^6$ are hydrogen atoms,
or a pharmaceutically acceptable salt thereof.
(13α) The compound according to any one of the above items (1α) to (12α), wherein $R^7$ is a group represented by Formula:

[Chemical formula 6]

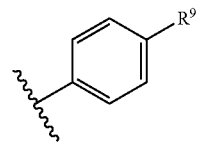

wherein $R^9$ is substituted or unsubstituted alkyloxy,
or a pharmaceutically acceptable salt thereof.
(14α) A compound according to the above item (1α), wherein the compound is represented by Formula (III):

[Chemical formula 7]

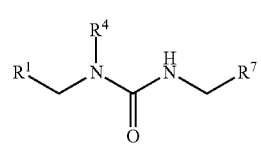

wherein $R^1$ is substituted or unsubstituted 6-membered aromatic nitrogen-containing heterocyclyl, or substituted or unsubstituted 5-membered aromatic nitrogen-containing heterocyclyl;

$R^4$ is a group represented by Formula:

[Chemical formula 8]

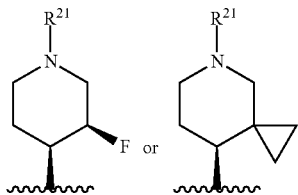

wherein $R^{21}$ is a hydrogen atom or substituted or unsubstituted alkyl, $R^7$ is a group represented by Formula:

[Chemical formula 9]

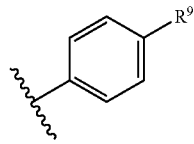

wherein $R^9$ is substituted or unsubstituted C2-C4 alkyloxy or substituted or unsubstituted amino, or a pharmaceutically acceptable salt thereof.

(15α) The compound according to the above item (14α), wherein $R^1$ is substituted or unsubstituted 5-membered aromatic nitrogen-containing heterocyclyl, or a pharmaceutically acceptable salt thereof.

(16α) The compound according to the above item (1α), wherein the compound is selected from the group consisting of compounds I-008, I-027, I-047, I-102, I-112, I-114, I-115, I-124, I-126, I-129, I-133, I-134, I-138, I-139, I-140, I-141, I-144 and I-145 or a pharmaceutically acceptable salt thereof.

(17α) A pharmaceutical composition comprising the compound according to any one of the above items (1α) to (16α), or a pharmaceutically acceptable salt thereof.

(18α) The pharmaceutical composition according to the above item (17α), wherein the composition is a serotonin 5-HT2A receptor inverse agonist.

(19α) A method for treating and/or preventing a disease related to serotonin 5-HT2A receptor comprising administering the compound according to any one of the above items (1α) to (16α), or a pharmaceutically acceptable salt thereof.

(20α) The compound according to any one of the above items (1α) to (16α), or a pharmaceutically acceptable salt thereof, for use in treating and/or preventing a disease related to serotonin 5-HT2A receptor.

(21α) Use of the compound according to any one of the above items (1α) to (16α), or a pharmaceutically acceptable salt thereof, for the manufacture of a medicament for treating and/or preventing a disease related to serotonin 5-HT2A receptor.

(1) A compound represented by Formula (I);

[Chemical formula 10]

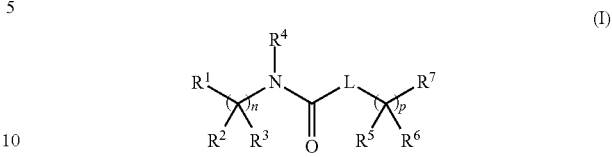

wherein $R^1$ is substituted or unsubstituted aromatic heterocyclyl;

$R^2$ is each independently a hydrogen atom, halogen, hydroxy, substituted or unsubstituted alkyl, or substituted or unsubstituted alkyloxy;

$R^3$ is each independently a hydrogen atom, halogen, hydroxy, substituted or unsubstituted alkyl, or substituted or unsubstituted alkyloxy;

n is 1 or 2;

$R^4$ is substituted or unsubstituted non-aromatic nitrogen-containing heterocyclyl;

L is —$NR^8$—, —O—, or a single bond;

$R^8$ is a hydrogen atom or substituted or unsubstituted alkyl;

$R^5$ is each independently a hydrogen atom, halogen, hydroxy, substituted or unsubstituted alkyl, or substituted or unsubstituted alkyloxy;

$R^6$ is each independently a hydrogen atom, halogen, hydroxy, substituted or unsubstituted alkyl, or substituted or unsubstituted alkyloxy;

p is 1 or 2;

$R^7$ is a group represented by Formula:

[Chemical formula 11]

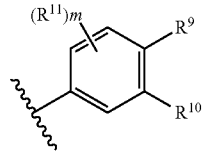

wherein $R^9$ is substituted or unsubstituted alkyloxy, substituted or unsubstituted amino, or substituted or unsubstituted alkyl;

$R^{10}$ is a hydrogen atom, halogen or substituted or unsubstituted alkyl; or $R^9$ and $R^{10}$ are taken together to form a substituted or unsubstituted non-aromatic heterocycle;

$R^{11}$ is halogen, hydroxy, substituted or unsubstituted alkyl, or substituted or unsubstituted alkyloxy;

m is 0 or 1 provided that the following compounds are excluded:

[Chemical formula 12]

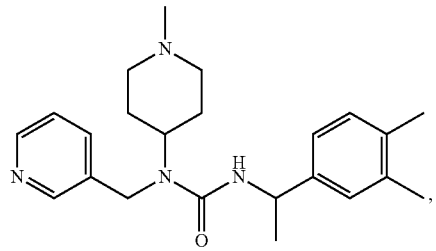

-continued

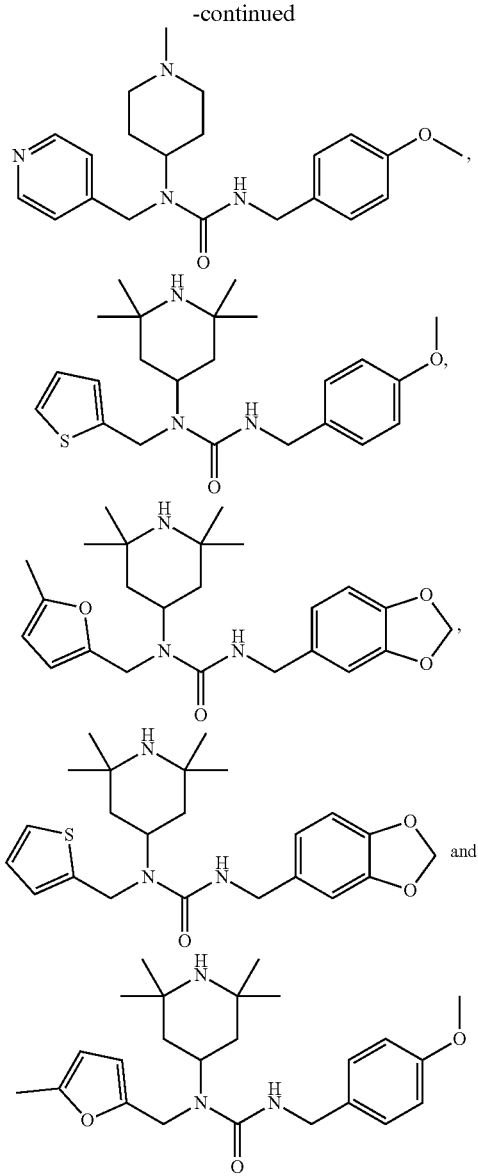

and

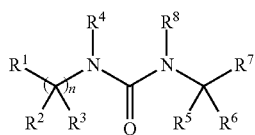

or a pharmaceutically acceptable salt thereof.
(1′) A compound represented by Formula (II):

[Chemical formula 13]

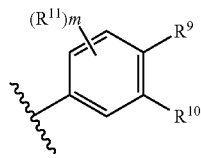

(II)

wherein $R^1$ is substituted or unsubstituted aromatic heterocyclyl;
$R^2$ is each independently a hydrogen atom, halogen, hydroxy, substituted or unsubstituted alkyl, or substituted or unsubstituted alkyloxy;
$R^3$ is each independently a hydrogen atom, halogen, hydroxy, substituted or unsubstituted alkyl, or substituted or unsubstituted alkyloxy;

n is 1 or 2;
$R^4$ is substituted or unsubstituted non-aromatic nitrogen-containing heterocyclyl;
$R^8$ is a hydrogen atom or substituted or unsubstituted alkyl;
$R^5$ is a hydrogen atom, halogen, hydroxy, substituted or unsubstituted alkyl, or substituted or unsubstituted alkyloxy;
$R^6$ is a hydrogen atom, halogen, hydroxy, substituted or unsubstituted alkyl, or substituted or unsubstituted alkyloxy;
$R^7$ is a group represented by Formula:

[Chemical formula 14]

$$\text{(structure with } (R^{11})_m, R^9, R^{10}\text{)}$$

wherein $R^9$ is substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl or substituted or unsubstituted alkyl;
$R^{10}$ is a hydrogen atom, halogen or substituted or unsubstituted alkyl; or
$R^9$ and $R^{10}$ are taken together to form a substituted or unsubstituted non-aromatic heterocycle;
$R^{11}$ is halogen, hydroxy, substituted or unsubstituted alkyl, or substituted or unsubstituted alkyloxy;
m is 0 or 1;
provided that the following compounds are excluded:

[Chemical formula 15]

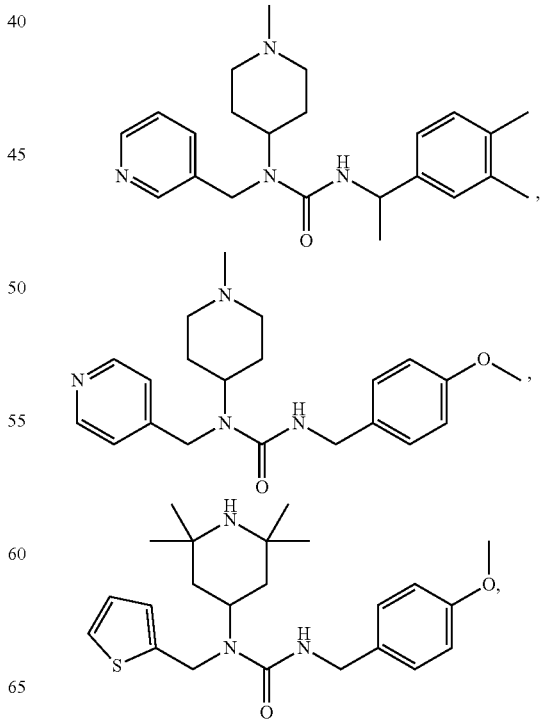

-continued

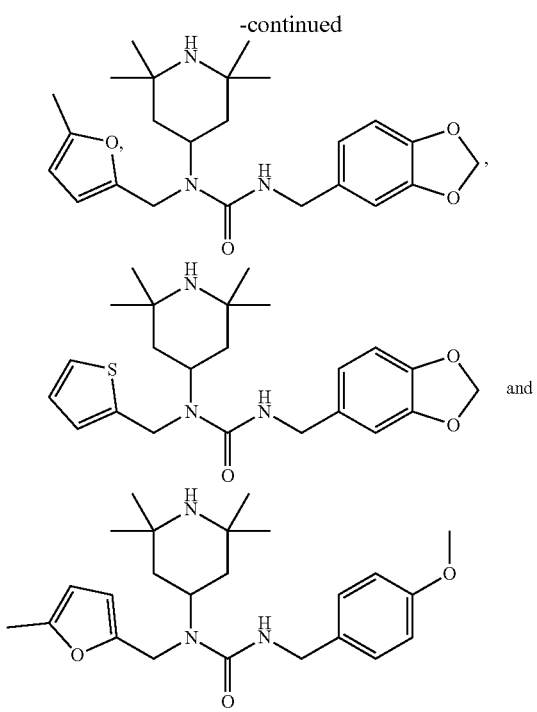

or a pharmaceutically acceptable salt thereof.

(2) The compound according to the above item (1) or (1'), wherein $R^1$ is substituted or unsubstituted aromatic nitrogen-containing heterocyclyl,
or a pharmaceutically acceptable salt thereof.

(3) The compound according to any one of the above items (1), (2) and (1'), wherein $R^1$ is substituted or unsubstituted 6-membered aromatic heterocyclyl, or substituted or unsubstituted 5-membered aromatic heterocyclyl,
or a pharmaceutically acceptable salt thereof.

(3') The compound according to the above item (1) or (1'), wherein $R^1$ is substituted or unsubstituted 6-membered aromatic nitrogen-containing heterocyclyl, or substituted or unsubstituted 5-membered aromatic nitrogen-containing heterocyclyl,
or a pharmaceutically acceptable salt thereof.

(4) The compound according to any one of the above items (1) to (3), (1') and (3'),
wherein $R^2$ and $R^3$ are hydrogen atoms,
or a pharmaceutically acceptable salt thereof.

(5) The compound according to any one of the above items (1) to (4), (1') and (3'), wherein n is 1.
or a pharmaceutically acceptable salt thereof.

(6) The compound according to any one of the above items (1) to (5), (1') and (3'), wherein $R^4$ is substituted or unsubstituted 4 to 7-membered non-aromatic nitrogen-containing heterocyclyl,
or a pharmaceutically acceptable salt thereof.

(7) The compound according to any one of the above items (1) to (6), (1') and (3'), wherein $R^4$ is substituted or unsubstituted piperidinyl,
or a pharmaceutically acceptable salt thereof.

(7') The compound according to any one of the above items (1) to (7), (1') and (3'), wherein $R^4$ is a group represented by Formula:

[Chemical formula 16]

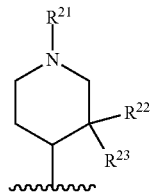

wherein $R^{21}$ is a hydrogen atom or substituted or unsubstituted alkyl;
$R^{22}$ is a hydrogen atom, halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle,
or a pharmaceutically acceptable salt thereof.

(7") The compound according to any one of the above items (1) to (7), (1'), (3') and (7'), wherein $R^4$ is a group represented by Formula:

[Chemical formula 17]

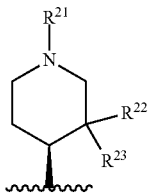

wherein $R^{21}$, $R^{22}$ and $R^{23}$ have the same meaning as the above item (7'),
or a pharmaceutically acceptable salt thereof.

(7''') The compound according to the above item (7"), wherein $R^{22}$ is halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle;
or a pharmaceutically acceptable salt thereof.

(8) The compound according to any one of the above items (1) to (7), wherein L is —$NR^8$—, or —O—,
or a pharmaceutically acceptable salt thereof.

(9) The compound according to any one of the above items 1 to (8), wherein L is —NH—,
or a pharmaceutically acceptable salt thereof.

(9') The compound according to any one of the above items (1'), (3'), (7'), (7") and (7'''), wherein $R^8$ is a hydrogen atom,
or a pharmaceutically acceptable salt thereof.

(10) The compound according to any one of the above items (1) to (9), (1'), (3'), (7'), (9'), (7") and (7'''), wherein $R^5$ and $R^6$ are hydrogen atoms,
or a pharmaceutically acceptable salt thereof.

(11) The compound according to any one of the above items (1) to (10), wherein p is 1,
or a pharmaceutically acceptable salt thereof.

(12) The compound according to any one of the above items (1) to (11), (1'), (3'), (7'), (9'), (7") and (7'''), wherein $R^7$ is a group represented by Formula:

[Chemical formula 18]

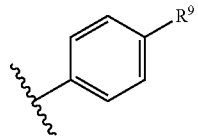

wherein $R^9$ is substituted or unsubstituted alkyloxy, or a pharmaceutically acceptable salt thereof.

(13) A pharmaceutical composition comprising the compound according to any one of the above items (1) to (12), (1'), (3'), (7'), (9'), (7') and (7'''), or a pharmaceutically acceptable salt thereof.

(14) The pharmaceutical composition according to the above item (13), wherein the composition is a serotonin 5-HT2A receptor inverse agonist.

(15) A method for treating and/or preventing a disease related to serotonin 5-HT2A receptor comprising administering the compound according to any one of the above items (1) to (12), (1'), (3'), (7'), (9'), (7") and (7'''), or a pharmaceutically acceptable salt thereof.

(16) The compound according to any one of the above items (1) to (12), (1'), (3'), (7') (9'), (7") and (7'''), or a pharmaceutically acceptable salt thereof, for use in treating and/or preventing a disease related to serotonin 5-HT2A receptor.

(17) Use of the compound according to any one of the above items (1) to (12), (1'), (3'), (7'), (9'), (7") and (7'''), or a pharmaceutically acceptable salt thereof, for the manufacture of a medicament for treating and/or preventing a disease related to serotonin 5-HT2A receptor.

Moreover, the present invention relates to the following items (1αA) to (22αA), (1A) to (15A), (1'A) to (7'A), (9'A), (10'A), (12'A), (1"A) (7"A), (1"'A), (7"'A) and (7""A).

(1αA) A serotonin 5-HT2A receptor inverse agonist comprising a compound represented by Formula (I):

[Chemical formula 19]

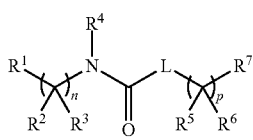

wherein $R^1$ is substituted or unsubstituted aromatic heterocyclyl, or substituted or unsubstituted non-aromatic heterocyclyl;
$R^2$ is each independently a hydrogen atom, halogen, hydroxy, substituted or unsubstituted alkyl, or substituted or unsubstituted alkyloxy;
$R^3$ is each independently a hydrogen atom, halogen, hydroxy, substituted or unsubstituted alkyl, or substituted or unsubstituted alkyloxy;
n is 1 or 2;
$R^4$ is substituted or unsubstituted non-aromatic nitrogen-containing heterocyclyl;
L is $-NR^8-$, $-O-$, or a single bond;

$R^8$ is a hydrogen atom or substituted or unsubstituted alkyl;
$R^5$ is each independently a hydrogen atom, halogen, hydroxy, substituted or unsubstituted alkyl, or substituted or unsubstituted alkyloxy;
$R^6$ is each independently a hydrogen atom, halogen, hydroxy substituted or unsubstituted alkyl, or substituted or unsubstituted alkyloxy;
p is 1 or 2;
$R^7$ is a group represented by Formula:

[Chemical formula 20]

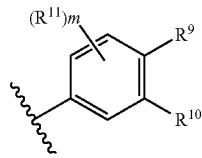

wherein $R^9$ is a hydrogen atom, halogen, substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;
$R^{10}$ is a hydrogen atom, hydroxy, halogen or substituted or unsubstituted alkyl; or
$R^9$ and $R^{10}$ are taken together to form a substituted or unsubstituted non-aromatic heterocycle;
$R^{11}$ is halogen, hydroxy, substituted or unsubstituted alkyl, or substituted or unsubstituted alkyloxy;
m is 0 or 1,
provided that the following compounds (i) and (ii) are excluded:
(i) a compound wherein L is a single bond, and $R^1$ is substituted or unsubstituted furyl, or substituted or unsubstituted thienyl;
(ii) a compound wherein L is $-NR^8-$, and $R^1$ is substituted or unsubstituted 2,3-dihydrobenzofuryl;
or a pharmaceutically acceptable salt thereof.

(2αA) The serotonin 5-HT2A receptor inverse agonist according to the above item (1αA), comprising a compound wherein $R^1$ is substituted or unsubstituted aromatic heterocyclyl;
L is $-NR^8-$, or
or a pharmaceutically acceptable salt thereof.

(3αA) A serotonin 5-HT2A receptor inverse agonist comprising a compound represented by Formula (II):

[Chemical formula 21]

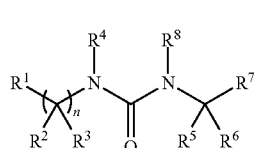

wherein $R^1$ is substituted or unsubstituted aromatic heterocyclyl;
$R^2$ is each independently a hydrogen atom, halogen, hydroxy, substituted or unsubstituted alkyl, or substituted or unsubstituted alkyloxy;

R³ is each independently a hydrogen atom, halogen, hydroxy, substituted or unsubstituted alkyl, or substituted or unsubstituted alkyloxy;

n is 1 or 2;

R⁴ is substituted or unsubstituted non-aromatic nitrogen-containing heterocyclyl;

R⁸ is a hydrogen atom or substituted or unsubstituted alkyl;

R⁵ is a hydrogen atom, halogen, hydroxy, substituted or unsubstituted alkyl, or substituted or unsubstituted alkyloxy;

R⁶ is a hydrogen atom, halogen, hydroxy, substituted or unsubstituted alkyl, substituted or unsubstituted alkyloxy, R⁷ is a group represented by Formula:

[Chemical formula 22]

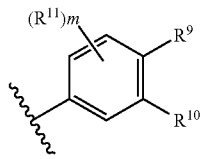

wherein R⁹ is substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;

R¹⁰ is a hydrogen atom, halogen or substituted or unsubstituted alkyl; or

R⁹ and R¹⁰ are taken together to form a substituted or unsubstituted non-aromatic heterocycle, R¹¹ is halogen, hydroxy, substituted or unsubstituted alkyl, or substituted or unsubstituted alkyloxy;

m is 0 or 1;

provided that the following compounds are excluded:

[Chemical formula 23]

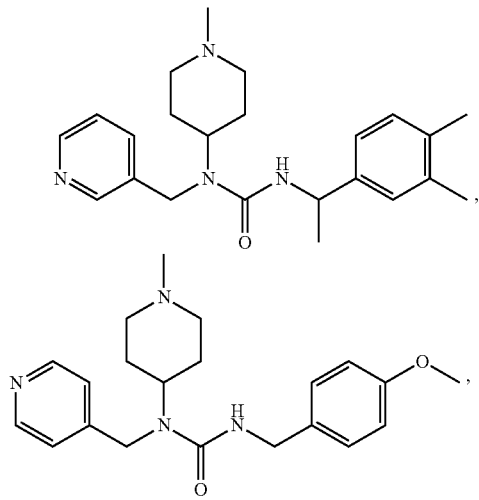

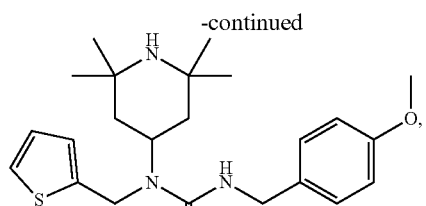

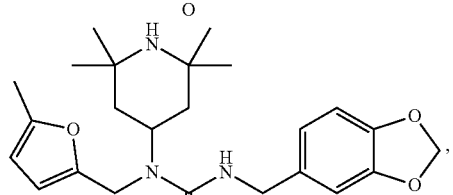

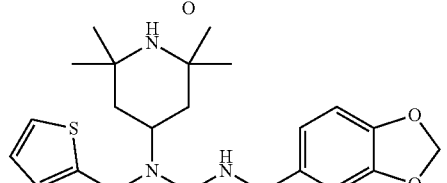

and

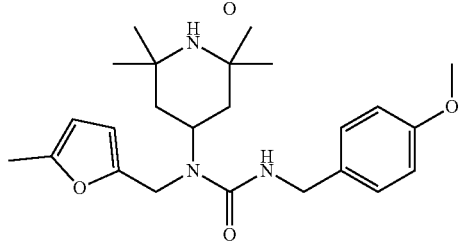

or a pharmaceutically acceptable salt thereof.

(4αA) The serotonin 5-HT2A receptor inverse agonist according to any one of the above items (1αA) to (3αA), wherein R¹ is substituted or unsubstituted aromatic nitrogen-containing heterocyclyl.

(5αA) The serotonin 5-HT2A receptor inverse agonist according to any one of the above items (1αA) to (4αA), wherein R¹ is substituted or unsubstituted 6-membered aromatic nitrogen-containing heterocyclyl, or substituted or unsubstituted 5-membered aromatic nitrogen-containing heterocyclyl.

(6αA) The serotonin 5-HT2A receptor inverse agonist according to any one of the above items (1αA) to (5αA), wherein R² and R³ are hydrogen atoms.

(7αA) The serotonin 5-HT2A receptor inverse agonist according to any one of the above items (1αA) to (6αA), wherein n is 1.

(8αA) The serotonin 5-HT2A receptor inverse agonist according to any one of the above items (1αA) to (7αA), wherein R⁴ is substituted or unsubstituted 4 to 7-membered non-aromatic nitrogen-containing heterocyclyl.

(9αA) The serotonin 5-HT2A receptor inverse agonist according to any one of the above items (1αA) to (8αA), wherein R⁴ is substituted or unsubstituted piperidinyl.

(10αA) The serotonin 5-HT2A receptor inverse agonist according to any one of the above items (1αA) to (9αA), wherein R⁴ is a group represented by Formula:

[Chemical formula 24]

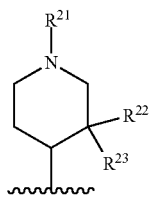

wherein $R^{21}$ is a hydrogen atom or substituted or unsubstituted alkyl;
$R^{22}$ is a hydrogen atom, halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle.

(11αA) The serotonin 5-HT2A receptor inverse agonist according to any one of the above items (1αA) to (10αA), wherein $R^4$ is a group represented by Formula:

[Chemical formula 25]

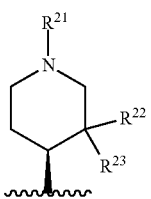

wherein $R^{21}$, $R^{22}$ and $R^{23}$ have the same meaning as the above item (10αA), or a pharmaceutically acceptable salt thereof.

(12αA) The serotonin 5-HT2A receptor inverse agonist according to any one of the above items (1αA) to (11αA), wherein $R^{22}$ is halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle.

(13αA) The serotonin 5-HT2A receptor inverse agonist according to any one of the above items (1αA) to (12αA), wherein $R^8$ is a hydrogen atom.

(14αA) The serotonin 5-HT2A receptor inverse agonist according to any one of the above items (1αA) to (13αA), wherein $R^5$ and $R^6$ are hydrogen atoms, (15αA) The serotonin 5-HT2A receptor inverse agonist according to any one of the above items (1αA) to (14αA), wherein $R^7$ is a group represented by Formula:

[Chemical formula 26]

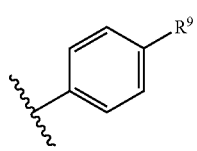

wherein $R^9$ is substituted or unsubstituted alkyloxy.

(16αA) A serotonin 5-HT2A receptor inverse agonist according to the above item.
(3αA), wherein the compound is represented by Formula (III);

[Chemical formula 27]

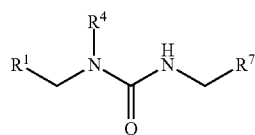

wherein $R^1$ is substituted or unsubstituted 6-membered aromatic nitrogen-containing heterocyclyl, or substituted or unsubstituted 5-membered aromatic nitrogen-containing heterocyclyl;
$R^4$ is a group represented by Formula:

[Chemical formula 28]

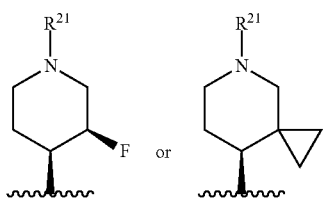

wherein $R^{21}$ is a hydrogen atom or substituted or unsubstituted alkyl,
$R^7$ is a group represented by Formula:

[Chemical formula 29]

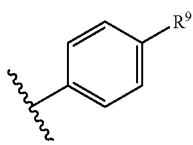

wherein $R^9$ is substituted or unsubstituted C2-C4 alkyloxy or substituted or substituted amino.

(17αA) The serotonin 5-HT2A receptor inverse agonist according to the above item
(16αA), wherein $R^1$ is substituted or unsubstituted 5-membered aromatic nitrogen-containing heterocyclyl, (18αA) The serotonin 5-HT2A receptor inverse agonist according to the above item (3αA), wherein the compound is selected from the group consisting of compounds I-008, I-027, I-047, I-102, I-112, I-114, I-115, I-124, I-126, I-129, I-133, I-134, I-138, I-139, I-140, I-141, I-144 and I-145, (19αA) A method for treating and/or preventing a disease related to serotonin 5-HT2A receptor comprising administering the serotonin 5-HT2A receptor inverse agonist according to any one of the above items (1αA) to (18αA).

(20αA) The serotonin 5-HT2A receptor inverse agonist according to any one of the above items (1αA) to (18αA), for use in treating and/or preventing a disease related to serotonin 5-HT2A receptor.

(21αA) Use of the serotonin 5-HT2A receptor inverse agonist according to any one of the above items (1αA) to (18αA), for the manufacture of a medicament for treating and/or preventing a disease related to serotonin 5-HT2A receptor.

(1A) A serotonin 5-HT2A receptor inverse agonist comprising a compound represented by Formula (I):

[Chemical formula 30]

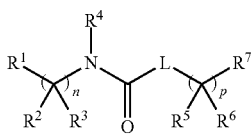

(I)

wherein $R^1$ is substituted or unsubstituted aromatic heterocyclyl, $R^2$ is each independently a hydrogen atom, halogen, hydroxy, substituted or unsubstituted alkyl, or substituted or unsubstituted alkyloxy;

$R^3$ is each independently a hydrogen atom, halogen, hydroxy, substituted or unsubstituted alkyl, or substituted or unsubstituted alkyloxy;

n is 1 or 2;

$R^4$ is substituted or unsubstituted non-aromatic nitrogen-containing heterocyclyl;

L is —$NR^8$—, —O—, or a single bond;

$R^8$ is a hydrogen atom or substituted or unsubstituted alkyl;

$R^5$ is each independently a hydrogen atom, halogen, hydroxy, substituted or unsubstituted alkyl, or substituted or unsubstituted alkyloxy;

$R^6$ is each independently a hydrogen atom, halogen, hydroxy substituted or unsubstituted alkyl, or substituted or unsubstituted alkyloxy;

p is 1 or 2;

$R^7$ is a group represented by Formula:

[Chemical formula 31]

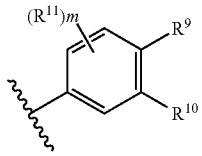

wherein $R^9$ is substituted or unsubstituted alkyloxy, substituted or unsubstituted amino, or substituted or unsubstituted alkyl;

$R^{10}$ is a hydrogen atom, halogen or substituted or unsubstituted alkyl; or $R^9$ and $R^{10}$ are taken together to form a substituted or unsubstituted non-aromatic heterocycle;

$R^{11}$ is halogen, hydroxy, substituted or unsubstituted alkyl, or substituted or unsubstituted alkyloxy;

m is 0 or 1, or a pharmaceutically acceptable salt thereof, (1'A) A serotonin 5-HT2A receptor inverse agonist comprising a compound represented by Formula (I);

[Chemical formula 32]

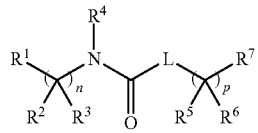

(I)

wherein $R^1$ is substituted or unsubstituted aromatic heterocyclyl or substituted or unsubstituted non-aromatic heterocyclyl;

$R^2$ is each independently a hydrogen atom, halogen, hydroxy, substituted or unsubstituted alkyl, or substituted or unsubstituted alkyloxy;

$R^3$ is each independently a hydrogen atom, halogen, hydroxy, substituted or unsubstituted alkyl, or substituted or unsubstituted alkyloxy;

n is 1 or 2;

$R^4$ is substituted or unsubstituted non-aromatic nitrogen-containing heterocyclyl;

L is —$NR^8$—, —O—, or a single bond;

$R^8$ is a hydrogen atom or substituted or unsubstituted alkyl;

$R^5$ is each independently a hydrogen atom, halogen, hydroxy substituted or unsubstituted alkyl, or substituted or unsubstituted alkyloxy;

$R^6$ is each independently a hydrogen atom, halogen, hydroxy, substituted or unsubstituted alkyl, or substituted or unsubstituted alkyloxy;

p is 1 or 2;

$R^7$ is a group represented by Formula:

[Chemical formula 33]

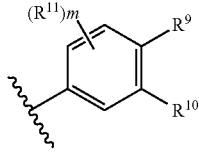

wherein $R^9$ is a hydrogen atom, halogen, substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;

$R^{10}$ is a hydrogen atom, hydroxy, halogen or substituted or unsubstituted or $R^9$ and $R^{10}$ are taken together to form a substituted or unsubstituted non-aromatic heterocycle;

$R^{11}$ is halogen, hydroxy, substituted or unsubstituted alkyl, or substituted or unsubstituted alkyloxy;

m is 0 or 1, provided that the following compounds (i) and (ii) are excluded:

(i) a compound wherein L is a single bond, and $R^1$ is substituted or unsubstituted furyl, or substituted or unsubstituted thienyl;

(ii) a compound wherein L is —$NR^8$—, and $R^1$ is substituted or unsubstituted 2,3-dihydrobenzofuryl;

or a pharmaceutically acceptable salt thereof.

(1"A) The serotonin 5-HT2A receptor inverse agonist according to the above item (1'A), comprising a compound wherein $R^1$ is substituted or unsubstituted aromatic heterocyclyl;

L is —NR$^8$—, or —O—, or a pharmaceutically acceptable salt thereof.

(1'''A) A serotonin 5-HT2A receptor inverse agonist comprising a compound represented by Formula (II):

[Chemical formula 34]

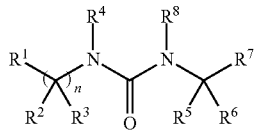

(II)

wherein R$^1$ is substituted or unsubstituted aromatic heterocyclo;

R$^2$ is each independently a hydrogen atom, halogen, hydroxy, substituted or unsubstituted alkyl, or substituted or unsubstituted alkyloxy;

R$^3$ is each independently a hydrogen atom, halogen, hydroxy, substituted or unsubstituted alkyl, or substituted or unsubstituted alkyloxy;

n is 1 or 2;

R$^4$ is substituted or unsubstituted non-aromatic nitrogen-containing heterocyclyl;

R$^8$ is a hydrogen atom or substituted or unsubstituted alkyl;

R$^5$ is a hydrogen atom, halogen, hydroxy, substituted or unsubstituted alkyl, or substituted or unsubstituted alkyloxy;

R$^6$ is a hydrogen atom, halogen, hydroxy, substituted or unsubstituted alkyl, or substituted or unsubstituted alkyloxy;

R$^7$ is a group represented by Formula:

[Chemical formula 35]

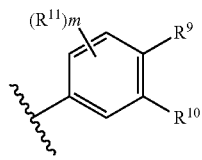

wherein R$^5$ is substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;

R$^{10}$ is a hydrogen atom, halogen or substituted or unsubstituted alkyl; or

R$^9$ and R$^{10}$ are taken together to form a substituted or unsubstituted non-aromatic heterocycle;

R$^{11}$ is halogen, hydroxy, substituted or unsubstituted alkyl, or substituted or unsubstituted alkyloxy;

m is 0 or 1;

provided that the following compounds are excluded:

[Chemical formula 36]

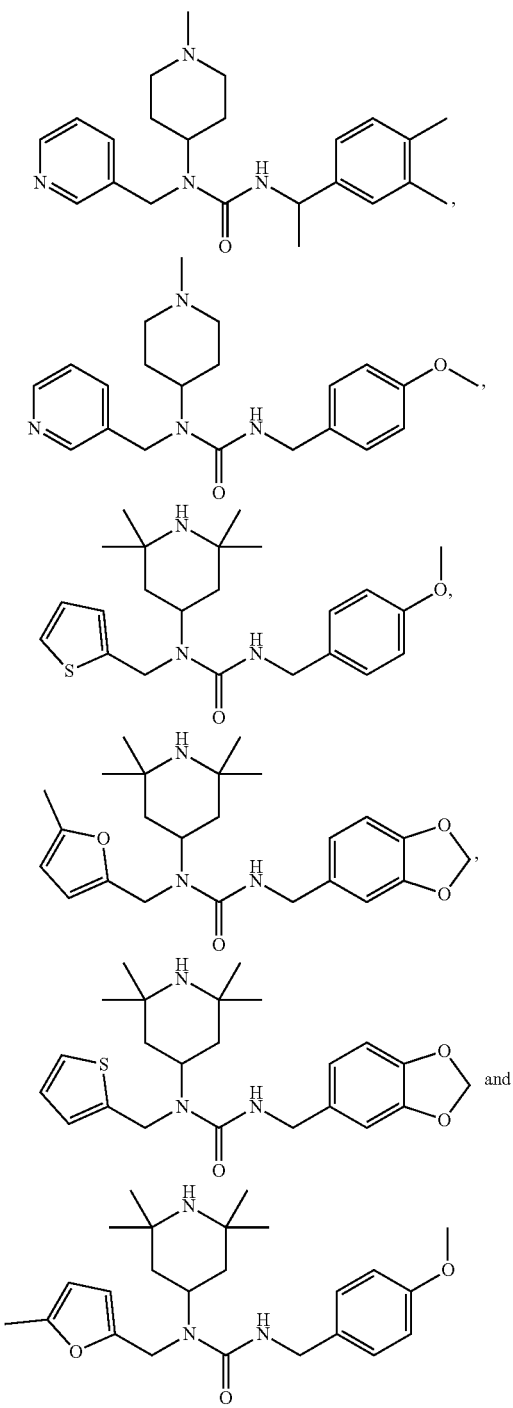

or a pharmaceutically acceptable salt thereof.

(2A) The serotonin 5-HT2A receptor inverse agonist, according to the above item (1A), wherein R$^1$ is substituted or unsubstituted aromatic nitrogen-containing heterocyclyl.

(2'A) The serotonin 5-HT2A receptor inverse agonist according to any one of the above items (1A), (1''A) and (1'''A), containing the compound wherein R$^1$ is substituted or unsubstituted aromatic nitrogen-containing heterocyclyl or the pharmaceutically acceptable salt thereof.

(3A) The serotonin 5-HT2A receptor inverse agonist according to any one of the above items (1A), (2A), (1'A), (1"A) and (1'''A), wherein $R^1$ is substituted or unsubstituted 6-membered aromatic heterocyclyl, or substituted or unsubstituted 5-membered aromatic heterocyclyl.

(3'A) The serotonin 5-HT2A receptor inverse agonist according to any one of the above items (1A), (2A), (1'A), (1"A) and (1'''A), containing the compound wherein $R^1$ is substituted or unsubstituted 6-membered aromatic nitrogen-containing heterocyclyl, or substituted or unsubstituted 5-membered aromatic nitrogen-containing heterocyclyl or the pharmaceutically acceptable salt thereof.

(4A) The serotonin 5-HT2A receptor inverse agonist according to any one of the above items (1A) to (3A), wherein $R^2$ and $R^3$ are hydrogen atoms.

(4'A) The serotonin 5-HT2A receptor inverse agonist according to any one of the above items (1'A) to (3'A), (1"A) and (1'''A), containing the compound wherein $R^2$ and $R^3$ are hydrogen atoms, or the pharmaceutically acceptable salt thereof.

(5A) The serotonin 5-HT2A receptor inverse agonist according to any one of the above items (1A) to (4A), wherein n is 1.

(5'A) The serotonin 5-HT2A receptor inverse agonist, according to any one of the above items (1'A) to (4'A), (1"A) and (1'''A), containing the compound wherein n is 1, or the pharmaceutically acceptable salt thereof.

(6A) The serotonin 5-HT2A receptor inverse agonist according to any one of the above items (1A) to (5A), wherein $R^4$ is substituted or unsubstituted 4 to 7-membered non-aromatic nitrogen-containing heterocyclyl.

(6'A) The serotonin 5-HT2A receptor inverse agonist according to any one of the above items (1'A) to (5'A), (1"A) and (1'''A), containing the compound wherein $R^4$ is substituted or unsubstituted 4 to 7-membered non-aromatic nitrogen-containing heterocyclyl, or the pharmaceutically acceptable salt thereof.

(7A) The serotonin 5-HT2A receptor inverse agonist according to any one of the above items (1A) to (6A), wherein $R^4$ is substituted or unsubstituted piperidinyl.

(7'A) The serotonin 5-HT2A receptor inverse agonist according to any one of the above items (1'A) to (6'A), (1"A) and (1'''A), containing the compound wherein $R^4$ is substituted or unsubstituted piperidinyl, or the pharmaceutically acceptable salt thereof.

(7"A) The serotonin 5-HT2A receptor inverse agonist according to any one of the above items (1A) to (7A), (1'A) to (7'A), (1"A) and (1'''A), containing the compound wherein $R^4$ is a group represented by Formula:

[Chemical formula 37]

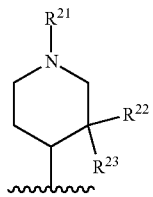

wherein $R^{21}$ is a hydrogen atom or substituted or unsubstituted alkyl;

$R^{22}$ is a hydrogen atom, halogen or substituted or unsubstituted alkyl;

$R^{23}$ is a hydrogen atom, halogen or substituted or unsubstituted alkyl; or $R^{22}$ and $R^{23}$ are taken together with the carbon atom to which they are bonded to form a substituted or unsubstituted non-aromatic carbocycle, or the pharmaceutically acceptable salt thereof.

(7'''A) The serotonin 5-HT2A receptor inverse agonist according to any one of the above items (1A) to (7A), (1'A) to (7'A), (1"A), (7"A) and (1'''A), containing the compound wherein $R^4$ is a group represented by Formula:

[Chemical formula 38]

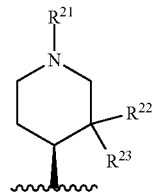

wherein $R^{21}$, $R^{22}$ and $R^{23}$ have the same meaning as the above item (7"A), or a pharmaceutically acceptable salt thereof.

(7""A) The serotonin 5-HT2A receptor inverse agonist according to the above item (7"A) or (7'''A), containing the compound wherein $R^{22}$ is halogen or substituted or unsubstituted alkyl:

$R^{23}$ is a hydrogen atom, halogen or substituted or unsubstituted alkyl; or $R^{22}$ and $R^{23}$ are taken together with the carbon atom to which they are bonded to form a substituted or unsubstituted non-aromatic carbocycle.

or a pharmaceutically acceptable salt thereof.

(8A) The serotonin 5-HT2A receptor inverse agonist according to any one of the above items (1A) to (7A), wherein L is —$NR^8$—, or —O—.

(9A) The serotonin 5-HT2A receptor inverse agonist according to any one of the above items (1A) to (8A), wherein L is —NH—.

(9'A) The serotonin 5-HT2A receptor inverse agonist according to any one of the above items (1'A) to (7'A), (1"A), (7"A), (1'''A), (7''') and (7""A), containing the compound wherein $R^8$ is a hydrogen atom, or a pharmaceutically acceptable salt thereof.

(10A) The serotonin 5-HT2A receptor inverse agonist according to any one of the above items (1A) to (9A), wherein $R^5$ and $R^6$ are hydrogen atoms.

(10'A) The serotonin 5-HT2A receptor inverse agonist according to any one of the above items (1'A) to (7'A), (9'A), (1"A), (7"A), (1'''A), (7'''A) and (7""A), containing the compound wherein $R^5$ and $R^6$ are hydrogen atoms, or a pharmaceutically acceptable salt thereof.

(11A) The serotonin 5-HT2A receptor inverse agonist according to any one of the above items (1A) to (10A), wherein p is 1.

(12A) The serotonin 5-HT2A receptor inverse agonist according to any one of the above items (1A) to (11A), wherein $R^7$ is a group represented by Formula:

[Chemical formula 39]

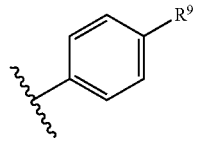

wherein $R^9$ is substituted or unsubstituted alkyloxy.

(12A') The serotonin 5-HT2A receptor inverse agonist according to any one of the above items (1'A) to (7'A), (9'A), (10'A), (1"A), (7"A), (1'''A), (7'''A) and (7''''A), containing the compound wherein $R^7$ is a group represented by Formula:

[Chemical formula 40]

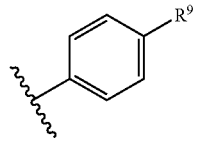

wherein $R^9$ is substituted or unsubstituted alkyloxy, or a pharmaceutically acceptable salt thereof.

(13A) A method for treating and/or preventing a disease related to serotonin 5-HT2A receptor comprising administering the serotonin 5-HT2A receptor inverse agonist according to any one of the above items (1A) to (12A), (1'A) to (7'A), (9'A), (10'A), (12'A), (1"A), (7"A), (1'''A), (7'''A) and (7''''A).

(14A) The serotonin 5-HT2A receptor inverse agonist according to any one of the above items (1A) to (12A), (1'A) to (7'A), (9'A), (10'A), (12'A), (1"A), (7"A), (1'''A), (7'''A) and (7''''A), for use in treating and/or preventing a disease related to serotonin 5-HT2A receptor.

(15A) Use of the serotonin 5-HT2A receptor inverse agonist according to any one of the above items (1A) to (12A), (1'A) to (7'A), (9'A), (10'A), (12'A), (1"A), (7"A), (1'''A), (7'''A) and (7''''A), for the manufacture of a medicament for treating and/or preventing a disease related to serotonin 5-HT2A receptor.

Furthermore, the present invention relates to the following items (1αB) to (22αB), (1B) to (15B), (1'B) to (7'B), (9'B), (10'B), (12'B), (1"B), (7"B), (1'''B), (7'''B) and (7''''B).

(1αB) A composition for serotonin 5-HT2A receptor inverse agonism comprising a compound represented by Formula (I):

[Chemical formula 41]

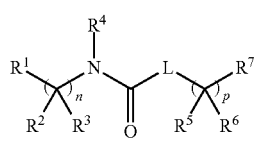

wherein $R^1$ is substituted or unsubstituted aromatic heterocyclyl, or substituted or unsubstituted non-aromatic heterocyclyl;

$R^2$ is each independently a hydrogen atom, halogen, hydroxy, substituted or unsubstituted alkyl, or substituted or unsubstituted alkyloxy;

$R^3$ is each independently a hydrogen atom, halogen, hydroxy, substituted or unsubstituted alkyl, or substituted or unsubstituted alkyloxy;

n is 1 or 2;

$R^4$ is substituted or unsubstituted non-aromatic nitrogen-containing heterocyclyl;

L is —$NR^8$—, —O—, or a single bond;

$R^8$ is a hydrogen atom or substituted or unsubstituted alkyl;

$R^5$ is each independently a hydrogen atom, halogen, hydroxy, substituted or unsubstituted alkyl, or substituted or unsubstituted alkyloxy;

$R^6$ is each independently a hydrogen atom, halogen, hydroxy, substituted or unsubstituted alkyl, or substituted or unsubstituted alkyloxy;

p is 1 or 2;

$R^7$ is a group represented by Formula:

[Chemical formula 42]

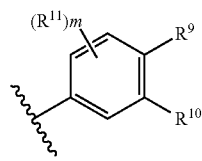

wherein $R^9$ is a hydrogen atom, halogen, substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;

$R^{10}$ is a hydrogen atom, hydroxy, halogen or substituted or unsubstituted alkyl; or $R^9$ and $R^{10}$ are taken together to form a substituted or unsubstituted non-aromatic heterocycle;

$R^{11}$ is halogen, hydroxy, substituted or unsubstituted alkyl, or substituted or unsubstituted alkyloxy;

m is 0 or 1, provided that the following compounds (i) and (ii) are excluded:

(i) a compound wherein L is a single bond, and $R^1$ is substituted or unsubstituted furyl, or substituted or unsubstituted thienyl;

(ii) a compound wherein L is —$NR^8$—, and $R^1$ is substituted or unsubstituted 2,3-dihydrobenzofuryl;

or a pharmaceutically acceptable salt thereof.

(2αB) The composition for serotonin 5-HT2A receptor inverse agonism according to the above item (1αB), comprising a compound wherein $R^1$ is substituted or unsubstituted aromatic heterocyclyl;

L is —$NR^8$—, or —O—, or a pharmaceutically acceptable salt thereof.

(3αB) A composition for serotonin 5-HT2A receptor inverse agonism comprising a compound represented by Formula (II):

[Chemical formula 43]

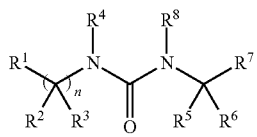
(II)

wherein R¹ is substituted or unsubstituted aromatic heterocyclyl;
R² is each independently a hydrogen atom, halogen, hydroxy, substituted or unsubstituted alkyl, or substituted or unsubstituted alkyloxy;
R³ is each independently a hydrogen atom, halogen, hydroxy, substituted or unsubstituted alkyl, or substituted or unsubstituted alkyloxy;
n is 1 or 2;
R⁴ is substituted or unsubstituted non-aromatic nitrogen-containing heterocyclyl;
R⁸ is a hydrogen atom or substituted or unsubstituted alkyl;
R⁵ is a hydrogen atom, halogen, hydroxy, substituted or unsubstituted alkyl, or substituted or unsubstituted alkyloxy;
R⁶ is a hydrogen atom, halogen, hydroxy, substituted or unsubstituted alkyl, or substituted or unsubstituted alkyloxy;
R⁷ is a group represented by Formula:

[Chemical formula 44]

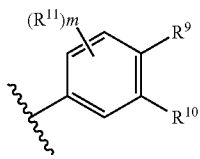

wherein R⁹ is substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;
R¹⁰ is a hydrogen atom, halogen or substituted or unsubstituted alkyl; or
R⁹ and R¹⁰ are taken together to form a substituted or unsubstituted non-aromatic heterocycle;
R¹¹ is halogen, hydroxy, substituted or unsubstituted alkyl, or substituted or unsubstituted alkyloxy;
m is 0 or 1;
provided that the following compounds are excluded:

[Chemical formula 45]

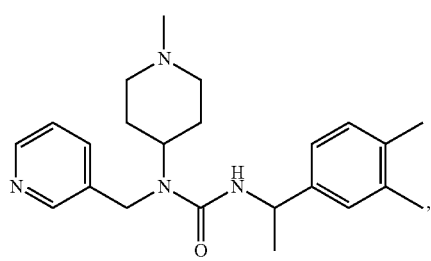

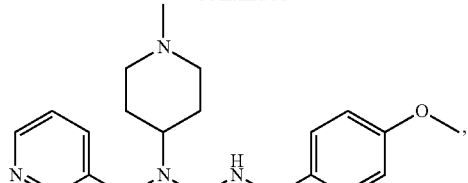

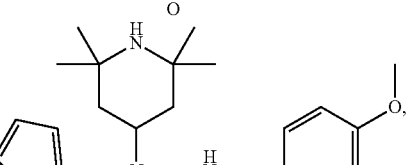

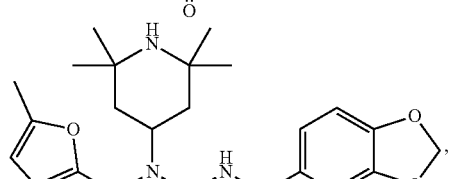

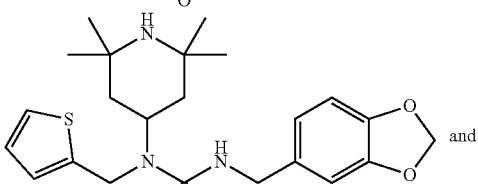

and

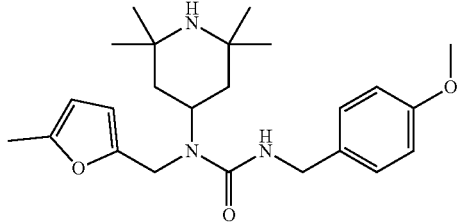

or a pharmaceutically acceptable salt thereof.
(4αB) The composition for serotonin 5-HT2A receptor inverse agonism according to any one of the above items (1αB) to (3αB), wherein R¹ is substituted or unsubstituted aromatic nitrogen-containing heterocyclyl.
(5αB) The composition for serotonin 5-HT2A receptor inverse agonism according to any one of the above items (1αB) to (4αB), wherein R¹ is substituted or unsubstituted 6-membered aromatic nitrogen-containing heterocyclyl, or substituted or unsubstituted 5-membered aromatic nitrogen-containing heterocyclyl.
(6αB) The composition for serotonin 5-HT2A receptor inverse agonism according to any one of the above items (1αB) to (5αB), wherein R² and R³ are hydrogen atoms.
(7αB) The composition for serotonin 5-HT2A receptor inverse agonism according to any one of the above items (1αB) to (6αB), wherein n is 1.
(8αB) The composition for serotonin 5-HT2A receptor inverse agonism according to any one of the above items (1αB) to (7B), wherein $R^4$ is substituted or unsubstituted 4 to 7-membered non-aromatic nitrogen-containing heterocyclyl.

(9αB) The composition for serotonin 5-HT2A receptor inverse agonism according to any one of the above items (1αB) to (8αB), wherein $R^4$ is substituted or unsubstituted piperidinyl.

(10αB) The composition for serotonin 5-HT2A receptor inverse agonism according to any one of the above items (1αB) to (9αB), wherein $R^4$ is a group represented by Formula:

[Chemical formula 46]

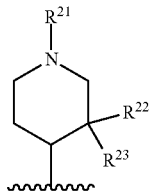

wherein $R^2$ is a hydrogen atom or substituted or unsubstituted alkyl;
$R^{22}$ is a hydrogen atom, halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle.

(11αB) The composition for serotonin 5-HT2A receptor inverse agonism according to any one of the above items (1αB) to (10αB), wherein $R^4$ is a group represented by Formula:

[Chemical formula 47]

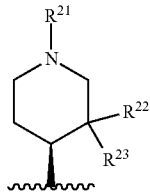

wherein $R^{21}$, $R^{22}$ and $R^{23}$ have the same meaning as the above item (10αB), or a pharmaceutically acceptable salt thereof.

(12αB) The composition for serotonin 5-HT2A receptor inverse agonism according to any one of the above items (1αB) to (11αB), wherein $R^{22}$ is halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle.

(13αB) The composition for serotonin 5-HT2A receptor inverse agonism according to any one of the above items (1αB) to (12αB), wherein $R^8$ is a hydrogen atom.

(14αB) The composition for serotonin 5-HT2A receptor inverse agonism according to any one of the above items (1αB) to (13αB), wherein $R^5$ and $R^6$ are hydrogen atoms.

(15αB) The composition for serotonin 5-HT2A receptor inverse agonism according to any one of the above items (1αB) to (14αB), wherein $R^7$ is a group represented by Formula:

[Chemical formula 48]

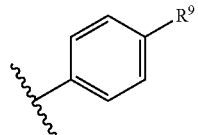

wherein $R^1$ is substituted or unsubstituted alkyloxy.

(16αB) A composition for serotonin 5-HT2A receptor inverse agonism according to the above item (3αB), wherein the compound is represented by Formula (III):

[Chemical formula 49]

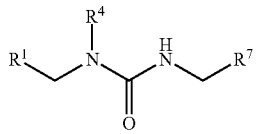

(III)

wherein $R^1$ is substituted or unsubstituted 6-membered aromatic nitrogen-containing heterocyclyl, or substituted or unsubstituted 5-membered aromatic nitrogen-containing heterocyclyl;
$R^4$ is a group represented by Formula:

[Chemical formula 50]

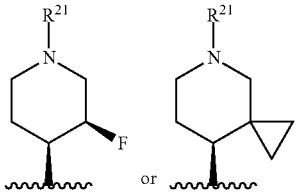

wherein $R^{21}$ is a hydrogen atom or substituted or unsubstituted alkyl,
$R^7$ is a group represented by Formula:

[Chemical formula 51]

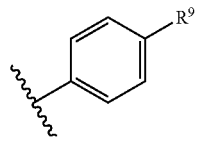

wherein $R^1$ is substituted or unsubstituted C2-C4 alkyloxy or substituted or unsubstituted amino.

(17αB) The composition for serotonin 5-HT2A receptor inverse agonism according to the above item (16αB), wherein $R^1$ is substituted or unsubstituted 5-membered aromatic nitrogen-containing heterocyclyl.

(18αB) The composition for serotonin 5-HT2A receptor inverse agonism according to the above item (3αB), wherein the compound is selected from the group consisting of compounds I-008, I-027, I-047, I-102, I-112, I-114, I-115, I-124, I-126, I-129, I-133, I-134, I-138, I-139, I-140, I-141, I-144 and I-145, (19αB) A method for treating and/or preventing a disease related to serotonin 5-HT2A receptor comprising administering the composition for serotonin 5-HT2A receptor inverse agonism according to any one of the above items (1αB) to (18αB).

(20αB) The composition for serotonin 5-HT2A receptor inverse agonism according to any one of the above items (1αB) to (18αB), for use in treating and/or preventing a disease related to serotonin 5-HT2A receptor.

(21αB) Use of the composition for serotonin 5-HT2A receptor inverse agonism according to any one of the above items (1αB) to (18αB), for the manufacture of a medicament for treating and/or preventing a disease related to serotonin 5-HT2A receptor.

(1αB) A composition for serotonin 5-HT2A receptor inverse agonism comprising a compound represented by Formula (I):

[Chemical formula 52]

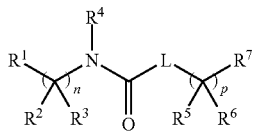

(I)

wherein $R^1$ is substituted or unsubstituted aromatic heterocyclyl, $R^2$ is each independently a hydrogen atom, halogen, hydroxy, substituted or unsubstituted alkyl, or substituted or unsubstituted alkyloxy;

$R^3$ is each independently a hydrogen atom, halogen, hydroxy, substituted or unsubstituted alkyl, or substituted or unsubstituted alkyloxy;

n is 1 or 2;

$R^4$ is substituted or unsubstituted non-aromatic nitrogen-containing heterocyclyl;

L is $-NR^8-$, $-O-$, or a single bond;

$R^8$ is a hydrogen atom or substituted or unsubstituted alkyl;

$R^5$ is each independently a hydrogen atom, halogen, hydroxy, substituted or unsubstituted alkyl, or substituted or unsubstituted alkyloxy;

$R^6$ is each independently a hydrogen atom, halogen, hydroxy, substituted or unsubstituted alkyl, or substituted or unsubstituted alkyloxy;

p is 1 or 2;

$R^7$ is a group represented by Formula:

[Chemical formula 53]

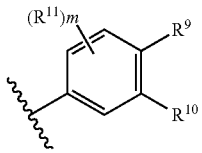

wherein $R^5$ is substituted or unsubstituted alkyloxy, substituted or unsubstituted amino, or substituted or unsubstituted alkyl;

$R^{10}$ is a hydrogen atom, halogen or substituted or unsubstituted alkyl; or $R^9$ and $R^{10}$ are taken together to form a substituted or unsubstituted non-aromatic heterocycle;

$R^{11}$ is halogen, hydroxy, substituted or unsubstituted alkyl, or substituted or unsubstituted alkyloxy;

m is 0 or 1.

or a pharmaceutically acceptable salt thereof.

(1'B) A composition for serotonin 5-HT2A receptor inverse agonism comprising a compound represented by Formula (I):

[Chemical formula 54]

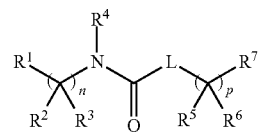

(I)

wherein $R^1$ is substituted or unsubstituted aromatic heterocyclyl, or substituted or unsubstituted non-aromatic heterocyclyl;

$R^2$ is each independently a hydrogen atom, halogen, hydroxy, substituted or unsubstituted alkyl, or substituted or unsubstituted alkyloxy;

$R^3$ is each independently a hydrogen atom, halogen, hydroxy, substituted or unsubstituted alkyl, or substituted or unsubstituted alkyloxy;

n is 1 or 2;

$R^4$ is substituted or unsubstituted non-aromatic nitrogen-containing heterocyclyl;

L is $-NR^8-$, $-O-$, or a single bond;

$R^8$ is a hydrogen atom or substituted or unsubstituted alkyl;

$R^5$ is each independently a hydrogen atom, halogen, hydroxy, substituted or unsubstituted alkyl, or substituted or unsubstituted alkyloxy;

$R^6$ is each independently a hydrogen atom, halogen, hydroxy, substituted or unsubstituted alkyl, or substituted or unsubstituted alkyloxy;

p is 1 or 2;

$R^7$ is a group represented by Formula:

[Chemical formula 55]

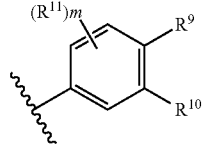

wherein $R^9$ is a hydrogen atom, halogen, substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;

$R^{10}$ is a hydrogen atom, hydroxy, halogen or substituted or unsubstituted alkyl; or R[9] and R[10] are taken together to form a substituted or unsubstituted non-aromatic heterocycle;

R[11] is halogen, hydroxy, substituted or unsubstituted alkyl, or substituted or unsubstituted alkyloxy;

m is 0 or 1, provided that the following compounds (i) and (ii) are excluded:

(i) a compound wherein L is a single bond, and R[1] is substituted or unsubstituted furyl, or substituted or unsubstituted thienyl;

(ii) a compound wherein L is —NR[8]—, and R[1] is substituted or unsubstituted 2,3-dihydrobenzofuryl;

or a pharmaceutically acceptable salt thereof.

(1″B) The composition for serotonin 5-HT2A receptor inverse agonism according to the above item (1′B), comprising a compound wherein R[1] is substituted or unsubstituted aromatic heterocyclyl;

L is —NR[8]—, or —O—, or a pharmaceutically acceptable salt thereof.

(1‴B) A composition for serotonin 5-HT2A receptor inverse agonism comprising a compound represented by Formula (II):

[Chemical formula 56]

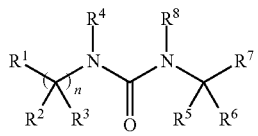

(II)

wherein R[1] is substituted or unsubstituted aromatic heterocyclyl;

R[2] is each independently a hydrogen atom, halogen, hydroxy, substituted or unsubstituted alkyl, or substituted or unsubstituted alkyloxy;

R[3] is each independently a hydrogen atom, halogen, hydroxy, substituted or unsubstituted alkyl, or substituted or unsubstituted alkyloxy;

n is 1 or 2;

R[4] is substituted or unsubstituted non-aromatic nitrogen-containing heterocyclyl;

R[8] is a hydrogen atom or substituted or unsubstituted alkyl;

R[5] is a hydrogen atom, halogen, hydroxy, substituted or unsubstituted alkyl, or substituted or unsubstituted alkyloxy;

R[6] is a hydrogen atom, halogen, hydroxy, substituted or unsubstituted alkyl, or substituted or unsubstituted alkyloxy;

R[7] is a group represented by Formula:

[Chemical formula 57]

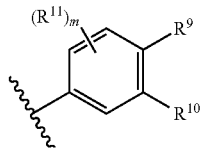

wherein R[9] is substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;

R[10] is a hydrogen atom, halogen or substituted or unsubstituted alkyl; or

R[9] and R[10] are taken together to form a substituted or unsubstituted non-aromatic heterocycle;

R[11] is halogen, hydroxy, substituted or unsubstituted alkyl, or substituted or unsubstituted alkyloxy;

m is 0 or 1;

provided that the following compounds are excluded:

[Chemical formula 58]

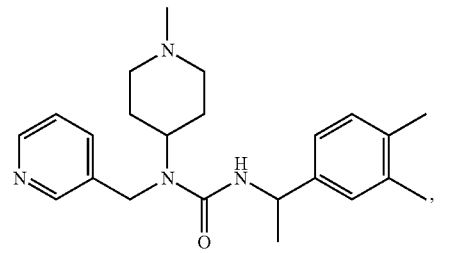

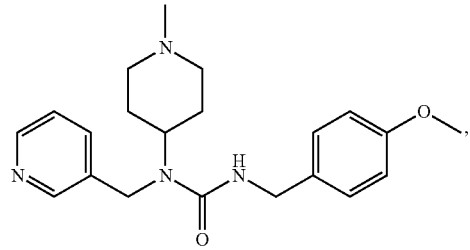

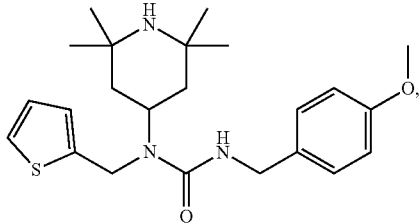

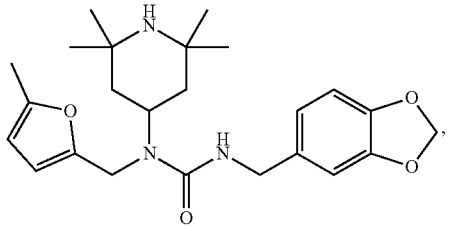

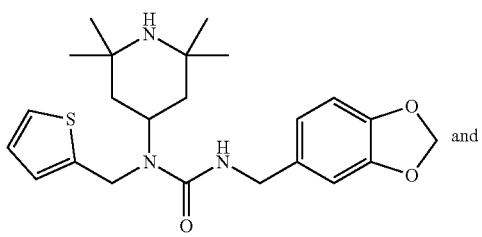

and

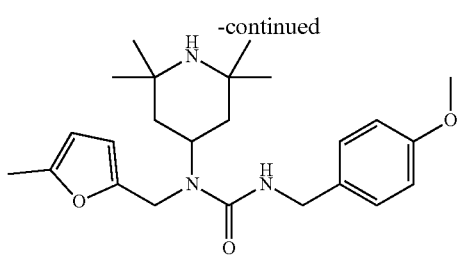

or a pharmaceutically acceptable salt thereof.

(2B) The composition for serotonin 5-HT2A receptor inverse agonism according to the above item (1B), wherein $R^1$ is substituted or unsubstituted aromatic nitrogen-containing heterocyclyl.

(2'B) The composition for serotonin 5-HT2A receptor inverse agonism according to any one of the above items (1'B), (1"B) and (1'''B), containing the compound wherein $R^1$ is substituted or unsubstituted aromatic nitrogen-containing heterocyclyl, or the pharmaceutically acceptable salt thereof.

(3B) The composition for serotonin 5-HT2A receptor inverse agonism according to any one of the above items (1B), (2B), (1'B), (1"B) and (1'''B), wherein $R^1$ is substituted or unsubstituted 6-membered aromatic heterocyclyl, or substituted or unsubstituted 5-membered aromatic heterocyclyl.

(3'B) The composition for serotonin 5-HT2A receptor inverse agonism according to any one of the above items (1B), (2B), (1'B), (1"B) and (1'''B), containing the compound wherein $R^1$ is substituted or unsubstituted 6-membered aromatic nitrogen-containing heterocyclyl, or substituted or unsubstituted 5-membered aromatic nitrogen-containing heterocyclyl, or the pharmaceutically acceptable salt thereof.

(4B) The composition for serotonin 5-HT2A receptor inverse agonism agonist according to any one of the above items (1B) to (3B), wherein $R^2$ and $R^3$ are hydrogen atoms.

(4'B) The composition for serotonin 5-HT2A receptor inverse agonism according to any one of the above items (1'B) to (3'B), (1"B) and (1'''B), containing the compound wherein $R^2$ and $R^3$ are hydrogen atoms or the pharmaceutically acceptable salt thereof.

(5B) The composition for serotonin 5-HT2A receptor inverse agonism according to any one of the above items (1B) to (4B), wherein n is 1.

(5'B) The composition for serotonin 5-HT2A receptor inverse agonism according to any one of the above items (1'B) to (4'B), (1"B) and (1'''B), containing the compound wherein n is 1, or the pharmaceutically acceptable salt thereof.

(6B) The composition for serotonin 5-HT2A receptor inverse agonism according to any one of the above items (1B) to (5B), wherein $R^4$ is substituted or unsubstituted 4 to 7-membered non-aromatic nitrogen-containing heterocyclyl.

(6'B) The composition for serotonin 5-HT2A receptor inverse agonism according to any one of the above items (1'B) to (5'B), (1"B) and (1'''B), containing the compound wherein $R^4$ is substituted or unsubstituted 4 to 7-membered non-aromatic nitrogen-containing heterocyclyl or the pharmaceutically acceptable salt thereof.

(7B) The composition for serotonin 5-HT2A receptor inverse agonism according to any one of the above items (1B) to (6B), wherein $R^4$ is substituted or unsubstituted piperidinyl.

(7'B) The composition for serotonin 5-HT2A receptor inverse agonism according to any one of the above items (1'B) to (6'B), (1"B) and (1'''B), containing the compound wherein $R^4$ is substituted or unsubstituted piperidinyl, or the pharmaceutically acceptable salt thereof.

(7"B) The composition for serotonin 5-HT2A receptor inverse agonism according to any one of the above items (1B) to (7B), (1'B) to (7'B), (1"B) and (1'''B), containing the compound wherein $R^4$ is a group represented by Formula:

[Chemical formula 59]

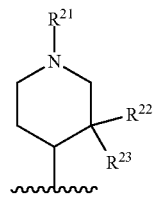

wherein $R^2$ is a hydrogen atom or substituted or unsubstituted alkyl;
$R^{22}$ is a hydrogen atom, halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle,
or the pharmaceutically acceptable salt thereof.

(7'''B) The composition for serotonin 5-HT2A receptor inverse agonism according to any one of the above items (1B) to (7B), (1'B) to (7'B), (1"B), (7"B) and (1'''B), containing the compound wherein $R^4$ is a group represented by Formula:

[Chemical formula 60]

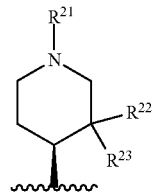

wherein $R^{21}$, $R^{22}$ and $R^{23}$ have the same meaning as the above item (7"B),
or a pharmaceutically acceptable salt thereof.

(7""B) The composition for serotonin 5-HT2A receptor inverse agonism according to the above item (7"B) or (7'''B), containing the compound wherein $R^{22}$ is halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle, or a pharmaceutically acceptable salt thereof.
(8B) The composition for serotonin 5-HT2A receptor inverse agonism according to any one of the above items (1B) to (7B), wherein L is —NR⁸—, or —O—.
(9B) The composition for serotonin 5-HT2A receptor inverse agonism according to any one of the above items (1B) to (8B), wherein L is —NH—.
(9'B) The composition for serotonin 5-HT2A receptor inverse agonism according to any one of the above items (1'B) to (7'B), (1"B), (7"B), (1'''B), (7'''B) and (7''''B), containing the compound wherein R, is a hydrogen atom, or a pharmaceutically acceptable salt thereof.
(10B) The composition for serotonin 5-HT2A receptor inverse agonism according to any one of the above items (1B) to (9B), wherein R⁵ and R⁶ are hydrogen atoms.
(10'B) The composition for serotonin 5-HT2A receptor inverse agonism according to any one of the above items (1'B) to (7'B), (9'B), (1"B), (7"B), (1'''B), (7'''B) and (7''''B), containing the compound wherein R⁵ and R⁶ are hydrogen atoms or a pharmaceutically acceptable salt thereof.
(11B) The composition for serotonin 5-HT2A receptor inverse agonism according to any one of the above items (11B) to (10B), wherein p is 1.
(12B) The composition for serotonin 5-HT2A receptor inverse agonism according to any one of the above items (1B) to (11B), wherein R⁷ is a group represented by Formula:

[Chemical formula 61]

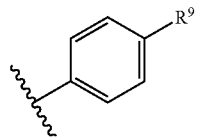

wherein R⁹ is substituted or unsubstituted alkyloxy.
(12B') The composition for serotonin 5-HT2A receptor inverse agonism according to any one of the above items (1B) to (7'B), (9'B), (10'B), (1"B), (7"B), (1'''B), (7'''B) and (7''''B), containing the compound wherein R⁷ is a group represented by Formula:

[Chemical formula 62]

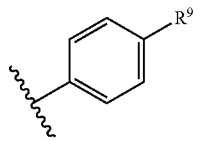

wherein R⁵ is substituted or unsubstituted alkyloxy,
or a pharmaceutically acceptable salt thereof.
(13B) A method for treating and/or preventing a disease related to serotonin 5-HT2A receptor comprising administering the composition for serotonin 5-HT2A receptor inverse agonism according to any one of the above items (1B) to (12B), (1'B) to (7'B), (9'B), (10'B), (12'B), (1"B), (7"B), (1'''B), (7'''B) and (7''''B).
(14B) The composition for serotonin 5-HT2A receptor inverse agonism according to any one of the above items (1B) to (12B), (1'B) to (7'B), (9'B), (10'B), (12'B), (1"B), (7"B), (1'''B), (7'''B) and (7''''B), for use in treating and/or preventing a disease related to serotonin 5-HT2A receptor.
(15B) Use of the composition for serotonin 5-HT2A receptor inverse agonism according to any one of the above items (1B) to (12B), (1'B) to (7'B), (9'B), (10'B), (12'B), (1"B), (7"B), (1'''B), (7'''B) and (7''''B), for the manufacture of a medicament for treating and/or preventing a disease related to serotonin 5-HT2A receptor.

Effect of the Invention

The compound according to the present invention (In the present description, "the compound according to the present invention" refers to the compound of the present invention, the compound according to the 5-HT2A receptor inverse agonist of the present invention, the compound according to the composition for 5-HT2A receptor inverse agonism of the present invention, or the compound according to the pharmaceutical composition of the present invention.) has serotonin 5-HT2A receptor inverse agonism, and are useful as a therapeutic agent and/or prophylactic agent for Parkinson's disease and/or dementia-related hallucinations and delusions.

MODE FOR CARRYING OUT THE INVENTION

Terms used in this description are explained below. Each term, unless otherwise indicated, has the same meaning when it is used alone or together with other terms.
The term of "consisting of" means having only components.
The term of "comprising" means not restricting with components and not excluding undescribed factors.
Hereinafter, the present invention is described with reference to embodiments. It should be understood that, throughout the present description, the expression of a singular form includes the concept of its plural form unless specified otherwise. Accordingly, it should be understood that an article in singular form (for example, in the English language, "a," "an," and "the") includes the concept of its plural form unless specified otherwise.
Furthermore, it should be understood that the terms used herein are used in a meaning normally used in the art unless specified otherwise. Thus, unless defined otherwise, all technical and scientific terms used herein have the same meaning as those generally understood by those skilled in the art in the field to which the present invention pertains. If there is a contradiction, the present description (including definitions) precedes.
The term "halogen" includes a fluorine atom, a chlorine atom, a bromine atom and an iodine atom. A fluorine atom and a chlorine atom are especially preferable.
The term "alkyl" includes a C1 to C15, preferably C1 to C10, more preferably C1 to C6 and further preferably C1 to C4 linear or branched hydrocarbon group. Examples include methyl, ethyl, n-propyl, isopropyl, n-butyl, isobutyl, see-butyl, tert-butyl, n-pentyl, isopentyl, neopentyl, n-hexyl, isohexyl, n-heptyl, isoheptyl, n-octyl, isooctyl, n-nonyl, and n-decyl.
Preferred embodiments of "alkyl" include methyl, ethyl, n-propyl, isopropyl, n-butyl, isobutyl, sec-butyl, tert-butyl, and n-pentyl. More preferred embodiments include methyl, ethyl, n-propyl, isopropyl, and tert-butyl.

As the alkyl moiety of alkyloxy in $R^9$, C2-C4 alkyl is preferable. Examples include ethyl, n-propyl, isopropyl, n-butyl, isobutyl, sec-butyl and tert-butyl.

The term "haloalkyl" means the above alkyl substituted with one or more halogen(s). When substituted with two or more halogens, the halogens may be the same or different. Examples include fluoromethyl, difluoromethyl, trifluoromethyl and chlorofluoromethyl.

The term "alkenyl" includes a C2 to C15, preferably a C2 to C10, more preferably a C2 to C6 and further preferably a C2 to C4 linear or branched hydrocarbon group having one or more double bond(s) at any position(s). Examples include vinyl, allyl, propenyl, isopropenyl, butenyl, isobutenyl, prenyl, butadienyl, pentenyl, isopentenyl, pentadienyl, hexenyl, isohexenyl, hexadienyl, heptenyl, octenyl, nonenyl, decenyl, undecenyl, dodecenyl, tridecenyl, tetradecenyl, and pentadecenyl.

Preferred embodiments of "alkenyl" include vinyl, allyl, propenyl, isopropenyl, and butenyl. More preferred embodiments include vinyl and n-propenyl.

The term "alkynyl" includes a C2 to C10, preferably a C2 to C8, more preferably a C2 to C6 and further preferably a C2 to C4 linear or branched hydrocarbon group having one or more triple bond(s) at any position(s). Furthermore, it may have double bond(s) at any position(s). Examples include ethynyl, propynyl, butynyl, pentynyl, hexynyl, heptynyl, octynyl, nonynyl, and decynyl.

Preferred embodiments of "alkynyl" include ethynyl, propynyl, butynyl, and pentynyl. More preferred embodiments include ethynyl and propynyl.

The term "aromatic carbocyclyl" means a cyclic aromatic hydrocarbon group which is monocyclic or polycyclic having two or more rings. Examples include phenyl, naphthyl, anthryl, and phenanthryl.

Preferred embodiments of the "aromatic carbocyclyl" include phenyl.

The term "aromatic carbocycle" means a ring derived from the above "aromatic carbocyclyl".

The term "non-aromatic carbocyclyl" means a cyclic saturated hydrocarbon group or a cyclic non-aromatic unsaturated hydrocarbon group, which is monocyclic or polycyclic having two or more rings. The "non-aromatic carbocyclyl" which is polycyclic having two or more rings includes a fused ring group wherein a non-aromatic carbocyclyl, which is monocyclic or polycyclic having two or more rings, is fused with a ring of the above "aromatic carbocyclyl".

In addition, examples of the "non-aromatic carbocyclyl" also include a group having a bridge or a group to form a spiro ring as follows:

[Chemical formula 63]

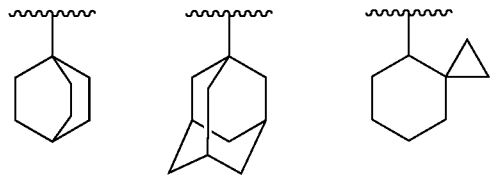

The non-aromatic carbocyclyl which is monocyclic is preferably C3 to C16, more preferably C3 to C12 and further preferably C4 to C8 carbocyclyl. Examples include cyclopropyl, cyclobutyl, cyclopentyl, cyclohexyl, cycloheptyl, cyclooctyl, cyclononyl, cyclodecyl, cyclopropenyl, cyclobutenyl, cyclopentenyl, cyclohexenyl, cycloheptenyl, and cyclohexadienyl.

The non-aromatic carbocyclyl which is polycyclic having two or more rings is preferably C8 to C20, more preferably C8 to C16 carbocyclyl. Examples include indanyl, indenyl, acenaphthyl, tetrahydronaphthyl, and fluorenyl.

The term "non-aromatic carbocycle" means a ring derived from the above "non-aromatic carbocyclyl".

The term "aromatic heterocyclyl" means an aromatic cyclyl, which is monocyclic or polycyclic having two or more rings, containing one or more, same or different heteroatom(s) selected independently from O, S and N.

The aromatic heterocyclyl, which is polycyclic having two or more rings, includes a fused ring group wherein an aromatic heterocyclyl, which is monocyclic or polycyclic having two or more rings, is fused with a ring of the above "aromatic carbocyclyl", the bond may be held in any ring.

The aromatic heterocyclyl, which is monocyclic, is preferably a 5- to 8-membered ring and more preferably a 5- to 6-membered ring. Examples of the 5-membered aromatic heterocyclyl include pyrrolyl, imidazolyl, pyrazolyl, triazolyl, tetrazolyl, furyl, thienyl, isoxazolyl, oxazolyl, oxadiazolyl, isothiazolyl, thiazolyl, and thiadiazolyl. Examples of the 6-membered aromatic heterocyclyl include pyridyl, pyridazinyl, pyrimidinyl, pyrazinyl, triazinyl. The aromatic heterocyclyl, which is bicyclic, is preferably a 8- to 10-membered ring and more preferably a 9- to 10-membered ring. Examples of aromatic heterocyclyl, which is bicyclic, include indolyl, isoindolyl, indazolyl, indolizinyl, quinolinyl, isoquinolinyl, cinnolinyl, phthalazinyl, quinazolinyl, naphthyridinyl, quinoxalinyl, purinyl, pteridinyl, benzimidazolyl, benzisoxazolyl, benzoxazolyl, benzoxadiazolyl, benzisothiazolyl, benzothiazolyl, benzothiadiazolyl, benzofuryl, isobenzofuryl, benzothienyl, benzotriazolyl, imidazopyridyl, triazolopyridyl, imidazothiazolyl, pyrazinopyridazinyl, oxazolopyridyl, and thiazolopyridyl.

The aromatic heterocyclyl, which is polycyclic having three or more rings, is preferably a 13- to 15-membered ring. Examples of aromatic heterocyclyl, which is polycyclic having three or more rings, include carbazolyl, acridinyl, xanthenyl, phenothiazinyl, phenoxathiinyl, phenoxazinyl, and dibenzofuryl.

The term "aromatic heterocycle" means a ring derived from the above "aromatic heterocyclyl".

The term "aromatic nitrogen-containing heterocyclyl" means an aromatic heterocyclyl, which is monocyclic or polycyclic having two or more rings, containing one or more N and optionally containing one or more, same or different heteroatom(s) selected independently from O, S and N. The aromatic nitrogen-containing heterocyclyl, which is polycyclic having two or more rings, includes a fused ring group wherein an aromatic nitrogen-containing heterocyclyl, which is monocyclic or polycyclic having two or more rings, is fused with a ring of the above "aromatic carbocyclyl", the bond may be held in any ring.

The aromatic nitrogen-containing heterocyclyl, which is monocyclic, is preferably a 5- to 8-membered ring and more preferably a 5- to 6-membered ring. Examples of the 5-membered aromatic nitrogen-containing heterocyclyl include pyrrolyl, imidazolyl, pyrazolyl, triazolyl, tetrazolyl, isoxazolyl, oxazolyl, oxadiazolyl, isothiazolyl, thiazolyl, and thiadiazolyl. Examples of the 6-membered aromatic nitrogen-containing heterocyclyl include pyridyl, pyridazinyl, pyrimidinyl, pyrazinyl, triazinyl.

The aromatic nitrogen-containing heterocyclyl, which is bicyclic, is preferably a 8- to 10-membered ring and more preferably a 9- to 10-membered ring. Examples of aromatic nitrogen-containing heterocyclyl, which is bicyclic, include indolyl, isoindolyl, indazolyl, indolizinyl, quinolinyl, isoquinolinyl, cinnolinyl, phthalazinyl, quinazolinyl, naphthyridinyl, quinoxalinyl, purinyl, pteridinyl, benzimidazolyl, benzisoxazolyl, benzoxazolyl, benzoxadiazolyl, benzisothiazolyl, benzothiazolyl, benzothiadiazolyl, benzotriazolyl, imidazopyridyl, triazolopyridyl, imidazothiazolyl, pyrazinopyridazinyl, oxazolopyridyl, and thiazolopyridyl.

The aromatic nitrogen-containing heterocyclyl, which is polycyclic having three or more rings, is preferably a 13- to 15-membered ring. Examples of aromatic nitrogen-containing heterocyclyl, which is polycyclic having three or more rings, include carbazolyl, acridinyl, and phenothiazinyl.

The term "non-aromatic heterocyclyl" means a non-aromatic cyclyl, which is monocyclic or polycyclic having two or more rings, containing one or more, same or different heteroatom(s) selected independently from O, S and N. The "non-aromatic heterocyclyl", which is polycyclic having two or more rings, includes a non-aromatic heterocyclyl fused with a ring of the above "aromatic carbocyclyl", "non-aromatic carbocyclyl" and/or "aromatic heterocyclyl", and further includes a non-aromatic carbocyclyl, which is monocyclic or polycyclic having two or more rings, fused with a ring of the above "aromatic heterocyclyl", the bond may be held in any ring.

In addition, examples of the "non-aromatic heterocyclyl" also include a group having a bridge or a group to form a spiro ring as follows:

[Chemical formula 64]

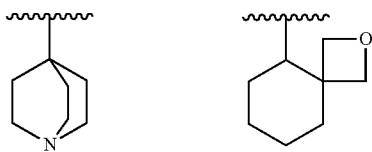

The non-aromatic heterocyclyl, which is monocyclic, is preferably a 3- to 8-membered and more preferably a 5- to 6-membered ring.

Examples of the 3-membered non-aromatic heterocyclyl include thiiranyl, oxiranyl and aziridinyl. Examples of the 4-membered non-aromatic heterocyclyl include oxetanyl and azetidinyl. Examples of the 5-membered non-aromatic heterocyclyl include oxathiolanyl, thiazolidinyl, pyrrolidinyl, pyrrolinyl, imidazolidinyl, imidazolinyl, pyrazolidinyl, pyrazolinyl, tetrahydrofuryl, dihydrothiazolyl, tetrahydroisothiazolyl, dioxolanyl, dioxolyl, and thiolanyl. Examples of the 6-membered non-aromatic heterocyclyl include dioxanyl, thianyl, piperidyl, piperazinyl, morpholinyl, morpholino, thiomorpholinyl, thiomorpholino, dihydropyridyl, tetrahydropyridyl, tetrahydropyranyl, dihydrooxazinyl, tetrahydropyridazinyl, hexahydropyrimidinyl, dioxazinyl, thiinyl, and thiazinyl. Examples of the 7-membered non-aromatic heterocyclyl include hexahydroazepinyl, tetrahydrodiazepinyl, and oxepanyl. Examples of the 8-membered non-aromatic heterocyclyl include azocane, thiocane and oxocane.

The non-aromatic heterocyclyl, which is polycyclic having two or more rings, is preferably a 8- to 20-membered and more preferably a 8- to 10-membered ring. Examples of non-aromatic heterocyclyl, which is polycyclic having two or more rings, include indolinyl, isoindolinyl, chromanyl, and isochromanyl.

The term "non-aromatic nitrogen-containing heterocyclyl" means an non-aromatic heterocyclyl, which is monocyclic or polycyclic having two or more rings, containing one or more N. The non-aromatic nitrogen-containing heterocyclyl, which is polycyclic having two or more rings, includes a fused ring group wherein an non-aromatic nitrogen-containing heterocyclyl, which is monocyclic or polycyclic having two or more rings, is fused with a ring of the above "aromatic carbocyclyl", "non-aromatic carbocyclyl" and/or "aromatic heterocyclyl", the bond may be held in any ring.

Examples include rings as follows.

[Chemical formula 65]

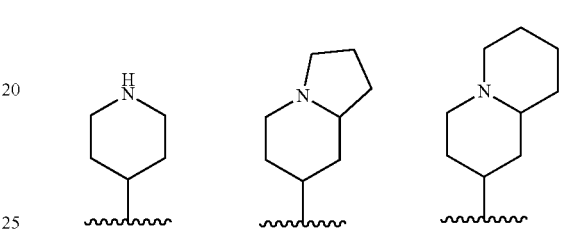

Furthermore. "non-aromatic nitrogen-containing heterocyclyl" also include a group having a bridge or a group to form a spiro ring as follows:

[Chemical formula 66]

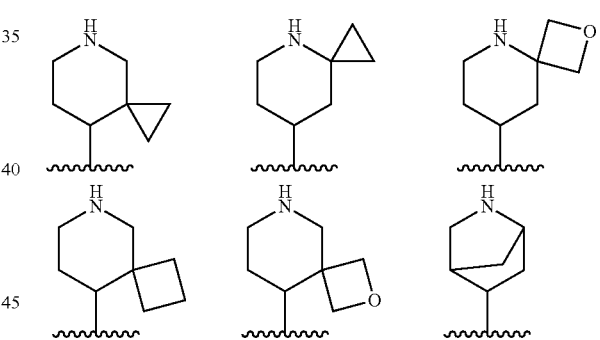

The term "non-aromatic heterocycle" means a ring derived from the above "non-aromatic heterocyclyl".

The term "non-aromatic heterocycle that $R^9$ and $R^{10}$ are taken together to form" means rings as follows as examples.

[Chemcial formula 67]

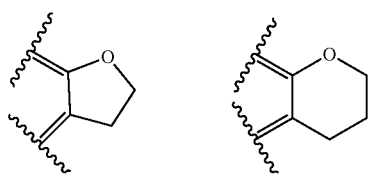

The term "non-aromatic carbocycle that $R^{22}$ and $R^{23}$ are taken together with the carbon atom to which they are bonded to form" means rings as follows as examples.

[Chemcial formula 68]

The term "trialkylsilyl" means a group in which the above three "alkyls" are bound to a silicon atom. The three alkyls may be the same or different. Examples include trimethylsilyl, triethylsilyl and tert-butyldimethylsilyl.

In the present description, the phrase "may be substituted with substituent group α" means that "may be substituted with one or more group(s) selected from substituent group α". The same also applies to substituent groups β, γ, and γ'.

Substituents for "substituted alkyl", "substituted alkenyl", "substituted alkynyl", "substituted alkyloxy", "substituted alkenyloxy", "substituted alkynyloxy", "substituted alkylcarbonyloxy", "substituted alkenylcarbonyloxy", "substituted alkynylcarbonyloxy", "substituted alkylcarbonyl", "substituted alkenylcarbonyl", "substituted alkynylcarbonyl", "substituted alkyloxycarbonyl", "substituted alkenyloxycarbonyl", "substituted alkynyloxycarbonyl", "substituted alkylsulfanyl", "substituted alkenylsulfanyl", "substituted alkynylsulfanyl", "substituted alkylsulfinyl", "substituted alkenylsulfinyl", "substituted alkynylsulfinyl", "substituted alkylsulfonyl", "substituted alkenylsulfonyl", "substituted alkynylsulfonyl", "substituted dialkylsulfoxyimino", and the like include the following substituent group A. A carbon atom at any position may be bonded to one or more group(s) selected from the following substituent group A.

Substituent group A: halogen, hydroxy, carboxy, formyl, formyloxy, sulfanyl, sulfino, sulfo, thioformyl, thiocarboxy, dithiocarboxy, thiocarbamoyl, cyano, nitro, nitroso, azido, hydrazino, ureido, amidino, guanidino, pentafluorothio, trialkylsilyl, alkyloxy which may be substituted with substituent group α, alkenyloxy which may be substituted with substituent group α, alkynyloxy which may be substituted with substituent group α, alkylcarbonyloxy which may be substituted with substituent group α, alkenylcarbonyloxy which may be substituted with substituent group α, alkynylcarbonyloxy which may be substituted with substituent group α, alkylcarbonyl which may be substituted with substituent group α, alkenylcarbonyl which may be substituted with substituent group α, alkynylcarbonyl which may be substituted with substituent group α, alkyloxycarbonyl which may be substituted with substituent group α, alkenyloxycarbonyl which may be substituted with substituent group α, alkynyloxycarbonyl which may be substituted with substituent group α, alkylsulfanyl which may be substituted with substituent group α, alkenylsulfanyl which may be substituted with substituent group α, alkynylsulfanyl which may be substituted with substituent group α, alkylsulfinyl which may be substituted with substituent group α, alkenylsulfinyl which may be substituted with substituent group α, alkynylsulfinyl which may be substituted with substituent group α, alkylsulfonyl which may be substituted with substituent group α, alkenylsulfonyl which may be substituted with substituent group α, alkynylsulfonyl which may be substituted with substituent group α, amino which may be substituted with substituent group α, imino which may be substituted with substituent group α, carbamoyl which may be substituted with substituent group β, sulfamoyl which may be substituted with substituent group β, aromatic carbocyclyl which may be substituted with substituent group γ, non-aromatic carbocyclyl which may be substituted with substituent group γ', aromatic heterocyclyl which may be substituted with substituent group γ, non-aromatic heterocyclyl which may be substituted with substituent group γ', aromatic carbocyclyloxy which may be substituted with substituent group γ, non-aromatic carbocyclyloxy which may be substituted with substituent group γ', aromatic heterocyclyloxy which may be substituted with substituent group γ, non-aromatic heterocyclyloxy which may be substituted with substituent group γ', aromatic carbocyclylcarbonyloxy which may be substituted with substituent group γ, non-aromatic carbocyclylcarbonyloxy which may be substituted with substituent group γ', aromatic heterocyclylcarbonyloxy which may be substituted with substituent group γ, non-aromatic heterocyclylcarbonyloxy which may be substituted with substituent group γ', aromatic carbocyclylcarbonyl which may be substituted with substituent group γ, non-aromatic carbocyclylcarbonyl which may be substituted with substituent group γ', aromatic heterocyclylcarbonyl which may be substituted with substituent group γ, non-aromatic heterocyclylcarbonyl which may be substituted with substituent group γ', aromatic carbocyclyloxycarbonyl which may be substituted with substituent group γ, non-aromatic carbocyclyloxycarbonyl which may be substituted with substituent group γ', aromatic heterocyclyloxycarbonyl which may be substituted with substituent group γ, non-aromatic heterocyclyloxycarbonyl which may be substituted with substituent group γ', aromatic carbocyclylalkyloxy which may be substituted with substituent group γ, non-aromatic carbocyclylalkyloxy which may be substituted with substituent group γ', aromatic heterocyclylalkyloxy which may be substituted with substituent group γ, non-aromatic heterocyclylalkyloxy which may be substituted with substituent group γ', aromatic carbocyclylalkyloxycarbonyl which may be substituted with substituent group γ, non-aromatic carbocyclylalkyloxycarbonyl which may be substituted with substituent group γ', aromatic heterocyclylalkyloxycarbonyl which may be substituted with substituent group γ, non-aromatic heterocyclylalkyloxycarbonyl which may be substituted with substituent group γ', aromatic carbocyclylsulfanyl which may be substituted with substituent group γ, non-aromatic carbocyclylsulfanyl which may be substituted with substituent group γ', aromatic heterocyclylsulfanyl which may be substituted with substituent group γ, non-aromatic heterocyclylsulfanyl which may be substituted with substituent group γ', aromatic carbocyclylsulfinyl which may be substituted with substituent group γ, non-aromatic carbocyclylsulfinyl which may be substituted with substituent group γ', aromatic heterocyclylsulfinyl which may be substituted with substituent group γ, non-aromatic heterocyclylsulfinyl which may be substituted with substituent group γ', aromatic carbocyclylsulfonyl which may be substituted with substituent group γ, non-aromatic carbocyclylsulfonyl which may be substituted with substituent group γ', aromatic heterocyclylsulfonyl which may be substituted with substituent group γ, and non-aromatic heterocyclylsulfonyl which may be substituted with substituent group γ'.

Substituent group α: halogen, hydroxy, carboxy, alkyloxy, haloalkyloxy, alkenyloxy, alkynyloxy, sulfanyl, and cyano.

Substituent group β: halogen, hydroxy, carboxy, cyano, alkyl which may be substituted with substituent group α, alkenyl which may be substituted with substituent group α, alkynyl which may be substituted with substituent group α, alkylcarbonyl which may be substituted with substituent group α, alkenylcarbonyl which may be substituted with substituent group α, alkynylcarbonyl which may be substituted with substituent group α, alkylsulfanyl which may be substituted with substituent group α, alkenylsulfanyl which may be substituted with substituent group α, alkynylsulfanyl which may be substituted with substituent group α, alkylsulfinyl which may be substituted with substituent group α, alkenylsulfinyl which may be substituted with substituent group α, alkynylsulfinyl which may be substituted with substituent group α, alkylsulfonyl which may be substituted with substituent group α, alkenylsulfonyl which may be substituted with substituent group α, alkynylsulfonyl which may be substituted with substituent group α, aromatic carbocyclyl which may be substituted with substituent group γ, non-aromatic carbocyclyl which may be substituted with substituent group γ', aromatic heterocyclyl which may be substituted with substituent group γ, non-aromatic heterocyclyl which may be substituted with substituent group γ', aromatic carbocyclylalkyl which may be substituted with substituent group γ, non-aromatic carbocyclylalkyl which may be substituted with substituent group γ', aromatic heterocyclylalkyl which may be substituted with substituent group γ, non-aromatic heterocyclylalkyl which may be substituted with substituent group γ', aromatic carbocyclylcarbonyl which may be substituted with substituent group γ, non-aromatic carbocyclylcarbonyl which may be substituted with substituent group γ', aromatic heterocyclylcarbonyl which may be substituted with substituent group γ, non-aromatic heterocyclylcarbonyl which may be substituted with substituent group γ', aromatic carbocyclyloxycarbonyl which may be substituted with substituent group γ, non-aromatic carbocyclyloxycarbonyl which may be substituted with substituent group γ', aromatic heterocyclyloxycarbonyl which may be substituted with substituent group γ, non-aromatic heterocyclyloxycarbonyl which may be substituted with substituent group γ', aromatic carbocyclylsulfanyl which may be substituted with substituent group γ, non-aromatic carbocyclylsulfanyl which may be substituted with substituent group γ', aromatic heterocyclylsulfanyl which may be substituted with substituent group γ, non-aromatic heterocyclylsulfanyl which may be substituted with substituent group γ', aromatic carbocyclylsulfinyl which may be substituted with substituent group γ, non-aromatic carbocyclylsulfinyl which may be substituted with substituent group γ', aromatic heterocyclylsulfinyl which may be substituted with substituent group γ, non-aromatic heterocyclylsulfinyl which may be substituted with substituent group γ', aromatic carbocyclylsulfonyl which may be substituted with substituent group γ, non-aromatic carbocyclylsulfonyl which may be substituted with substituent group γ', aromatic heterocyclylsulfonyl which may be substituted with substituent group γ, and non-aromatic heterocyclylsulfonyl which may be substituted with substituent group γ'.

Substituent group γ: substituent group α, alkyl, haloalkyl, hydroxyalkyl, alkenyl, alkynyl, alkylcarbonyl, haloalkylcarbonyl, alkenylcarbonyl, and alkynylcarbonyl.

Substituent group γ': substituent group γ and oxo.

The substituents on the rings of "aromatic carbocycle" and "aromatic heterocycle", such as "substituted aromatic carbocyclyl", "substituted aromatic heterocyclyl", "substituted aromatic nitrogen-containing heterocyclyl", "substituted aromatic carbocyclyloxy", "substituted aromatic heterocyclyloxy", "substituted aromatic carbocyclylcarbonyloxy", "substituted aromatic heterocyclylcarbonyloxy", "substituted aromatic carbocyclylcarbonyl", "substituted aromatic heterocyclylcarbonyl", "substituted aromatic carbocyclyloxycarbonyl", "substituted aromatic heterocyclyloxycarbonyl", "substituted aromatic carbocyclylsulfanyl", "substituted aromatic heterocyclylsulfanyl", "substituted aromatic carbocyclylsulfinyl", "substituted aromatic heterocyclylsulfinyl", "substituted aromatic carbocyclylsulfonyl", and "substituted aromatic heterocyclylsulfonyl" include the following substituent group B. An atom at any position on the ring may be bonded to one or more group(s) selected from the following substituent group B.

Substituent group B: halogen, hydroxy, carboxy, formyl, formyloxy, sulfanyl, sulfino, sulfo, thioformyl, thiocarboxy, dithiocarboxy, thiocarbamoyl, cyano, nitro, nitroso, azido, hydrazino, ureido, amidino, guanidino, pentafluorothio, trialkylsilyl, alkyl which may be substituted with substituent group α, alkenyl which may be substituted with substituent group α, alkynyl which may be substituted with substituent group α, alkyloxy which may be substituted with substituent group α, alkenyloxy which may be substituted with substituent group α, alkynyloxy which may be substituted with substituent group α, alkylcarbonyloxy which may be substituted with substituent group α, alkenylcarbonyloxy which may be substituted with substituent group α, alkynylcarbonyloxy which may be substituted with substituent group α, alkylcarbonyl which may be substituted with substituent group α, alkenylcarbonyl which may be substituted with substituent group α, alkynylcarbonyl which may be substituted with substituent group α, alkyloxycarbonyl which may be substituted with substituent group α, alkenyloxycarbonyl which may be substituted with substituent group α, alkynyloxycarbonyl which may be substituted with substituent group α, alkylsulfanyl which may be substituted with substituent group α, alkenylsulfanyl which may be substituted with substituent group α, alkynylsulfanyl which may be substituted with substituent group α, alkylsulfinyl which may be substituted with substituent group α, alkenylsulfinyl which may be substituted with substituent group α, alkynylsulfinyl which may be substituted with substituent group α, alkylsulfonyl which may be substituted with substituent group α, alkenylsulfonyl which may be substituted with substituent group α, alkynylsulfonyl which may be substituted with substituent group α, amino which may be substituted with substituent group β, imino which may be substituted with substituent group β, carbamoyl which may be substituted with substituent group β, sulfamoyl which may be substituted with substituent group β, aromatic carbocyclyl which may be substituted with substituent group γ, non-aromatic carbocyclyl which may be substituted with substituent group γ', aromatic heterocyclyl which may be substituted with substituent group γ, non-aromatic heterocyclyl which may be substituted with substituent group γ', aromatic carbocyclyloxy which may be substituted with substituent group γ, non-aromatic carbocyclyloxy which may be substituted with substituent group γ', aromatic heterocyclyloxy which may be substituted with substituent group γ, non-aromatic heterocyclyloxy which may be substituted with substituent group γ', aromatic carbocyclylcarbonyloxy which may be substituted with substituent group γ, non-aromatic carbocyclylcarbonyloxy which may be substituted with substituent group γ', aromatic heterocyclylcarbonyloxy which may be substituted with substituent group γ, and non-aromatic heterocyclylcarbonyloxy which may be substituted with substituent group γ', aromatic carbocyclylcarbonyl which may be substituted with substituent group γ, non-aromatic carbocyclylcarbonyl which may be substituted with substituent group γ', aromatic heterocyclylcarbonyl which may be substituted with substituent group γ, non-aromatic heterocyclylcarbonyl which may be substituted with substituent group γ', aromatic carbocyclyloxycarbonyl which may be substituted with substituent group γ, non-aromatic carbocyclyloxycarbonyl which may be substituted with substituent group γ', aromatic heterocyclyloxycarbonyl which may be substituted with substituent group γ, non-aromatic heterocyclyloxycarbonyl which may be substituted with substituent group γ', aromatic carbocyclylalkyl which may be substituted with substituent group γ, non-aromatic carbocyclylalkyl which may be substituted with substituent group γ', aromatic heterocyclylalkyl which may be substituted with substituent group γ, non-aromatic heterocyclylalkyl which may be substituted with substituent group γ', aromatic carbocyclylalkyloxy which may be substituted with substituent group γ, non-aromatic carbocyclylalkyloxy which may be substituted with substituent group γ', aromatic heterocyclylalkyloxy which may be substituted with substituent group γ, non-aromatic heterocyclylalkyloxy which may be substituted with substituent group γ', aromatic carbocyclylalkyloxycarbonyl which may be substituted with substituent group γ, non-aromatic carbocyclylalkyloxycarbonyl which may be substituted with substituent group γ', aromatic heterocyclylalkyloxycarbonyl which may be substituted with substituent group γ, non-aromatic heterocyclylalkyloxycarbonyl which may be substituted with substituent group γ', aromatic carbocyclylalkyloxyalkyl which may be substituted with substituent group γ, non-aromatic carbocyclylalkyloxyalkyl which may be substituted with substituent group γ', aromatic heterocyclylalkyloxyalkyl which may be substituted with substituent group γ, non-aromatic heterocyclylalkyloxyalkyl which may be substituted with substituent group γ', aromatic carbocyclylsulfanyl which may be substituted with substituent group γ, non-aromatic carbocyclylsulfanyl which may be substituted with substituent group γ', aromatic heterocyclylsulfanyl which may be substituted with substituent group γ, non-aromatic heterocyclylsulfanyl which may be substituted with substituent group γ', aromatic carbocyclylsulfinyl which may be substituted with substituent group γ, non-aromatic carbocyclylsulfinyl which may be substituted with substituent group γ', aromatic heterocyclylsulfinyl which may be substituted with substituent group γ, non-aromatic heterocyclylsulfinyl which may be substituted with substituent group γ', aromatic carbocyclylsulfonyl which may be substituted with substituent group γ, non-aromatic carbocyclylsulfonyl which may be substituted with substituent group γ', aromatic heterocyclylsulfonyl which may be substituted with substituent group γ, and non-aromatic heterocyclylsulfonyl which may be substituted with substituent group γ'.

The substituents on the ring of "non-aromatic carbocycle" and "non-aromatic heterocycle" of "substituted non-aromatic carbocyclyl", "substituted non-aromatic heterocyclyl", "substituted non-aromatic nitrogen-containing heterocyclyl", "substituted heterocyclyl which $R^9$ and $R^{10}$ are taken together to form", "substituted heterocyclyl which $R^{22}$ and $R^{23}$ are taken together with the carbon atom to which they are bonded to form", "substituted non-aromatic carbocyclyloxy", "substituted non-aromatic heterocyclyloxy", "substituted non-aromatic carbocyclylcarbonyloxy", "substituted non-aromatic heterocyclylcarbonyloxy", "substituted non-aromatic carbocyclylcarbonyl", "substituted non-aromatic heterocyclylcarbonyl", "substituted non-aromatic carbocyclyloxycarbonyl", "substituted non-aromatic heterocyclyloxycarbonyl", "substituted non-aromatic carbocyclylsulfanyl", "substituted non-aromatic heterocyclylsulfanyl", "substituted non-aromatic carbocyclylsulfinyl", "substituted non-aromatic heterocyclylsulfinyl", "substituted non-aromatic carbocyclylsulfonyl", and "substituted non-aromatic heterocyclylsulfonyl", include the following substituent group C. An atom at any position on the ring may be bonded to one or more group(s) selected from the following substituent group C.

Substituent group C: substituent group B and oxo.

When the "non-aromatic carbocycle", the "non-aromatic heterocycle" and the "non-aromatic nitrogen-containing heterocycle" are substituted with "oxo", this means a ring in which two hydrogen atoms on a carbon atom are substituted as follows.

[Chemcial formula 69]

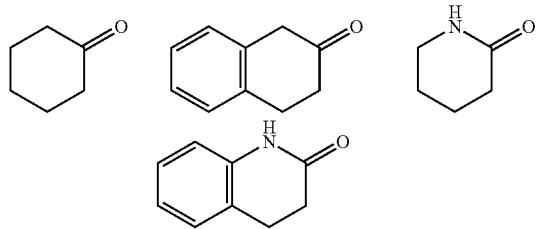

The substituents for "substituted amino", "substituted imino", "substituted carbamoyl", and "substituted sulfamoyl" include the following substituent group D. These moieties may be substituted with one or two group(s) selected from substituent group D.

Substituent group D: halogen, hydroxy, carboxy, cyano, alkyl which may be substituted with substituent group α, alkenyl which may be substituted with substituent group α, alkynyl which may be substituted with substituent group α, alkylcarbonyl which may be substituted with substituent group α, alkenylcarbonyl which may be substituted with substituent group α, alkynylcarbonyl which may be substituted with substituent group α, alkylsulfanyl which may be substituted with substituent group α, alkenylsulfanyl which may be substituted with substituent group α, alkynylsulfanyl which may be substituted with substituent group α, alkylsulfinyl which may be substituted with substituent group α, alkenylsulfinyl which may be substituted with substituent group α, alkynylsulfinyl which may be substituted with substituent group α, alkylsulfonyl which may be substituted with substituent group α, alkenylsulfonyl which may be substituted with substituent group α, alkynylsulfonyl which may be substituted with substituent group α, amino which may be substituted with substituent group β, imino which may be substituted with substituent group β, carbamoyl which may be substituted with substituent group β, sulfamoyl which may be substituted with substituent group β, aromatic carbocyclyl which may be substituted with substituent group γ, non-aromatic carbocyclyl which may be substituted with substituent group γ', aromatic heterocyclyl which may be substituted with substituent group γ, non-aromatic heterocyclyl which may be substituted with substituent group γ', aromatic carbocyclylalkyl which may be substituted with substituent group γ, non-aromatic carbocyclylalkyl which may be substituted with substituent group γ', aromatic heterocyclylalkyl which may be substituted with substituent group γ, non-aromatic heterocyclylalkyl which may be substituted with substituent group γ', aromatic carbocyclylcarbonyl which may be substituted with substituent group γ, non-aromatic carbocyclylcarbonyl which may be substituted with substituent group γ', aromatic heterocyclylcarbonyl which may be substituted with substituent group γ, non-aromatic heterocyclylcarbonyl which may be substituted with substituent group γ', aromatic carbocyclyloxycarbonyl which may be substituted with substituent group γ, non-aromatic carbocyclyloxycarbonyl which may be substituted with substituent group γ', aromatic heterocyclyloxycarbonyl which may be substituted with substituent group γ, non-aromatic heterocyclyloxycarbonyl which may be substituted with substituent group γ', aromatic carbocyclylsulfanyl which may be substituted with substituent group γ, non-aromatic carbocyclylsulfanyl which may be substituted with substituent group γ', aromatic heterocyclylsulfanyl which may be substituted with substituent group γ, non-aromatic heterocyclylsulfanyl which may be substituted with substituent group γ', aromatic carbocyclylsulfinyl which may be substituted with substituent group γ, non-aromatic carbocyclylsulfinyl which may be substituted with substituent group γ', aromatic heterocyclylsulfinyl which may be substituted with substituent group γ, non-aromatic heterocyclylsulfinyl which may be substituted with substituent group γ', aromatic carbocyclylsulfonyl which may be substituted with substituent group γ, non-aromatic carbocyclyl sulfonyl which may be substituted with substituent group γ', aromatic heterocyclylsulfonyl which may be substituted with substituent group γ, and non-aromatic heterocyclylsulfonyl which may be substituted with substituent group γ'.

With regard to a compound represented by Formula (I) or Formula (II), preferred embodiments of $R^1$, $R^2$, $R^3$, n, $R^4$, L, $R^8$, $R^5$, $R^6$, p, $R^7$, $R^9$, $R^{10}$, $R^{11}$, $R^{21}$, $R^{22}$, $R^{23}$ and m will be shown below. Regarding the compound represented by Formula (I) and Formula (II), embodiments of all the combinations of specific examples shown below are mentioned as examples.

$R^1$ may be substituted or unsubstituted aromatic heterocyclyl, or substituted or unsubstituted non-aromatic heterocyclyl (hereinafter, referred to as A-1).

$R^1$ may be substituted or unsubstituted aromatic heterocyclyl (hereinafter, referred to as A-2).

$R^1$ may be substituted or unsubstituted aromatic nitrogen-containing heterocyclyl, (hereinafter, referred to as A-3).

$R^1$ may be substituted or unsubstituted 5-membered aromatic heterocyclyl, substituted or unsubstituted 6-membered aromatic heterocyclyl, or substituted or unsubstituted 10-membered aromatic heterocyclyl (hereinafter, referred to as A-4).

$R^1$ may be substituted or unsubstituted 6-membered aromatic heterocyclyl, or substituted or unsubstituted 5-membered aromatic heterocyclyl (hereinafter, referred to as A-5).

$R^1$ may be 5-membered aromatic heterocyclyl substituted with alkyl; unsubstituted 5-membered aromatic heterocyclyl; 6-membered aromatic heterocyclyl substituted with one or more substituent(s) selected from the group consisting of halogen, alkyloxy, cyano, haloalkyl and alkyl; or unsubstituted 6-membered aromatic heterocyclyl halogen (hereinafter, referred to as A-6).

$R^1$ may be substituted or unsubstituted 5-membered aromatic heterocyclyl (hereinafter, referred to as A-7).

$R^1$ may be 5-membered aromatic heterocyclyl substituted with alkyl, or unsubstituted 5-membered aromatic heterocyclyl (hereinafter, referred to as A-8).

$R^1$ may be substituted or unsubstituted 6-membered aromatic heterocyclyl (hereinafter, referred to as A-9).

$R^1$ may be 6-membered aromatic heterocyclyl substituted with one or more substituent(s) selected from the group consisting of halogen, alkyloxy, cyano, haloalkyl and alkyl, or unsubstituted 6-membered aromatic heterocyclyl (hereinafter, referred to as A-10).

$R^1$ may be substituted or unsubstituted 10-membered aromatic heterocyclyl (hereinafter, referred to as A-11).

$R^1$ may be unsubstituted 10-membered aromatic heterocyclyl (hereinafter, referred to as A-12).

$R^1$ may be substituted or unsubstituted pyridyl, substituted or unsubstituted pyrimidinyl, substituted or unsubstituted pyridazinyl, substituted or unsubstituted pyrazinyl, substituted or unsubstituted pyrazolyl, substituted or unsubstituted imidazolyl, substituted or unsubstituted pyrrolyl, substituted or unsubstituted thienyl, substituted or unsubstituted thiazolyl, substituted or unsubstituted oxazolyl, substituted or unsubstituted isothiazolyl, substituted or unsubstituted isoxazolyl, substituted or unsubstituted oxadiazolyl, substituted or unsubstituted isoquinolinyl, substituted or unsubstituted quinolinyl, or substituted or unsubstituted indolyl (hereinafter referred to as A-13).

$R^1$ may be substituted or unsubstituted pyridyl, substituted or unsubstituted pyrimidinyl, substituted or unsubstituted pyridazinyl, substituted or unsubstituted pyrazinyl, substituted or unsubstituted pyrrolyl, or substituted or unsubstituted pyrazolyl (hereinafter referred to as A-14).

$R^1$ may be substituted or unsubstituted pyridyl, substituted or unsubstituted pyrrolyl, or substituted or unsubstituted pyrazolyl (hereinafter referred to as A-15).

$R^1$ may be substituted or unsubstituted pyrrolyl, or substituted or unsubstituted pyrazolyl (hereinafter referred to as A-16).

$R^1$ may be substituted or unsubstituted pyridyl (hereinafter referred to as A-17).

$R^1$ may be pyridyl substituted with one or more substituent(s) selected from the group consisting of halogen, alkyloxy, cyano, haloalkyl and alkyl, or unsubstituted pyridyl (hereinafter, referred to as A-18).

$R^1$ may be pyridyl substituted with halogen and/or haloalkyl, or unsubstituted pyridyl (hereinafter, referred to as A-19).

$R^1$ may be pyridyl substituted with halogen, or unsubstituted pyridyl (hereinafter, referred to as A-20).

$R^1$ may be pyridyl substituted with halogen (hereinafter, referred to as A-21).

$R^1$ may be pyridyl substituted with haloalkyl, or unsubstituted pyridyl (hereinafter, referred to as A-22).

$R^1$ may be pyridyl substituted with haloalkyl (hereinafter, referred to as A-23).

$R^1$ may be substituted or unsubstituted pyrazolyl (hereinafter, referred to as A-24).

$R^1$ may be pyrazolyl substituted with haloalkyl and/or alkyl, or unsubstituted pyrazolyl (hereinafter, referred to as A-25).

$R^1$ may be pyrazolyl substituted with alkyl, or unsubstituted pyrazolyl (hereinafter, referred to as A-26).

$R^1$ may be pyrazolyl substituted with alkyl (hereinafter, referred to as A-27).

$R^1$ may be substituted or unsubstituted pyrrolyl (hereinafter, referred to as A-28).

$R^1$ may be pyrrolyl substituted with haloalkyl and/or alkyl, or unsubstituted pyrrolyl (hereinafter, referred to as A-29).

$R^1$ may be pyrrolyl substituted with alkyl, or unsubstituted pyrrolyl (hereinafter, referred to as A-30).

$R^1$ may be pyrrolyl substituted with alkyl (hereinafter, referred to as A-31).

$R^2$ may be each independently a hydrogen atom, halogen, hydroxy, substituted or unsubstituted alkyl, or substituted or unsubstituted alkyloxy (hereinafter, referred to as B-1).

$R^2$ may be each independently a hydrogen atom (hereinafter, referred to as B-2).

$R^3$ may be each independently a hydrogen atom, halogen, hydroxy, substituted or unsubstituted alkyl, or substituted or unsubstituted alkyloxy (hereinafter, referred to as C-1).

$R^3$ may be each independently a hydrogen atom (hereinafter, referred to as C-2).

n may be 1 or 2 (hereinafter, referred to as D-1).

n may be 1 (hereinafter, referred to as D-2).

$R^4$ may be substituted or unsubstituted non-aromatic nitrogen-containing heterocyclyl (hereinafter, referred to as E-1).

$R^4$ may be substituted or unsubstituted 4 to 7-membered non-aromatic nitrogen-containing heterocyclyl (hereinafter, referred to as E-2).

$R^4$ may be substituted or unsubstituted 6-membered non-aromatic nitrogen-containing heterocyclyl (hereinafter, referred to as E-3).

$R^4$ may be substituted or unsubstituted piperidinyl (hereinafter, referred to as E-4).

$R^4$ may be a group represented by Formula:

[Chemcial formula 70]

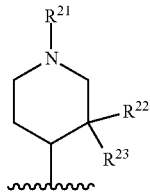

wherein $R^{21}$ is a hydrogen atom or substituted or unsubstituted alkyl;
$R^{22}$ is a hydrogen atom, halogen or substituted or unsubstituted alkyl;
$R^{23}$ is a hydrogen atom, halogen or substituted or unsubstituted alkyl; or $R^{22}$ and $R^{23}$ are taken together with the carbon atom to which they are bonded to form a substituted or unsubstituted non-aromatic carbocycle (hereinafter, referred to as E-5).

$R^4$ may be a group represented by Formula:

[Chemcial formula 71]

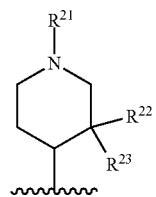

wherein $R^{21}$ is a hydrogen atom or substituted or unsubstituted alkyl;
$R^{22}$ is halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle, (hereinafter, referred to as E-6).

$R^4$ may be a group represented by Formula:

[Chemcial formula 70]

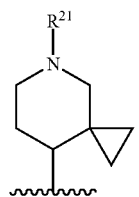

wherein $R^{21}$ is a hydrogen atom or substituted or unsubstituted alkyl (hereinafter, referred to as E-7).

$R^4$ may be a group represented by Formula:

[Chemcial formula 73]

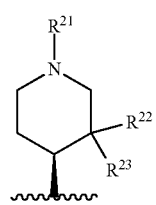

wherein $R^{21}$, $R^{22}$ and $R^{23}$ have the same meaning as E-5 (hereinafter, referred to as E-8).

$R^4$ may be a group represented by Formula:

[Chemcial formula 74]

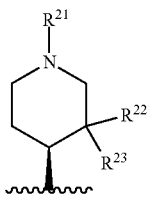

wherein $R^{21}$, $R^{22}$ and $R^{23}$ have the same meaning as E-6 (hereinafter, referred to as E-9).

$R^4$ may be a group represented by Formula:

[Chemical formula 75]

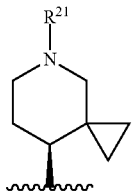

wherein $R^{21}$ is a hydrogen atom or substituted or unsubstituted alkyl (hereinafter, referred to as E-10).

$R^4$ may be a group represented by Formula:

[Chemical formula 76]

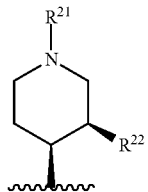

wherein $R^{21}$ is a hydrogen atom or substituted or unsubstituted alkyl;

$R^{22}$ is halogen (hereinafter, referred to as E-11).

L may be —$NR^8$—, —O—, or a single bond (hereinafter, referred to as F-1).

L may be —$NR^8$— (hereinafter, referred to as F-2).

L may be —O— (hereinafter, referred to as F-3).

L may be a single bond (hereinafter, referred to as F-4).

$R^8$ may be a hydrogen atom or substituted or unsubstituted alkyl (hereinafter, referred to as G-1).

$R^8$ may be a hydrogen atom (hereinafter, referred to as G-2).

$R^5$ may be each independently a hydrogen atom, halogen, hydroxy, substituted or unsubstituted alkyl, or substituted or unsubstituted alkyloxy (hereinafter, referred to as 11-1).

$R^5$ may be each independently a hydrogen atom (hereinafter, referred to as H-2).

$R^6$ may be each independently a hydrogen atom, halogen, hydroxy, substituted or unsubstituted alkyl, or substituted or unsubstituted alkyloxy (hereinafter, referred to as J-1).

$R^6$ may be each independently a hydrogen atom (hereinafter, referred to as J-2).

p may be 1 or 2 (hereinafter, referred to as K-1).

p may be 1 (hereinafter, referred to as K-2).

$R^7$ may be a group represented by Formula:

[Chemical formula 77]

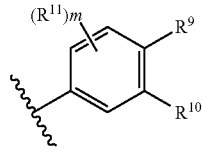

wherein $R^9$ is a hydrogen atom, halogen, substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;

$R^{10}$ is a hydrogen atom, hydroxy, halogen or substituted or unsubstituted alkyl; or $R^9$ and $R^{10}$ are taken together to form a substituted or unsubstituted non-aromatic heterocycle;

$R^{11}$ is halogen, hydroxy, substituted or unsubstituted alkyl, or substituted or unsubstituted alkyloxy;

m is 0 or 1 (hereinafter, referred to as L-1).

$R^7$ may be a group represented by Formula:

[Chemical formula 78]

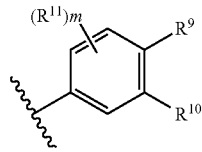

wherein $R^9$ is substituted or unsubstituted alkyloxy, substituted or unsubstituted non-aromatic carbocyclyloxy, substituted or unsubstituted amino, substituted or unsubstituted non-aromatic carbocyclyl, substituted or unsubstituted alkenyl, or substituted or unsubstituted alkyl;

$R^{10}$ is a hydrogen atom, halogen or substituted or unsubstituted alkyl; or $R^9$ and $R^{10}$ are taken together to form a substituted or unsubstituted non-aromatic heterocycle;

$R^{11}$ is halogen, hydroxy, substituted or unsubstituted alkyl, or substituted or unsubstituted alkyloxy;

m is 0 or 1 (hereinafter, referred to as L-2).

$R^7$ may be a group represented by Formula:

[Chemical formula 79]

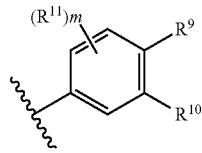

wherein $R^9$ is substituted or unsubstituted alkyloxy, substituted or unsubstituted amino, or substituted or unsubstituted alkyl;

$R^{10}$ is a hydrogen atom, halogen or substituted or unsubstituted alkyl; or $R^9$ and $R^{10}$ are taken together to form a substituted or unsubstituted non-aromatic heterocycle;

$R^{11}$ is halogen, hydroxy, substituted or unsubstituted alkyl, or substituted or unsubstituted alkyloxy;

m is 0 or 1 (hereinafter, referred to as L-3).

$R^7$ may be a group represented by Formula:

[Chemical formula 80]

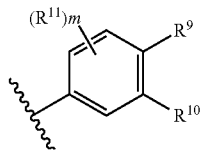

wherein $R^9$ is substituted or unsubstituted alkyloxy, $R^{10}$ is a hydrogen atom, m is 0, or a group represented by Formula:

[Chemical formula 81]

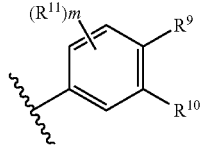

wherein $R^9$ and $R^{10}$ are taken together to form a substituted or unsubstituted non-aromatic heterocycle, m is 0 (hereinafter, referred to as L-4).

$R^7$ may be a group represented by Formula:

[Chemical formula 82]

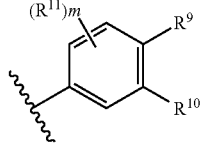

wherein $R^9$ is substituted or unsubstituted alkyloxy, $R^{10}$ is a hydrogen atom, m is 0 (hereinafter, referred to as L-5).

$R^7$ may be a group represented by Formula:

[Chemical formula 83]

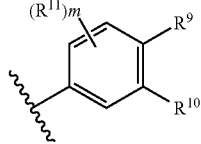

wherein $R^5$ is alkyloxy substituted with halogen, or unsubstituted alkyloxy, $R^{10}$ is a hydrogen atom, m is 0 (hereinafter, referred to as L-6).

$R^7$ may be a group represented by Formula:

[Chemical formula 84]

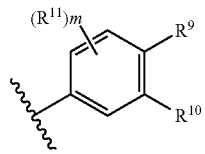

wherein $R^5$ and $R^{10}$ are taken together to form a substituted or unsubstituted non-aromatic heterocycle, m is 0 (hereinafter, referred to as L-7).

$R^7$ may be a group represented by Formula:

[Chemical formula 85]

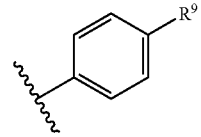

wherein $R^9$ is substituted or unsubstituted alkyloxy (hereinafter, referred to as L-8).

$R^7$ may be a group represented by Formula:

[Chemical formula 86]

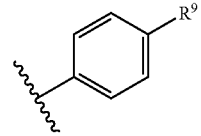

wherein $R^9$ is substituted or unsubstituted C2-C4 alkyloxy (hereinafter, referred to as L-9).

$R^7$ may be a group represented by Formula:

[Chemical formula 87]

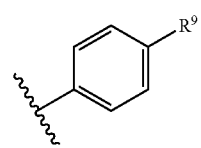

wherein $R^9$ is amino substituted with substituted or unsubstituted alkyl (hereinafter, referred to as L-10).

$R^7$ may be a group represented by Formula:

[Chemical formula 88]

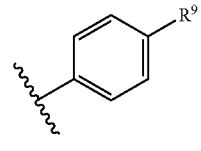

wherein $R^9$ is substituted or unsubstituted C2-C4 alkyloxy, or substituted or unsubstituted amino (hereinafter, referred to as L-11).

In particular, the following embodiments are preferable.

(i) A serotonin 5-HT2A receptor inverse agonist comprising a compound represented by Formula (I):

[Chemical formula 89]

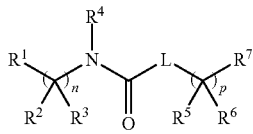
(I)

wherein $R^1$ is A-17;
$R^2$ is a hydrogen atom;
$R^3$ is a hydrogen atom;
n is 1;
$R^4$ is E-4;
L is —$NR^8$—;
$R^8$ is a hydrogen atom;
$R^5$ is a hydrogen atom;
$R^6$ is a hydrogen atom;
p is 1;
$R^7$ is a group represented by Formula:

[Chemical formula 90]

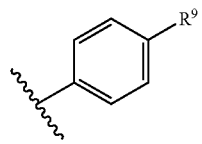

wherein $R^9$ is substituted or unsubstituted alkyloxy, or a pharmaceutically acceptable salt thereof.

(ii) A serotonin 5-HT2A receptor inverse agonist comprising a compound represented by Formula (I):

[Chemical formula 91]

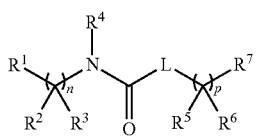
(I)

wherein $R^1$ is A-24;
$R^2$ is a hydrogen atom;
$R^a$ is a hydrogen atom;
n is 1;
$R^4$ is E-4;
L is —NR—;
$R^8$ is a hydrogen atom;
$R^5$ is a hydrogen atom;
$R^6$ is a hydrogen atom;
p is 1;

$R^7$ is a group represented by Formula:

[Chemical formula 92]

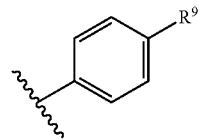

wherein $R^9$ is substituted or unsubstituted alkyloxy, or a pharmaceutically acceptable salt thereof.

(iii) A serotonin 5-HT2A receptor inverse agonist comprising a compound represented by Formula (I):

[Chemical formula 93]

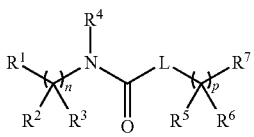
(I)

wherein $R^1$ is A-28;
$R^2$ is a hydrogen atom;
$R^3$ is a hydrogen atom;
n is 1;
$R^4$ is E-4;
L is —$NR^8$—;
$R^8$ is a hydrogen atom;
$R^5$ is a hydrogen atom;
$R^6$ is a hydrogen atom;
p is 1;
$R^7$ is a group represented by Formula:

[Chemical formula 94]

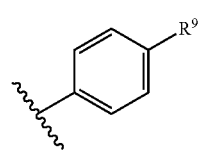

wherein $R^9$ is substituted or unsubstituted alkyloxy, or a pharmaceutically acceptable salt thereof.

(iv) A composition for serotonin 5-HT2A receptor inverse agonism comprising a compound represented by Formula (I):

[Chemical formula 95]

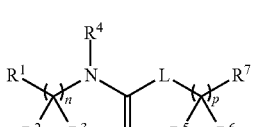
(I)

wherein $R^1$ is A-17;
$R^2$ is a hydrogen atom;
$R^3$ is a hydrogen atom;
n is 1;

$R^4$ is E-4;
L is —$NR^8$—;
$R^8$ is a hydrogen atom;
$R^5$ is a hydrogen atom;
$R^6$ is a hydrogen atom;
p is 1;
$R^7$ is a group represented by Formula:

[Chemical formula 96]

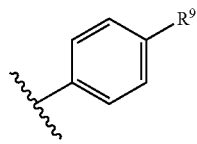

wherein $R^9$ is substituted or unsubstituted alkyloxy,
or a pharmaceutically acceptable salt thereof.

(v) A composition for serotonin 5-HT2A receptor inverse agonism comprising a compound represented by Formula (I):

[Chemical formula 97]

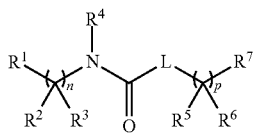

(I)

wherein $R^1$ is A-24;
$R^2$ is a hydrogen atom;
$R^3$ is a hydrogen atom;
n is 1;
$R^4$ is E-4;
L is —$NR^8$—;
$R^8$ is a hydrogen atom;
$R^5$ is a hydrogen atom;
$R^6$ is a hydrogen atom;
p is 1;
$R^7$ is a group represented by Formula:

[Chemical formula 98]

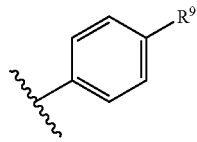

wherein $R^9$ is substituted or unsubstituted alkyloxy,
or a pharmaceutically acceptable salt thereof.

(vi) A composition for serotonin 5-HT2A receptor inverse agonism comprising a compound represented by Formula (I):

[Chemical formula 99]

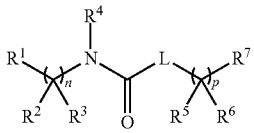

(I)

wherein $R^1$ is A-28;
$R^2$ is a hydrogen atom;
$R^3$ is a hydrogen atom;
n is 1;
$R^4$ is E-4;
L is —$NR^8$—;
$R^8$ is a hydrogen atom;
$R^5$ is a hydrogen atom;
$R^6$ is a hydrogen atom;
p is 1;
$R^7$ is a group represented by Formula:

[Chemical formula 100]

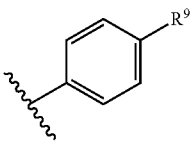

wherein $R^5$ is substituted or unsubstituted alkyloxy,
or a pharmaceutically acceptable salt thereof.

(vii) A compound represented by Formula (II):

[Chemical formula 101]

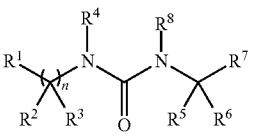

(II)

wherein $R^1$ is substituted or unsubstituted aromatic nitrogen-containing heterocyclyl;
$R^2$ is a hydrogen atom;
$R^3$ is a hydrogen atom;
n is 1;
$R^4$ is substituted or unsubstituted non-aromatic nitrogen-containing heterocyclyl;
$R^8$ is a hydrogen atom;
$R^5$ is a hydrogen atom;
$R^6$ is a hydrogen atom;
$R^7$ is a group represented by Formula:

[Chemical formula 102]

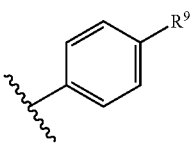

wherein $R^9$ is substituted or unsubstituted C2-C4 alkyloxy, or substituted or unsubstituted amino, or a pharmaceutically acceptable salt thereof.
(viii) A compound represented by Formula (II):

[Chemical formula 103]

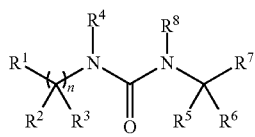
(II)

wherein R¹ is A-17;
R² is a hydrogen atom;
R³ is a hydrogen atom;
n is 1;
R⁴ is substituted or unsubstituted non-aromatic nitrogen-containing heterocyclyl;
R⁸ is a hydrogen atom;
R⁵ is a hydrogen atom;
R⁶ is a hydrogen atom;
R⁷ is a group represented by Formula:

[Chemical formula 104]

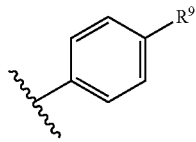

wherein R⁹ is substituted or unsubstituted alkyloxy,
or a pharmaceutically acceptable salt thereof.
(ix) A compound represented by Formula (II):

[Chemical formula 105]

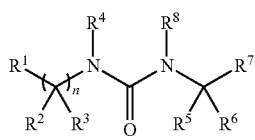
(II)

wherein R¹ is A-24;
R² is a hydrogen atom;
R³ is a hydrogen atom;
n is 1;
R⁴ is substituted or unsubstituted non-aromatic nitrogen-containing heterocyclyl;
R⁸ is a hydrogen atom;
R⁵ is a hydrogen atom;
R⁶ is a hydrogen atom;
R⁷ is a group represented by Formula:

[Chemical formula 106]

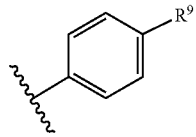

wherein R⁹ is substituted or unsubstituted alkyloxy,
or a pharmaceutically acceptable salt thereof.
(x) A compound represented by Formula (II):

[Chemical formula 107]

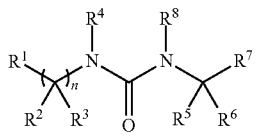
(II)

wherein R¹ is A-28;
R² is a hydrogen atom;
R³ is a hydrogen atom;
n is 1;
R⁴ is substituted or unsubstituted non-aromatic nitrogen-containing heterocyclyl;
R⁸ is a hydrogen atom;
R⁵ is a hydrogen atom;
R⁶ is a hydrogen atom;
R⁷ is a group represented by Formula:

[Chemical formula 108]

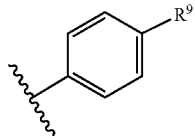

wherein R⁹ is substituted or unsubstituted alkyloxy,
or a pharmaceutically acceptable salt thereof.
(xi) A compound represented b Formula (III):

[Chemical formula 109]

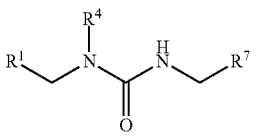
(III)

wherein R¹ is substituted or unsubstituted 6-membered aromatic nitrogen-containing heterocyclyl, or substituted or unsubstituted 5-membered aromatic nitrogen-containing heterocyclyl;
R⁴ is a group represented by Formula:

[Chemical formula 110]

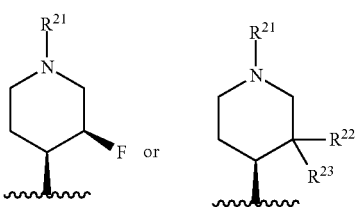

wherein R²¹ is a hydrogen atom or substituted or unsubstituted alkyl;

$R^{22}$ and $R^{23}$ are taken together with the carbon atom to which they are bonded to form a substituted or unsubstituted non-aromatic carbocycle;

$R^7$ is a group represented by Formula:

[Chemical formula 111]

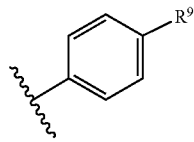

wherein $R^9$ is substituted or unsubstituted C2-C4 alkyloxy or substituted or unsubstituted amino, or a pharmaceutically acceptable salt thereof.

The compounds represented by Formulas (I) or Formula (II) are not limited to specific isomers, but include all possible isomers (eg, keto-enol isomers, imine-enamin isomers, diastereoisomers, optical isomers, rotational isomers, etc.), racemates or mixtures thereof.

One or more hydrogen, carbon, and/or other atom(s) of the compounds represented by Formula (I) or Formula (II) may be substituted by isotope(s) of hydrogen, carbon, and/or other atom(s), respectively. Examples of such isotopes include hydrogen, carbon, nitrogen, oxygen, phosphorus, sulfur, fluorine, iodine, and chlorine, as in the cases of $^2$H, $^3$H, $^{11}$C, $^{13}$C, $^{14}$C, $^{15}$N, $^{18}$O, $^{17}$O, $^{31}$P, $^{32}$P, $^{35}$S, $^{18}$F, $^{123}$I, and $^{36}$Cl, respectively. The compounds represented by Formula (I) or Formula (II) also include compounds substituted with such isotopes. The compounds substituted with the isotopes are also useful as pharmaceutical products and include all radiolabeled forms of the compounds represented by Formula (I) or Formula (II). Furthermore, a "radiolabeling method" for producing the "radiolabeled forms" is also included in the present invention, and the "radiolabeled forms" are useful as tools for metabolic pharmacokinetics studies, studies on binding assay, and/or diagnostics.

Radiolabeled forms of the compounds represented by Formula (I) or Formula (II) can be prepared by methods well known in the pertinent art. For example, a tritium-labeled compound represented by Formula (I) or Formula (II) can be prepared by introducing tritium into a specific compound represented by Formula (I) or Formula (II), by a catalytic dehalogenation reaction using tritium. This method comprises reacting an appropriately-halogenated precursor of the compound of Formula (I) or Formula (II) with tritium gas in the presence of an appropriate catalyst, such as Pd/C, and in the presence or absence of a base. The other appropriate method of preparing a tritium-labeled compound can be referred to "Isotopes in the Physical and Biomedical Sciences, Vol. 1, Labeled Compounds (Part A), Chapter 6 (1987)". A $^{14}$C-labeled compound can be prepared by using a raw material having $^{14}$C carbon.

The pharmaceutically acceptable salts of the compounds represented by Formula (I) or Formula (II) include, for example, salts of compounds represented by Formula (I) or Formula (II) with alkaline metal (e.g., lithium, sodium, or potassium), alkaline earth metal (e.g., calcium or barium), magnesium, transition metal (e.g., zinc or iron), ammonia, organic bases (e.g., trimethylamine, triethylamine, dicyclohexylamine, ethanolamine, diethanolamine, triethanolamine, meglumine, ethylenediamine, pyridine, picoline, or quinoline), or amino acids, or salts with inorganic acids (e.g., hydrochloric acid, sulfuric acid, nitric acid, carbonic acid, hydrobromic acid, phosphoric acid, or hydroiodic acid) or organic acids (e.g., formic acid, acetic acid, propionic acid, trifluoroacetic acid, citric acid, lactic acid, tartaric acid, oxalic acid, maleic acid, fumaric acid, mandelic acid, glutaric acid, malic acid, benzoic acid, phthalic acid, ascorbic acid, benzenesulfonic acid, p-toluenesulfonic acid, methanesulfonic acid, or ethanesulfonic acid). These salts can be formed by the usual methods.

The compounds represented by Formula (I) or Formula (II) of the present invention or pharmaceutically acceptable salts thereof may form solvates (e.g., hydrates), co-crystal and/or crystal polymorphs. The present invention encompasses those various solvates, co-crystal and crystal polymorphs. The "solvates" may have the compounds represented by Formula (I) or Formula (II) coordinated with any number of solvent molecules (e.g., water molecules). When the compounds represented by Formula (I) or Formula (II), or pharmaceutically acceptable salts thereof are allowed to stand in the atmosphere, the compounds may absorb water, resulting in attachment of adsorbed water or formation of hydrates. Recrystallization of the compounds represented by Formula (I) or Formula (II), or pharmaceutically acceptable salts thereof may produce crystal polymorphs. The "Co-crystal" means that a compound represented by Formula (I) or Formula (II), or a salt thereof and a counter molecule exist in the same crystal lattice, and it can include any number of counter molecules.

The compounds represented by Formula (I) or Formula (II) of the present invention or pharmaceutically acceptable salts thereof may form prodrugs. The present invention also encompasses such various prodrugs. Prodrugs are derivatives of the compounds according to the present invention that have chemically or metabolically degradable groups, and compounds that are converted to the pharmaceutically active compounds according to the present invention through solvolysis or under physiological conditions in vivo. Prodrugs include compounds that are converted to the compounds represented by Formula (I) or Formula (II) through enzymatic oxidation, reduction, hydrolysis or the like under physiological conditions in vivo, compounds that are converted to the compounds represented by Formula (I) or Formula (II) through hydrolysis by gastric acid etc., and the like. Methods for selecting and preparing suitable prodrug derivatives are described in, for example, "Design of Prodrugs, Elsevier, Amsterdam, 1985". Prodrugs themselves may have some activity.

When the compounds represented by Formula (I) or Formula (II) or pharmaceutically acceptable salts thereof have hydroxyl group(s), prodrugs include acyloxy derivatives and sulfonyloxy derivatives that are prepared by, for example, reacting compounds having hydroxyl group(s) with suitable acyl halide, suitable acid anhydride, suitable sulfonyl chloride, suitable sulfonyl anhydride and mixed anhydride, or with a condensing agent. For example, they include $CH_3COO$—, $C_2H_5COO$—, tert-BuCOO—, $C_{15}H_{31}COO$—, PhCOO—, (m-NaOOCPh)COO—, $NaOOCCH_2CH_2COO$—, $CH_3CH(NH_2)COO$—, $CH_2N(CH_3)_2COO$—, $CH_3SO_3$—, $CH_3CH_2SO_3$—, $CF_3SO_3$—, $CH_2FSO_3$—, $CF_3CH_2SO_3$—, p-$CH_3O$-$PhSO_3$—, $PhSO_3$— and p-$CH_3PhSO_3$—.

Since the compound according to the present invention has serotonin 5-HT2A receptor inverse agonism, the compound is useful as a therapeutic and/or prophylactic agent for a disease or condition associated with serotonin 5-HT2A receptor. Diseases associated with serotonin 5-HT2A receptor include serotonin-mediated diseases such as Parkinson's disease-related hallucinations and delusions, dementia-related hallucinations and delusions, schizophrenia-related hallucinations and delusions, depression-related hallucinations and delusions, neurodegenerative diseases-related hallucinations and delusions, depression, schizophrenia, autism, dependence, dyskinesia, sleep disorder, Parkinson's disease-related irritability, dementia-related irritability, schizophrenia-related irritability, sexual dysfunction and the like. Preferable examples include Parkinson's disease-related hallucinations and delusions, dementia-related hallucinations and delusions, schizophrenia-related hallucinations and delusions, depression-related hallucinations and delusions, Parkinson's disease-related irritability, dementia-related irritability, and schizophrenia-related irritability. More preferable examples include Parkinson's disease-related hallucinations and delusions, and dementia-related hallucinations and delusions.

The "serotonin 5-HT2A receptor inverse agonist" means a drug having a serotonin 5-HT2A receptor inverse agonism.

The "composition for serotonin 5-HT2A receptor inverse agonism" means a composition having a serotonin 5-HT2A receptor inverse agonism, and it is not limited to pharmaceutical use.

(Method for Producing Compounds of the Present Invention)

The compounds represented by Formula (I) or Formula (II) according to the present invention can be produced by, for example, the general synthesis method described below. Regarding extraction, purification, and the like, the treatments carried out in ordinary experiments of organic chemistry may be carried out.

The compounds of the present invention can be synthesized with reference to methods known in the art.

(When $R^3$ is a Hydrogen Atom and L is —NH—)

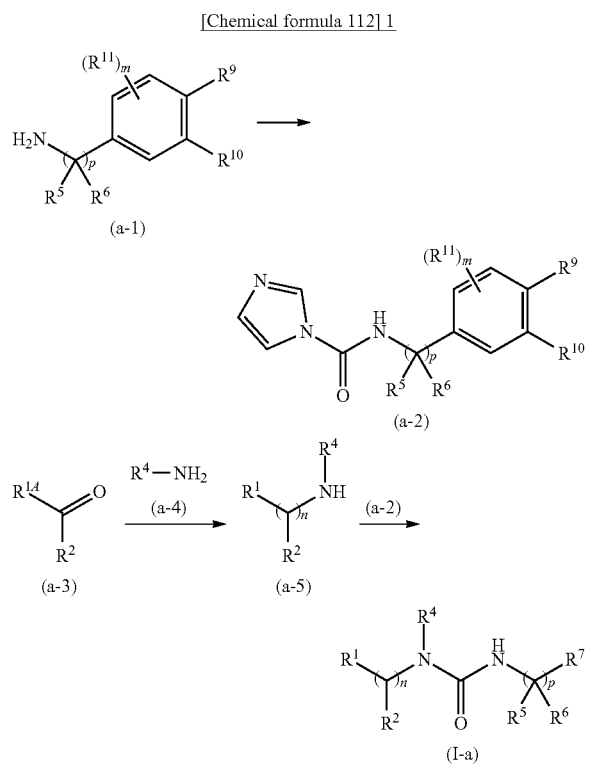

wherein each symbol has the same meaning as the above (1), and $R^{14}$— is $R^1$— or $R^1R^2CH$—.

Step 1

Compound (a-2) can be obtained by reacting compound (a-1) and CDI in an appropriate solvent.

CDI can be used in an amount of 1.0 mol equivalent or more, preferably 1.2 mol equivalents relative to compound (a-1).

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 80° C., preferably 0 to 20° C.

The reaction time is 0.1 to 24 hours, preferably 0.5 to 6 hours.

The obtained desired compound (a-2) can be purified by a conventional method (e.g., column chromatography, recrystallization, etc.) if necessary.

Step 2

Compound (a-5) can be obtained by reacting compound (a-3) and compound (a-4) with an appropriate reducing agent and acetic acid in an appropriate solvent.

Examples of the reducing agent include sodium triacetoxyborohydride, sodium cyanoborohydride and the like, and the reducing agent can be used in an amount of 1.0 molar equivalent or more, preferably 1.0 to 2.0 molar equivalents relative to compound (a-3).

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 80° C., preferably 0 to 20° C.

The reaction time is 0.1 to 48 hours, preferably 0.5 to 24 hours.

The obtained desired compound (a-5) can be purified by a conventional method (e.g., column chromatography, recrystallization, etc.) if necessary.

Step 3

Compound (I-a) can be obtained by reacting compound (a-5) and compound (a-2) in an appropriate solvent.

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 100° C., preferably 0 to 80° C.

The reaction time is 0.1 to 24 hours, preferably 0.5 to 6 hours.

The obtained desired compound (I-a) can be purified by a conventional method (e.g., column chromatography, recrystallization, etc.) if necessary.

[Chemical formula 113] 2

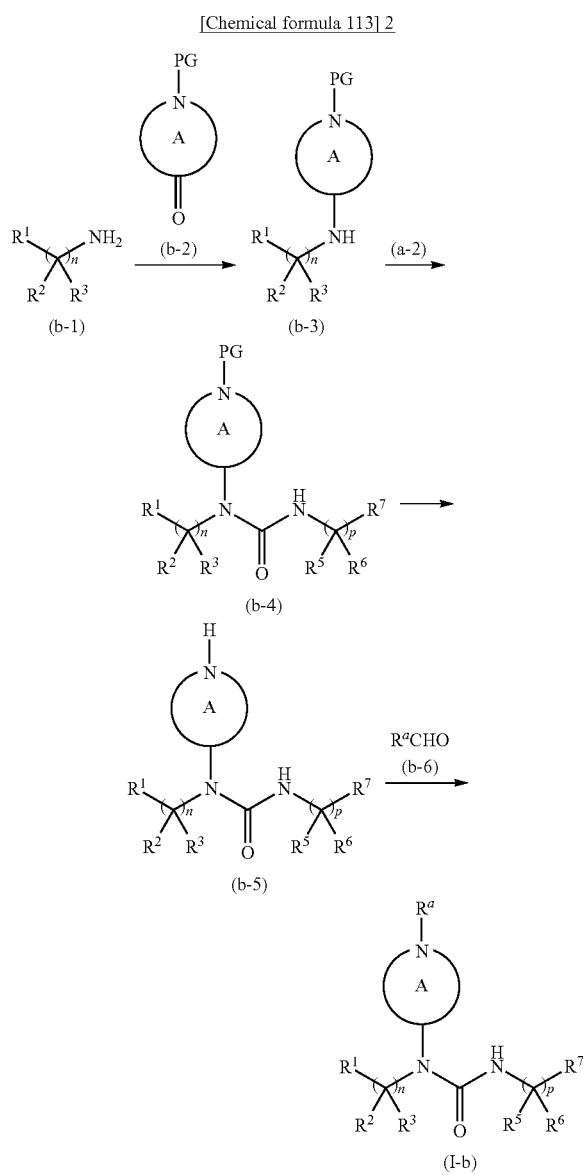

wherein PG is an appropriate protecting group for the amino group, ring A is substituted or unsubstituted non-aromatic nitrogen-containing heterocyclic group, and $R^a$ is substituted or unsubstituted alkyl.)

Step 1

Compound (b-3) can be obtained by reacting compound (b-1) and compound (b-2) with an appropriate reducing agent and, if necessary, acetic acid in an appropriate solvent.

Examples of the reducing agent include sodium triacetoxyborohydride, sodium cyanoborohydride and the like, and the reducing agent can be used in an amount of 1.0 molar equivalent or more, preferably 1.0 to 2.0 molar equivalents, relative to compound (b-3).

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 80° C., preferably 0 to 20° C.

The reaction time is 0.1 to 48 hours, preferably 0.5 to 24 hours.

The obtained desired compound (b-3) can be purified by a conventional method (e.g., column chromatography, recrystallization, etc.) if necessary.

Step 2

Compound (b-4) can be obtained by reacting compound (b-3) and compound (a-2) in an appropriate solvent.

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 100° C., preferably 0 to 80° C.

The reaction time is 0.1 to 24 hours, preferably 0.5 to 6 hours.

The obtained desired compound (b-4) can be purified by a conventional method (e.g., column chromatography, recrystallization, etc.) if necessary.

Step 3

Compound (b-5) can be obtained by reacting compound (b-4) in the presence of an acid in the absence of a solvent or in an appropriate solvent.

Examples of the acid include hydrochloric acid, sulfuric acid, TFA, formic acid and the like, the acid can be used in an amount of 1.0 molar equivalent or more, preferably 1.0 to 30 molar equivalents relative to the compound (b-4).

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 80° C., preferably 0 to 20° C.

The reaction time is 0.1 to 24 hours, preferably 0.5 to 6 hours.

The obtained desired compound (b-5) can be purified by a conventional method (e.g., column chromatography, recrystallization, etc.) if necessary.

Step 4

Compound (I-b) can be obtained by reacting compound (b-5) and compound (b-6) with an appropriate reducing agent and, if necessary, acetic acid in an appropriate solvent.

Examples of the reducing agent include sodium triacetoxyborohydride, sodium cyanoborohydride and the like, and the reducing agent can be used in an amount of 1.0 molar equivalent or more, preferably 1.0 to 2.0 molar equivalents relative to compound (b-5).

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 80° C., preferably 0 to 20° C.

The reaction time is 0.1 to 24 hours, preferably 0.5 to 6 hours.

The obtained desired compound (I-b) can be purified by a conventional method (e.g., column chromatography, recrystallization, etc.) if necessary.

[Chemical formula 114] 3

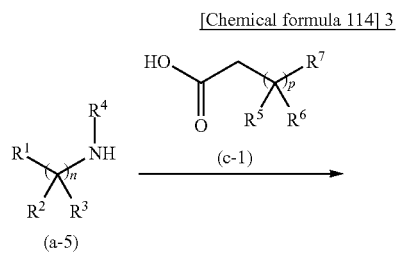

Step 1

Compound (I-c) can be obtained by reacting compound (a-5) and compound (c-1) with an appropriate condensing agent and, if necessary, a base in an appropriate solvent.

Examples of the condensing agent include HOBt, HOAt, DCC, DIC, EDC HCl, HATU. PyBOP and the like, and the condensing agent can be used in an amount of 1.0 molar equivalent or more, preferably 1.0 to 2.0 molar equivalents relative to compound (b-5).

Examples of the base include triethylamine, DIEA and the like, the base can be used in an amount of 1.0 molar equivalent or more, preferably 1.0 to 2.0 molar equivalents relative to compound (a-5).

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 80° C., preferably 0 to 20° C.

The reaction time is 0.1 to 24 hours, preferably 0.5 to 6 hours.

The obtained desired compound (I-c) can be purified by a conventional method (e.g., column chromatography, recrystallization, etc.) if necessary.

[Chemical formula 115]

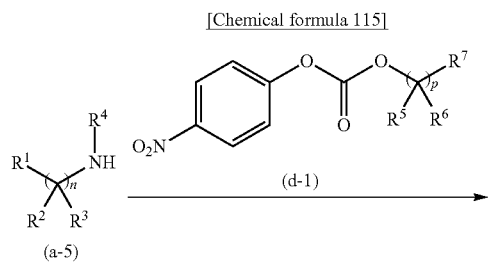

-continued

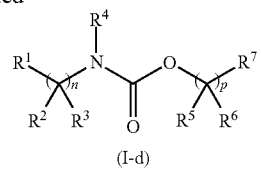

Step 1

Compound (I-d) can be obtained by reacting compound (a-5) and compound (d-1) with a base in an appropriate solvent.

Examples of the base include triethylamine, DIEA, pyridine and the like, the base can be used in an amount of 1.0 mol equivalent or more, preferably 1.0 to 5.0 molar equivalents relative to compound (a-5).

Reaction solvents include alcohols (e.g., methanol, ethanol, tert-butanol, isopropanol, etc.), aromatic hydrocarbons (e.g., toluene, benzene, xylene, etc.), saturated hydrocarbons (e.g., cyclohexane, hexane, etc.), ethers (e.g., tetrahydrofuran, diethyl ether, dioxane, dimethoxyethane, etc.), halogenated hydrocarbons (e.g., chloroform, dichloromethane, etc.), DMF, DMSO, NMP, acetonitrile, pyridine, etc., each solvent can be used alone or mixed with the others.

The reaction temperature is 0 to 120° C., preferably 0 to 80° C.

The reaction time is 0.1 to 24 hours, preferably 0.5 to 12 hours.

The obtained desired compound (I-d) can be purified by a conventional method (e.g., column chromatography, recrystallization, etc.) if necessary.

Since the compound according to the present invention has serotonin 5-HT2A receptor inverse agonism, the compound is useful as a therapeutic and/or prophylactic agent for a disease or condition associated with serotonin 5-HT2A receptor.

Furthermore, the compound according to the present invention has utility as a medicine, and preferably, the compound has any one or a plurality of the following excellent features.

a) Inhibitory activity against CYP enzymes (for example, CYP1A2, CYP2C9, CYP2C19, CYP2D6, and CYP3A4) is weak.
b) Satisfactory pharmacokinetics such as high bioavailability and adequate clearance are exhibited.
c) Metabolic stability is high.
d) Irreversible inhibitory activity is not exhibited against CYP enzymes (for example, CYP3A4) within the concentration range of the measurement conditions described in the present description.
e) Mutagenicity is not exhibited.
f) The cardiovascular risk is low.
g) High solubility is exhibited.
h) High binding ability for serotonin 5-HT2A is exhibited.
i) High binding ability for serotonin 5-HT2C is exhibited.
j) Brain distribution ability is high.
k) P-gp substrate property is low.

A pharmaceutical composition of the present invention can be administered orally or parenterally. Methods for parenteral administration include dermal, subcutaneous, intravenous, intraarterial, intramuscular, intraperitoneal, transmucosal, inhalation, transnasal, ophthalmic, inner ear or vaginal administration.

In the case of oral administration of pharmaceutical composition of the present invention, any forms, which are usually used, such as oral solid formulations (e.g., tablets, powders, granules, capsules, pills, or films), and oral liquid formulations (e.g., suspension, emulsion, elixir, syrup, lemonade, spirit, aromatic water, extract, decoction, or tincture) may be prepared according to the usual method and administered. The tablets can be sugar-coated tablets, film-coated tablets, enteric-coating tablets, sustained-release tablets, troche tablets, sublingual tablets, buccal tablets, chewable tablets or orally disintegrating tablets. Powders and granules can be dry syrups. Capsules can be soft capsules, micro capsules or sustained-release capsules.

In the case of parenteral administration of pharmaceutical composition of the present invention, any forms, which are usually used, such as injections, drips, and external preparations (e.g., ophthalmic drops, nasal drops, ear drops, aerosols, inhalations, lotion, infusion, liniment, mouthwash, enema, ointment, plaster, jelly, cream, patch, cataplasm, external powder, or suppository) can be preferably administered. Injections can be emulsions whose type is O/W, W/O, O/W/O. W/O/W or the like.

A pharmaceutical composition can be obtained by mixing an effective amount of the compound according to the present invention with various pharmaceutical additives appropriate for the dosage form, such as an excipient, a binder, a disintegrating agent, and a lubricating agent, as necessary. Furthermore, the pharmaceutical composition can be prepared into a pharmaceutical composition for use for a child, an elderly, a patient with a serious case, or a surgical operation, by appropriately changing the effective amount of the compound according to the present invention, the dosage form, and/or various pharmaceutical additives. For example, a pharmaceutical composition for use for a child may be administered to a neonate (less than 4 weeks after birth), an infant (from 4 weeks after birth to less than 1 year), a preschool child (from 1 year to less than 7 years), a child (from 7 years to less than 15 years), or a patient 15 year to 18 years of age. For example, a pharmaceutical composition for an elderly may be administered to a patient 65 years of age or older.

It is desirable to set the amount of administration of the pharmaceutical composition of the present invention, after considering the age and body weight of the patient, the type and degree of the disease, the route of administration, and the like; however, in the case of oral administration, the amount of administration is usually 0.05 to 100 mg/kg/day and is preferably in the range of 0.1 to 10 mg/kg/day. In the case of parenteral administration, the amount of administration may vary greatly depending on the route of administration; however, the amount of administration is usually 0.005 to 10 mg/kg/day and is preferably in the range of 0.01 to 1 mg/kg/day. This may be administered once a day or several times a day.

The compound according to the present invention can be used in combination with another therapeutic agent for Parkinson's disease, Alzheimer's disease, psychosis or depression (hereinafter, referred to as concomitant drug), for the purpose of enhancing the action of the compound, reducing the amount of administration of the compound, or the like. At this time, the timing of administration for the compound according to the present invention and the concomitant drug is not limited, and these may be administered simultaneously to the target of administration or may be administered with a time difference. Furthermore, the compound according to the present invention and the concomitant drug may be administered as two or more kinds of preparations each including active ingredients, or may be administered as a single preparation including those active ingredients.

The amount of administration of the concomitant drug can be appropriately selected based on the clinically used dosage. Furthermore, the blending ratio of the compound according to the present invention and the concomitant drug can be appropriately selected according to the target of administration, the route of administration, the target disease, symptoms, combination, and the like. For example, when the target of administration is a human being, 0.01 to 100 parts by weight of the concomitant drug may be used with respect to 1 part by weight of the compound according to the present invention.

Examples of the therapeutic agent for Parkinson's disease include levodopa preparations.

Examples of the therapeutic agent for Alzheimer's disease include donepezil.

Examples of the therapeutic agent for psychosis include quetiapine.

Examples of the therapeutic agent for depression include escitalopram.

EXAMPLES

Hereinafter, the present invention will be described in more detail by way of Examples. Reference Examples, and Test Examples: however, the present invention is not intended to be limited by these.

Furthermore, abbreviations used in the present description denote the following meanings.

AcOH: Acetic acid
CDCl$_3$: Deuterated chloroform
CDI: Carbonyldiimidazole
DCC: N,N'-Dicyclohexylcarbodiimide
DIC: N,N'-Diisopropylcarbodiimide
DIEA: N,N-Diisopropylethylamine
DMF: N,N-Dimethylformamide
DMSO: Dimethyl sulfoxide
EDC: 1-Ethyl-3-(3-dimethylaminopropyl)carbodiimide
HATU: O-(7-Azabenzotriazol-1-yl)-1,1,3,3-tetramethyluronium hexafluorophosphate
HOAt: 1-Hydroxy-7-azabenzotriazole
HOBt: 1-Hydroxybenzotriazole
NaBH(OAc)$_3$: Sodium triacetoxyborohydride
NMP: N-Methylpyrrolidone
TFA: Trifluoroacetic acid
PyBOP (registered trademark): (Benzotriazol-1-yloxy)-tripyrrolidinophosphonium hexafluorophosphate (Method for Identifying Compound)

The NMR analysis obtained in each Example was performed at 400 MHz, and measurement was made using DMSO-d$_6$, CDCl$_3$. Furthermore, when NMR data are shown, there are occasions in which all the measured peaks are not described.

The term RT in the description indicates retention time in an LC/MS: liquid chromatography/mass analysis, and the retention time was measured under the following conditions.

(Measurement Condition 1)

Column: Shim-pack XR-ODS (2.2 μm, i.d. 3.0×50 mm) (Shimadzu)
Flow rate: 1.6 mL/min
UV detection wavelength: 254 nm
Mobile phase: [A] was 0.1% formic acid-containing aqueous solution, and [B] was 0.1% formic acid-containing acetonitrile solution.
Gradient: A linear gradient of 10% to 100% solvent [B] was carried out for 3 minutes, and then 100% solvent [B] was maintained for 0.5 minutes.

(Measurement Condition 2)
Column: ACQUITY UPLC (registered trademark) BEH C18 (1.7 µm i.d. 2.1×50 mm) (Waters)
Flow rate: 0.8 mL/min
UV detection wavelength: 254 nm
Mobile phase: [A] was 0.1% formic acid-containing aqueous solution, and [B] was 0.1% formic acid-containing acetonitrile solution.
Gradient: A linear gradient of 5% to 100% solvent [B] was carried out for 3.5 minutes, and then 100% solvent [B] was maintained for 0.5 minutes.
Incidentally, in the description, the description of MS(m/z) indicates a value observed by mass analysis.

Example 1

Synthesis of Compound (I-008)

[Chemical formula 116]

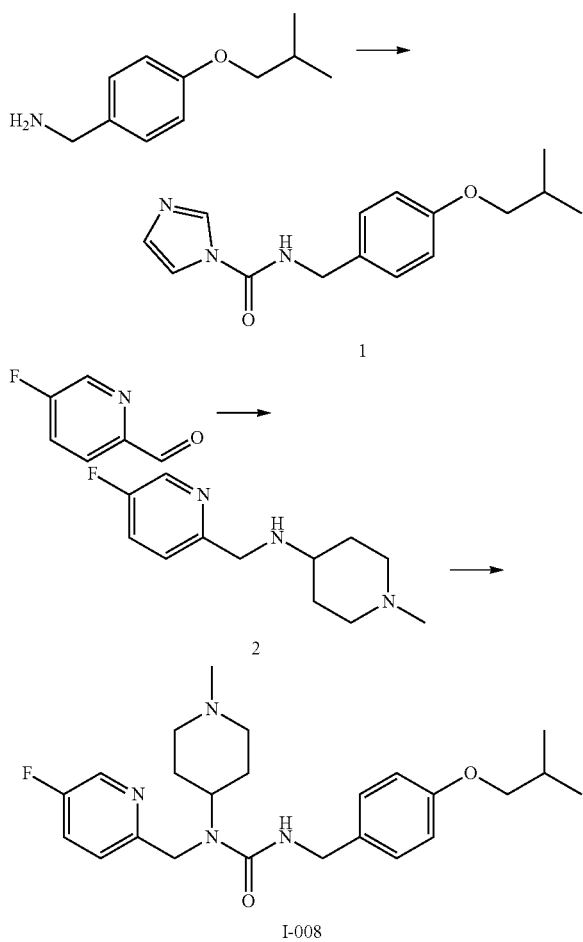

Step 1 Synthesis of Compound 1

4-Isobutoxyphenylmethaneamine (6.00 g, 33.5 mmol) and CDI (651 mg, 40.2 mmol) were dissolved in acetonitrile (60 mL) and stirred at room temperature for 1 hour. The solvent was distilled off under reduced pressure, and the obtained residue was purified by silica gel column chromatography (hexane-ethyl acetate) to afford Compound 1 (7.92 g, yield 87%).

$^1$H-NMR (CDCl$_3$) δ: 1.02 (d, J=6.5 Hz, 6H), 2.00-2.14 (m, 1H), 3.68-3.77 (m, 2H), 4.49-4.59 (m, 21H), 6.03 (brs, 1H), 6.90 (d, J=7.3 Hz, 21), 7.07 (s, 1H), 7.22-7.35 (m, 3H), 8.10 (s, 1H).

Step 2 Synthesis of Compound 2

5-Fluoropicoline aldehyde (1.00 g, 7.99 mmol) and 1-methylpiperidine 4-amine (913 mg, 7.99 mmol) were dissolved in dichloromethane (20 mL) and sodium triacetoxyborohydride (3.39 g, 16.0 mmol) and acetic acid (0.914 mL, 16.0 mmol) were added, and the mixture was stirred at room temperature overnight. A saturated aqueous solution of sodium hydrogen carbonate was added, and the mixture was extracted with chloroform. The organic layer was dried over anhydrous magnesium sulfate. The solvent was distilled off under reduced pressure to afford Compound 2 (970 mg, yield 55%).

$^1$H-NMR (CDCl$_3$) δ: 1.42-1.53 (m, 2H), 1.81-2.03 (m, 4H), 2.27 (s, 3H), 2.45-2.54 (m, 1H), 2.83 (d, J=11.8 Hz, 2H), 3.92 (s, 2H), 7.31-7.40 (m, 2H), 8.40 (d, J=2.5 Hz, 1H).

Step 3 Synthesis of Compound (I-008)

Compound 1 (673 mg, 2.46 mmol) and Compound 2 (500 mg, 2.24 mmol) were dissolved in toluene (5 mL) and stirred at 80° C., for 1 hour. After allowing to cool, the solvent was distilled off under reduced pressure, and the obtained residue was purified by amino column chromatography (hexane-ethyl acetate) to afford compound (I-008) (525 mg, yield 55%).

Example 21

Synthesis of Compound (I-042)

[Chemical formula 117]

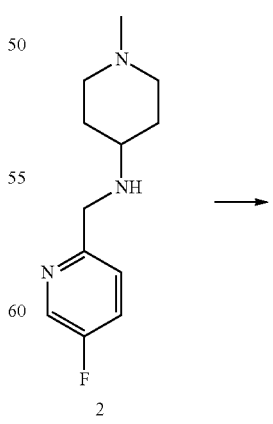

-continued

I-042

Step 1 Synthesis of Compound (I-042)

Compound 2 (74.4 mg, 0.333 mmol) was dissolved in N,N-dimethylformamide (1.15 ml), 4-isobutoxybenzyl (4-nitrophenyl) carbonate (74.4 mg, 0.333 mmol) and triethylamine (0.14 mL, 1.00 mmol) were added, and the mixture was stirred at 70° C., for 8 hours. Water was added and the mixture was extracted with ethyl acetate. After washing the organic layer with water, the solvent was distilled off under reduced pressure, and the obtained residue was purified by silica gel column chromatography (ethyl acetate-hexane) to afford compound (1-042) (40 mg, yield 28%).

Example 31

Synthesis of Compound (I-050)

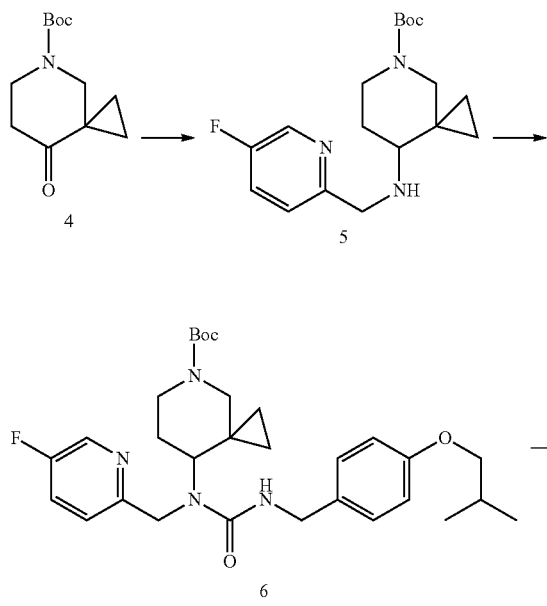

-continued

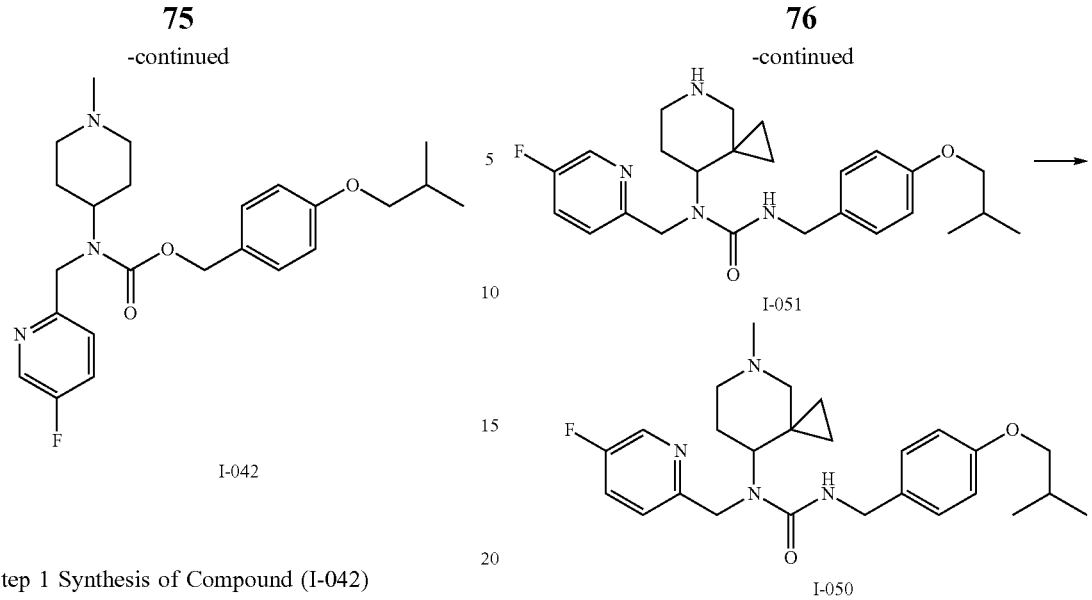

Step 1 Synthesis of Compound 5

To Compound 4 (300 mg, 1.33 mmol) were added dichloromethane (5 mL), (5-fluoropyridin-2-yl) methaneamine (202 mg, 1.60 mmol), AcOH (0.07 mL, 1.33 mmol), and sodium triacetoxyborohydride (423 mg, 2.00 mmol), and the mixture was stirred at room temperature for 6 hours. A saturated aqueous solution of sodium hydrogen carbonate (5 mL) was added, and the mixture was stirred at room temperature. Water was added and the mixture was extracted with ethyl acetate. The organic layer was washed with brine and dried over anhydrous magnesium sulfate. The solvent was distilled off under reduced pressure, and the obtained residue was purified by amino silica gel column chromatography (hexane-ethyl acetate) to afford Compound 5 (402 mg, yield 90%).

$^1$H-NMR (CDCl$_3$) δ: 0.28-0.33 (m, 1H), 0.40-0.48 (m, 3H), 1.44 (s, 9H), 1.62-1.68 (m, 1H), 1.75-1.82 (m, 1H), 2.15 (t. J=3.6 Hz, 1H), 2.94-3.10 (m, 1H), 3.33-3.42 (m, 1H), 3.46-3.53 (m, 1H), 3.65-3.82 (m, 1H), 3.84 (d, J=14.4 Hz, 1H), 3.90 (d, J=14.4 Hz, 1H), 7.31-7.39 (m, 2H), 8.40 (d, J=2.6 Hz, 1H).

Step 2 Synthesis of Compound 6

To Compound 5 (150 mg, 0.45 mmol) were added acetonitrile (2 mL) and N-(4-isobutoxybenzyl)-1H-imidazole-1-carboxamide (147 mg, 0.54 mmol), and the mixture was stirred at 80° C., for 8 hours. The solvent was distilled off under reduced pressure, and the obtained residue was purified by silica gel column chromatography (hexane-ethyl acetate) to afford Compound 6 (195 mg, yield 81%).

$^1$H-NMR (CDCl$_3$) δ: 0.32-0.50 (m, 3H), 0.52-0.58 (m, 1H), 1.02 (d, J=6.8 Hz, 6H), 1.44 (9H, s), 1.56-1.62 (m, 1H), 1.69-1.76 (m, 1H), 1.80-1.91 (m, 1H), 2.04-2.11 (m, 1H), 2.80-3.01 (m, 1H), 3.06-3.48 (m, 2H), 3.70 (d, J=6.7 Hz, 2H), 5.80-6.18 (m, 1H), 6.82 (d, J=8.5 Hz, 2H), 7.13 (d, J=8.7 Hz, 2H), 7.21-7.25 (m, 1H), 7.35 (td, J=8.3, 2.8 Hz, 1H), 8.28 (s, 1H).

Step 3 Synthesis of Compound (I-051)

To Compound 6 (195 mg, 0.36 mmol) were added dichloromethane (2 mL) and TFA (0.5 mL, 6.49 mmol), and the mixture was stirred at room temperature for 3 hours. A 20% aqueous solution of potassium carbonate (4 mL) was added, and the mixture was extracted with ethyl acetate. The organic layer was washed with brine and dried over anhydrous magnesium sulfate. The solvent was distilled off under reduced pressure to afford compound (I-051) (152 mg, yield 96%).

1H-NMR (CDCl3) δ: 0.28-0.32 (m, 1H), 0.39-0.42 (m, 1H), 0.42-0.48 (m, 1H), 0.57-0.62 (m, 1H), 1.01 (d, J=6.7 Hz, 6H), 1.95-2.10 (m, 3H), 2.35 (d, J=13.6 Hz, 1H), 2.87 (t, J=10.8 Hz, 1H), 3.17 (d, J=12.2 Hz, 1H), 3.28 (d, J=12.9 Hz, 1H), 3.70 (d, J=6.5 Hz, 2H), 4.24-4.57 (m, 6H), 6.05 (s, 1H), 6.82 (d, J=8.5 Hz, 2H), 7.13 (d, J=8.5 Hz, 2H), 7.22-7.26 (m, 1H), 7.35 (td, J=8.3, 2.9 Hz, 1H), 8.27 (d, J=2.8 Hz, 1H).

Step 4 Synthesis of Compound (I-050)

To compound (1-051) (85 mg, 0.19 mmol) were added ethanol (2 mL), 37% formaldehyde solution (0.03 mL, 0.39 mmol), and sodium triacetoxyborohydride (61 mg, 0.29 mmol), the mixture was stirred at room temperature for 2 hours. A saturated aqueous solution of sodium hydrogen carbonate (5 mL) was added, and the mixture was stirred at room temperature. Water was added and the mixture was extracted with ethyl acetate. The organic layer was washed with brine and dried over anhydrous magnesium sulfate. The solvent was distilled off under reduced pressure, and the obtained residue was purified by amino silica gel column chromatography (hexane-ethyl acetate) to afford compound (1-050) (80 mg, yield 91%).

Example 41

Synthesis of Compound (I-068)

[Chemical formula 119] 7

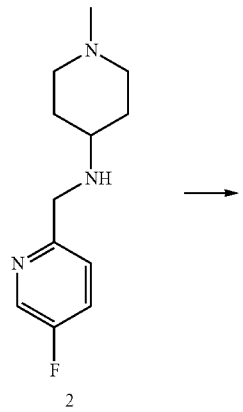

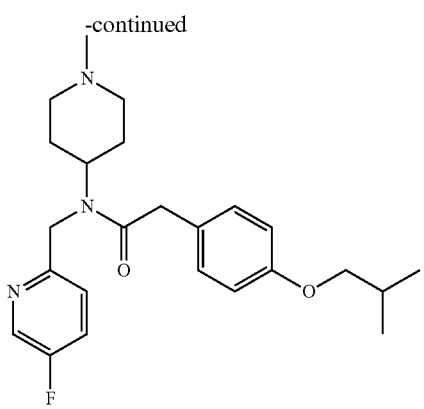

I-068

Step 1 Synthesis of Compound (I-068)

Compound 2 (75.0 mg, 0.336 mmol) was dissolved in N, N-dimethylformamide (0.75 mL), and 2-(4-isobutoxyphenyl) acetic acid (84.0 mg, 0.403 mmol) (synthesis method of the compound has been described in WO2019/40104), HOBt (54.5 mg, 0.403 mmol) and 1-ethyl-3-(3-dimethylaminopropyl) carbodiimide hydrochloride (77.0 mg, 0.403 mmol) were added and the mixture was stirred at room temperature for 1.5 hours. An aqueous solution of potassium carbonate was added, and the mixture was extracted with ethyl acetate. After washing the organic layer with water, the solvent was distilled off under reduced pressure, and the obtained residue was purified by silica gel column chromatography (ethyl acetate-hexane) to afford compound (I-068) (104 mg, yield 75%).

Reference Example 1

Synthesis of Compound 8

[Chemical formula 120] 8

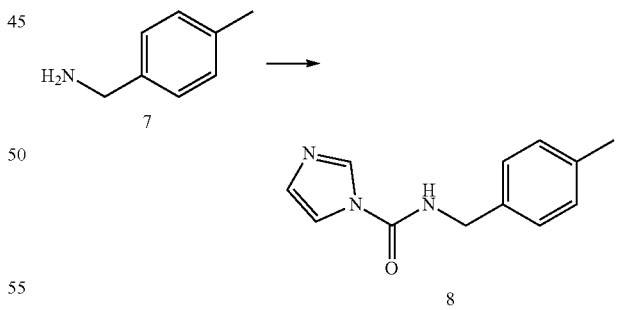

Step 1 Synthesis of Compound 8

To a solution of p-tolylmethaneamine (0.6 g, 5.00 mmol) in tetrahydrofuran (14 ml) was added CDI (0.97 g, 6.00 mmol), and the mixture was stirred at 45° C., for 3 hours. The solvent was distilled off under reduced pressure, and the obtained residue was purified by silica gel column chromatography (hexane-ethyl acetate) to afford Compound 8 (0.66 g, yield 61%).

1H-NMR (400 MHz, CDCl3) δ: 1.60 (s, 3H), 2.34 (s, 3H), 4.56 (d, J=5.5 Hz, 2H), 6.06 (s, 1H), 7.07 (s, 1H), 7.19 (d, J=7.9 Hz, 2H), 7.22-7.26 (m, 2H), 7.31 (s, 1H), 8.09 (s, 1H).

Example 5

Synthesis of Compound (I-120)

[Chemical formula 121] 9

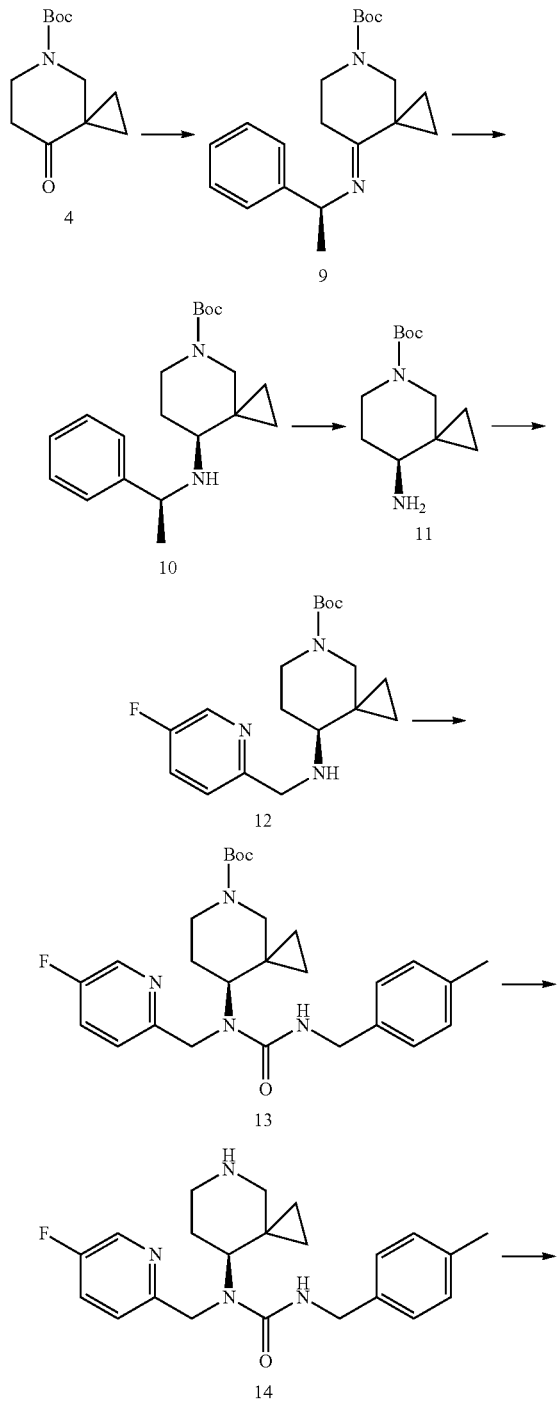

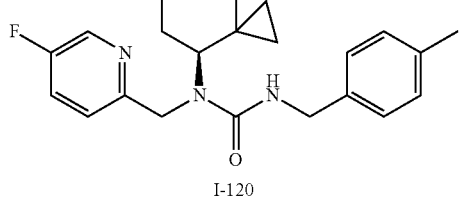

I-120

Step 1 Synthesis of Compound 9

Under ice-cooling, to (S)-1-phenethyl-1-amine (1.29 g, 10.7 mmol) were added dichloromethane (30 mL), triethylamine (5.39 g, 53.3 mmol), titanium tetrachloride (4.44 ml, 4.44 mmol) and compound 4 (2 g, 8.88 mmol), and the mixture was stirred at room temperature for 18 hours. Diethyl ether (60 ml) was added and the mixture was stirred at room temperature for 30 minutes. After removing the resulting solid by filtration, the solvent was removed under reduced pressure to afford Compound 9 (2.8 g, yield 96%).

Step 2 Synthesis of Compound 10

To a solution of Compound 9 (2.8 g, 8.52 mmol) in ethanol (28 ml) was added sodium borohydride (0.16 g, 4.26 mmol) at −78° C., and the mixture was stirred at −78° C., for 2 hours. A saturated aqueous solution of sodium hydrogen carbonate (20 mL) was added, and the mixture was extracted with ethyl acetate. The organic layer was washed with brine and dried over anhydrous magnesium sulfate. The solvent was distilled off under reduced pressure, and the obtained residue was purified by amino silica gel column chromatography (hexane-ethyl acetate) to afford Compound 10 (2.1 g, yield 75%).

$^1$H-NMR (CDCl$_3$) δ: 0.29-0.50 (m, 4H), 1.30 (d, J=6.4 Hz, 2H), 1.42 (s, 9H), 1.45-1.70 (m, 2H), 2.18 (s, 1H), 2.92-3.06 (s, 1H), 3.28-3.49 (m, 3H), 3.83 (q. J=6.6 Hz, 1H), 7.22 (dd, J=8.7, 4.5 Hz, 1H), 7.30 (d, J=4.3 Hz, 4H).

Step 3 Synthesis of Compound 11

To Compound 10 (157 mg, 0.48 mmol) were added methanol (1.6 mL), ammonium formate (150 mg, 2.38 mmol), and palladium hydroxide on carbon (40 mg, 0.14 mmol), and the mixture was stirred at 60° C., for 1 hour. After the reaction solution was filtered to remove palladium hydroxide on carbon, the solvent was removed under reduced pressure to afford Compound 11 (102 mg, yield 95%).

1H-NMR (CDCl$_3$) δ: 0.32-0.50 (m, 4H), 1.45 (s, 9H), 1.50-1.62 (m, 1H), 1.80-1.88 (m, 1H), 2.62 (dd, J=10.0, 6.4 Hz, 1H), 3.05 (d, J=12.2 Hz, 1H), 3.41 (d, J=13.6 Hz, 1H), 3.45-3.62 (m, 2H).

Step 4 Synthesis of Compound 12

Compound 12 was obtained by using Compound 11 (49 mg, 0.22 mmol) instead of 1-methylpiperidine 4-amine in Step 2 of Example 1.

Step 5 Synthesis of Compound 13

Compound 13 was obtained by using Compound 12 instead of Compound 5 and Compound 8 instead of N-(4-isobutoxybenzyl)-1H-imidazole-1-carboxamide in Step 2 of Example 3.

Step 6 Synthesis of Compound 14

Compound 14 was obtained by using Compound 13 instead of compound 6 in Step 3 of Example 3.

Step 7 Synthesis of 1-120

Compound (I-120) (38 mg, total yield of 4 steps 53%) was obtained by using Compound 14 instead of Compound (I-051) in step 4 of Example 3.

Example 61

Synthesis of Compound (I-136)

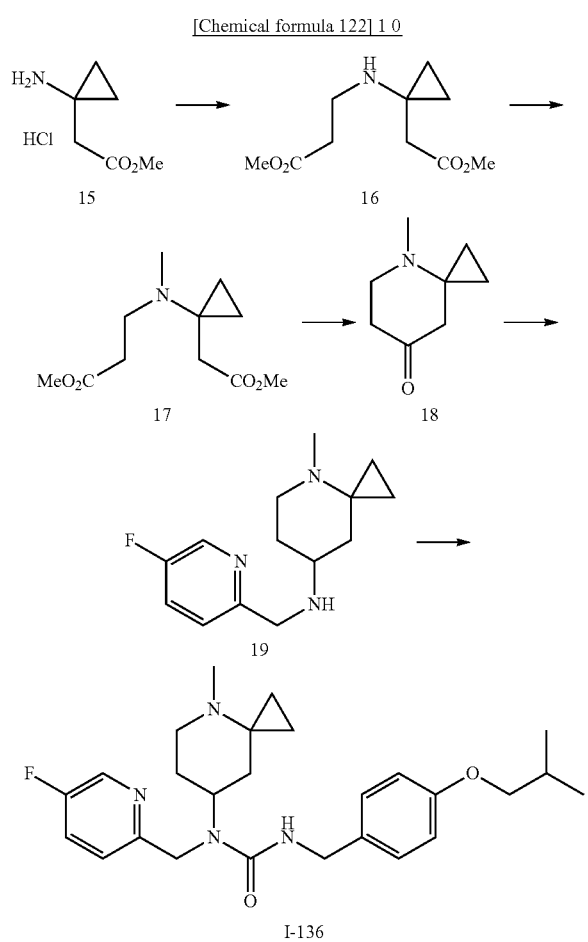

[Chemical formula 122] 1 0

Step 1 Synthesis of Compound 16

To Compound 15 (500 mg, 3.02 mmol) were added ethanol (5 mL), methyl acrylate (0.03 mL, 3.02 mmol) and triethylamine (0.42 mL, 3.02 mmol), and the mixture was stirred at room temperature for 48 hours. The solvent was evaporated under reduced pressure to afford Compound 16 (654 mg, 101% yield) as a crude product.

Step 2 Synthesis of Compound 17

To Compound 16 (654 mg, 3.02 mmol) were added methanol (5 mL), 37% formaldehyde solution (0.67 mL, 9.06 mmol) and NaBH(OAc)$_3$ (61 mg, 0.29 mmol), and the mixture was stirred at room temperature for 1 hour. A saturated aqueous solution of sodium hydrogen carbonate (5 mL) was added, and the mixture was stirred at room temperature. Water was added and the mixture was extracted with chloroform. The organic layer was washed with brine and dried over anhydrous magnesium sulfate. The solvent was evaporated under reduced pressure to afford compound 17 (687 mg, 99% yield) as a crude product.

Step 3 Synthesis of Compound 18

To Compound 17 (195 mg, 0.36 mmol) were added toluene (7 mL) and 28% sodium methoxide solution (2.2 mL, 8.87 mmol), and the mixture was stirred at reflux for 4 hours. After distilling off the solvent under reduced pressure, methanol (3 mL) and water (3 mL) were added, and the mixture was stirred at reflux for 4 hours. The reaction mixture was diluted with water and extracted with ethyl acetate. The organic layer was washed with brine and dried over anhydrous magnesium sulfate. The solvent was distilled off under reduced pressure to afford Compound 18 (432 mg, yield 105%) as a crude product.

Step 4 Synthesis of Compound 19

To Compound 18 (132 mg, 0.95 mmol) were added dichloromethane (5 mL), (5-fluoropyridin-2-yl)methaneamine (120 mg, 0.95 mmol), AcOH (0.07 mL, 1.14 mmol) and NaBH(OAc)$_3$ (241 mg, 1.14 mmol), and the mixture was stirred at room temperature for 1 hour. A saturated aqueous solution of sodium hydrogen carbonate (5 mL) was added, and the mixture was stirred at room temperature. Water was added and the mixture was extracted with ethyl acetate. The organic layer was washed with brine and dried over anhydrous magnesium sulfate. The solvent was evaporated under reduced pressure to afford compound 19 (157 mg, 67% yield) as a crude product.

Step 5 Synthesis of Compound (I-136)

To Compound 19 (18 mg, 0.07 mmol) were added acetonitrile (0.2 mL) and N-(4-isobutoxybenzyl)-1H-imidazole-1-carboxamide (22 mg, 0.08 mmol), the mixture was stirred at 80° C., for 1 hour. The solvent was distilled off under reduced pressure, and the obtained residue was purified by silica gel column chromatography (hexane-ethyl acetate) to obtain compound (1-136) (22 mg, yield 67%).

1H-NMR (CDCl3) δ: 0.30-0.36 (m, 1H), 0.43-0.48 (m, 1), 0.58-0.71 (m, 2H), 1.02 (d, 6H, J=6.5 Hz), 1.37-1.47 (m, 1H), 1.86-1.97 (m, 1H), 2.03-2.10 (m, 1H), 2.21-2.37 (m, 4H), 2.85-2.99 (m, 2H), 3.70 (d, 2H, J=5.0 Hz), 4.33 (t, 2H, J=4.5 Hz), 4.42 (s, 3H), 6.20 (br s, 1H), 6.82 (d, 2H, J=8.0 Hz), 7.15 (d, 2H, J=8.0 Hz), 7.28-7.40 (m, 2H), 8.29 (s, 1H).

Example 71

Synthesis of Compound (I-139)

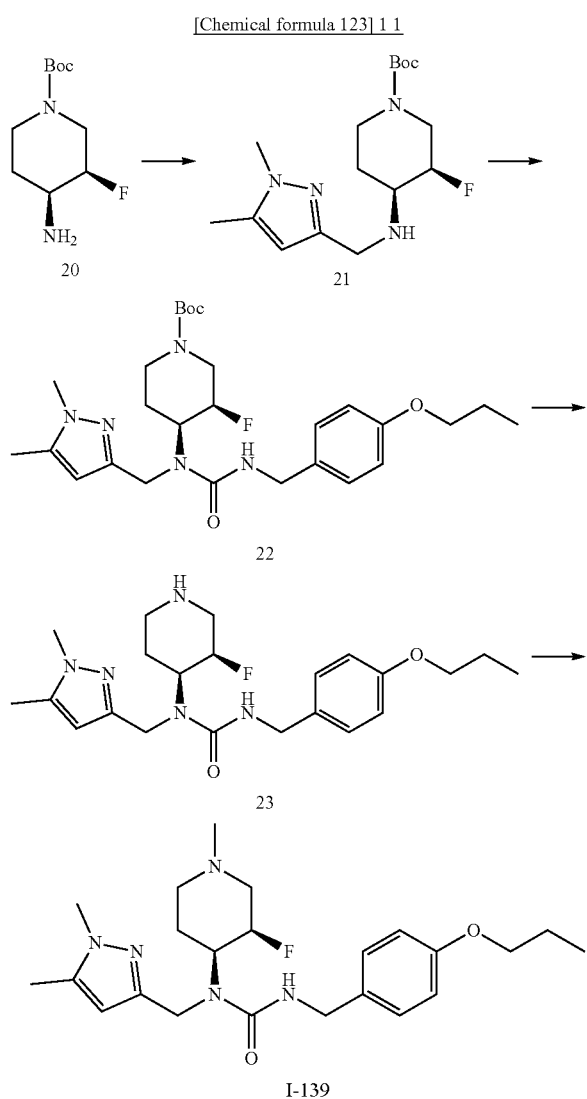

[Chemical formula 123] 1 1

Step 1 Synthesis of Compound 21

To Compound 20 (300 mg, 1.37 mmol) were added dichloromethane (5 mL), 1,5-dimethyl-1H-pyrazolecarbaldehyde (171 mg, 1.37 mmol), AcOH (0.39 mL, 6.87 mmol), and NaBH(OAc)$_3$ (583 mg, 2.75 mmol), and the mixture was stirred at room temperature for 2 hours. A saturated aqueous solution of sodium hydrogen carbonate was added, and the mixture was stirred at room temperature. Water was added and the mixture was extracted with ethyl acetate. The organic layer was washed with brine and dried over anhydrous magnesium sulfate. The solvent was distilled off under reduced pressure, and the obtained residue was purified by amino silica gel column chromatography (hexane-ethyl acetate) to afford Compound 21 (359 mg, yield 80%).

$^1$H-NMR (CDCl$_3$) δ: 1.45 (s, 9H), 1.59-1.81 (m, 2H), 2.24 (s, 311), 2.69-3.02 (m, 2H), 3.72 (s, 3H), 3.72 (s, 3H), 3.80 (s, 2H), 3.69-4.20 (m, 1H), 4.23-4.42 (m, 1H), 4.69-4.81 (m, 1H), 5.96 (s, 1H).

Step 2 Synthesis of Compound 22

To Compound 21 (142 mg, 0.44 mmol) were added acetonitrile (3 mL) and N-(4-normalpropoxybenzyl)-1H-imidazole-1-carboxamide (113 mg, 0.44 mmol), and the mixture was stirred at 80° C., for 4 hours. The solvent was distilled off under reduced pressure, and the obtained residue was purified by silica gel column chromatography (hexane-ethyl acetate) to afford compound 22 (195 mg, yield 81%).

$^1$H-NMR (CDCl$_3$) δ: 1.03 (t, 3H, J=7.4 Hz), 1.47 (s, 9H), 1.56-1.65 (m, 1H), 1.75-1.84 (m, 1H), 2.15-2.24 (m, 4H), 2.75-3.10 (m, 2H), 3.56 (s, 3H), 3.90 (t, 2H, J=6.6 Hz), 4.25-4.42 (m, 5H), 4.74-4.63 (m, 1H), 4.76-4.89 (m, 1H), 5.92 (s, 1H), 5.92 (s, 1H), 6.82 (d, J=8.5 Hz, 21), 7.15 (d, J=8.5 Hz, 2H).

Step 3 Synthesis of Compound 23

To Compound 22 (80 mg, 0.36 mmol) were added dichloromethane (1 mL), 2,6-lutidine (0.08 mL, 0.695 mmol), trimethylsilyl triflate (0.08 mL, 0.695 mmol), and the mixture was stirred at room temperature for 10 minutes. A 20% aqueous solution of potassium carbonate (4 mL) was added, and the mixture was extracted with ethyl acetate. The solvent was distilled off under reduced pressure, and the obtained residue was purified by amino silica gel column chromatography (hexane-ethyl acetate) to afford Compound 23 (52 mg, yield 80%).

1H-NMR (CDCl3) δ: 1.01 (6H, d, J=6.8 Hz), 1.62 (1H, br s), 2.02-2.12 (2H, m), 2.21 (3H, s), 2.74-2.92 (2H, m), 3.24 (2H, dd, J=29.7, 14.9 Hz), 3.57 (3H, s), 3.69 (2H, d, J=6.5 Hz), 4.30-4.34 (4H, m), 4.57 (1H, dt, J=35.4, 6.4 Hz), 4.78 (1H, d, J=50.8 Hz), 5.92 (1H, s), 6.82 (1H, br s), 6.81 (2H, d, J=8.5 Hz), 7.14 (2H, d, J=8.5 Hz).

Step 4 Synthesis of Compound (I-139)

To Compound 23 (30 mg, 0.19 mmol) were added methanol (1 ml), 37% formaldehyde solution (0.03 mL, 0.36 mmol) and NaBH(OAc)$_3$ (45 mg, 0.22 mmol), and the mixture was stirred at room temperature for 1 hour. A saturated aqueous solution of sodium hydrogen carbonate was added, and the mixture was stirred at room temperature. Water was added and the mixture was extracted with ethyl acetate. The organic layer was washed with brine and dried over anhydrous magnesium sulfate. The solvent was distilled off under reduced pressure, and the obtained residue was purified by amino silica gel column chromatography (hexane-ethyl acetate) to afford compound (I-139) (20 mg, yield 66%).

1H-NMR (CDCl3) δ: 1.03 (t, 3H, J=7.5 Hz), 1.61-1.68 (m, 1H), 1.75-1.84 (m, 2H), 2.15-2.37 (m, 9H), 3.00 (d, 1H, J=10.8 Hz), 3.14 (t, 1H, J=11.9 Hz), 3.56 (s, 3H), 3.90 (t, 2H, J=6.7 Hz), 4.26-4.51 (m, 5H), 4.79-4.91 (m, 1H), 5.93 (br s, 1H), 6.70 (br s, 1H), 6.81 (d, 2H, J=8.5 Hz), 7.15 (d, 2H, J=8.5 Hz).

The following compounds were synthesized according to the above general synthetic method and the method described in Examples. The structure and physical properties (LC/MS data) are shown in the table below.

Incidentally, in the structural formula, "wedge shape" and "dashed line" indicate the configuration. Particularly, with regard to compounds whose configurations are described, a compound described as "racemate" in the item of "Configuration" is a racemic compound whose relative configuration has been specified.

In addition, with regard to compounds in which the bonds forming an asymmetric carbon are described by solid lines, a compound described as "racemate" in the item of "Configuration" is a racemic compound.

A compound described as "diastereo mixture" in the item of "Configuration" is diastereomer mixture.

TABLE 1

| Compound No. | Structure | LC/MS Measurement condition | Retention time (min) | m/z | Configuration |
|---|---|---|---|---|---|
| I-001 | | 2 | 1.56 | 411 | |
| I-002 | | 2 | 1.31 | 411 | |
| I-003 | | 2 | 1.30 | 411 | |
| I-004 | | 2 | 1.53 | 412 | |
| I-005 | | 2 | 1.46 | 412 | |

TABLE 1-continued

| Compound No. | Structure | LC/MS Measurement condition | Retention time (min) | m/z | Configuration |
|---|---|---|---|---|---|
| I-006 | | 1 | 1.23 | 412 | |

TABLE 2

| I-007 | | 2 | 1.47 | 412 | |
| I-008 | | 1 | 1.34 | 429 | |
| I-009 | | 2 | 1.98 | 446 | |
| I-010 | | 2 | 1.65 | 441 | |

TABLE 2-continued

| ID | Structure | | | |
|---|---|---|---|---|
| I-011 | [structure: 5-cyano-pyridin-2-yl-methyl, N-(1-methylpiperidin-4-yl), urea, N'-(4-isobutoxybenzyl)] | 2 | 1.63 | 436 |
| I-012 | [structure: 5-trifluoromethyl-pyridin-2-yl-methyl, N-(1-methylpiperidin-4-yl), urea, N'-(4-isobutoxybenzyl)] | 2 | 2.06 | 479 |
| I-013 | [structure: 5-methyl-pyridin-2-yl-methyl, N-(1-methylpiperidin-4-yl), urea, N'-(4-isobutoxybenzyl)] | 2 | 1.52 | 425 |

TABLE 3

| ID | Structure | | | |
|---|---|---|---|---|
| I-014 | [structure: 3,5-difluoropyridin-2-yl-methyl, N-(1-methylpiperidin-4-yl), urea, N'-(4-isobutoxybenzyl)] | 2 | 1.91 | 447 |
| I-015 | [structure: 3-chloro-5-fluoropyridin-2-yl-methyl, N-(1-methylpiperidin-4-yl), urea, N'-(4-isobutoxybenzyl)] | 2 | 1.97 | 463 |

TABLE 3-continued
I-016 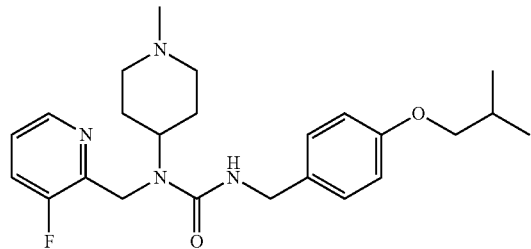 [SMILES: CC(C)COc1ccc(CNC(=O)N(Cc2ncccc2F)C2CCN(C)CC2)cc1] 2 1.67 429
I-017 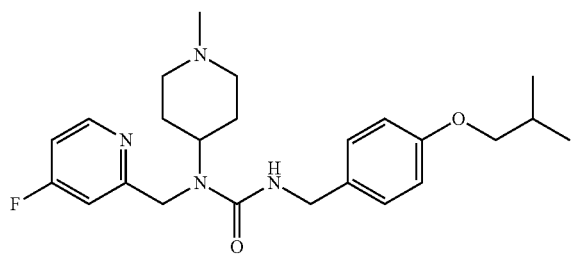 [SMILES: CC(C)COc1ccc(CNC(=O)N(Cc2cc(F)ccn2)C2CCN(C)CC2)cc1] 1 1.38 429
I-018 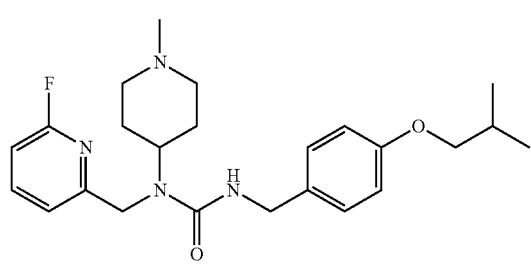 [SMILES: CC(C)COc1ccc(CNC(=O)N(Cc2cccc(F)n2)C2CCN(C)CC2)cc1] 2 1.70 429
I-019 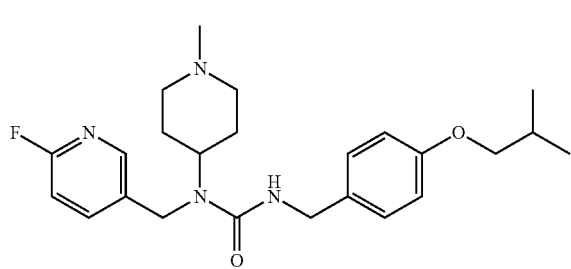 [SMILES: CC(C)COc1ccc(CNC(=O)N(Cc2ccc(F)nc2)C2CCN(C)CC2)cc1] 1 1.66 429
I-020 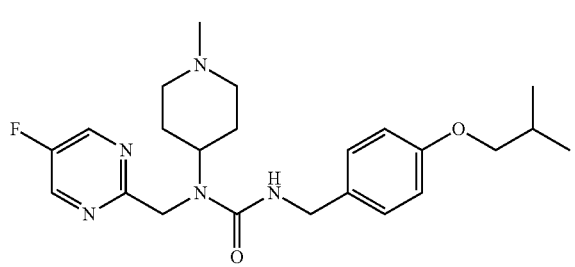 [SMILES: CC(C)COc1ccc(CNC(=O)N(Cc2ncc(F)cn2)C2CCN(C)CC2)cc1] 2 1.68 430

TABLE 4

| ID | Structure | | | |
|---|---|---|---|---|
| I-021 | (1-methylpyrazol-3-yl)methyl / 1-methylpiperidin-4-yl urea with 4-isobutoxybenzyl | 1 | 1.41 | 414 |
| I-022 | (1-methylpyrazol-4-yl)methyl / 1-methylpiperidin-4-yl urea with 4-isobutoxybenzyl | 2 | 1.55 | 414 |
| I-023 | (1-methylpyrazol-5-yl)methyl / 1-methylpiperidin-4-yl urea with 4-isobutoxybenzyl | — | — | — |
| I-024 | (1-methylimidazol-2-yl)methyl / 1-methylpiperidin-4-yl urea with 4-isobutoxybenzyl | 2 | 1.35 | 414 |
| I-025 | (1-methylimidazol-4-yl)methyl / 1-methylpiperidin-4-yl urea with 4-isobutoxybenzyl | 2 | 1.29 | 414 |
| I-026 | (1H-pyrazol-3-yl)methyl / 1-methylpiperidin-4-yl urea with 4-isobutoxybenzyl | 2 | 1.50 | 400 |

TABLE 4-continued

| ID | Structure | | | |
|---|---|---|---|---|
| I-207 | (1-methylpyrrol-3-yl-methyl)(1-methylpiperidin-4-yl)-N'-(4-isobutoxybenzyl)urea | 2 | 1.75 | 413 |

TABLE 5

| ID | Structure | | | |
|---|---|---|---|---|
| I-028 | (1-methylpyrrol-2-yl-methyl)(1-methylpiperidin-4-yl)-N'-(4-isobutoxybenzyl)urea | 2 | 1.80 | 413 |
| I-029 | (thiophen-2-yl-methyl)(1-methylpiperidin-4-yl)-N'-(4-isobutoxybenzyl)urea | 2 | 1.85 | 416 |
| I-030 | (5-methylthiophen-2-yl-methyl)(1-methylpiperidin-4-yl)-N'-(4-isobutoxybenzyl)urea | 2 | 2.02 | 430 |
| I-031 | (4-methylthiophen-2-yl-methyl)(1-methylpiperidin-4-yl)-N'-(4-isobutoxybenzyl)urea | 2 | 2.06 | 430 |

TABLE 5-continued

| ID | Structure | a | b | c |
|---|---|---|---|---|
| I-032 | (1-methylpiperidin-4-yl)(thiazol-2-ylmethyl) urea with 4-isobutoxybenzyl | 2 | 1.52 | 417 |
| I-033 | (1-methylpiperidin-4-yl)(oxazol-2-ylmethyl) urea with 4-isobutoxybenzyl | 2 | 1.50 | 401 |
| I-034 | (1-methylpiperidin-4-yl)(isothiazol-5-ylmethyl) urea with 4-isobutoxybenzyl | 1 | 1.21 | 417 |

TABLE 6

| ID | Structure | a | b | c |
|---|---|---|---|---|
| I-035 | (1-methylpiperidin-4-yl)(5-methylisoxazol-3-ylmethyl) urea with 4-isobutoxybenzyl | 2 | 1.76 | 415 |
| I-036 | (1-methylpiperidin-4-yl)(5-methyl-1,2,4-oxadiazol-3-ylmethyl) urea with 4-isobutoxybenzyl | 2 | 1.66 | 416 |

TABLE 6-continued
I-037 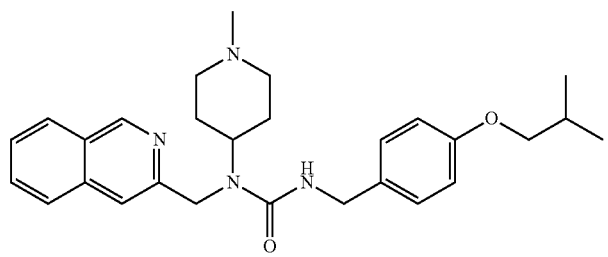 [SMILES: CC(C)COc1ccc(CNC(=O)N(Cc2cc3ccccc3cn2)C2CCN(C)CC2)cc1] 2 2.04 461
I-038 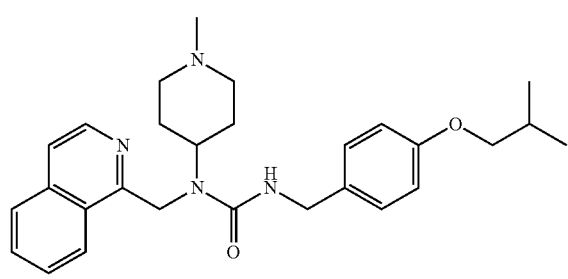 [SMILES: CC(C)COc1ccc(CNC(=O)N(Cc2nccc3ccccc23)C2CCN(C)CC2)cc1]
I-039 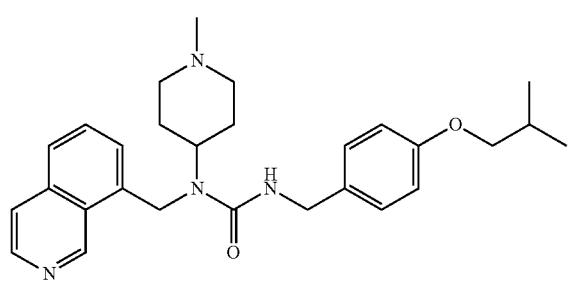 [SMILES: CC(C)COc1ccc(CNC(=O)N(Cc2cccc3ccncc23)C2CCN(C)CC2)cc1]
I-040 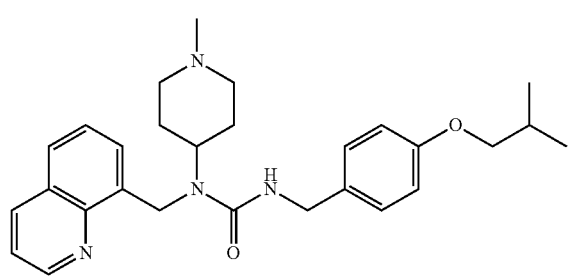 [SMILES: CC(C)COc1ccc(CNC(=O)N(Cc2cccc3cccnc23)C2CCN(C)CC2)cc1] 2 2.02 461
I-041 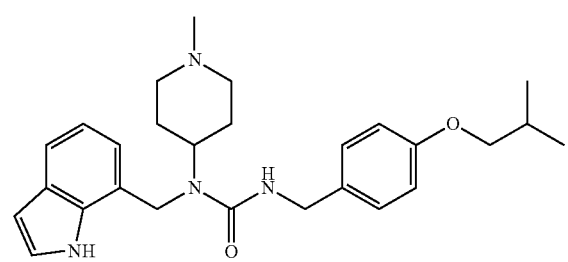 [SMILES: CC(C)COc1ccc(CNC(=O)N(Cc2cccc3cc[nH]c23)C2CCN(C)CC2)cc1] 2 2.18 449

TABLE 7
| | | | | |
|---|---|---|---|---|
| I-042 | 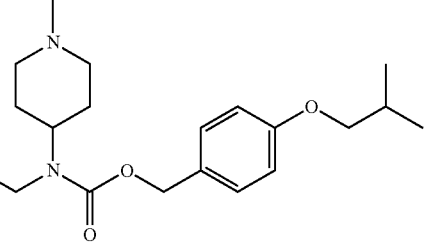 | 2 | 2.02 | 430 |
| I-043 | 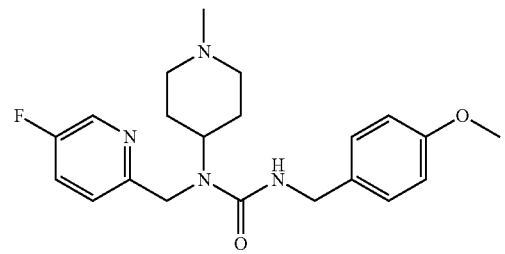 [SMILES: COc1ccc(CNC(=O)N(Cc2ccc(F)cn2)C2CCN(C)CC2)cc1] | 1 | 0.92 | 387 |
| I-044 | 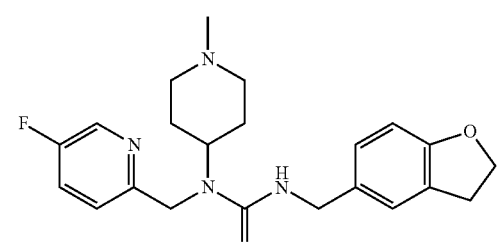 | 2 | 1.24 | 399 |
| I-045 | 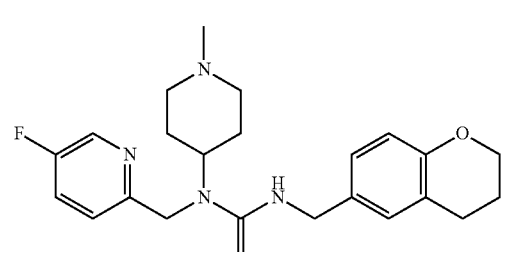 | 2 | 1.38 | 413 |
| I-046 | 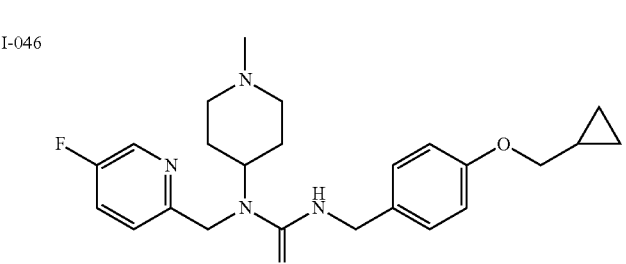 | 1 | 1.28 | 427 |
| I-047 | 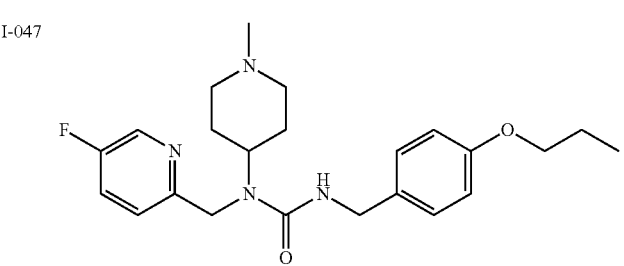 | 1 | 1.30 | 415 |

TABLE 7-continued
| | | | | |
|---|---|---|---|---|
| I-048 | 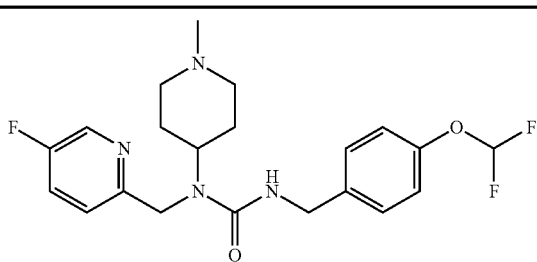 | 2 | 1.46 | 423 |
TABLE 8
| | | | | | |
|---|---|---|---|---|---|
| I-049 | 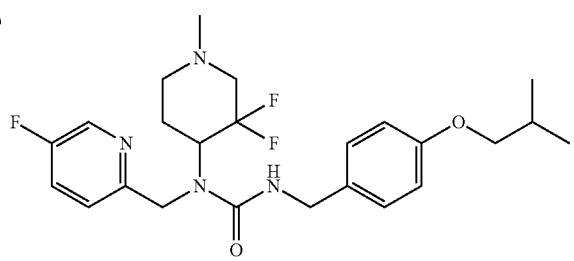 | 2 | 1.74 | 465 | racemate |
| I-050 | 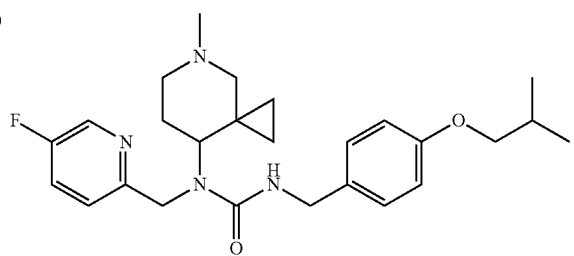 | 2 | 1.70 | 455 | racemate |
| I-051 | 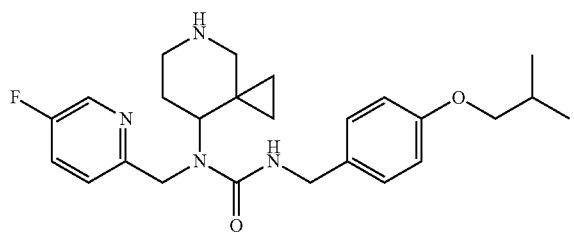 [SMILES: CC(C)COc1ccc(CNC(=O)N(Cc2ccc(F)cn2)C2CCNCC23CC3)cc1] | 2 | 1.69 | 441 | racemate |
| I-052 | 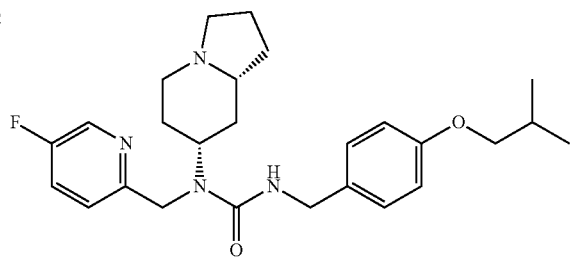 | 2 | 1.75 | 455 | racemate |

TABLE 8-continued
| | | | | | |
|---|---|---|---|---|---|
| I-053 | 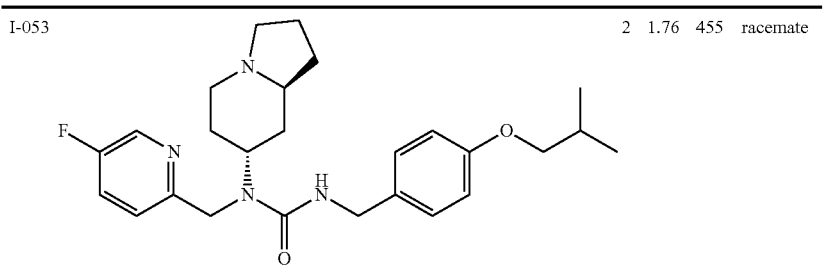 | 2 | 1.76 | 455 | racemate |
| I-054 | 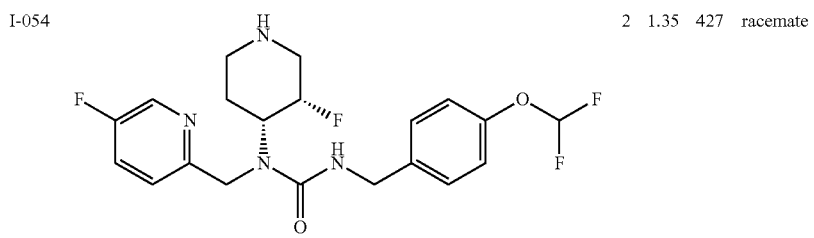 | 2 | 1.35 | 427 | racemate |
| I-055 | 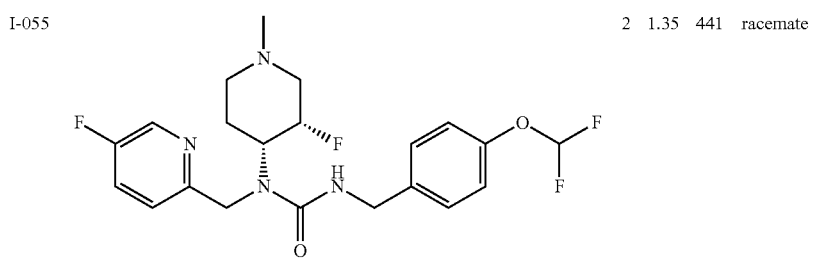 | 2 | 1.35 | 441 | racemate |
TABLE 9
| | | | | | |
|---|---|---|---|---|---|
| I-056 | 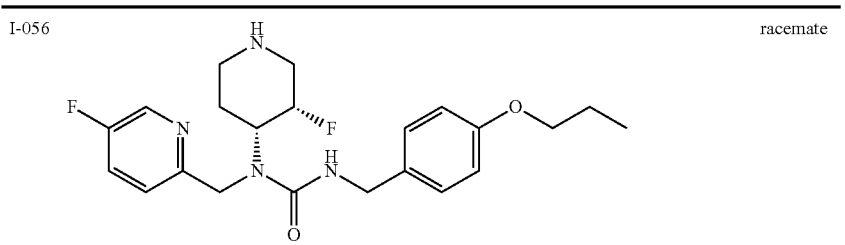 | | | | racemate |
| I-057 | 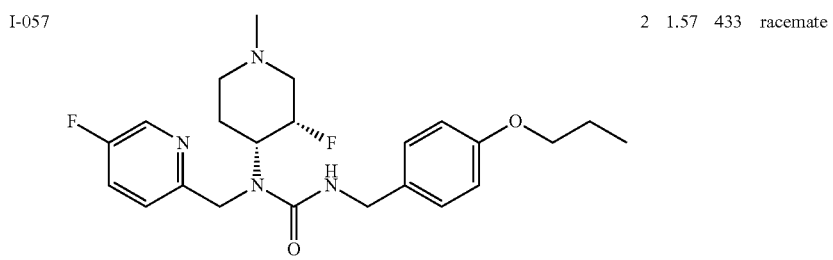 | 2 | 1.57 | 433 | racemate |
| I-058 | 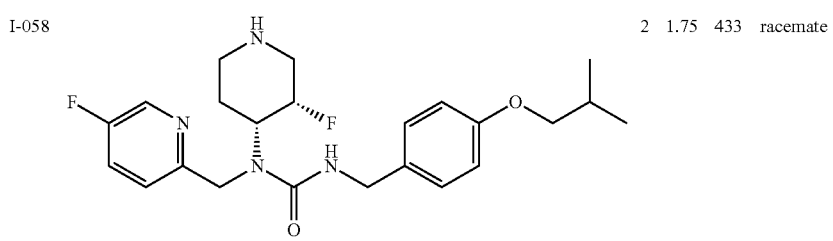 | 2 | 1.75 | 433 | racemate |

TABLE 9-continued
| I-059 | 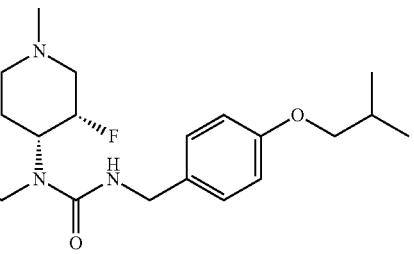 | 2 | 1.67 | 447 | racemate |
| I-060 | 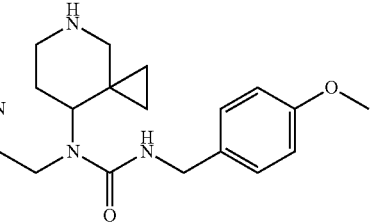 | 2 | 1.37 | 399 | racemate |
| I-061 | 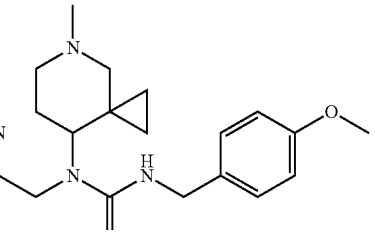 | 2 | 1.31 | 413 | racemate |
| I-062 | 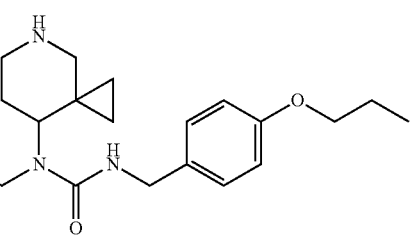 | 2 | 1.61 | 427 | racemate |
TABLE 10
| I-063 | 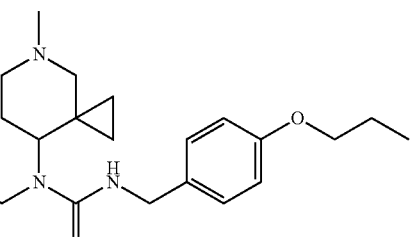 | 2 | 1.63 | 441 | racemate |
| I-064 | 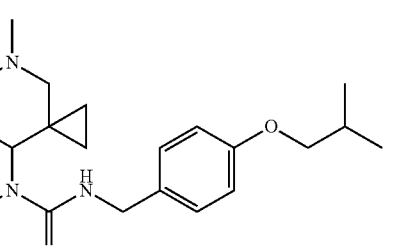 | 2 | 1.68 | 440 | racemate |

TABLE 10-continued
| | | | | |
|---|---|---|---|---|
| I-065 | 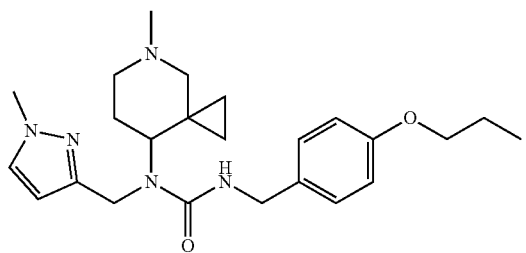 [SMILES: CCCOc1ccc(CNC(=O)N(Cc2ccn(C)n2)C2CCN(C)CC23CC3)cc1] | 2 | 1.52 | 426 racemate |
| I-066 | 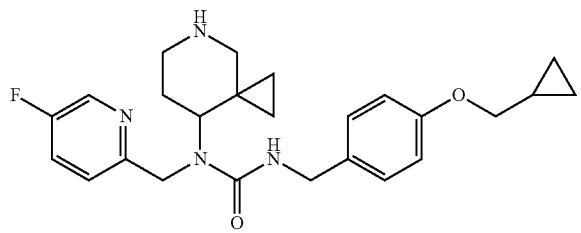 [SMILES: O=C(NCc1ccc(OCC2CC2)cc1)N(Cc1ccc(F)cn1)C1CCNCC12CC2] | 1 | 1.35 | 439 racemate |
| I-067 | 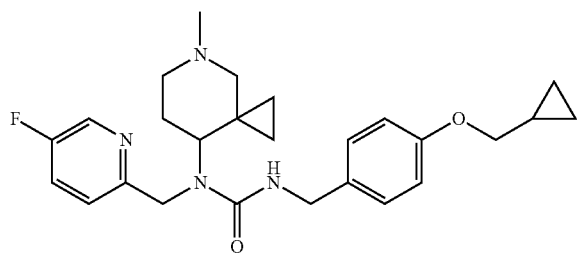 [SMILES: CN1CCC(N(Cc2ccc(F)cn2)C(=O)NCc2ccc(OCC3CC3)cc2)C2(CC2)C1] | 1 | 1.39 | 453 racemate |
| I-068 | 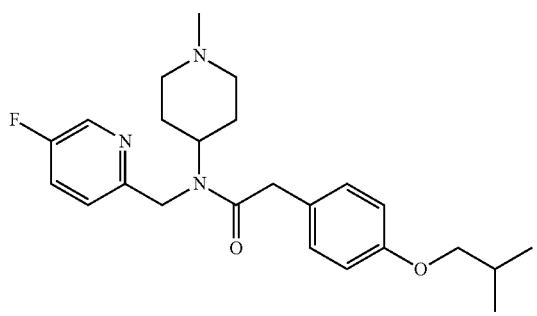 [SMILES: CC(C)COc1ccc(CC(=O)N(Cc2ccc(F)cn2)C2CCN(C)CC2)cc1] | 2 | 1.63 | 414 |
TABLE 11
| | | | | |
|---|---|---|---|---|
| I-069 | 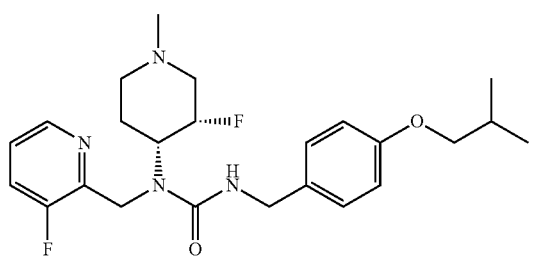 [SMILES: CC(C)COc1ccc(CNC(=O)N(Cc2ncccc2F)[C@@H]2CCN(C)C[C@@H]2F)cc1] | 2 | 1.80 | 447 racemate |

TABLE 11-continued

| ID | Structure | a | b | c | d |
|---|---|---|---|---|---|
| I-070 | (5-fluoroquinolin-8-yl)methyl-N-(1-methylpiperidin-4-yl)-N'-(4-isobutoxybenzyl)urea | 2 | 2.01 | 479 | |
| I-071 | (4-fluorobenzofuran-7-yl)methyl-N-(1-methylpiperidin-4-yl)-N'-(4-isobutoxybenzyl)urea | 2 | 2.01 | 468 | |
| I-072 | (2,3-dihydro-[1,4]dioxino[2,3-c]pyridin-7-yl)methyl-N-(1-methylpiperidin-4-yl)-N'-(4-isobutoxybenzyl)urea | 2 | 1.65 | 469 | |
| I-073 | (3-fluoropyridin-2-yl)methyl-N-(3-fluoropiperidin-4-yl)-N'-(4-isobutoxybenzyl)urea | 2 | 1.81 | 433 | racemate |
| I-074 | (1-methyl-1H-pyrrolo[3,2-b]pyridin-3-yl)methyl-N-(1-methylpiperidin-4-yl)-N'-(4-isobutoxybenzyl)urea | 2 | 1.40 | 464 | |
| I-075 | (5-fluoropyridin-2-yl)methyl-N-(1-methylpiperidin-4-yl)-N'-(3-hydroxybenzyl)urea | 2 | 1.08 | 373 | |

TABLE 11-continued
| I-076 | 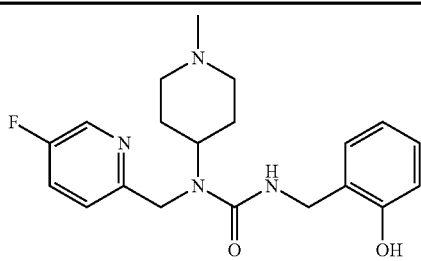 | 2 | 1.24 | 373 |
TABLE 12
| I-077 | 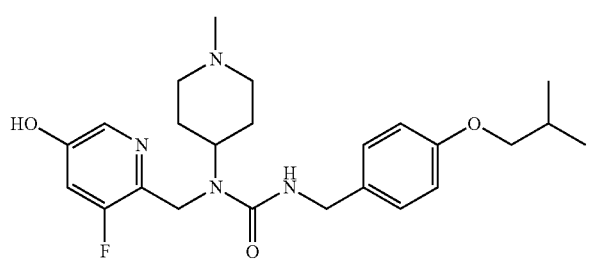 | 2 | 1.66 | 445 |
| I-078 | 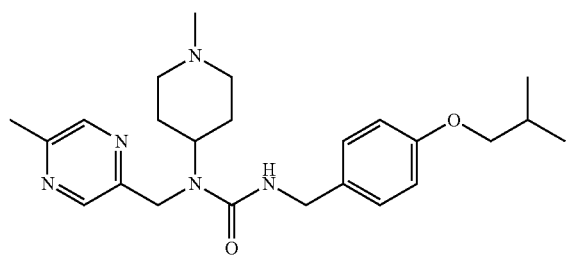 | 2 | 1.55 | 426 |
| I-079 | 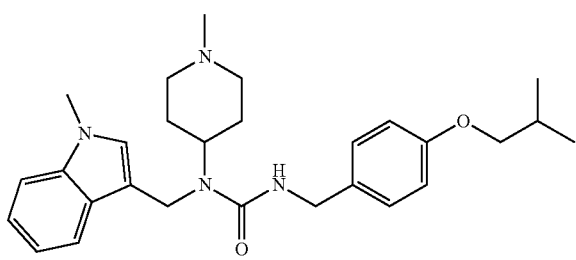 [SMILES: CC(C)COc1ccc(CNC(=O)N(Cc2cn(C)c3ccccc23)C2CCN(C)CC2)cc1] | 2 | 1.78 | 463 |
| I-080 | 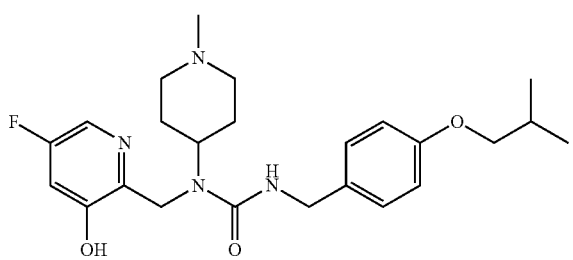 [SMILES: CC(C)COc1ccc(CNC(=O)N(Cc2ncc(F)cc2O)C2CCN(C)CC2)cc1] | 2 | 1.81 | 445 |

TABLE 12-continued
| | | | | |
|---|---|---|---|---|
| I-081 | 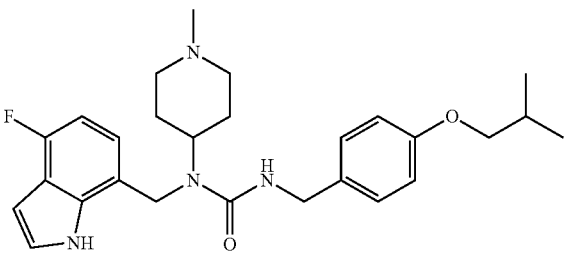 [SMILES: CC(C)COc1ccc(CNC(=O)N(Cc2ccc(F)c3cc[nH]c23)C2CCN(C)CC2)cc1] | 2 | 1.98 | 467 |
| I-082 | 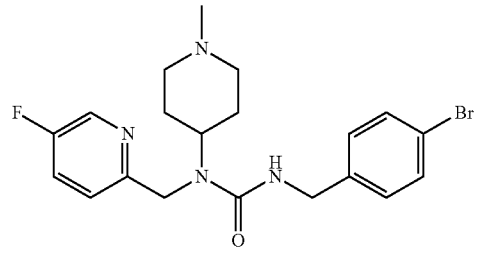 [SMILES: CN1CCC(N(Cc2ccc(F)cn2)C(=O)NCc2ccc(Br)cc2)CC1] | 1 | 1.13 | 435 |
| I-083 | 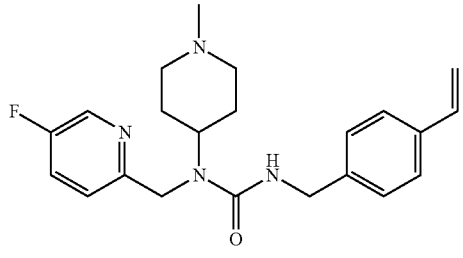 [SMILES: C=Cc1ccc(CNC(=O)N(Cc2ccc(F)cn2)C2CCN(C)CC2)cc1] | 1 | 1.13 | 383 |
| I-084 | 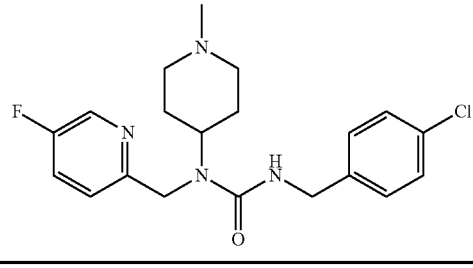 | 2 | 1.44 | 391 |
TABLE 13
| | | | | |
|---|---|---|---|---|
| I-085 | 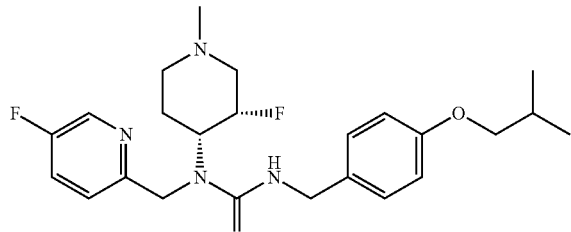 | 2 | 1.78 | 447 |

TABLE 13-continued
| | | | | |
|---|---|---|---|---|
| I-086 | 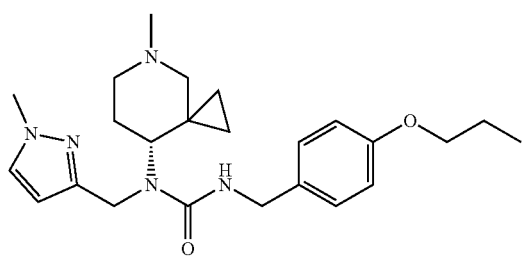 [SMILES: CCCOc1ccc(CNC(=O)N(Cc2ccn(C)n2)[C@@H]2CCN(C)CC23CC3)cc1] | 2 | 1.52 | 426 |
| I-087 | 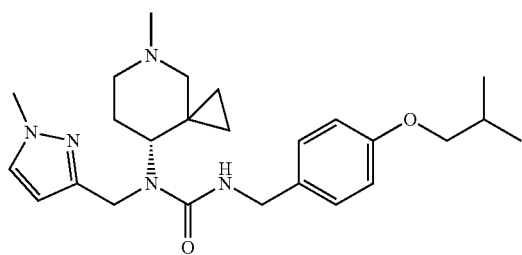 | 2 | 1.68 | 440 |
| I-088 | 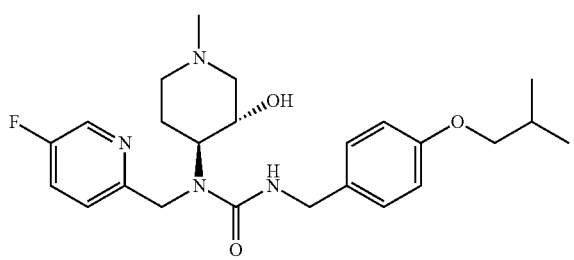 [SMILES: CC(C)COc1ccc(CNC(=O)N(Cc2ccc(F)cn2)[C@H]2CCN(C)C[C@@H]2O)cc1] | 1 | 1.48 | 445 | racemate |
| I-089 | 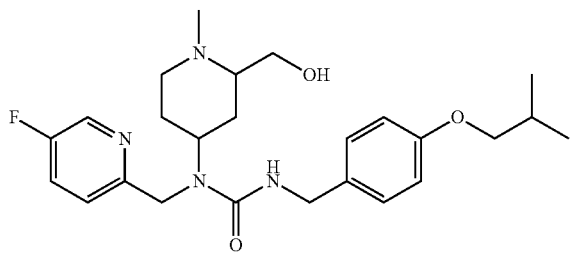 [SMILES: CC(C)COc1ccc(CNC(=O)N(Cc2ccc(F)cn2)C2CCN(C)C(CO)C2)cc1] | 1 | 1.54 | 459 | diastereo mixture |
| I-090 | 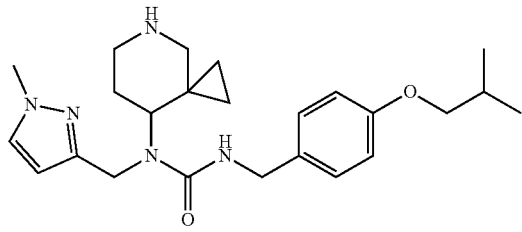 | 2 | 1.65 | 426 | racemate |
| I-091 | 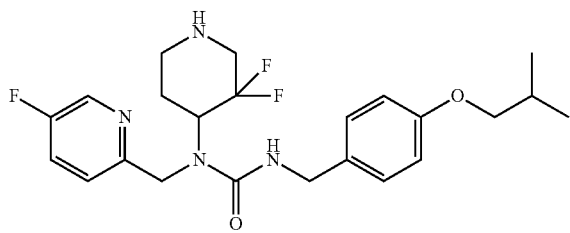 [SMILES: CC(C)COc1ccc(CNC(=O)N(Cc2ccc(F)cn2)C2CCNCC2(F)F)cc1] | 2 | 1.71 | 451 | racemate |

TABLE 14

| ID | Structure | a | b | c | d |
|---|---|---|---|---|---|
| I-092 | (5-fluoropyridin-2-yl)methyl / 1-methylpiperidin-4-yl urea with 4-(2,2,2-trifluoro...) | 1 | 1.26 | 451 | |
| I-093 | 1-methylpyrrol-3-ylmethyl / 3-fluoropiperidin-4-yl urea with 4-isobutoxybenzyl | 2 | 1.84 | 417 | racemate |
| I-094 | 1,5-dimethylpyrazol-3-ylmethyl / N-methyl-spiro piperidine urea with 4-isobutoxybenzyl | 1 | 1.30 | 455 | racemate |
| I-095 | (5-fluoropyridin-2-yl)methyl / 1-methylpiperidin-4-yl urea with 4-(2,2,2-trifluoroethoxy)benzyl | 1 | 1.56 | 455 | |
| I-096 | 1,5-dimethylpyrazol-3-ylmethyl / 1-methylpiperidin-4-yl urea with 4-isobutoxybenzyl | 2 | 1.78 | 428 | |
| I-097 | (5-fluoropyridin-2-yl)methyl / 1-methylpiperidin-4-yl urea with 4-((S)-2-fluoropropoxy)benzyl | 1 | 1.21 | 433 | |

TABLE 14-continued
| I-098 | 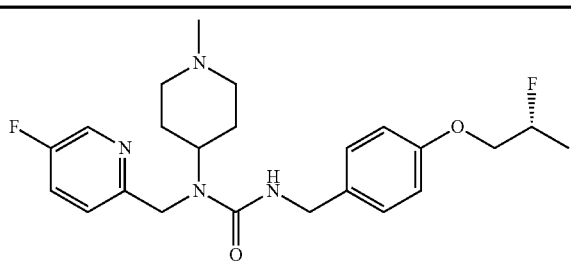 | 1 | 0.99 | 433 | |
TABLE 15
| I-099 | 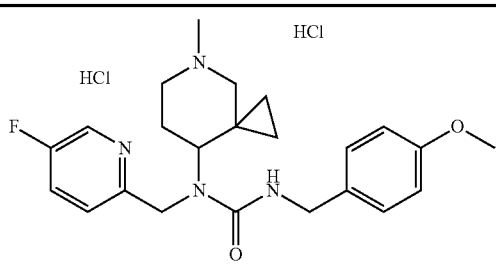 | 2 | 1.29 | 413 | racemate |
| I-100 | 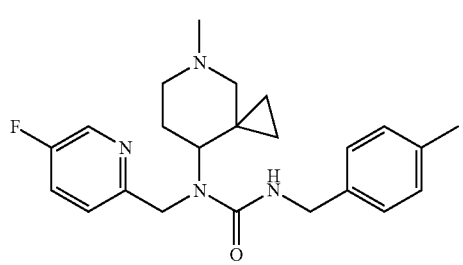 [SMILES: Cc1ccc(CNC(=O)N(Cc2ccc(F)cn2)C2CCN(C)CC23CC3)cc1] | 2 | 1.48 | 397 | racemate |
| I-101 | 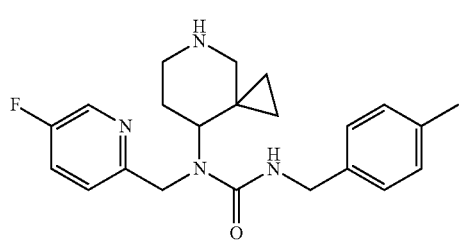 [SMILES: Cc1ccc(CNC(=O)N(Cc2ccc(F)cn2)C2CCNCC23CC3)cc1] | 2 | 1.46 | 383 | racemate |
| I-102 | 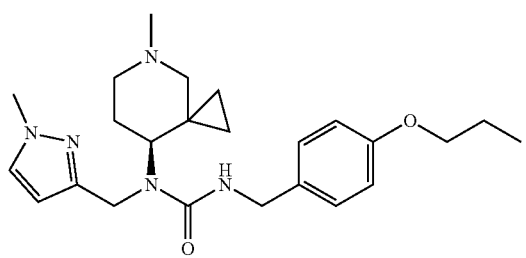 [SMILES: CCCOc1ccc(CNC(=O)N(Cc2ccn(C)n2)[C@H]2CCN(C)CC23CC3)cc1] | 2 | 1.52 | 426 | |
| I-103 | 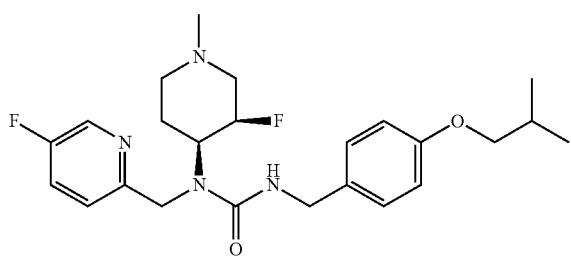 [SMILES: CC(C)COc1ccc(CNC(=O)N(Cc2ccc(F)cn2)[C@H]2CCN(C)C[C@H]2F)cc1] | 2 | 1.71 | 447 | |

TABLE 15-continued
| | | | | | |
|---|---|---|---|---|---|
| I-104 | 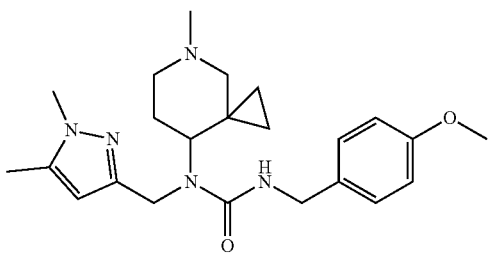 | 1 | 0.93 | 413 | racemate |
| I-105 | 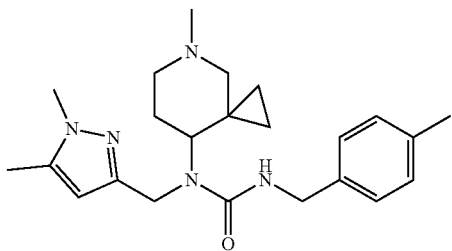 | 1 | 1.05 | 396 | racemate |
| I-106 | 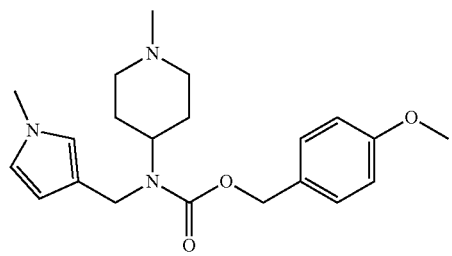 [SMILES: COc1ccc(COC(=O)N(Cc2ccn(C)c2)C2CCN(C)CC2)cc1] | 2 | 1.54 | 372 | |
TABLE 16
| | | | | | |
|---|---|---|---|---|---|
| I-107 | 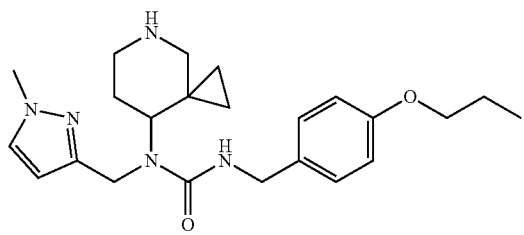 [SMILES: CCCOc1ccc(CNC(=O)N(Cc2ccn(C)n2)C2CCNCC23CC3)cc1] | 2 | 1.52 | 412 | racemate |
| I-108 | 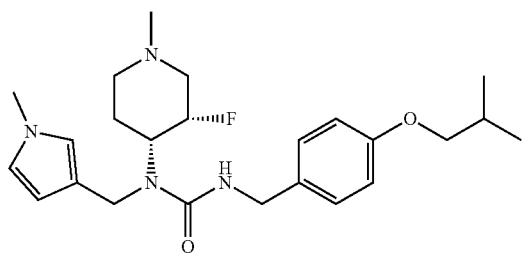 [SMILES: CC(C)COc1ccc(CNC(=O)N(Cc2ccn(C)c2)[C@@H]2CCN(C)C[C@@H]2F)cc1] | 2 | 1.84 | 431 | racemate |

TABLE 16-continued
| | | | | | |
|---|---|---|---|---|---|
| I-109 | 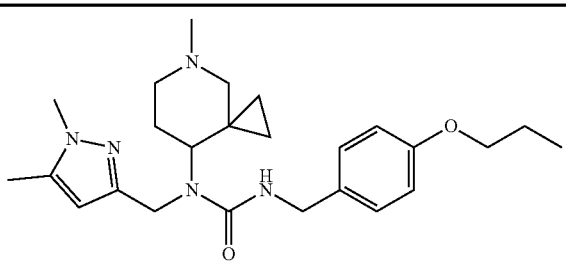 | 2 | 1.55 | 440 | racemate |
| I-110 | 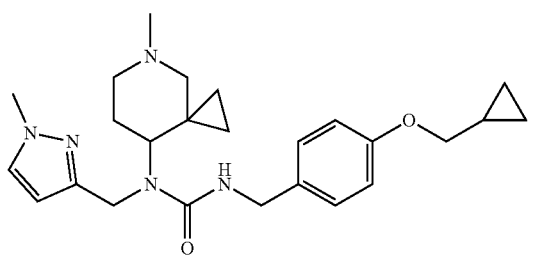 [SMILES: CN1CCC(N(Cc2ccn(C)n2)C(=O)NCc2ccc(OCC3CC3)cc2)C2(CC2)C1] | 1 | 1.11 | 439 | racemate |
| I-111 | 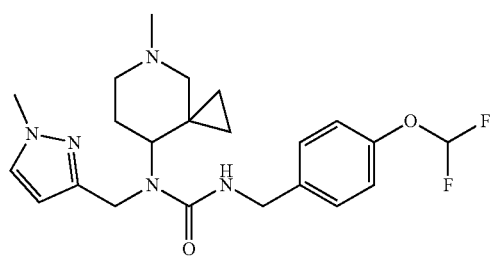 [SMILES: CN1CCC(N(Cc2ccn(C)n2)C(=O)NCc2ccc(OC(F)F)cc2)C2(CC2)C1] | 1 | 0.99 | 435 | racemate |
| I-112 | 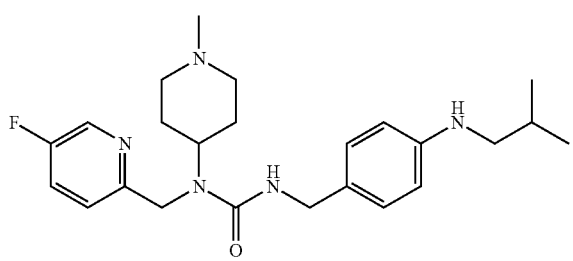 [SMILES: CC(C)CNc1ccc(CNC(=O)N(Cc2ccc(F)cn2)C2CCN(C)CC2)cc1] | 1 | 0.88 | 428 | |
| I-113 | 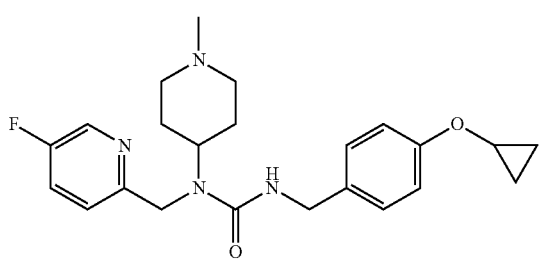 [SMILES: CN1CCC(N(Cc2ccc(F)cn2)C(=O)NCc2ccc(OC3CC3)cc2)CC1] | 1 | 1.08 | 413 | |
TABLE 17
| | | | | |
|---|---|---|---|---|
| I-114 | 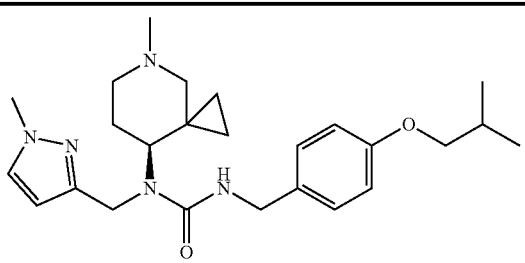 | 2 | 1.68 | 440 |

TABLE 17-continued
I-115 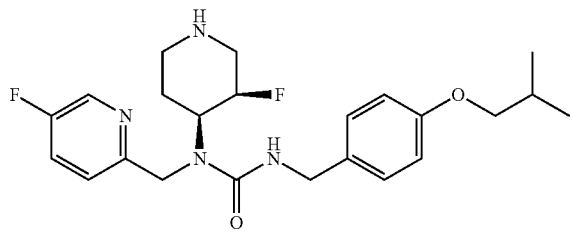 [SMILES: CC(C)COc1ccc(CNC(=O)N(Cc2ccc(F)cn2)[C@H]2CCNC[C@H]2F)cc1] 2 1.73 433
I-116 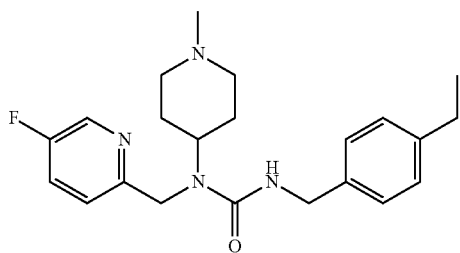 [SMILES: CCc1ccc(CNC(=O)N(Cc2ccc(F)cn2)C2CCN(C)CC2)cc1] 1 1.18 385
I-117 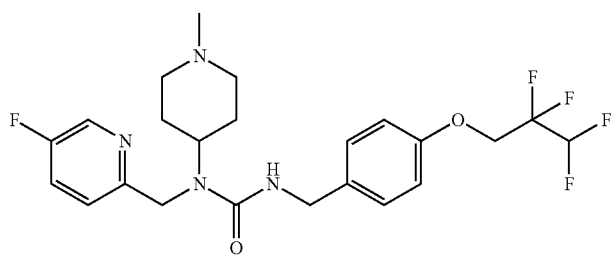 [SMILES: CN1CCC(N(Cc2ccc(F)cn2)C(=O)NCc2ccc(OCC(F)(F)C(F)F)cc2)CC1] 1 1.16 487
I-118 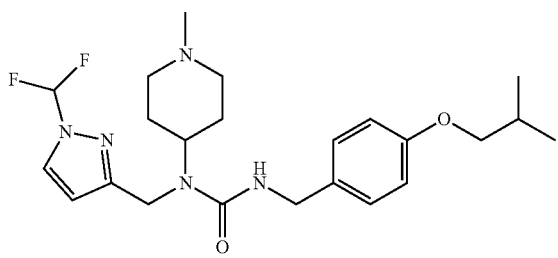 [SMILES: CC(C)COc1ccc(CNC(=O)N(Cc2ccn(C(F)F)n2)C2CCN(C)CC2)cc1] 1 1.34 450
I-119 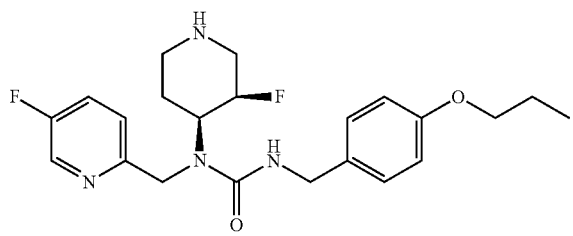 [SMILES: CCCOc1ccc(CNC(=O)N(Cc2ccc(F)cn2)[C@H]2CCNC[C@H]2F)cc1] 2 1.58 419
I-120 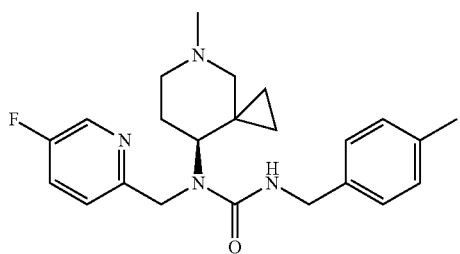 [SMILES: Cc1ccc(CNC(=O)N(Cc2ccc(F)cn2)[C@H]2CCN(C)CC23CC3)cc1] 1 1.06 397

TABLE 17-continued
| | | | | |
|---|---|---|---|---|
| I-121 | 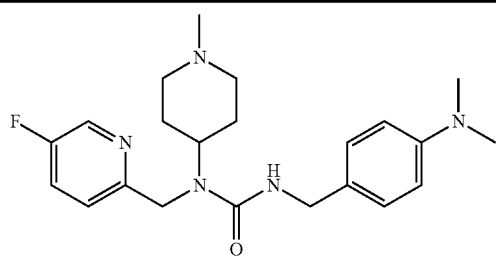 | 1 | 0.53 | 400 |
TABLE 18
| | | | | |
|---|---|---|---|---|
| I-122 | 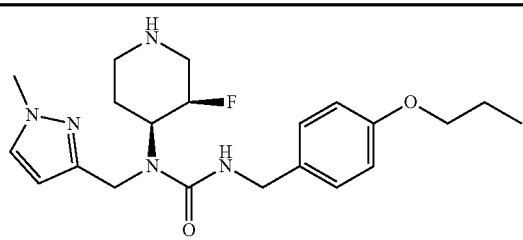 | 1 | 1.09 | 405 |
| I-123 | 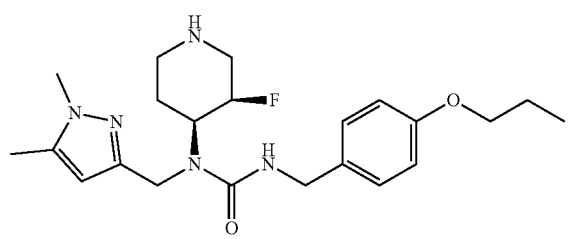 [SMILES: CCCOc1ccc(CNC(=O)N(Cc2cc(C)n(C)n2)[C@H]2CCNC[C@H]2F)cc1] | 1 | 1.17 | 418 |
| I-124 | 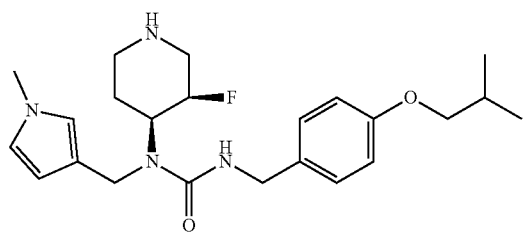 [SMILES: CC(C)COc1ccc(CNC(=O)N(Cc2ccn(C)c2)[C@H]2CCNC[C@H]2F)cc1] | 1 | 1.35 | 418 |
| I-125 | 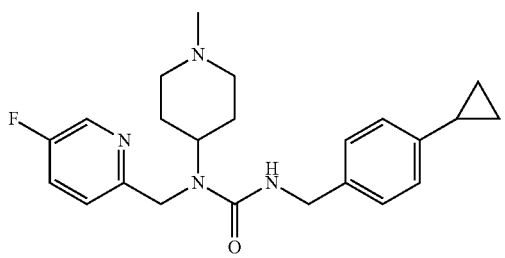 [SMILES: CN1CCC(N(Cc2ccc(F)cn2)C(=O)NCc2ccc(C3CC3)cc2)CC1] | 1 | 1.21 | 397 |
| I-126 | 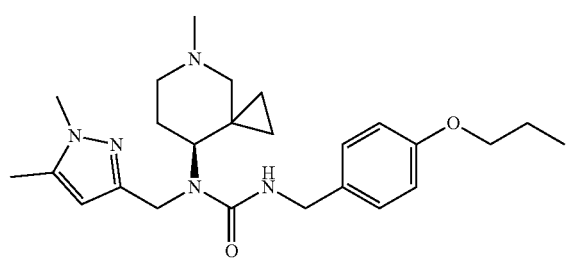 [SMILES: CCCOc1ccc(CNC(=O)N(Cc2cc(C)n(C)n2)[C@H]2CCN(C)CC23CC3)cc1] | 2 | 1.56 | 440 |

TABLE 18-continued
| I-127 | 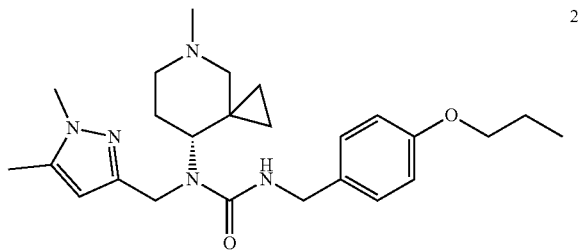 | 2 | 1.56 | 440 |
TABLE 19
| I-128 | 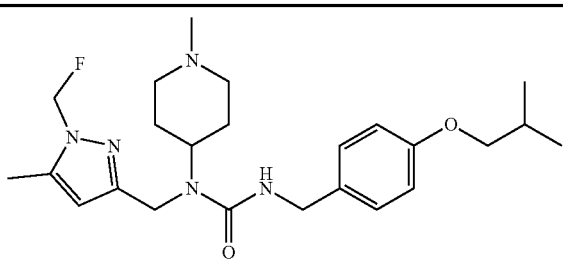 | 1 | 1.61 | 446 |
| I-129 | 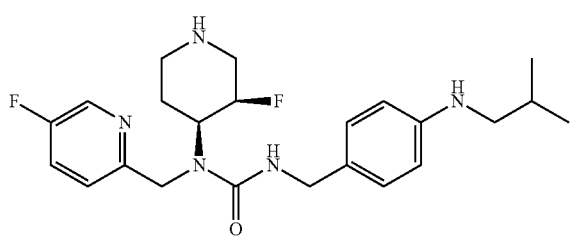 [SMILES: CC(C)CNc1ccc(CNC(=O)N(Cc2ccc(F)cn2)[C@H]2CCNC[C@H]2F)cc1] | 1 | 0.91 | 432 |
| I-130 | 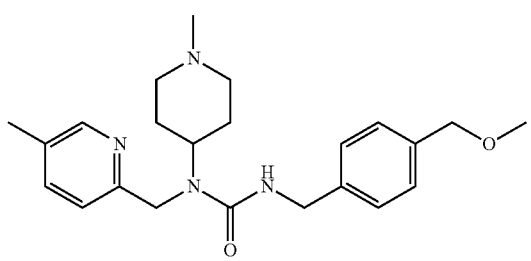 | 2 | 1.11 | 397 |
| I-131 | 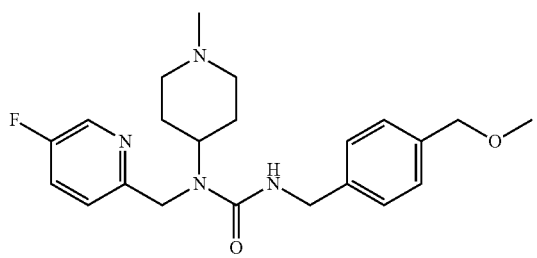 [SMILES: COCc1ccc(CNC(=O)N(Cc2ccc(F)cn2)C2CCN(C)CC2)cc1] | 2 | 1.28 | 401 |
| I-132 | 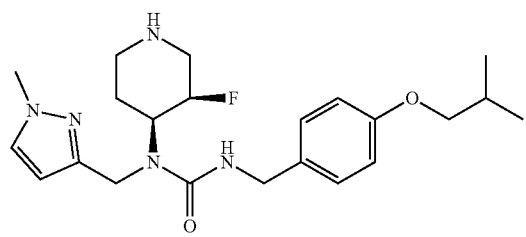 | 1 | 1.24 | 418 |

TABLE 19-continued
| I-133 | 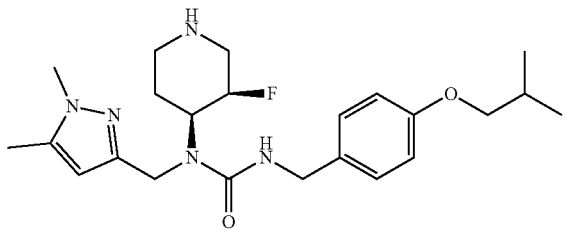 [SMILES: Cc1cc(CN(C(=O)NCc2ccc(OCC(C)C)cc2)[C@H]2CCNC[C@H]2F)nn1C] | 1 | 1.29 | 432 |
| I-134 | 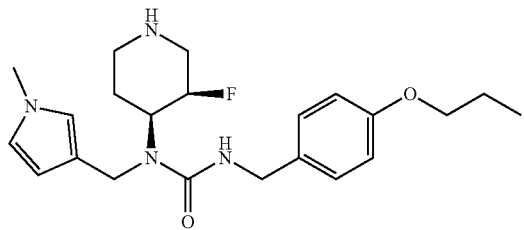 [SMILES: CCCOc1ccc(CNC(=O)N(Cc2ccn(C)c2)[C@H]2CCNC[C@H]2F)cc1] | 2 | 1.62 | 403 |
| I-135 | 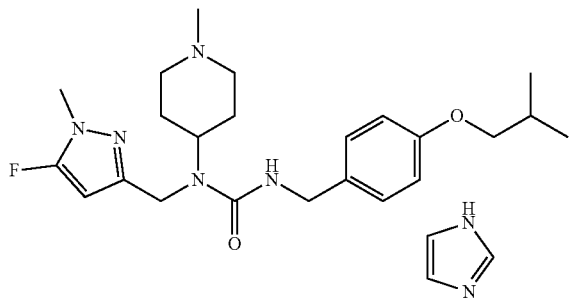 | 1 | 1.33 | 432 |
TABLE 20
| I-136 | 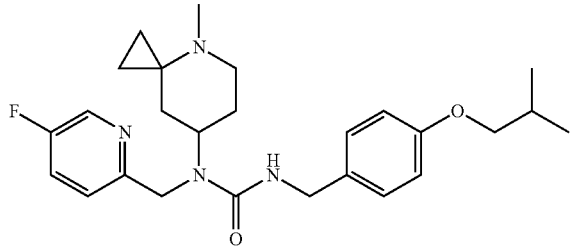 [SMILES: CC(C)COc1ccc(CNC(=O)N(Cc2ccc(F)cn2)C2CCN(C)C3(CC3)C2)cc1] | 1 | 1.78 | 455 | racemate |
| I-137 | 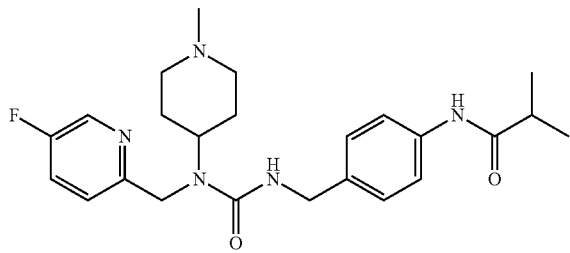 [SMILES: CC(C)C(=O)Nc1ccc(CNC(=O)N(Cc2ccc(F)cn2)C2CCN(C)CC2)cc1] | 1 | 0.89 | 442 | |

TABLE 20-continued
| | | | | |
|---|---|---|---|---|
| I-138 | 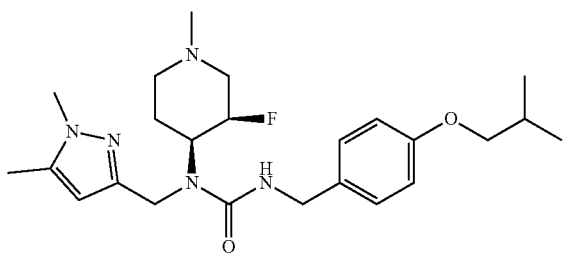 | 1 | 1.28 | 446 |
| I-139 | 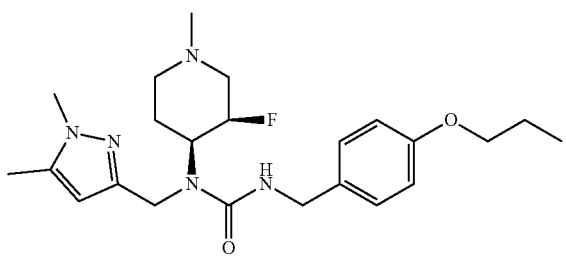 [SMILES: CCCOc1ccc(CNC(=O)N(Cc2cc(C)n(C)n2)[C@H]2CCN(C)C[C@H]2F)cc1] | 1 | 1.16 | 432 |
| I-140 | 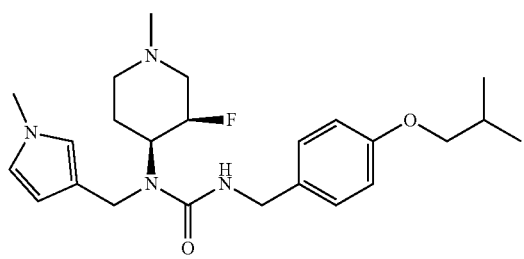 | 1 | 1.38 | 431 |
| I-141 | 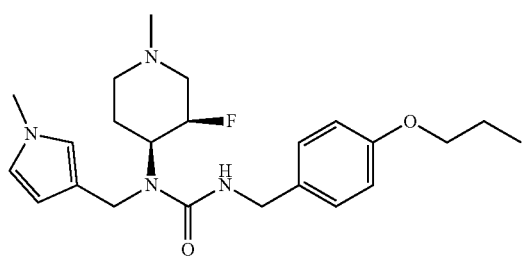 [SMILES: CC(C)COc1ccc(CNC(=O)N(Cc2ccn(C)c2)[C@H]2CCN(C)C[C@H]2F)cc1] | 1 | 1.25 | 417 |
| I-142 | 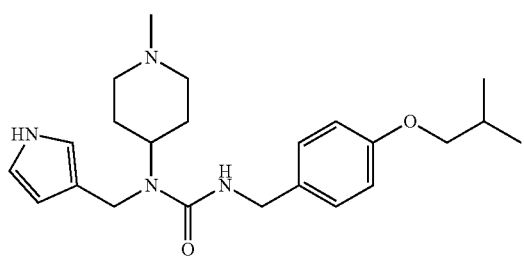 [SMILES: CC(C)COc1ccc(CNC(=O)N(Cc2cc[nH]c2)C2CCN(C)CC2)cc1] | 1 | 1.25 | 399 |
| I-143 | 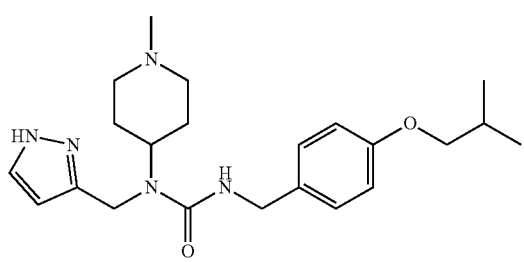 | 1 | 1.14 | 400 |

TABLE 21

| | | | | |
|---|---|---|---|---|
| I-144 | [structure] | 1 | 1.41 | 427 |
| I-145 | [structure] | 1 | 1.3 | 450 |
| I-146 | [structure] | 1 | 1.31 | 464 |
| I-147 | [structure] | 1 | 0.99 | 460 |
| I-148 | [structure] | 1 | 1.19 | 401 |

TABLE 22

| Compound No. | NMR |
|---|---|
| I - 001 | 1H-NMR (CDCl3) δ: 1.01 (d, J = 6.7 Hz, 6H), 1.55-1.82 (m, 4H), 2.03-2.13 (m, 3H), 2.28 (s, 3H), 2.89 (d, J = 10.3 Hz, 2H), 3.69 (d, J = 6.5 Hz, 2H), 4.26-4.38 (m, 5H), 6.82 (d, J = 8.5 Hz, 2H), 7.07 (s, 1H), 7.15-7.22 (m, 3H), 7.26-7.29 (m, 1H), 7.65 (t, J = 7.2 Hz, 1 H), 8.42 (d, J = 4.1 Hz, 1H). |
| I - 002 | 1H-NMR (CDCl3) δ: 1.01 (d, J = 6.8 Hz, 6H), 1.56-1.75 (m, 4H), 2.01-2.10 (m, 3H), 2.25 (s, 3H), 2.86 (d, J = 11.4 Hz 2H), 3.68 (d, J = 6.5 Hz, 2H), 4.12-4.22 (m, 1H), 4.32 (d, J = 5.1 Hz, 2H), 4.43 (s, 2H), 4.47-4.51 (m, 1H), 6.80 (d, J = 8.5 Hz, 2H), 7.08 (d, J = 8.5 Hz, 2H), 7.23 (dd, J = 7.7, 5.2 Hz, 1H), 7.56 (d, J = 7.9 Hz, 1H), 8.50 (s, 2H). |

TABLE 22-continued

| Compound No. | NMR |
|---|---|
| I - 003 | 1H-NMR (CDCl3) δ: 1.01 (d, J = 6.7 Hz, 6H), 1.56-1.74 (m, 4H), 2.02-2.09 (m, 3H), 2.25 (s, 3H), 2.85 (d, J = 11.5 Hz, 2H), 3.68 (d, J = 6.5 Hz, 2H), 4.15-4.24 (m, 1H), 4.32 (d, J = 5.1 Hz, 2H), 4.38-4.45 (m, 3H), 6.80 (d, J = 8.5 Hz, 2H), 7.07 (d, J = 8.5 Hz, 2H), 7.15 (m, J = 5.3 Hz, 2H), 8.53 (d, J = 5.8 Hz, 2H). |
| I - 004 | 1H-NMR (CDCl3) δ: 1.01 (d, J = 6.7 Hz, 6H), 1.57-1.66 (m, 2H), 1.74-1.86 (m, 2H), 2.00-2.10 (m, 3H), 2.26 (s, 3H), 2.87 (d, J = 10.9 Hz, 2H), 3.70 (d, J = 6.5 Hz, 2H), 4.18-4.28 (m, 1H), 4.36 (d, J = 5.3 Hz, 2H), 4.53 (s, 2H), 6.67 (s, 1H), 6.83 (d, J = 8.5 Hz, 2H), 7.18 (t, J = 4.9 Hz, 1H), 7.22 (d, J = 8.4 Hz, 2H), 8.63 (d, J = 4.9 Hz, 2H). |
| I - 005 | 1H-NMR (CDCl3) δ: 1.01 (d, J = 8.8 Hz, 6H), 1.59-2.14 (m, 7H), 2.27 (s, 3H), 2.89 (d, J = 11.5 Hz, 2H), 3.68 (d, J = 6.5 Hz, 2H), 4.12-4.26 (m, 1H), 4.33 (d, J = 5.3 Hz, 2H), 4.64 (s, 2H), 6.11 (s, 1H), 6.82 (d, J = 9.3 Hz, 2H), 7.14 (d, J = 8.5 Hz, 2H), 7.39-7.55 (m, 2H), 9.10 (dd, J = 4.8, 1.5 Hz, 2H). |
| I - 006 | 1H-NMR (CDCl3) δ: 1.01 (d, J = 6.7 Hz, 6H), 1.67-1.80 (m, 4H), 2.00-2.12 (m, 3H), 2.27 (s, 3H), 2.89 (d, J = 11.7 Hz, 2H), 3.70 (d, J = 6.7 Hz, 2H), 4.16-4.24 (m, 1H), 4.36 (d, J = 5.3 Hz, 2H), 4.46 (s, 2H), 6.36 (s, 1H), 6.84 (d, J = 8.5 Hz, 2H), 7.19 (d, J = 8.5 Hz, 2H), 8.40-8.43 (m, 1H), 8.49 (d, J = 2.5 Hz, 1H), 8.61 (d, J = 1.4 Hz, 1H) |
| I - 007 | 1H-NMR (CDCl3) δ: 1.02 (d, J = 6.8 Hz, 6H), 1.65-1.74 (m, 4H), 1.96-2.12 (m, 3H), 2.25 (s, 3H), 2.87 (d, J = 11.8 Hz, 2H), 3.70 (d, J = 6.5 Hz, 2H), 3.76-3.84 (m, 1H), 4.37 (d, J = 5.1 Hz, 2H), 4.48 (s, 2H), 4.56-4.64 (m, 1H), 6.85 (d, J = 8.5 Hz, 2H), 7.16 (d, J = 8.4 Hz, 2H), 8.66 (s, 2H), 9.11 (s, 1H). |
| I - 008 | 1H-NMR (CDCl3) δ: 1.02 (d, J = 6.8 Hz, 6H), 1.59-1.78 (m, 4H), 2.01-2.10 (m, 3H), 2.27 (s, 3H), 2.88 (d, J = 11.8 Hz, 2H), 3.70 (d, J = 6.5 Hz, 2H), 4.23-4.35 (m, 3H), 4.37 (s, 2H), 6.61 (brs, 1H), 6.33 (d, J = 8.7 Hz, 2H), 7.16 (d, J = 8.7 Hz, 2H), 7.24-7.30 (m, 1H), 7.36 (td, J = 8.3, 2.8 Hz, 1H), 8.26 (d, J = 2.8 Hz, 1H). |
| I - 009 | 1H-NMR (CDCl3) δ: 1.02 (d, J = 6.7 Hz, 6H), 1.64-1.75 (m, 4H), 2.02-2.12 (m, 3H), 2.27 (s, 3H), 2.88 (d, J = 11.7 Hz, 2H), 3.70 (d, J = 6.5 Hz, 2H), 4.23-4.31 (m, 1H), 4.33 (d, J = 5.3 Hz, 2H), 4.37 (s, 2H), 6.46 (s, 1H), 6.83 (d, J = 8.8 Hz, 2H), 7.15 (d, J = 8.8 Hz, 2H), 7.23 (d, J = 8.3 Hz, 1H), 7.62 (dd, J = 8.3, 2.5 Hz, 1H), 8.37 (d, J = 2.1 Hz, 1H). |
| I - 010 | 1H-NMR (CDCl3) δ: 1.02 (d, J = 6.5 Hz, 6H), 1.59-1.82 (m, 4H), 2.01-2.13 (m, 3H), 2.28 (s, 3H), 2.89 (d, J = 11.3 Hz, 2H), 3.69 (d, J = 6.5 Hz, 2H), 3.83 (s, 3H), 4.31 (s, 3H), 4.34 (d, J = 5.3 Hz, 2H), 6.82 (d, J = 8.5 Hz, 2H), 7.07 (brs, 1H), 7.12-7.22 (m, 4H), 8.07 (d, J = 2.5 Hz, 1H). |

TABLE 23

| | |
|---|---|
| I - 011 | 1H-NMR (400 MHz, d6-DMSO) δ 0.97 (d, J = 6.7 Hz, 6H), 1.51 (m, 4H), 1.92 (m, 2H), 2.00 (td, J = 13.3 Hz, 6.7 Hz, 1H), 2.10 (s, 3H), 2.71 (d, J = 11.4 Hz, 2H), 3.70 (d, J = 6.7 Hz, 2H), 3.93 (m, 1H), 4.17 (d, J = 5.6 Hz, 2H), 4.54 (s, 2H), 6.84 (d, J = 8.5 Hz, 2H), 7.06 (t, J = 5.6 Hz, 1H), 7.11 (d, J = 8.7 Hz, 2H), 7.41 (d, J = 8.2 Hz, 1H), 8.23 (dd, J = 11.3 Hz, 4.0 Hz, 1H), 8.94 (d, J = 1.5 Hz, 1H) |
| I - 012 | 1H-NMR (400 MHz, CDCl3) δ 1 01 (d, J = 6.7 Hz 6H), 1.57-1.77 (m, 4H), 2.02-2.12 (m, 3H), 2.27 (s, 3H), 2.89 (d, J = 11.5 Hz, 2H), 3.69 (d, J = 6.3 Hz, 2H), 4.19-4.29 (m, 1H), 4.34 (d, J = 5.3 Hz, 2H), 4.47 (s, 2H), 6.25 (br, s, 1H), 6.82 (d, J = 8.5 Hz, 2H), 7.15 (d, J = 8.5 Hz, 2H), 7.41 (d, J = 8.5 Hz, 1H), 7.88 (dd, J = 8.5 Hz, 1.7 Hz, 1H), 8.69 (s, 1H) |
| I - 013 | 1H-NMR (CDCl3) δ: 1.01 (d, J = 6.8 Hz, 6H), 1.64-1.79 (m, 4H), 2.03-2.10 (m, 3H), 2.27 (s, 3H), 2.30 (s, 3H), 2.88 (d, J = 11.5 Hz, 2H), 3.70 (d, J = 6.5 Hz, 2H), 4.27-4.34 (m, 5H), 6.81 (d, J = 8.8 Hz, 2H), 7.13-7.19 (m, 4H), 7.44 (dd, J = 7.9, 1.8 Hz, 1H), 8.22 (d, J = 1.9 Hz, 1H). |
| I - 014 | 1H-NMR (CDCl3) δ: 1.02 (d, J = 6.7 Hz, 6H), 1.60-1.78 (m, 4H), 2.02-2.10 (m, 3H), 2.26 (s, 3H), 2.87 (d, J = 11.5 Hz, 2H), 3.70 (d, J = 6.5 Hz, 2H), 4.19 (tt, J = 12.0, 4.0 Hz, 1H), 4.36 (d, J = 5.3 Hz, 2H), 4.46 (s, 2H), 6.85 (d, J = 8.5 Hz, 2H), 6.95 (s, 1H), 7.17-7.20 (m, 1H), 7.23 (d, J = 8.5 Hz, 2H), 8.15 (d, J = 2.3 Hz, 1H). |
| I - 015 | 1H-NMR (CDCl3) δ: 1.01 (d, J = 6.7 Hz, 6H), 1.58-1.67 (m, 4H), 2.00-2.12 (m, 3H), 2.24 (s, 3H), 2.84 (d, J = 11.8 Hz, 2H), 3.70 (d, J = 6.5 Hz, 2H), 4.12-4.19 (m, 1H), 4.35 (d, J = 5.4 Hz, 2H), 4.57 (s, 2H), 5.95 (s, 1H), 6.84 (d, J = 8.5 Hz, 2H), 7.22 (d, J = 8.5 Hz, 2H), 7.45 (dd, J = 7.7, 2.6 Hz, 1H), 8.26 (d, J = 2.5 Hz, 1H). |
| I - 016 | 1H-NMR (400 MHz, d6-DMSO) δ 0.96 (d, J = 6.8 Hz, 6H), 1.51 (m, 4H), 1.87 (m, 2H), 1.99 (m, 1H), 2.10 (s, 3H), 2.71 (d, J = 11.4 Hz, 2H), 3.70 (d, J = 6.6 Hz, 2H), 3.94 (m, 1H), 4.17 (d, J = 5.5 Hz, 2H), 4.55 (s, 2H), 6.84 (d, J = 8.7 Hz, 2H), 7.03 (t, J = 5.6 Hz, 1H), 7.11 (d, J = 8.7 Hz, 2H), 7.15 (d, J = 8.7 Hz, 2H), 7.67 (m, J = 9.3 Hz, 1H), 8.36 (d, J = 4.6 Hz, 1H) |
| I - 017 | 1H-NMR (CDCl3) δ: 1.01 (d, J = 6.8 Hz, 6H), 1.65-1.75 (m, 4H), 2.01-2.13 (m, 3H), 2.28 (s, 3H), 2.89 (d, J = 11.7 Hz, 2H), 3.69 (d, J = 6.5 Hz, 2H), 4.22-4.32 (m, 1H), 4.34 (d, J = 5.3 Hz, 2H), 4.39 (s, 2H), 6.62 (brs, 1H), 6.89-6.95 (m, 1H), 7.02 (d, J = 9.2 Hz, 2H), 7.17 (d, J = 8.5 Hz, 2H), 7.24-7.30 (m, 1H), 7.36 (td, J = 8.3, 2.8 Hz, 1H), 8.39 (dd, J = 8.3, 5.6 Hz, 1H). |

TABLE 23-continued

| | |
|---|---|
| I - 018 | 1H-NMR (CDCl3) δ: 1.01 (d, J = 6.7 Hz, 6H), 1.64-1.73 (m, 4H), 2.02-2.11 (m, 3H), 2.26 (s, 3H), 2.87 (d, J = 11.5 Hz, 2H), 3.69 (d, J = 6.5 Hz, 2H), 4.29-4.30 (m, 1H), 4.30-4.39 (m, 3H), 6.06 (brs, 1H), 6.82 (d, J = 8.5 Hz, 2H), 7.12-7.17 (m, 3H), 7.69-7.79 (m, 1H). |
| I - 019 | 1H-NMR (CDCl3) δ: 1.01 (d, J = 6.7 Hz, 6H), 1.83-1.91 (m, 2H), 2.45-2.51 (m, 2H), 2.76 (s, 3H), 2.93-3.05 (m, 2H), 3.47 (d, J = 12.9 Hz, 2H), 3.68 (d, J = 6.5 Hz, 2H), 4.30 (d, J = 5.4 Hz, 2H), 4.49 (d, J = 9.0 Hz, 2H), 4.67 (s, 1H), 5.14 (s, 1H), 6.80 (d, J = 8.7 Hz, 2H), 6.88 (dd, J = 8.5, 2.8 Hz, 2H), 7.08 (d, J = 8.5 Hz, 2H), 7.71 (1, J = 6.8 Hz, 1H), 8.12 (1H). |
| I - 020 | 1H-NMR (400 MHz, CDCl3) δ 0.94 (d, J = 6.5 Hz, 6H), 1.64-1.77 (m, 4H), 1.92-2.06 (m, 3H), 2.19 (s, 3H), 2.80 (d, J = 12.0 Hz, 2H), 3.63 (d, J = 6.8 Hz, 2H), 4.08-4.29 (m, 1H), 4.28 (d, J = 5.5 Hz, 2H), 4.46 (s, 2H), 6.26 (br, 1H), 6.76 (d, J = 8.7 Hz, 2H), 7.13 (d, J = 8.7 Hz, 2H), 8.41 (s, 2H) |

TABLE 24

| | |
|---|---|
| I - 021 | 1H-NMR (CDCl3) δ: 1.02 (d, J = 6.3 Hz, 6H), 1.68-1.85 (m, 4H), 2.02-2.14 (m, 3H), 2.28 (s, 3H), 2.91 (d, J = 11.7 Hz, 2H), 3.69 (d, J = 6.5 Hz, 2H), 3.73 (s, 3H), 4.21 (s, 2H), 4.30-4.40 (m, 3H), 6.10 (d, J = 2.3 Hz, 1H), 6.22 (brs, 1H), 6.81 (d, J = 8.7 Hz, 2H), 7.14 (d, J = 8.7 Hz, 2H), 7.23 (d, J = 2.3 Hz, 1H). |
| I - 022 | 1H-NMR (400 MHz, CDCl3) δ 1.01 (d, J = 6.5 Hz, 6H), 1.64-1.77 (m, 4H), 1.92-2.06 (m, 3H), 2.26 (s, 3H), 2.88 (d, J = 12.0 Hz, 2H), 3.63 (d, J = 6.5 Hz, 2H), 3.81 (s, 3H), , 4.20 (s, 2H) 4.25 (m, 1H), 4.28 (d, J = 5.3 Hz, 2H), 4.64. (br t, J = 4.8 Hz 1H), 6.81 (d, J = 8.5 Hz, 2H), 7.09 (d, J = 8.5 Hz, 2H), 7.15 (s, 1H), 7.33 (s, 1H) |
| I - 023 | 1H-NMR (400 MHz, CDCl3) δ 1.01 (d, J = 6.5 Hz, 6H), 1.56-1.77 (m, 4H), 1.97-2.11 (m, 3H), 2.26 (s, 3H), 2.86 (d, J = 12.0 Hz, 2H), 3.69 (d, J = 6.5 Hz, 2H), 3.77 (s, 3H), 4.02-4.18(m, 1H), 4.32 (d, J = 5.3 Hz, 2H), 4.36 (s, 2H), 4.60. (t, J = 5.7 Hz 1H), 6.08 (s, 1H) 6.81 (d, J = 8.5 Hz, 2H), 7.13 (d, J = 8.5 Hz, 2H), 7.36 (d, J = 1.77 Hz, 1H) |
| I - 024 | 1H-NMR (400 MHz, CDCl3) δ 1.01 (d, J = 6.5 Hz, 6H), 1.66-1.78 (m, 4H), 1.98-2.14 (m, 3H), 2.26 (s, 3H), 2.88 (d, J = 12.0 Hz, 2H), 3.64 (s, 3H) 3.69 (d, J = 6.5 Hz, 2H), 4.03-4.17(m, 1H), 4.33 (d, J = 5.3 Hz, 2H), 4.39 (s, 2H), 4.89 (t, J = 5.7 Hz, 1H), 6.77 (d, J = 1.0 Hz, 1H), 6.91 (d, t = 1.0 Hz, 1H), 6.82 (d, J = 8.5 Hz, 2H), 7.20 (d, J = 8.5 Hz, 2H) |
| I - 025 | 1H-NMR (400 MHz, CDCl3) δ 1.01 (d, J = 6.5 Hz, 6H), 1.60-1.86 (m, 4H), 1.98-2.14 (m, 3H), 2.27 (s, 3H), 2.88 (d, J = 12.0 Hz, 2H), 3.62 (s, 3H) 3.69 (d, J = 6.5 Hz, 2H), 4.18 (s, 2H), 4.24-4.34(m, 1H), 4.35 (d, J = 5.3 Hz, 2H), 6.67 (s, 1H), 6.82 (d, J = 8.5 Hz, 2H), 7.20 (d, J = 8.5 Hz, 2H), 9.50 (br, 1H) |
| I - 026 | 1H-NMR (400 MHz, CDCl3) δ 1.01 (d, J = 6.5 Hz, 6H), 1.61-1.89 (m, 4H), 1.98-2.11 (m, 3H), 2.27 (s, 3H), 2.90 (d, J = 12.0 Hz, 2H), 3.69 (d, J = 6.5 Hz, 2H), 3.97-4.49(m, 5H), 6.18 (s, 1H), 6.81 (d, J = 8.5 Hz, 2H), 7.13 (d, J = 8.5 Hz, 2H), 7.47 (d, J = 2.0 Hz, 2H) |
| I - 027 | 1H-NMR (400 MHz, CDCl3) δ 1.01 (d, J = 6.5 Hz, 6H), 1.61-1.76 (m, 4H), 1.98-2.11 (m, 3H), 2.27 (s, 3H), 2.88 (d, J = 12.0 Hz, 2H), 3.54 (s, 3H), 3.69 (d, J = 6.5 Hz, 2H), 4.16 (s, 2H), 4.26 (d, J = 5.3 Hz, 2H), 4.33-4.42(m, 1H), 4.94 (t, J = 5.3 Hz, 1H), 5.95 (t, J = 2.0 Hz, 1H), 6.37 (br, s, 1H), 6.54 (t, J = 2.0 Hz, 1H), 6.78 (d, J = 8.5 Hz, 2H), 7.02 (d, J = 8.5 Hz, 2H) |
| I - 028 | 1H-NMR (400 MHz, CDCl3) δ 1.01 (d, J = 6.5 Hz, 6H), 1.61-1.76 (m, 4H), 1.98-2.11 (m, 3H), 2.27 (s, 3H), 2.86 (d, J = 12.0 Hz, 2H), 3.69 (d, J = 6.5 Hz, 2H), 4.22-4.34(m, 5H), 4.89 (t, J = 5.7 Hz, 1H), 5.96 (br, s, 1H), 6.01 (1, J = 2.5 Hz, 1H), 6.55 (t, J = 2.5 Hz, 1H), 6.80 (d, J = 8.5 Hz, 2H), 7.10 (d, J = 8.5 Hz, 2H) |
| I - 029 | 1H-NMR (400 MHz, CDCl3) δ 1.01 (d, J = 6.5 Hz, 6H), 1.61-1.82 (m, 4H), 1.98-2.11 (m, 3H), 2.27 (s, 3H), 2.89 (d, J = 12.0 Hz, 2H), 3.50 (s, 3H), 3.69 (d, J = 6.5 Hz, 2H), 4.21-4.34(m, 1H), , 4.30 (d, J = 5.3 Hz, 2H), 4.50 (s, 2H), 4.73 (t, J = 5.5 Hz, 1H), 6.78 (d, J = 8.5 Hz, 2H), 6.87-6.94 (m, 2H), 7.03 (d, J = 8.5 Hz, 2H), 7.21(d, J = 5.0 Hz, 1H) |
| I - 030 | 1H-NMR (400 MHz, CDCl3) δ 1.01 (d, J = 6.5 Hz, 6H), 1.65-1.81 (m, 4H), 1.98-2.13 (m, 3H), 2.27 (s, 3H), 2.42 (s, 3H), 2.88 (d, J = 12.0 Hz, 2H), 3.69 (d, J = 6.5 Hz, 2H), 4.24-4.34(m, 1H), 4.29 (d, J = 5.3 Hz, 2H), 4.40 (s, 2H), 4.78 (t, J = 5.7 Hz, 1H), 6.53 (d, J = 3.3 Hz, 1H), 6.66 (d, J = 3.3 Hz, 1H), 6.79 (d, J = 8.5 Hz, 2H), 7.03 (d, J = 8.5 Hz, 2H) |

TABLE 25

| | |
|---|---|
| I - 031 | 1H-NMR (400 MHz, CDCl3) δ 1.01 (d, J = 6.5 Hz, 6H), 1.65-1.81 (m, 4H), 1.98-2.13 (m, 3H), 2.16 (s, 3H), 2.27 (s, 3H), 2.88 (d, J = 12.0 Hz, 2H), 3.69 (d, J = 6.5 Hz, 2H), 4.24-4.34(m, 1H), 4.29 (d, J = 5.3 Hz, 2H), 4.42 (s, 2H), 4.74 (t, J = 6.5 Hz, 1H), 6.68 (s, 1H), 6.77 (s, 1H), 6.79 (d, J = 8.5 Hz, 2H), 7.03 (d, J = 8.5 Hz, 2H) |

TABLE 25-continued

| | |
|---|---|
| I - 032 | 1H-NMR (400 MHz, CDCl3) δ 1.01 (d, J = 6.5 Hz, 6H), 1.71-1.82 (m, 4H), 2.00-2.14 (m, 3H), 2.29 (s, 3H), 2.91 (d, J = 12.0 Hz, 2H), 3.69 (d, J = 6.5 Hz, 2H), 4.20-4.31(m, 1H), 4.35 (d, J = 5.3 Hz, 2H), 4.59 (s, 2H), 6.18 (t, J = 4.8 Hz, 1H), 6.81 (d, J = 8.5 Hz, 2H), 7.15 (d, J = 8.5 Hz, 2H), 7.23 (d, J = 3.5 Hz, 1H), 7.66 (d, J = 3.5 Hz, 1H) |
| I - 033 | 1H-NMR (400 MHz, CDCl3) δ 1.01 (d, J = 6.5 Hz, 6H), 1.64-1.85 (m, 4H), 1.92-2.13 (m, 3H), 2.54 (s, 3H), 2.90 (d, J = 12.0 Hz, 2H), 3.69 (d, J = 6.5 Hz, 2H), 3.81 (s, 3H), 4.11-4.27(m, 1H), 4.35 (d, J = 5.3 Hz, 2H), 4.38 (s, 2H), 5.96 (t, J = 4.8 Hz, 1H), 6.83 (d, J = 8.5 Hz, 2H), 7.03 (s, 1H), 7.20 (d, J = 8.5 Hz, 2H), 7.58 (s, 1H), |
| I - 034 | 1H-NMR (400 MHz, CDCl3) δ 1.01 (d, J = 6.7 Hz, 6H), 1.70-1.74 (m, 4H), 1.99-2.12 (m, 3H), 2.28 (s, 3H), 2.88 (d, J = 11.8 Hz, 2H), 3.69 (d, J = 6.5 Hz, 2H), 3.84-3.96 (m, 1H), 4.36 (d, J = 5.3 Hz, 2H), 4.55-4.63 (m, 1H), 4.66 (s, 2H), 6.83 (d, J = 6.7 Hz, 2H), 7.01 (s, 1H), 7.14 (d, J = 8.5 Hz, 2H), 8.35 (d, J = 1.5 Hz, 1H). |
| I - 035 | 1H-NMR (400 MHz, CDCl3) δ 1.01 (d, J = 6.5 Hz, 6H), 1.68-1.80 (m, 4H), 1.98-2.13 (m, 3H), 2.28 (s, 3H), 2.39 (s, 3H), 2.88 (d, J = 12.0 Hz, 2H), 3.69 (d, J = 6.5 Hz, 2H), 4.15-4.26(m, 1H), 4.29 (s, 2H), 4.31 (d, J = 5.3 Hz, 2H), 5.30 (br, 1H), 5.91 (s, 1H), 6.82 (d, J = 8.5 Hz, 2H), 7.14 (d, J = 8.5 Hz, 2H) |
| I - 036 | 1H-NMR (400 MHz, CDCl3) δ 1.01 (d, J = 6.5 Hz, 6H), 1.64-1.85 (m, 4H), 1.98-2.13 (m, 3H), 2.26 (s, 3H), 2.54 (s, 3H), 2.88 (d, J = 12.0 Hz, 2H), 3.71 (d, J = 6.5 Hz, 2H), 3.81 (s, 3H), 4.38 (s, 2H), 4.06-4.19(m, 1H), 4.35 (d, J = 5.3 Hz, 2H), 4.38 (s, 2H), 5.81 (t, J = 4.7 Hz, 1H), 6.85 (d, J = 8.5 Hz, 2H), 7.23 (d, J = 8.5 Hz, 2H) |
| I - 037 | 1H-NMR (400 MHz, CDCl3) δ 1.02 (d, J = 6.7 Hz, 6H), 1.68-1.87 (m, 4H), 1.99-2.14 (m, 3H), 2.29 (s, 3H), 2.91 (d, J = 12.0 Hz, 2H), 3.66 (d, J = 6.5 Hz, 2H), 4.30-4.42 (m, 1H), 4.36 (d, J = 5.2 Hz, 2H), 4.53 (s, 2H), 6.75 (d, J = 8.5 Hz, 2H), 7.15 (d, J = 8.5 Hz, 2H), 7.40 (d, J = 5.5 Hz, 1H), 7.40 (d, J = 8.3 Hz, 1H), 7.49-7.56 (m, 1H), 7.60-7.69 (m, 2H), 7.79 (d, J = 8.3 Hz, 1H), 8.13 (d, J = 8.3 Hz, 1H) |
| I - 038 | 1H-NMR (400 MHz, CDCl3) δ 1.03 (d, J = 6.7 Hz, 6H), 1.50-1.87 (m, 4H), 1.99-2.14 (m, 3H), 2.23 (s, 3H), 2.81 (d, J = 12.0 Hz, 2H), 3.66 (d, J = 6.5 Hz, 2H), 4.20-4.31 (m, 1H), 4.39 (d, J = 5.2 Hz, 2H), 4.98 (s, 2H), 6.75 (br, 1H)), 6.82 (d, J = 8.5 Hz, 2H), 7.25 (d, J = 8.5 Hz, 2H), 7.56 (d, J = 5.5 Hz, 1H), 7.64 (t, J = 8.3 Hz, 1H), 7.71 (t, J = 8.3 Hz, 1H), 7.84 (d, J = 8.3 Hz, 1H), 8.21 (d, J = 8.3, 1H), 8.38 (d, J = 5.5, 1H) |
| I - 039 | 1H-NMR (400 MHz, CDCl3) δ 0.99 (d, J = 6.7 Hz, 6H), 1.62-1.86 (m, 4H), 1.99-2.12 (m, 3H), 2.23 (s, 3H), 2.84 (d, J = 10.7 Hz, 2H), 3.76 (d, J = 6.5 Hz, 2H), 4.31 (d, J = 5.2 Hz, 2H), 4.40-4.51 (m, 1H), 4.53 (t, J = 5.2 Hz, 1H), ), 4.99 (s, 2H), 6.76 (d, J = 8.5 Hz, 2H), 7.06 (d, J = 8.5 Hz, 2H), 7.51 (d, J = 8.3 Hz, 1H), 7.61 (t, J = 8.3 Hz, 1H), 7.68 (d, J = 5.8 Hz, 1H), 7.73 (d, J = 8.3 Hz, 1H), 8.59 (d, J = 5.8 Hz, 1H), 9.39 (s, 1H) |

TABLE 26

| | |
|---|---|
| I - 040 | 1H-NMR (400 MHz, CDCl3) δ 1.03 (d, J = 6.7 Hz, 6H), 1.50-1.87 (m, 4H), 1.99-2.14 (m, 3H), 2.23 (s, 3H), 2.86 (d, J = 12.0 Hz, 2H), 3.66 (d, J = 6.5 Hz, 2H), 4.27 (d, J = 5.2 Hz, 2H), 4.40-4.55 (m, 1H), 5.03 (s, 2H), 5.63 (t, J = 5.5 Hz, 1H)), 6.72 (d, J = 8.5 Hz, 2H), 6.99 (d, J = 8.5 Hz, 2H), 7.38 (dd, J = 8.3, 4.3 Hz, 1H), 7.49 (t, J = 8.3 Hz, 1H), 7.68 (d, J = 8.3 Hz, 1H), 7.77 (d, J = 8.3 Hz, 1H), 8.28 (dd, J = 8.3, 2.0 Hz, 1H), 8.68 (dd, J = 4.3, 2.0, 1H) |
| I - 041 | 1H-NMR (400 MHz, CDCl3) δ 1.02 (d, J = 6.7 Hz 6H), 1.50-1.61 (m, 4H), 1.84-2.14 (m, 3H), 2.23 (s, 3H), 2.86 (d, J = 12.0 Hz, 2H), 3.31-3.43 (m, 1H), 3.71 (d, J = 6.5 Hz, 2H), 4.45 (d, J = 5.2 Hz, 2H), 4.80 (s, 2H), 4.87 (t, J = 5.5 Hz, 1H), , 6.51 (t, J = 2.3 Hz, 1H), 6.84 (d, J = 8.5 Hz, 2H), 6.92-7.09 (m, 2H), 7.14-7.20 (m, 3H), 7.56 (d, J = 8.3 Hz, 1H), 10.5 (s, 1H) |
| I - 042 | 1H-NMR (400 MHz, CDCl3) δ 1.01 (d, J = 6.7 Hz, 6H), 1.51-2.2 (m, 7H), 2.23 (s, 3H), 2.82 (d, J = 11.4 Hz, 2H), 3.64-76 (m, 2H), 4.06-4.22 (m, 1H), 4.39-4.63 (m, 2H), 4.95-5.22 (m, 2H), 6.65-7.37 (m, 6H), 8.33 (s, 1H) |
| I - 043 | 1H-NMR (CDCl3) δ: 1.57-1.80 (m, 4H), 2.07 (td, J = 11.5, 2.7 Hz, 2H), 2.28 (s, 3H), 2.88 (d, J = 11.7 Hz, 2H), 3.79 (s, 3H), 4.24-4.36 (m, 3H), 4.37 (s, 2H), 6.65 (brs, 1H), 6.84 (d, J = 8.7 Hz, 2H), 7.18 (d, J = 8.7 Hz, 2H), 7.26-7.31 (m, 1H), 7.36 (td, J = 8.3, 2.8 Hz, 1H), 8.26 (d, J = 2.8 Hz, 1H). |
| I - 044 | 1H-NMR (400 MHz, d6-DMSO) δ 1.43 (d, J = 9.5 Hz, 2H), 1.53 (q, J = 10.2 Hz, 2H), 1.88 (t, J = 10.7 Hz, 2H), 2.71 (d, J = 11.8 Hz, 2H), 3.12 (t, J = 8.7 Hz, 3H), 3.92 (m, 1H), 4.11 (d, J = 5.9 Hz, 1H), 4.16 (d, J = 5.6 Hz, 2H), 4.46 (s, 3H), 4.48 (t, J = 8.7 Hz, 2H), 6.65 (d, J = 8.0 Hz, 1H), 6.93 (d, J = 7.9 Hz, 1H), 7.00 (t, J = 5.7, 1H), 7.05 (s, 1H), 7.31 (dd, J = 8.5, 4.5 Hz, 1H), 7.66 (td, J = 8.8 Hz, 2.8 Hz, 1H), 8.46 (d, J = 2.9 Hz, 1H) |
| I - 045 | 1H-NMR (400 MHz, d6-DMSO) δ 1.43 (d, J = 10.4 Hz, 2H), 1.53 (q, J = 12.0 Hz, 2H), 1.87 (m, 4H), 2.10 (s, 3H), 2.69 (m, 4H), 3.92 (m, 1H), 4.07 (dd, J = 13.6 Hz, 8.7 Hz, 2H), 4.13 (d, J = 5.4 Hz, 2H), 4.45 (s, 2H), 6.63 (d, J = 8.3 Hz, 1H), 6.85 (s, 1H), 6.90 (d, J = 8.4 Hz, 1H), 6.98 (d, J = 5.0 Hz, 1H), 7.32 (dd, J = 8.7 Hz, 4.6 Hz, 1H), 7.67 (td, J = 8.8 Hz, 2.8 Hz, 1H), 8.46 (d, J = 2.6 Hz, 1H) |

TABLE 26-continued

| | |
|---|---|
| I - 046 | 1H-NMR (CDCl3) δ: 0.34 (d, J = 3.8 Hz, 2H), 0.64 (d, J = 7.4 Hz, 2H), 1.25 (1H, m), 1.63-1.79 (m, 4H), 2.07 (t, J = 11.0 Hz, 3H), 2.27 (s, 3H), 2.89 (d, J = 10.9 Hz, 2H), 3.78 (d, J = 6.9 Hz, 2H), 4.23-4.39 (m, 5H), 6.65 (s, 1H), 6.83 (d, J = 8.4 Hz, 2H), 7.16 (d, J = 8.2 Hz, 2H), 7.36 (t, J = 8.0 Hz, 1H), 8.26 (s, 1H). |
| I - 047 | 1H-NMR (CDCl3) δ: 1.03 (t, J = 7.4 Hz, 3H), 1.64-1.84 (m, 6H), 2.07 (t, J = 10.2 Hz, 3H), 2.28 (s, 3H), 2.88 (d, J = 11.2 Hz, 2H), 3.90 (t, J = 6.6 Hz, 2H), 4.26-4.38 (m, 5H), 6.61 (s, 1H), 6.83 (d, J = 8.5 Hz, 2H), 7.16 (d, J = 8.4 Hz, 2H), 7.36 (t, J = 8.4 Hz, 1H), 8.26 (d, J = 2.5 Hz, 1H). |
| I - 048 | 1H-NMR (400 MHz, d6-DMSO) δ 1.50 (s, 4H), 1.87 (t, J = 10.7 Hz, 2H), 2.10 (s, 3H), 2.71 (d, J = 10.2 Hz, 2H), 3.91 (m, 1H), 4.24 (d, J = 4.9 Hz, 2H), 4.47 (s, 2H), 6.63 (d, J = 8.3 Hz, 1H), 7.14 (m, 3H), 7.31 (m, 4H), 7.67 (t, J = 7.3 Hz, 1H), 8.48 (s, 1H) |
| I - 049 | 1H-NMR (CDCl3) δ: 1.01 (t, J = 6.8 Hz, 6H), 1.74-1.81(m 1H), 2.04-2.40 (m, 5H), 2.37(s, 3H), 2.97 (d, J = 11.7 Hz, 1H), 3.06-3.12 (m, 1H), 3.70 (d, J = 6.5 Hz, 2H), 4.32 (d, J = 5.1 Hz, 2H), 4.54 (s, 2H), 4.81-4.93 (m, 1H), 6.81 (dd, J = 8.5 Hz, 2H), 6.89 (s, 1H), 7.11 (d, J = 8.5 Hz, 2H), 7.34-7.40 (m, 2H), 8.22 (d, J = 2.1 Hz, 1H). |

TABLE 27

| | |
|---|---|
| I - 050 | 1H-NMR (CDCl3) δ: 0.21-0.26 (m, 1H), 0.44-0.47 (m, 2H), 0.51-0.55 (m, 1H), 1.01 (t, J = 6.7 Hz, 6H), 1.72 (dd, J = 11.8, 3.0 Hz, 2H), 1.98-2.12 (m, 3H), 2.16-2.21 (m, 1H), 2.26 (s, 3H), 2.54 (d, J = 11.7 Hz, 1H), 2.96 (d, J = 11.8 Hz, 1H), 3.70 (d, J = 6.7 Hz, 2H), 4.26 (dd, J = 14.4, 5.1 Hz, 1H), 4.35 (dd, J = 14.4, 5.1 Hz, 1H), 4.42-4.49 (m, 3H), 5.96 (s, 1H), 6.82 (t, J = 8.5 Hz, 2H), 7.13 (d, J = 8.5 Hz, 2H), 7.22 (dd, J = 8.7, 4.3 Hz, 1H), 7.34 (td, J = 8.4, 2.8 Hz, 1H), 8.27 (d, J = 2.9 Hz, 1H). |
| I - 051 | 1H-NMR (CDCl3) δ: 0.28-0 32 (m, 1H), 0.39-0.42 (m, 1H), 0.42-0.48 (m, 1H), 0.57-0.62 (m, 1H), 1.01 (d, J = 6.7 Hz, 6H), 1.95-2.10 (m, 3H), 2.35 (d, J = 13.6 Hz, 1H), 2.87 (t, J = 10.8 Hz, 1H), 3.17 (d, J = 12.2 Hz, 1H), 3.28 (d, J = 12.9 Hz, 1H), 3.70 (d, J = 6.5 Hz, 2H), 4.24-4.57 (m, 6H), 6.05 (s, 1H), 6.82 (d, J = 8.5 Hz, 2H), 7.13 (d, J = 8.5 Hz, 2H), 7.22-7.26 (m, 1H), 7.35 (td, J = 8.3, 2.9 Hz, 1H), 8.27 (d, J = 2.8 Hz, 1H). |
| I - 052 | 1H-NMR (CDCl3) δ: 1.02 (d, J = 6.8 Hz, 6H), 1.62-1.97 (m, 9H), 2.02-2.10 (m, 2H), 2.58-2.72 (m, 2H), 2.79-2.85 (m, 2H), 3.10 (brs, 1H), 3.70 (d, J = 6.5 Hz, 2H), 4.29-4.39 (m, 2H), 4.42 (s, 2H), 4.50-4.58 (m, 1H), 6.61 (s, 1H), 6.83 (d, J = 8.7 Hz, 2H), 7.16 (d, J = 8.7 Hz, 2H), 7.29 (dd, J = 8.7, 4.4 Hz, 1H), 7.37 (td, J = 8.3, 2.8 Hz, 1H), 8.27 (d, J = 2.8 Hz, 1H). |
| I - 053 | 1H-NMR (CDCl3) δ: 1.02 (d, J = 6.8 Hz, 6H), 1.43-1.60 (m, 2H), 1.68-2.28 (m, 10H), 3.05-3.25 (m, 2H), 3.70 (d, J = 6.5 Hz, 2H), 4.34 (d, J = 5.1 Hz, 2H), 4.37-4.50 (m, 3H), 6.68-6.88 (m, 3H), 7.17 (d, J = 8.5 Hz, 2H), 7.32-7.40 (m, 2H), 8.26 (s, 1H). |
| I - 054 | 1H-NMR (CDCl3) δ: 1.47-1.66 (m, 2H), 2.11-2.38 (m, 1H), 2.68-2.94 (m, 2H), 3.13-3.32 (m, 2H), 4.40 (d, J = 5.5 Hz, 1H), 4.46-4.64 (m, 3H), 4.84 (d, J = 51 Hz, 1H), 6.49 (t, J = 74 Hz, 1H), 7.06 (d, J = 8.7 Hz, 2H), 7.25 (d, J = 8.2 Hz, 2H), 7.33-7.43 (m, 3H), 8.25 (d, J = 2.2 Hz, 1H). |
| I - 055 | 1H-NMR (CDCl3) δ: 1.47-1.66 (m, 1H), 2.11-2.38 (m, 3H), 2.32 (s, 3H), 2.98 (d, J = 12 Hz, 1H), 3.13 (t, J = 12 Hz, 1H), 4.31-4.65 (m, 5H), 4.84 (d, J = 51 Hz, 1H), 6.49 (t, J = 73 Hz, 1H), 6.80 (d, J = 8.7 Hz, 2H), 7.06 (d, J = 8.2 Hz, 2H), 7.32-7.43 (m, 2H), 7.59 (t, J = 5.1 Hz, 1H), 8.23 (d, J = 2.2 Hz, 1H). |
| I - 056 | 1H-NMR (CDCl3) δ: 1.03 (t, J = 7.3 Hz 3H), 1.47-1.66 (m, 1H), 1.73-2.11 (m, 3H), 2.69-2.97 (m, 1H), 3.12-3.33 (m, 1H), 3.91 (t, J = 7.0 Hz, 2H), 4.34 (d, J = 5.3 Hz, 2H) 4.49-4.61 (m, 3H), 4.77 (d, J = 51 Hz, 1H), 6.84 (d, J = 8.3 Hz, 2H), 4.84 (d, J = 51 Hz, 1H) 7.09 (t, J = 4.5 Hz, 1H), 7.28-7.41 (m, 2H), 8.23 (d, J = 2.0 Hz, 1H). |
| I - 057 | 1H-NMR (CDCl3) δ: 1.03 (t, J = 7.3 Hz, 3H), 1.47-1.66 (m, 1H), 1.73-1.87(d, J = 12 Hz, 2H), 2.11-2.36 (m, 3H), 2.32 (s, 3H), 2.98 (d, J = 12 Hz, 1H), 3.13 (t, J = 12 Hz, 1H), 3.91 (t, J = 6.7 Hz, 2H), 4.31-4.61 (m, 5H), 4.84 (d, J = 51 Hz, 1H), 6.84 (d, J = 8.4 Hz, 2H), 7.17 (d, J = 8.4 Hz, 2H), 7.28-7.41 (m, 3H), 8.23 (d, J = 2.2 Hz, 1H). |
| I - 058 | 1H-NMR (CDCl3) δ: 1.02 (d, J = 7.0 Hz, 6H), 1.47-1.66 (m, 1H), 1.94-2.14 (m, 3H), 2.69-2.95 (m, 2H), 3.13-3.33 (m, 2H), 3.68 (d, J = 7.0 Hz, 2H), 4.33 (d, J = 5.2 Hz, 2H), 4.49-4.66 (m, 3H), 4.84 (d, J = 51 Hz, 1H), 6.84 (d, J = 8.3 Hz, 2H), 7.08 (t, J = 4.5 Hz, 1H), 7.16 (d, J = 8.3 Hz, 1H), 7.32-7.44 (m, 2H), 8.23 (d, J = 2.0 Hz, 1H). |

TABLE 28

| | |
|---|---|
| I - 059 | 1H-NMR (CDCl3) δ: 1.02 (d, J = 7.0 Hz, 6H), 1.47-1.66 (m, 1H), 2.11-2.36 (m, 4H), 2.32 (s, 3H), 2.98 (d, J = 12 Hz, 1H), 3.13 (t, J = 12 Hz, 1H), 3.68 (d, J = 7.0 Hz, 2H), 4.31-4.61 (m, 5H), 4.84 (d, J = 51 Hz, 1H), 6.84 (d, J = 8.4 Hz, 2H), 7.17 (d, J = 8.4 Hz, 2H), 7.28-7.41 (m, 3H), 8.23 (d, J = 2.0 Hz, 1H). |

TABLE 28-continued

| | |
|---|---|
| I - 060 | 1H-NMR (CDCl3) δ: 0.27-0.32 (m, 1H), 0.36-0.41 (m, 1H), 0.42-0.50 (m, 1H), 0.55-0.63 (m, 1H), 1.77 (dd, J = 12.4, 3.1 Hz, 1H), 1.93-2.04 (m, 1H), 2.34 (d, J = 13.1 Hz, 1H), 2.84-2.90 (m, 1H), 3.17 (d, J = 13.1 Hz, 1H), 3.28 (d, J = 12.8 Hz, 1H), 3.80 (s, 3H), 4.25-4.50 (m, 4H), 4.57 (d, J = 8.8 Hz, 1H), 6.13 (s, 1H), 6.83 (d, J = 8.5 Hz, 2H), 7.15 (d, J = 8.5 Hz, 2H), 7.25 (dd, J = 8.7, 4.4 Hz, 1H), 7.35 (td, J = 8.3, 2.8 Hz, 1H), 8.27 (d, J = 2.8 Hz, 1H). |
| I - 061 | 1H-NMR (CDCl3) δ: 0.21-0.25 (m, 1H), 0.43-0.47 (m, 2H), 0.49-0.53 (m, 1H), 1.69-1.73 (m, 1H), 1.98-2.05 (m, 2H), 2.15-2.18 (m, 1H), 2.24 (s, 3H), 2.52 (d, J = 11.3 Hz, 1H), 2.93 (d, J = 11.2 Hz, 1H), 3.79 (s, 3H), 4.27 (dd, J = 14.4, 5.1 Hz, 1H), 4.36 (dd, J = 14.3, 5.4 Hz, 1H), 4.44-4.49 (m, 3H), 5.97 (s, 1H), 6.83 (d, J = 8.7 Hz, 2H), 7.14 (d, J = 8.7 Hz, 2H), 7.22 (td, J = 8.4, 4.3 Hz, 1H), 7.34 (td, J = 8.4, 2.9 Hz, 1H), 8.27 (d, J = 2.9 Hz, 1H). |
| I - 062 | 1H-NMR (CDCl3) δ: 0.27-0.32 (m, 1H), 0.35-0.43 (m, 1H), 0.45-0.51 (m, 1H), 0.55-0.65 (m, 1H), 1.03 (t, J = 7.3 Hz, 3H), 1.74-1.85 (m, 3H), 1.94-2.05 (m, 1H), 2.33-2.40 (m, 1H), 2.84-2.92 (m, 1H), 3.15-3.20 (m, 1H), 3.25-3.34 (m, 1H), 3.90 (t, J = 6.5 Hz, 2H), 4.20-4.50 (m, 4H), 4.58 (d, J = 10.7 Hz, 1H), 6.12 (s, 1H), 6.82 (d, J = 8.3 Hz, 2H), 7.14 (d, J = 8.2 Hz, 2H), 7.22-7.29 (m, 1H), 7.31-7.38 (m, 1H), 8.27 (s, 1H). |
| I - 063 | 1H-NMR (CDCl3) δ: 0.20-0.25 (m, 1H), 0.40-0.55 (m, 3H), 1.03 (t, J = 7.4 Hz, 3H), 1.68-1.74 (m, 1H), 1.75-1.83 (m, 2H), 2.00 (d, J = 11.8 Hz, 2H), 2.16 (t, J = 10.7 Hz, 1H), 2.24 (s, 3H), 2.52 (d, J = 12.0 Hz, 1H), 2.93 (d, J = 10.9 Hz, 1H), 3.90 (t, J = 6.5 Hz, 2H), 4.23-4.50 (m, 5H), 5.93 (s, 1H), 6.82 (d, J = 8.5 Hz, 2H), 7.13 (d, J = 8.4 Hz, 2H), 7.22 (dd, J = 8.5, 4.3 Hz, 1H), 7.34 (td, J = 8.3, 2.7 Hz, 1H), 8.27 (d, J = 2.5 Hz, 1H). |
| I - 064 | 1H-NMR (CDCl3) δ: 0.18-0.24 (m, 1H), 0.40-0.45 (m, 1H), 0.47-0.55 (m, 2H), 1.01 (d, J = 6.7 Hz, 6H), 1.83 (d, J = 11.5 Hz, 1H), 2.00-2.23 (m, 4H), 2.26 (s, 3H), 2.55 (d, J = 11.7 Hz, 1H), 2.99 (d, J = 10.8 Hz, 1H), 3.66-3.75 (m, 5H), 4.17-4.38 (m, 4H), 4.61 (d, J = 11.7 Hz, 1H), 6.02 (s, 1H), 6.08 (s, 1H), 6.79 (d, J = 8.5 Hz, 2H), 7.09 (d, J = 8.4 Hz, 2H), 7.22 (s, 1H). |
| I - 065 | 1H-NMR (CDCl3) δ: 0.19-0.22 (m, 1H), 0.40-0.45 (m, 1H) 0.49-0.55 (2H, m), 1.02 (t, J = 7.4 Hz, 3H), 1.74-1.87 (m, 3H), 1.97-2.24 (m, 3H), 2.26 (s, 3H), 2.54 (d, J = 11.7 Hz, 1H), 2.99 (d, J = 10.9 Hz, 1H), 3.70 (s, 3H), 3.89 (t, J = 6.6 Hz, 2H), 4.17-4.38 (m, 4H), 4.61 (d, J = 11.2 Hz, 1H), 6.02 (s, 1H), 6.08 (d, J = 2.0 Hz, 1H), 6.80 (d, J = 8.5 Hz, 2H), 7.09 (d, J = 8.4 Hz, 2H), 7.22 (s, 1H). |
| I - 066 | 1H-NMR (CDCl3) δ: 0.20-0.27 (m, 1H), 0.29-0.37 (m, 3H), 0.39-0.40 (m, 1H), 0.50-0.58 (m, 1H), 0.61-0.67 (m, 2H), 1.24-1.31 (m, 1H), 1.67-1.84 (m, 2H), 2.19 (d, J = 13.6 Hz, 1H), 2.75-2.83 (m, 1H), 3.08-3.21 (m, 2H), 3.78 (d, J = 7.1 Hz, 2H), 4.27 (dd, J = 14.6, 5.3 Hz, 1H), 4.33-4.42 (m, 2H), 4.47-4.54 (m, 2H), 5.74 (s, 1H), 6.83 (d, J = 8.5 Hz, 2H), 7.13 (d, J = 8.5 Hz, 2H), 7.23 (dd, J = 8.5, 4.3 Hz, 1H), 7.34 (td, J = 8.3, 2.5 Hz, 1H), 8.28 (d, J = 2.8 Hz, 1H). |

TABLE 29

| | |
|---|---|
| I - 067 | 1H-NMR (CDCl3) δ: 0.20-0.26 (m, 1H), 0.32-0.37 (m, 2H), 0.41-0.55 (m, 3H), 0.61-0.67 (m, 2H), 1.68-1.75 (m, 1H), 1.96-2.06 (m, 2H), 2.12-2.20 (m, 1H), 2.24 (s, 3H), 2.51 (d, J = 11.8 Hz, 1H), 2.89-2.96 (m, 1H), 3.78 (d, J = 7.0 Hz, 2H), 4.26 (dd, J = 14.3, 5.0 Hz, 1H), 4.32-4.50 (m, 4H), 5.94 (s, 1H), 6.82 (d, J = 8.8 Hz, 2H), 7.13 (d, J = 8.5 Hz, 2H), 7.22 (dd, J = 8.5, 4.3 Hz, 1H), 7.34 (td, J = 8.3, 2.8 Hz, 1H), 8.26 (d, J = 2.5 Hz, 1H). |
| I - 068 | 1H-NMR (400 MHz, CDCl3) δ 1.00 (d, J = 6.8 Hz, 3H), 1.03 (d, J = 6.5 Hz, 3H), 1.28-1.92 (m, 5 Hz), 1.99-2.13 (m, 2H), 2.21 (s, 1.5 Hz), 2.23 (s, 1.5 Hz), 2.76-2.85 (m, 2H), 3.58 (s, 1H), 3.68 (d, J = 6.5 Hz, 1H), 3.71 (d, J = 6.5 Hz, 1H), 3.78 (s, 1H), 4.55 (s, 1H), 4.62 (s, 1H), 6.80 (d, J = 8.8 Hz, 1H), 6.87 (d, J = 8.5 Hz, 1H), 7.07 (d, J = 8.5 Hz, 1H), 7.13-7.39 (m, 4H), 8.32 (d, J = 3.0 Hz, 0.5 H), 8.43 (d, J = 3.0 Hz, 0.5H). |

TABLE 30

| | |
|---|---|
| I - 069 | 1H-NMR (CDCl3) δ: 1.01 (d, J = 6.7 Hz, 6H), 1.48 (d, J = 12.6 Hz, 1H), 2.00-2.51 (m, 4H), 2.30 (s, 3H), 2.96 (d, J = 11.8 Hz, 1H), 3.31 (t, J = 12.3 Hz, 1H), 3.70 (d, J = 6.5 Hz, 2H), 4.21-4.47 (m, 3H), 4.57 (d, J = 16.6 Hz, 1H), 4.84 (d, J = 16.6 Hz, 1H), 4.88 (d, J = 49.7 Hz, 1H), 6.85 (d, J = 8.8 Hz, 2H), 7.19-7.28 (3H, m), 7.39 (t, J = 8.5 Hz, 1H), 7.71 (br, t, J = 5.3 Hz, 1H), 8.21 (d, J = 4.5 Hz 1H). |
| I - 070 | 1H-NMR (CDCl3) δ: 1.03 (d, J = 6.7 Hz, 6H), 1.50-1.87 (m, 4H), 1.99-2.14 (m, 3H), 2.25 (s, 3H), 2.86 (d, J = 12.0 Hz, 2H), 3.66 (d, J = 6.5 Hz, 2H), 4.27 (d, J = 5.2 Hz, 2H), 4.40-4.55 (m, 1H), 4.97 (s, 2H), 5.56 (t, J = 5.5 Hz, 1H), 6.72 (d, J = 8.5 Hz, 2H), 6.99 (d, J = 8.5 Hz, 2H), 7.15 (t, J = 8.5 Hz, 1H), 7.43 (dd, J = 8.5, 4.2 Hz, 1H), 7.59 (t, J = 7.2 Hz, 1H), 8.41 (dd, J = 8.5, 1.5 Hz, 1H), 8.70 (dd, J = 4.3, 1.8 Hz, 1H). |

TABLE 30-continued

| | |
|---|---|
| I - 071 | 1H-NMR (CDCl3) δ: 1.03 (d, J = 6.7 Hz, 6H), 1.61-1.87 (m, 4H), 2.00-2.14 (m, 3H), 2.25 (s, 3H), 2.84 (d, J = 12.0 Hz, 2H), 3.66 (d, J = 6.5 Hz, 2H), 4.29 (d, J = 5.2 Hz, 2H), 4.27-4.45 (m, 1H), 4.61 (t, J = 5.1 Hz, 1H), 4.63 (s, 2H), 6.77 (d, J = 8.5 Hz, 2H), 6.82-6.89 (m, 2H), 7.03 (d, J = 8.5 Hz, 2H), 7.06-7.13 (m, 1H), 7.54 (d, J = 2.0 Hz, 2H). |
| I - 072 | 1H-NMR (CDCl3) δ: 1.00 (d, J = 10.2 Hz, 6H), 1.66-1.76 (m, 4H), 2.03-2.11 (m, 3H), 2.28 (s, 3H), 2.90 (d, J = 11.5 Hz, 2H), 3.69 (d, J = 6.5 Hz, 2H), 4.22 (s, 2H), 4.25-4.36 (m, 7H), 6.77 (s, 1H), 6.82 (d, J = 8.5 Hz, 2H), 7.10 (s, 1H), 7.18 (d, J = 8.5 Hz, 2H), 7.94 (s, 1H). |
| I - 073 | 1H-NMR (CDCl3) δ: 1.01 (d, J = 6.7 Hz, 6H), 1.42 (d, J = 12.6 Hz, 1H), 2.00-2.18 (m, 2H), 2.65-2.93 (m, 2H), 3.11-3.30 (m, 2H), 3.70 (d, J = 6.5 Hz, 2H), 4.30-4.64 (m, 4H), 4.70-4.89 (m, 2H), 6.85 (d, J = 8.8 Hz, 2H), 7.19-7.28 (3H, m), 7.39 (t, J = 8.5 Hz, 1H), 7.69 (bt, J = 5.3 Hz, 1H), 8.23 (d, J = 4.7 Hz, 1H). |
| I - 074 | 1H-NMR (CDCl3) δ: 1.03 (d, J = 6.7 Hz, 6H), 1.70-1.98 (m, 4H), 2.00-2.14 (m, 3H), 2.29 (s, 3H), 2.92 (d, J = 12.0 Hz, 2H), 3.68 (d, J = 6.5 Hz, 2H), 3.76 (s, 3H), 4.29-4.42 (m, 1H), 4.33 (d, J = 5.2 Hz, 2H), 4.63 (s, 2H), 6.77 (d, J = 8.5 Hz, 2H), 7.04-7.10 (m, 1H), 7.12-7.22 (m, 3H), 7.56 (d, J = 8.0 Hz, 1H), 7.80 (t, J = 6.3 Hz, 1H), 8.11 (d, J = 4.5 Hz, 2H) |

TABLE 31

| | |
|---|---|
| I - 075 | 1H-NMR (CDCl3) δ: 1.60-1.67 (m, 2H), 1.69-1.80 (m, 2H), 2.07 (t, J = 10.8 Hz, 2H), 2.28 (s, 3H), 2.89 (d, J = 11.5 Hz, 2H), 4.23-4.29 (m, 1H) 4.33 (s, 2H), 4.37 (d, J = 5.4 Hz, 2H), 6.70 (d, J = 8.0 Hz, 1H), 6.75-6.81 (m, 2H), 7.01 (s, 1H), 7.15 (t, J = 7.8 Hz, 1H), 7.22 (dd, J = 8.5, 4.1 Hz, 1H), 7.33 (td, J = 8.3, 2.8 Hz, 1H), 8.26 (d, J = 2.6 Hz, 1H). |
| I - 076 | 1H-NMR (CDCl3) δ: 1.59-1.64 (m, 2H), 1.67-1.80 (m, 2H), 2.06 (t, J = 10.9 Hz, 2H), 2.28 (s, 3H), 2.88 (d, J = 11.5 Hz, 2H), 4.21 (t, J = 11.9 Hz, 1H), 4.30-4.34 (m, 4H), 6.81 (t, J = 7.3 Hz, 1H), 6.92 (d, J = 7.7 Hz, 1H), 7.11 (d, J = 7.4 Hz, 1H), 7.16-7.21 (m, 1H), 7.25 7.24-7.27 (m, 1H), 7.37 (dt, J = 12.0, 4.2 Hz, 1H), 7.67 (s, 1H), 8.29 (d, J = 2.5 Hz, 1H), 10.34 (s, 1H). |
| I - 077 | 1H-NMR (CDCl3)δ: 1.00 (d, J = 6.7 Hz, 6H), 1.60 (d, J = 11.9 Hz, 2H), 1.70-1.81 (m, 2H), 2.00-2.10 (m, 1H), 2.16 (t, J = 11.4 Hz, 2H), 2.30 (s, 3H), 2.94 (d, J = 11.8 Hz, 2H), 3.66 (d, J = 6.5 Hz, 2H), 4.28-4.39 (m, 5H), 6.55 (d, J = 11.3 Hz, 1H), 6.79 (d, J = 8.5 Hz, 2H), 7.20 (d, J = 8.4 Hz, 2H), 7.60 (s, 1H), 7.73 (s, 1H). |
| I - 078 | 1H-NMR (CDCl3) δ: 1.01 (d, J = 6.7 Hz, 6H), 1.57-1 90 (m, 4H), 2.00-2.14 (m, 3H), 2.27 (s, 3H), 2.54 (s, 3H), 2.88 (d, J = 12.0 Hz, 2H), 3.70 (d, J = 7.0 Hz, 2H), 4.16-4.29 (m, 1H), 4.35 (d, J = 5.2 Hz, 2H), 4.40 (s, 2H), 6.57 (br, t, 1H), 6.84 (d, J = 8.7 Hz, 2H), 7.19 (d, J = 8.7 Hz, 1H), 8.25 (s, 1H), 8.47 (s, 1H) |
| I - 079 | 1H-NMR (CDCl3) δ: 1.02 (d, J = 6.3 Hz, 6H), 1.68-1.85 (m, 4H), 1.99-2.14 (m, 3H), 2.25 (s, 3H), 2.86 (d, J = 11.7 Hz, 2H), 3.62-3.70 (m, 5H), 4.26 (d, J = 5.3 Hz, 1H), 4.36-4.55 (m, 3H), 4.89 (t, J = 5.5. Hz, 1H), 6.74 (d, J = 8.8 Hz, 2H), 6.79 (s, 1H), 7.00 (d, J = 8.8 Hz, 2H), 7.10 (t, J = 6.8 Hz, 1H), 7.21-7.33 (m, 2H), 7.49 (d, J = 8.5 Hz, 1H) |
| I - 080 | 1H-NMR (CDCl3) δ: 1.02 (d, J = 6.5 Hz, 6H), 1.60 (d, J = 10.8 Hz, 2H), 1-95-2.12 (m, 5H), 2.26 (s, 3H), 2.92 (d, J = 9.0 Hz, 2H), 3.52 (s, 1H), 3.71 (d, J = 6.4 Hz, 2H), 4.40 (d, J = 4.4 Hz, 2H), 4.57 (s, 2H), 6.79-6.88 (m, 3H), 7.22 (d, J = 8.2 Hz, 2H), 7.86 (s, 1H). |
| I - 081 | 1H-NMR (CDCl3) δ: 1.02 (d, J = 6.7 Hz, 6H), 1.52-1.58(m, 2H), 1.84-1.95 (m, 4H), 2.05-2.11 (m, 1H), 2.22 (s, 3H), 2.85 (d, J = 9.2 Hz, 2H), 3.23-3.33 (m, 1H), 3.71 (d, J = 6.5 Hz, 2H), 4.46 (d, J = 5.3 Hz, 2H), 4.77 (s, 2H), 4.86 (s, 1H), 6.58 (s, 1H), 6.65 (dd, J = 10.0, 8.0 Hz, 1H), 6.85 (d, J = 8.5 Hz, 2H), 6.94 (dd, J = 7.5, 4.9 Hz, 1H), 7.14 (s, 1H), 7.19 (d, J = 8.5 Hz, 2H), 10.87 (s, 1H). |
| I - 082 | 1H-NMR (CDCl3) δ: 1.65-1.77 (4H, m), 2.06 (2H, ddd, J = 15.0, 6.0, 4.3 Hz), 2.28 (3H, s), 2.90 (2H, bd), 4.24-4.30 (1H, m), 4.37 (4H, d, J = 8.0 Hz), 6.98 (1H, br s), 7.15 (2H, d, J = 8.4 Hz), 7.29 (1H, dd, J = 8.7, 4.3 Hz), 7.38-7.41 (3H, m), 8.28 (1H, d, J = 2.6 Hz). |

TABLE 32

| | |
|---|---|
| I - 083 | 1H-NMR (CDCl3) δ: 1.70-1.76 (4H, m), 2.07 (2H, ddd, J = 16.5, 5.2, 5.1 Hz), 2.27 (3H, s), 2.88 (2H, d, J = 11.3 Hz), 4.27-4.31 (1H, m), 4.39-4.40 (4H, m), 5.22 (1H, d, J = 10.9 Hz), 5.72 (1H, d, J = 17.6 Hz), 6.70 (1H, dd, J = 17.6, 10.9 Hz), 6.79 (1H, br s), 7.22 (2H, d, J = 7.9 Hz), 7.30 (1H, t, J = 4.3 Hz), 7.34-7.40 (3H, m), 8.27 (1H, d, J = 2.6 Hz). |

TABLE 32-continued

| | |
|---|---|
| I - 084 | 1H-NMR (CDCl3) δ: 1.70-1.79 (m, 4H), 2.07 (t, J = 10.6 Hz, 2H), 2.28 (s, 3H), 2.89 (d, J = 11.5 Hz, 2H), 4.28 (dd, J = 14.0, 9.7 Hz, 1H), 4.38 (s, 4H), 6.98 (s, 1H), 7.20 (d, J = 8.4 Hz, 2H), 7.26-7.32 (m, 3H), 7.39 (td, J = 8.3, 2.8 Hz, 1H), 8.28 (d, J = 2.6 Hz, 1H). |
| I - 085 | 1H-NMR (CDCl3) δ: 1.01 (d, J = 6.7 Hz, 6H), 1.54 (d, J = 12.6 Hz, 1H), 1.92-2.44 (m, 4H), 2.31 (s, 3H), 2.97 (d, J = 10.3 Hz, 1H), 3.13 (t, J = 11.5 Hz, 1H), 3.70 (d, J = 6.3 Hz, 2H), 4.34 (d, J = 5.3 Hz, 2H), 4.45 (br, dd, J = 36, 14 Hz, 1H), 4.54 (br. s, 2H), 4.85 (d, J = 51 Hz, 1H), 6.83 (d, J = 8.3 Hz, 2H), 7.17 (d, J = 8.3 Hz, 2H), 7.28-7.41 (m, 1H), 8.23 (d, J = 2.0 Hz, 1H). |
| I - 086 | 1H-NMR (CDCl3) δ: 0.21 (d, J = 9.4 Hz, 1H), 0.43 (d, J = 9.7 Hz, 1H), 0.49-0.53 (m, 2H), 1.02 (t, J = 7.5 Hz, 3H), 1.74-1.86 (m, 3H), 1.98-2.13 (m, 2H), 2.19 (t, J = 10.7 Hz, 1H), 2.26 (s, 3H), 2.54 (d, J = 11.8 Hz, 1H), 2.99 (d, J = 10.8 Hz, 1H), 3.70 (s, 3H), 3.89 (t, J = 6.6 Hz, 2H), 4.18-4.28 (m, 3H), 4.31-4.38 (m, 1H), 4.61 (d, J = 9.0 Hz, 1H), 6.02 (s, 1H), 6.08 (d, J = 2.0 Hz, 1H), 6.80 (d, J = 8.7 Hz, 2H), 7.09 (d, J = 8.4 Hz, 2H), 7.22 (d, J = 1.9 Hz, 1H). |
| I - 087 | 1H-NMR (CDCl3) δ: 0.21 (d, J = 9.4 Hz, 1H), 0.43 (d, J = 10.0 Hz, 1H), 0.47-0.55 (m, 2H), 1.01 (d, J = 6.7 Hz, 6H), 1.83 (d, J = 11.5 Hz, 1H), 2.00-2.13 (m, 3H), 2.20 (t, J = 11.4 Hz, 1H), 2.26 (s, 3H), 2.55 (d, J = 11.7 Hz, 1H), 2.99 (d, J = 10.8 Hz, 1H), 3.66-3.73 (m, 5H), 4.18-4.31 (m, 3H), 4.35 (dd, J = 14.5, 5.5 Hz, 1H), 4.61 (d, J = 11.7 Hz, 1H), 6.01(s, 1H), 6.08 (s, 1H), 6.79 (d, J = 8.5 Hz, 2H), 7.09 (d, J = 8.4 Hz, 2H), 7.22 (s, 1H). |
| I - 088 | 1H-NMR (CDCl3) δ: 1.01 (6H, d, J = 6.8 Hz), 2.02-2.10 (4H, m), 2.34 (3H, s), 2.87 (1H, d, J = 12.5 Hz), 3.16 (1H, d, J = 8.5 Hz), 3.64-3.74 (4H, m), 4.23-4.35 (3H, m), 5.74 (1H, br, s), 6.82 (1H, d, J = 8.5 Hz), 7.13 (2H, J = 8.5 Hz), 7.32 (1H, t, J = 4.3 Hz), 7.41 (1H, td, J = 8.3, 2.7 Hz), 7.69 (1H, s), 8.31 (1H, d, J = 2.8 Hz). |
| I - 089 | diastereomeric ratio 3:2<br>1H-NMR (CDCl3) δ: 1.02 (6H, d, J = 6.7 Hz), 2.00-2.15 (4H, m), 2.38-2.66 (5H, m), 2.89 (2H, s), 2.96 (2H, s), 3.03-3.23 (2H, m), 3.70 (2H, d, J = 7.8 Hz), 3.87-3.98 (1H, m), 4.30-4.57 (4H, m), 6.83 (2H, d, J = 8.5 Hz), 6.97 (1H, br, s), 7.17 (2H, d, J = 8.5 Hz), 7.32-7.41 (2H, m), 8.02 (0.4H, s), 8.26 (0.6H, s). |

TABLE 33

| | |
|---|---|
| I - 090 | 1H-NMR (CDCl3) δ: 0.28-0.33 (m, 1H), 0.40-0.48 (m, 1H), 0.52-0.66 (m, 2H), 1.01 (d, J = 6.8 Hz, 6H), 1.93 (d, J = 11 Hz, 1H), 2.02-2.16 (m, 2H), 2.46 (d, J = 13.1 Hz, 1H), 2.94 (t, J = 11.0 Hz, 1H), 3.20 (d, J = 12.9 Hz, 1H), 3.37 (d, J = 12.3 Hz, 1H), 3.69 (d, J = 6.5 Hz, 2H), 3.72 (s, 3H), 4.18-4.23 (m, 3H), 4.30-4.37 (m, 1H), 4.64-4.70 (m, 1H), 6.08 (d, J = 2.0 Hz, H), 6.14 (s, 1H), 6.80 (d, J = 8.5 Hz, 2H), 7.11 (d, J = 8.5 Hz, 2H), 7.23 (d, J = 1.8 Hz, 1H). |
| I - 091 | 1H-NMR (CDCl3) δ: 1.01 (d, J = 6.7 Hz, 6H), 1.83 (d, J = 12.3 Hz, 1H), 1.97 (ddd, J = 25.3, 12.9, 4.9 Hz, 1H), 2.04-2.12 (m, 1H), 2.76-2.94 (m, 2H), 3.14-3.28 (m, 2H), 3.70 (d, J = 6.5 Hz, 2H), 4.32 (d, J = 5.1 Hz, 2H), 4.55 (dd, J = 19.4, 16.9 Hz, 2H), 5.00 (tt, J = 16.7, 5.4 Hz, 1H), 6.64 (s, 1H), 6.79-6.83 (m, 2H), 7.09 (d, J = 8.7 Hz, 2H), 7.34-7.42 (m, 2H), 8.23 (d, J = 2.5 Hz, 1H). |
| I - 092 | 1H-NMR (CDCl3) δ: 1.62-1.79 (m, 4H), 1.77 (t, J = 19.0 Hz, 3H), 2.02-2.11 (m, 2H), 2.28 (s, 3H), 2.85-2.92 (m, 2H), 4.09 (t, J = 11.3 Hz, 2H), 4.23-4.33 (m, 1H), 4.35 (d, J = 5.5 Hz, 2H), 4.37 (s, 2H), 6.71-6.78 (br, 1H), 6.86 d, J = 8.5 Hz, 2H), 7.20 (d, J = 8.5 Hz, 2H), 7.29 (dd, J = 8.7, 4.3 Hz, 1H), 7.37 (td, J = 8.2, 3.0 Hz, 1H), 8.26 (d, J = 2.5 Hz, 1H). |
| I - 093 | 1H-NMR (CDCl3) δ: 1.01 (d, J = 6.5 Hz, 6H), 1.64(d, J = 12.6 Hz, 1H), 1.94-2.14 (m, 2H), 2.72-2.95 (m, 2H), 3.14-3.32 (m, 2H), 3.55 (s, 3H) 3.68 (d, J = 6.5 Hz, 2H), 4.20-4.45 (m, 4H), 4.64 (ddd, J = 34.9, 13.3, 1.51 Hz, 1H), 4.80 (d, J = 51.4 Hz, 1H), 5.11 (br, t, J = 5.3 Hz, 1H), 5.97 (t, J = 2.2 Hz, 1H), 6.39 (br, s, 1H), 6.52 (t, J = 2.5 Hz, 1H), 6.79 (d, J = 8.8 Hz, 2H), 7.00 (d, J = 8.8 Hz, 2H) |
| I - 094 | 1H-NMR (CDCl3) δ: 0.18-0.22 (m, 1H), 0.41-0.44 (m, 1H), 0.48-0.54 (m, 2H), 1.00 (d, J = 6.8 Hz, 6H), 1.80-1.85 (m, 1H), 1.97-2.23 (m, 4H), 2.18 (s, 3H), 2.26 (s, 3H), 2.54 (d, J = 11.6 Hz, 1H), 2.97-3.01 (m, 1H), 3.55 (s, 3H), 3.68 (d, J = 6.8 Hz, 2H), 4.09-4.25 (m, 3H), 4.34 (dd, J = 14.4, 6.4 Hz, 1H), 4.59-4.64 (m, 1H), 5.83 (s, 1H), 6.05 (br s, 1H), 6.78 (d, J = 8.4 Hz, 2H), 7.08 (d, J = 8.4 Hz, 2H). |
| I - 095 | 1H-NMR (CDCl3) δ: 1.63-1.79 (m, 4H), 2.02-2.12 (m, 2H), 2.27 (s, 3H), 2.85-2.93 (m, 2H), 4.23-4.40 (m, 7H), 6.77-6.84 (br, 1H), 6.88 (d, J = 8.3 Hz, 2H), 7.22 (d, J = 8.5 Hz, 2H), 7.29 (dd, J = 8.8, 4.5 Hz, 1H), 7.38 (td, J = 8.0, 2.5 Hz, 1H), 8.26 (d, J = 2.5 Hz, 1H). |
| I - 096 | 1H-NMR (CDCl3) δ: 1.01 (d, J = 6.7 Hz, 6H), 1.57-1.84 (m, 4H), 2.00-2.14 (m, 3H), 2.20 (s, 3H), 2.90 (d, J = 12.0 Hz, 2H), 3.57 (s, 3H), 3.68 (d, J = 6.8 Hz, 2H), 4.13 (s, 2H), 4.29-4.41 (m, 1H), 4.31 (d, J = 5.2 Hz, 2H), 5.86 (s, 1H), 6.28 (t, J = 5.0 Hz, 1H), 6.80 (d, J = 8.3 Hz, 2H), 7.14 (d, J = 8.3 Hz, 1H). |

TABLE 33-continued

| I - 097 | 1H-NMR (CDCl3) δ: 1.46 (dd, J = 23.6, 6.5 Hz, 3H), 1.62-1.79 (m, 4H), 2.02-2.12 (m, 2H), 2.27 (s, 3H), 2.84-2.92 (m, 2H), 3.94-4.16 (m, 2H), 4.23-4.33 (m, 1H), 4.35 (d, J = 5.5 Hz, 2H), 4.37 (s, 2H), 4.90-5.11 (m, 1H), 6.65-6.71 (br, 1H), 6.85 (d, J = 8.3 Hz, 2H), 7.18 (d, J = 8.3 Hz, 2H), 7.28 (dd, J = 8.5, 4.3 Hz, 1H), 7.37 (td, J = 8.3, 2.8 Hz, 1H), 8.26 (d, J = 2.8 Hz, 1H). |

TABLE 34

| I - 098 | 1H-NMR (CDCl3) δ: 1.46 (dd, J = 23.6, 6.5 Hz, 3H), 1.63-1.79 (m, 4H), 2.02-2.11 (m, 2H), 2.27 (s, 3H), 2.84-2.95 (m, 2H), 3.94-4.16 (m, 2H), 4.23-4.33 (m, 1H), 4.35 (d, J = 5.3 Hz, 2H), 4.37 (s, 2H), 4.89-5.11 (m, 1H), 6.64-6.73 (br, 1H), 6.85 (d, J = 8.3 Hz, 2H), 7.18 (d, J = 8.3 Hz, 2H), 7.29 (dd, J = 8.8, 4.3 Hz, 1H), 7.37 (td, J = 8.0, 2.5 Hz, 1H), 8.26 (d, J = 2.8 Hz, 1H). |
|---|---|
| I - 099 | 1H-NMR (DMSO-D6) δ: 0.28-0.66 (m, 4H), 1.81-1.88 (m, 1H), 1.95-2.08 (m, 1H), 2.68 (s, 3H), 2.77 (d, J = 12.4 Hz, 1H), 2.95-3.14 (m, 1H), 3.20-3.48 (m, 2H), 3.71 (s, 3H), 4.04-4.28 (m, 3H), 4.60-4.70 (m, 2H), 6.82 (d, J = 8.5 Hz, 2H), 6.99 (s, 1H), 7.05 (d, J = 8.0 Hz, 1H), 7.22-7.31 (m, 1H), 7.66-7.70 (m, 1H), 8.49 (d, J = 2.5 Hz, 1H), 9.80-10.02 (m, 1H). |
| I - 100 | 1H-NMR (CDCl3) δ: 0.21-0.25 (m, 1H), 0.43-0.56 (m, 3H), 1.71-1.73 (m, 1H), 1.97-2.05 (m, 2H), 2.16 (t, J = 10.4 Hz, 1H), 2.24 (s, 3H), 2.33 (s, 3H), 2.51 (d, J = 11.8 Hz, 1H), 2.93 (d, J = 10.0 Hz, 1H), 4.28-4.50 (m, 5H), 5.99 (s, 1H), 7.10 (s, 4H), 7.21-7.26 (m, 1H), 7.34 (td, J = 8.3, 2.7 Hz, 1H), 8.27 (d, J = 2.6 Hz, 1H). |
| I - 101 | 1H-NMR (CDCl3) δ: 0.31-0.35 (m, 1H), 0.40-0.44 (m, 1H), 0.45-0.52 (m, 1H), 0.58-0.65 (m, 1H), 1.75-1.81 (m, 1H), 2.00-2.05 (m, 1H), 2.33 (s, 3H), 2.40 (d, J = 13.4 Hz, 1H), 2.90 (t, J = 11.9 Hz, 1H), 3.19 (d, J = 13.2 Hz, 1H), 3.31 (d, J = 12.2 Hz, 1H), 4.28-4.50 (m, 5H), 4.59 (d, J = 12.5 Hz, 1H), 6.25 (s, 1H), 7.11 (s, 4H), 7.24-7.26 (m, 1H), 7.36 (dd, J = 11.0, 5.2 Hz, 1H), 8.28 (s, 1H). |
| I - 102 | 1H-NMR (CDCl3) δ: 0.21 (d, J = 9.4 Hz, 1H), 0.43 (d, J = 9.7 Hz, 1H), 0.49-0.53 (m, 2H), 1.02 (t, J = 7.5 Hz, 3H), 1.74-1.86 (m, 3H), 1.98-2.13 (m, 2H), 2.19 (t, J = 10.7 Hz, 1H), 2.26 (s, 3H), 2.54 (d, J = 11.8 Hz, 1H), 2.99 (d, J = 10.8 Hz, 1H), 3.70 (s, 3H), 3.89 (t, J = 6.6 Hz, 2H), 4.18-4.28 (m, 3H), 4.31-4.38 (m, 1H), 4.61 (d, J = 9.0 Hz, 1H), 6.02 (s, 1H), 6.08 (d, J = 2.0 Hz, 1H), 6.80 (d, J = 8.7 Hz, 2H), 7.09 (d, J = 8.4 Hz, 2H), 7.22 (d, J = 1.9 Hz, 1H). |
| I - 103 | 1H-NMR (CDCl3) δ: 0.30-0.35 (m, 1H), 0.40-0.47 (m, 1H), 0.50-0.66 (m, 2H), 1.02 (t, J = 7.4 Hz, 3H), 1.79 (td, J = 13.9, 6.9 Hz, 2H), 1.93 (d, J = 10.7 Hz, 1H), 2.08-2.18 (m, 2H), 2.48-2.50 (m, 1H), 2.92-2.98 (m, 1H), 3.21 (d, J = 12.9 Hz, 1H), 3.38 (d, J = 12.2 Hz, 1H), 3.69 (t, J = 11.1 Hz, 3H), 3.89 (t, J = 6.6 Hz, 2H), 4.19-4.18 (m, 3H), 4.33 (dt, J = 18.4, 6.3 Hz, 1H), 4.67 (d, J = 10.5 Hz, 1H), 6.07 (s, 1H), 6.17 (s, 1H), 6.81 (d, J = 8.3 Hz, 2H), 7.11 (d, J = 8.2 Hz, 2H), 7.23 (s, 1H). |
| I - 104 | 1H-NMR (CDCl3) δ: 0.18-0.22 (m, 1H), 0.41-0.44 (m, 1H), 0.48-0.54 (m, 2H), 1.82-1.85 (m, 1H), 1.99-2.22 (m, 3H), 2.18 (s, 3H), 2.26 (s, 3H), 2.54 (d, J = 11.2 Hz, 1H), 2.97-3.01 (m, 1H), 3.55 (s, 3H), 3.78 (s, 3H), 4.09-4.25 (m, 3H), 4.35 (dd, J = 14.4, 6.0 Hz, 1H), 4.59-4.63 (m, 1H), 5.83 (s, 1H), 6.08 (br s, 1H), 6.79 (d, J = 8.4 Hz, 2H), 7.10 (d, J = 8.4 Hz, 2H). |

TABLE 35

| I - 105 | 1H-NMR (CDCl3) δ: 0.18-0.22 (m, 1H), 0.41-0.44 (m, 1H), 0.49-0.54 (m, 2H), 1.82-1.85 (m, 1H), 1.99-2.22 (m, 3H), 2.19 (s, 3H), 2.25 (s, 3H), 2.31 (s, 3H), 2.54 (d, J = 11.6 Hz, 1H), 2.97-3.01 (m, 1H), 3.55 (s, 3H), 4.12 (d, J = 16.8 Hz, 1H), 4.22 (d, J = 16.8 Hz, 1H), 4.25 (dd, J = 12.4, 4.8 Hz, 1H), 4.37 (dd, J = 14.4, 6.0 Hz, 1H), 4.59-4.63 (m, 1H), 5.84 (s, 1H), 6.09 (br s, 1H), 7.06 (br s, 4H). |
|---|---|
| I - 106 | 1H-NMR (CDCl3) δ: 1.58-1.70 (m, 2H), 1.70-2.06 (m, 4H), 2.25 (s, 3H), 2.86 (d, J = 11.3 Hz, 2H), 3.53 (s, 3H), 3.81 (s, 3H), 4.23 (br, s, 2H), 5.11 (s, 2H), 5.85-6.12 (m, 1H), 5.85-6.12 (m, 1H), 6.21-6.44 (m, 2H), 6.87 (d, J = 8.8 Hz, 2H), 7.30 (d, J = 8.8 Hz, 2H). |
| I - 107 | 1H-NMR (CDCl3) δ: 0.30-0.35 (m, 1H), 0.40-0.47 (m, 1H), 0.50-0.66 (m, 2H), 1.02 (t, J = 7.4 Hz, 3H), 1.79 (td, J = 13.9, 6.9 Hz, 2H), 1.93 (d, J = 10.7 Hz, 1H), 2.08-2.18 (m, 2H), 2.48-2.50 (m, 1H), 2.92-2.98 (m, 1H), 3.21 (d, J = 12.9 Hz, 1H), 3.38 (d, J = 12.2 Hz, 1H), 3.69 (t, J = 11.1 Hz, 3H), 3.89 (t, J = 6.6 Hz, 2H), 4.19-4.18 (m, 3H), 4.33 (dt, J = 18.4, 6.3 Hz, 1H), 4.67 (d, J = 10.5 Hz, 1H), 6.07 (s, 1H), 6.17 (s, 1H), 6.81 (d, J = 8.3 Hz, 2H), 7.11 (d, J = 8.2 Hz, 2H), 7.23 (s, 1H). |

TABLE 35-continued

| | |
|---|---|
| I - 108 | 1H-NMR (CDCl3) δ: 1.01 (d, J = 6.8 Hz, 6H), 1.67 (d, J = 14.3 Hz, 1H), 1.96-2.40 (m, 4H), 2.31 (s, 3H), 2.97 (d, J = 12.6 Hz, 1H), 3.14 (t, J = 11.8 Hz, 1H), 3.55 (s, 3H), 3.68 (d, J = 6.5 Hz, 2H), 4.19-4.62 (m, 6H), 4.70-4.97 (m, 2H), 5.14 (br, t, J = 5.0, 1H), 5.97 (br, s, 1H), 6.38 (br, s, 1H), 6.51 (br, s, 1H), 6.79 (d, J = 8.8, 2H), 7.00 (d, J = 8.8, 2H). |
| I - 109 | 1H-NMR (CDCl3) δ: 0.18-0.22 (m, 1H), 0.41-0.44 (m, 1H), 0.48-0.54 (m, 2H), 1.02 (t, J = 6.8 Hz, 3H), 1.75-1.86 (m, 3H), 1.98-2.23 (m, 3H), 2.18 (s, 3H), 2.26 (s, 3H), 2.54 (d, J = 10.4 Hz, 1H), 2.97-3.02 (m, 1H), 3.55 (s, 3H), 3.88 (t, J = 6.8 Hz, 2H), 4.09-4.24 (m, 3H), 4.34 (dd, J = 14.4, 5.2 Hz, 1H), 4.59-4.64 (m, 1H), 5.83 (s, 1H), 6.06 (br s, 1H), 6.78 (d, J = 8.4 Hz, 2H), 7.08 (d, J = 8.4 Hz, 2H). |
| I - 110 | 1H-NMR (CDCl3) δ: 0.19-0.22 (m, 1H), 0.31-0.35 (m, 2H), 0.41-0.44 (m, 1H), 0.47-0.49 (m, 2H), 0.61-0.65 (m, 2H), 0.86-0.90 (m, 1H), 1.81-1.85 (m, 1H), 1.99-2.22 (m, 3H), 2.25 (s, 3H), 2.54 (d, J = 11.6 Hz, 1H), 2.96-3.01 (m, 1H), 3.70 (s, 3H), 3.76 (d, J = 6.8 Hz, 2H), 4.17-4.37 (m, 4H), 4.59-4.62 (m, 1H), 6.02 (br s, 1H), 6.07 (d, J = 2.0 Hz, 1H), 6.80 (d, J = 8.4 Hz, 2H), 7.09 (d, J = 8.4 Hz, 2H), 7.21 (d, J = 2.0 Hz, 1H). |
| I - 111 | 1H-NMR (CDCl3) δ: 0.19-0.22 (m, 1H), 0.43-0.53 (m, 3H), 0.61-0.65 (m, 2H), 1.81-1.85 (m, 1H), 1.99-2.22 (m, 3H), 2.26 (s, 3H), 2.53 (d, J = 11.2 Hz, 1H), 2.97-3.01 (m, 1H), 3.69 (s, 3H), 4.18-4.32 (m, 3H), 4.42 (dd, J = 14.8, 6.0 Hz, 1H), 4.59-4.63 (m, 1H), 6.08 (d, J = 1.6 Hz, 1H), 6.22 (br s, 1H), 6.47 (t, J = 74.0 Hz, 1H), 7.01 (d, J = 8.4 Hz, 2H), 7.17 (d, J = 8.4 Hz, 2H), 7.23 (d, J = 1.6 Hz, 1H). |
| I - 112 | 1H-NMR (CDCl3) δ: 0.98 (d, J = 6.5 Hz, 6H), 1.63-1.78 (m, 4H), 1.81-1.94 (m, 1H), 2.02-2.11 (m, 2H), 2.27 (s, 3H), 2.83-2.95 (m, 4H), 3.59-3.74 (br, 1H), 4.22-4.33 (m, 1H), 4.28 (d, J = 5.1 Hz, 2H), 4.37 (s, 2H), 6.31-6.39 (br, 1H), 6.53 (d, J = 8.4 Hz, 2H), 7.05 (d, J = 8.4 Hz, 2H), 7.24-7.29 (m, 1H), 7.35 (td, J = 8.2, 2.6 Hz, 1H), 8.27 (d, J = 2.5 Hz, 1H). |

TABLE 36

| | |
|---|---|
| I - 113 | 1H-NMR (CDCl3) δ: 0.73-0.79 (m, 4H), 1.63-1.83 (m, 4H), 2.02-2.12 (m, 2H), 2.27 (s, 3H), 2.84-2.92 (m, 2H), 3.68-3.75 (m, 1H), 4.23-4.33 (m, 1H), 4.35 (d, J = 5.3 Hz, 2H), 4.37 (s, 2H), 6.58-6.68 (br, 1H), 6.98 (d, J = 8.5 Hz, 2H), 7.17 (d, J = 8.5 Hz, 2H), 7.28 (dd, J = 8.5, 4.3 Hz, 1H), 7.36 (td, J = 8.4, 3.0 Hz, 1H), 8.26 (d, J = 2.5 Hz, 1H). |
| I - 114 | 1H-NMR (CDCl3) δ: 0.21 (d, J = 9.4 Hz, 1H), 0.43 (d, J = 10.0 Hz, 1H), 0.47-0.55 (m, 2H), 1.01 (d, J = 6.7 Hz, 6H), 1.83 (d, J = 11.5 Hz, 1H), 2.00-2.13 (m, 3H), 2.20 (t, J = 11.4 Hz, 1H), 2.26 (s, 3H), 2.55 (d, J = 11.7 Hz, 1H), 2.99 (d, J = 10.8 Hz, 1H), 3.66-3.73 (m, 5H), 4.18-4.31 (m, 3H), 4.35 (dd, J = 14.5, 5.5 Hz, 1H), 4.61 (d, J = 11.7 Hz, 1H), 6.01(s, 1H), 6.08 (s, 1H), 6.79 (d, J = 8.5 Hz, 2H), 7.09 (d, J = 8.4 Hz, 2H), 7.22 (s, 1H). |
| I - 115 | 1H-NMR (CDCl3) δ: 1.01 (t, J = 6.5 Hz, 6H), 1.51-1.55 (m, 1H), 1.98-2.07 (m, 2H), 2.73-2.92 (m, 2H), 3.14-3.29 (m, 2H), 3.70 (d, J = 6.7 Hz, 2H), 4.33 (d, J = 5.0 Hz, 2H), 4.51-4.65 (m, 1H), 4.54 (s, 2H), 4.78 (d, J = 50.7 Hz, 1H), 6.83 (d, J = 8.5 Hz, 2H), 7.08 (s, 1H), 7.16 (d, J = 8.4 Hz, 2H), 7.35-7.40 (m, 2H), 8.24 (d, J = 1.9 Hz, 1H). |
| I - 116 | 1H-NMR (CDCl3) δ: 1.22 (3H, t, J = 7.7 Hz), 1.69-1.77 (4H, m), 2.07 (2H, ddd, J = 15.2, 5.6, 5.2 Hz), 2.27 (3H, s), 2.63 (2H, q, J = 7.7 Hz), 2.87-2.90 (2H, br m), 4.28-4.31 (1H, m), 4.38 (4H, br s), 6.64 (1H, br s), 7.15 (4H, q, J = 8.3 Hz), 7.29-7.30 (1H, m), 7.36 (1H, td, J = 8.3, 2.7 Hz), 8.26 (1H, d, J = 2.7 Hz). |
| I - 117 | 1H-NMR (CDCl3) δ: 1.61-1.79 (m, 4H), 2.01-2.11 (m, 2H), 2.27 (s, 3H), 2.84-2.92 (m, 2H), 4.22-4.40 (m, 7H), 6.06 (tt, J = 53.2, 5.1 Hz, 1H), 6.77-6.84 (br, 1H), 6.86 (d, J = 8.5 Hz, 2H), 7.22 (d, J = 8.5 Hz, 2H), 7.29 (dd, J = 8.5, 4.3 Hz, 1H), 7.38 (td, J = 8.3, 2.9 Hz, 1H), 8.27 (d, J = 2.6 Hz, 1H). |
| I - 118 | 1H-NMR (CDCl3) δ: 1.02 (d, J = 6.8 Hz, 6H), 1.69-1.82 (m, 4H), 1.99-2.13 (m, 3H), 2.28 (s, 3H), 2.86-2.95 (m, 2H), 3.69 (d, J = 6.5 Hz, 2H), 4.25-4.37 (m, 1H), 4.28 (s, 2H), 4.31 (d, J = 5.0 Hz, 2H), 5.61-5.68 (br, 1H), 6.35 (d, J = 2.5 Hz, 1H), 6.82 (d, J = 8.5 Hz, 2H), 6.91 (t, J = 60.7 Hz, 1H), 7.11 (d, J = 8.5 Hz, 2H), 7.72 (d, J = 2.5 Hz, 1H). |
| I - 119 | 1H-NMR (CDCl3) δ: 1.03 (t, J = 7.4 Hz, 3H), 1.54 (d, J = 11.5 Hz, 1H), 1.74-1.85 (m, 2H), 2.00-2.10 (m, 1H), 2.62-2.94 (m, 2H), 3.16-3.32 (m, 2H), 3.90 (t, J = 6.6 Hz, 2H), 4.33 (d, J = 5.1 Hz, 2H), 4.54 (s, 2H), 4.504.68 (m, 1H), 4.79 (d, J = 50.9 Hz, 1H), 6.83 (d, J = 8.5 Hz, 2H), 7.12 (s, 1H), 7.16 (d, J = 8.5 Hz, 2H), 7.35-7.38 (m, 2H), 8.24 (d, J = 1.9 Hz, 1H). |
| I - 120 | 1H-NMR (CDCl3) δ: 0.19-0.27 (m, 1H), 0.40-0.56 (m, 3H), 1.68-1.75 (m, 1H), 1.94-2.06 (m, 2H), 2.11-2.20 (m, 1H), 2.24 (s, 3H), 2.33 (s, 3H), 2.48-2.54 (m, 1H), 2.89-2.97 (m, 1H), 4.27-4.52 (m, 5H), 5.93-6.04 (m, 1H), 7.08-7.13 (m, 4H), 7.23 (dd, J = 8.5, 4.3 Hz, 1H), 7.34 (td, J = 8.4, 2.8 Hz, 1H), 8.27 (d, J = 2.8 Hz, 1H). |

TABLE 37

| | |
|---|---|
| I - 121 | 1H-NMR (CDCl3) δ: 1.69 (4H, br s), 2.05-2.07 (2H, m), 2.27 (3H, s), 2.86-2.89 (2H, br m), 2.93 (6H, s), 4.29-4.30 (3H, m), 4.37 (2H, s), 6.39 (1H, s), 6.68 (2H, d, J = 8.5 Hz), 7.13 (2H, d, J = 8.5 Hz), 7.29 (1H, d, J = 4.5 Hz), 7.33-7.37 (1H, m), 8.27 (1H, d, J = 2.8 Hz). |
| I - 122 | 1H-NMR (CDCl3) δ: 1.02 (t, J = 7.4 Hz, 3H), 1.60-1.65 (m, 1H), 1.79 (qt, J = 7.4 Hz, 6.6 Hz, 2H), 2.02-2.13 (m, 1H), 2.73-2.92 (m, 2H), 3.18-3.30 (m, 2H), 3.71 (s, 3H), 3.89 (t, J = 6.6 Hz, 2H), 4.27-4.37 (m, 2H), 4.40 (s, 2H), 4.50-4.66 (m, 1H), 4.78 (d, J = 51.2 Hz, 1H), 6.15 (d, J = 1.6 Hz, 1H), 6.50 (br s, 1H), 6.81 (d, J = 8.4 Hz, 2H), 7.13 (d, J = 8.4 Hz, 2H), 7.23 (d, J = 1.6 Hz, 1H). |
| I - 123 | 1H-NMR (CDCl3) δ: 1.03 (t, J = 7.4 Hz, 3H), 1.60-1.65 (m, 1H), 1.79 (qt, J = 7.4 Hz, 6.5 Hz, 2H), 2.08 (ddd, J = 25.1, 12.6, 4.1 Hz, 1H), 2.21 (s, 3H), 2.73-2.92 (m, 2H), 3.18-3.31 (m, 2H), 3.57 (s, 3H), 3.90 (t, J = 6.5 Hz, 2H), 4.49-4.64 (m, 1H), 4.79 (d, J = 51.3 Hz, 1H), 5.92 (s, 3H), 6.58 (br s, 1H), 6.81 (d, J = 8.5 Hz, 2H), 7.14 (d, J = 8.5 Hz, 2H) |
| I - 124 | 1H-NMR (CDCl3) δ: 1.01 (d, J = 6.7 Hz, 6H), 1.60-1.67 (m, 1H), 1.93-2.11 (m, 2H), 2.72-2.94 (m, 2H), 3.16-3.29 (m, 2H), 3.55 (s, 3H), 3.70 (d, J = 6.4 Hz, 2H), 4.20-4.42 (m, 4H), 4.55-4.69 (m, 1H), 4.80 (d, J = 51.3 Hz, 1H), 5.11 (br s, 1H), 5.97 (br s, 1H), 6.39 (br s, 1H), 6.52 (br s, 1H), 6.79 (d, J = 8.5 Hz, 2H), 7.00 (d, J = 8.5 Hz, 2H). |
| I - 125 | 1H-NMR (CDCl3) δ: 0.64-0.68 (2H, m), 0.91-0.96 (2H, m), 1.73-1.76 (4H, m), 1.84-1.90 (1H, m), 2.06-2.09 (2H, m), 2.28 (3H, s), 2.89 (2H, d, J = 11.4 Hz), 4.25-4.31 (1H, m), 4.37 (4H, d, J = 7.3 Hz), 6.66 (1H, s), 7.00 (2H, d, J = 7.9 Hz), 7.14 (2H, d, J = 7.9 Hz), 7.29 (1H, t, J = 4.3 Hz), 7.36 (1H, td, J = 8.3, 2.4 Hz), 8.26 (1H, d, J = 2.4 Hz). |
| I - 126 | 1H-NMR (CDCl3) δ: 0.18-0.22 (m, 1H), 0.41-0.44 (m, 1H), 0.48-0.54 (m, 2H), 1.02 (t, J = 6.8 Hz, 3H), 1.75-1.86 (m, 3H), 1.98-2.23 (m, 3H), 2.18 (s, 3H), 2.26 (s, 3H), 2.54 (d, J = 10.4 Hz, 1H), 2.97-3.02 (m, 1H), 3.55 (s, 3H), 3.88 (t, J = 6.8 Hz, 2H), 4.09-4.24 (m, 3H), 4.34 (dd, J = 14.4, 5.2 Hz, 1H), 4.59-4.64 (m, 1H), 5.83 (s, 1H), 6.06 (br s, 1H), 6.78 (d, J = 8.4 Hz, 2H), 7.08 (d, J = 8.4 Hz, 2H). |
| I - 127 | 1H-NMR (CDCl3) δ: 0.18-0.22 (m, 1H), 0.41-0.44 (m, 1H), 0.48-0.54 (m, 2H), 1.02 (t, J = 6.8 Hz, 3H), 1.75-1.86 (m, 3H), 1.98-2.23 (m, 3H), 2.18 (s, 3H), 2.26 (s, 3H), 2.54 (d, J = 10.4 Hz, 1H), 2.97-3.02 (m, 1H), 3.55 (s, 3H), 3.88 (t, J = 6.8 Hz, 2H), 4.09-4.24 (m, 3H), 4.34 (dd, J = 14.4, 5.2 Hz, 1H), 4.59-4.64 (m, 1H), 5.83 (s, 1H), 6.06 (br s, 1H), 6.78 (d, J = 8.4 Hz, 2H), 7.08 (d, J = 8.4 Hz, 2H). |

TABLE 38

| | |
|---|---|
| I - 128 | 1H-NMR (CDCl3) δ: 1.01 (d, 6H, J = 6.7 Hz), 1.69-1.76 (m, 4H), 2.00-2.12 (m, 3H), 2.21 (s, 3H), 2.28 (s, 3H), 2.90 (d, 2H, J = 10.9 Hz), 3.69 (d, 2H, J = 6.5 Hz), 3.95-4.07 (m, 1H), 4.33 (d, 2H, J = 5.4 Hz), 4.47 (s, 2H), 4.61-4.67 (m, 1H), 5.98 (d, 2H, J = 53.7 Hz), 5.99 (s, 1H), 6.83 (d, 2H, J = 8.5 Hz), 7.14 (d, 2H, J = 8.4 Hz). |
| I - 129 | 1H-NMR (CDCl3) δ: 0.98 (d, 6H, J = 6.5 Hz), 1.48-1.68 (m, 3H), 1.82-1.94 (m, 1H), 1.95-2.08 (m, 1H), 2.71-2.96 (m, 4H), 3.16-3.29 (m, 2H), 4.27 (d, 2H, J = 4.8 Hz), 4.50-4.90 (m, 2H), 4.53 (s, 2H), 6.54 (d, 2H, J = 8.0 Hz), 6.87 (br s, 1H), 7.05 (d, 2H, J = 8.0 Hz), 7.35-7.36 (m, 2H), 8.24 (s, 1H). |
| I - 130 | 1H-NMR (400 MHz, CDCl3) δ1.66-1.82 (m, 4H), 2.05-2.10 (m, 2H), 2.28 (s, 3H), 2.30 (s, 3H), 2.89 (d, J = 11.2 Hz, 2H), 3.73 (s, 3H), 4.28-4.32 (m, 1H), 4.34 (s, 2H), 4.42 (d, J = 6.0 Hz, 2H), 4.43 (s, 2H), 7.17 (d, J = 8.0 Hz), 7.24-7.28 (m, 4H), 7.32-7.34 (m, 1H), 7.46 (d, J = 7.6 Hz, 1H), 8.23 (s, 1H). |
| I - 131 | 1H-NMR (400 MHz, CDCl3) δ1.60-1.80 (m, 4H), 2.15-2.12 (m, 2H) 2.28 (s, 3H), 2.90 (d, J = 11.2 Hz, 2H), 3.73 (s, 3H), 4.26-4.32 (m, 1H), 4.39 (s, 2H), 4.41 (d, J = 6.0 Hz, 2H), 4.45(s, 2H), 6.76-6.82 (m, 1H), 7.23-7.31 (m, 4H), 7.37 (dd, J = 2.8, 8.4 Hz, 1H), 8.26 (d, J = 2.4, 1H). |
| I - 132 | 1H-NMR (CDCl3) δ: 1.01 (6H, d, J = 6.7 Hz), 1.63 (1H, br s), 2.03-2.10 (2H, m), 2.74-2.94 (2H, m), 3.19-3.31 (2H, m), 3.69-3.72 (5H, m), 4.27-4.37 (2H, m), 4.41 (2H, s), 4.58 (1H, dd, J = 35.7, 10.4 Hz), 4.79 (1H, d, J = 50.8 Hz), 6.16 (1H, d, J = 1.8 Hz), 6.51 (1H, br s), 6.81 (2H, d, J = 8.5 Hz), 7.14 (2H, d, J = 8.5 Hz), 7.24 (1H, d, J = 1.9 Hz). |
| I - 133 | 1H-NMR (CDCl3) δ: 1.01 (6H, d, J = 6.8 Hz), 1.62 (1H, br s), 2.02-2.12 (2H, m), 2.21 (3H, s), 2.74-2.92 (2H, m), 3.24 (2H, dd, J = 29.7, 14.9 Hz), 3.57 (3H, s), 3.69 (2H, d, J = 6.5 Hz), 4.30-4.34 (4H, m), 4.57 (1H, dt, J = 35.4, 6.4 Hz), 4.78 (1H, d, J = 50.8 Hz), 5.92 (1H, s), 6.82 (1H, br s), 6.81 (2H, d, J = 8.5 Hz), 7.14 (2H, d, J = 8.5 Hz). |
| I - 134 | 1H-NMR (CDCl3) δ: 1.03 (3H, t, J = 7.4 Hz), 1.64 (1H, d, J = 12.7 Hz), 1.75-1.84 (2H, m), 1.95-2.05 (1H, m), 2.74-2.94 (2H, m), 3.16-3.30 (2H, m), 3.55 (3H, s), 3.89 (2H, t, J = 6.6 Hz), 4.21-4.42 (4H, m), 4.55-4.69 (1H, m), 4.80 (1H, d, J = 51.1 Hz), 5.12 (1H, br s), 5.97 (1H, s), 6.39 (1H, s), 6.52 (1H, s), 6.79 (2H, d, J = 8.5 Hz), 7.00 (2H, d, J = 8.5 Hz). |

TABLE 38-continued

I - 135  1H-NMR (CDCl3) δ: 1.01 (6H, d, J = 6.5 Hz), 1.72-1.73 (4H, m), 2.08 (3H, s), 2.29 (3H, s), 2.91 (2H, d, J = 11.5 Hz), 3.53 (3H, s), 3.69 (2H, d, J = 6.8 Hz), 4.11 (2H, s), 4.31-4.33 (3H, m), 5.62 (1H, d, J = 5.8 Hz), 5.98 (1H, s), 6.81 (2H, d, J = 8.5 Hz), 7.14 (2H, d, J = 8.5 Hz).

TABLE 39

I - 136  1H-NMR (CDCl3) δ: 0.30-0.36 (m, 1H), 0.43-0.48 (m, 1H), 0.58-0.71 (m, 2H), 1.02 (d, 6H, J = 6.5 Hz), 1.37-1.47 (m, 1H), 1.86-1.97 (m, 1H), 2.03-2.10 (m, 1H), 2.21-2.37 (m, 4H), 2.85-2.99 (m, 2H), 3.70 (d, 2H, J = 5.0 Hz), 4.33 (t, 2H, J = 4.5 Hz), 4.42 (s, 3H), 6.20 (br s, 1H), 6.82 (d, 2H, J = 8.0 Hz), 7.15 (d, 2H, J = 8.0 Hz), 7.28-7.40 (m, 2H), 8.29 (s, 1H).

I - 137  1H-NMR (CDCl3) δ: 1.25 (d, 6H, J = 6.9 Hz), 1.65-1.80 (m, 4H), 2.03-2.13 (m, 2H), 2.28 (s, 3H), 2.47-2.53 (m, 1H), 2.86-2.93 (m, 2H), 4.22-4.33 (m, 1H), 4.35-4.40 (m, 4H), 6.80 (br s, 1H), 7.16 (br s, 1H), 7.22 (d, 2H, J = 8.3 Hz), 7.29 (dd, 1H, J = 8.6, 4.3 Hz), 7.37 (td, 1H, J = 8.3, 2.7 Hz), 7.46 (d, 2H, J = 8.3 Hz), 8.27 (d, 1H, J = 2.6 Hz).

I - 138  1H-NMR (CDCl3) δ: 1.01 (d, 6H, J = 6.5 Hz), 1.58-1.67 (m, 1H), 2.02-2.10 (m, 1H), 2.15-2.38 (m, 9H), 3.00 (d, 1H, J = 11.5 Hz), 3.14 (t, 1H, J = 11.9 Hz), 3.56 (s, 3H), 3.69 (d, 2H, J = 6.5 Hz), 4.27-4.50 (m, 5H), 4.79-4.91 (m, 1H), 5.93 (br s, 1H), 6.69 (br s, 1H), 6.81(d, 2H, J = 8.5 Hz), 7.14 (d, 2H, J = 8.5 Hz).

I - 139  1H-NMR (CDCl3) δ: 1.03 (t, 3H, J = 7.5 Hz), 1.61-1.68 (m, 1H), 1.75-1.84 (m, 2H), 2.15-2.37 (m, 9H), 3.00 (d, 1H, J = 10.8 Hz), 3.14 (t, 1H, J = 11.9 Hz), 3.56 (s, 3H), 3.90 (t, 2H, J = 6.7 Hz), 4.26-4.51 (m, 5H), 4.79-4.91 (m, 1H), 5.93 (br s, 1H), 6.70 (br s, 1H), 6.81(d, 2H, J = 8.5 Hz), 7.15 (d, 2H, J = 8.5 Hz).

I - 140  1H-NMR (CDCl3) δ: 1.01 (d, 6H, J = 6.8 Hz), 1.60-1.70 (m, 1H), 1.75-1.84 (m, 2H), 2.01-2.11 (m, 1H), 2.15-2.33 (m, 6H), 2.97 (d, 1H, J = 11.0 Hz), 3.14 (t, 1H, J = 11.5 Hz), 3.55 (s, 3H), 3.70 (t, 2H, J = 7.9 Hz), 4.21-4.54 (m, 5H), 4.81-4.93 (m, 1H), 5.14 (t, 1H, J = 5.3 Hz), 5.96 (br s, 1H), 6.38 (br s, 1H), 6.51 (br s, 1H), 6.79(d, 2H, J = 8.5 Hz), 7.00 (d, 2H, J = 8.5 Hz).

I - 141  1H-NMR (CDCl3) δ: 1.02 (t, 3H, J = 7.4 Hz), 1.66-1.84 (m, 2H), 2.16-2.34 (m, 6H), 2.98 (d, 1H, J = 9.0 Hz), 3.13 (t, 1H, J = 11.4 Hz), 3.55 (s, 3H), 3.89 (t, 2H, J = 6.7 Hz), 4.21-4.55 (m, 5H), 4.81-4.94 (m, 1H), 5.14 (t, 1H, J = 5.3 Hz), 5.96 (br s, 1H), 6.38 (br s, 1H), 6.51 (br s, 1H), 6.79(d, 2H, J = 8.5 Hz), 7.00 (d, 2H, J = 8.5 Hz).

I - 142  1H-NMR (CDCl3) δ: 1.01 (d, 6H, J = 6.7 Hz), 1.70-1.79 (m, 4H), 2.01-2.12 (m, 1H), 2.27 (s, 3H), 2.89 (d, 2H, J = 11.4 Hz), 3.68 (d, 2H, J = 6.5 Hz), 4.22 (s, 2H), 4.36-4.44 (m, 1H), 4.93 (t, 1H, J = 5.0 Hz), 6.08 (br s, 1H), 6.59 (br s, 1H), 6.73 (br s, 1H), 6.78 (d, 2H, J = 8.5 Hz), 7.02 (d, 2H, J = 8.5 Hz), 8.15 (br s, 1H).

I - 143  1H-NMR (CDCl3) δ: 1.01 (d, 6H, J = 6.7 Hz), 1.67-1.87 (m, 4H), 2.03-2.08 (m, 3H), 2.28 (s, 3H), 2.90 (d, 2H, J = 11.3 Hz), 3.69 (d, 2H, J = 6.5 Hz), 4.12 (br s, 1H), 4.31-4.35 (m, 4H), 6.19 (br s, 1H), 6.81 (d, 2H, J = 8.4 Hz), 7.12 (d, 2H, J = 8.4 Hz), 7.47 (br s, 1H).

I - 144  1H-NMR (CDCl3) δ: 1.01 (d, 6H, J = 6.8 Hz), 1.69-1.77 (m, 3H), 2.01-2.15 (m, 6H), 2.27 (s, 3H), 2.87 (d, 2H, J = 11.8 Hz), 3.39 (s, 3H), 3.68 (d, 2H, J = 6.7 Hz), 4.10 (s, 2H), 4.21 (d, 2H, J = 5.3 Hz), 4.34-4.42 (m, 1H), 5.00 (br s, 1H), 5.69 (br s, 1H), 6.29 (br s, 1H), 6.78 (d, 2H, J = 8.5 Hz), 7.02 (d, 2H, J = 8.5 Hz).

TABLE 40

I - 145  1H-NMR (CDCl3) δ: 1.01 (d, 6H, J = 6.7 Hz), 1.57-1.65 (m, 2H), 2.02-2.12 (m, 2H), 2.74-2.93 (m, 2H), 3.19-3.31 (m, 2H), 3.69 (d, 2H, J = 6.8 Hz), 3.72 (s, 3H), 4.32 (d, 2H, J = 6.5 Hz), 4.38 (s, 3H), 4.53-4.84 (m, 2H), 5.23-5.35 (m, 3H), 6.26 (br s, 1H), 6.26 (br s, 1H), 6.82(d, 2H, J = 8.5 Hz), 7.12 (d, 2H, J = 8.5 Hz).

I - 146  1H-NMR (CDCl3) δ: 1.01 (d, 6H, J = 6.7 Hz), 1.60-1.67 (m, 2H), 2.02-2.10 (m, 1H), 2.15-2.36 (m, 6H), 3.00 (d, 1H, J = 11.5 Hz), 3.14 (t, 1H, J = 11.9 Hz), 3.69 (d, 2H, J = 6.8 Hz), 3.72 (s, 3H), 4.27-4.53 (m, 5H), 4.78-4.91 (m, 1H), 5.23-5.35 (m, 2H), 6.26 (br s, 1H), 6.26 (br s, 1H), 6.82(d, 2H, J = 8.5 Hz), 7.13 (d, 2H, J = 8.5 Hz).

I - 147  1H-NMR (CDCl3) δ: 0.92 (d, 6H, J = 6.5 Hz), 1.49-1.66 (m, 3H), 2.01-2.08 (m, 1H), 2.13-2.34 (m, 4H), 2.92-3.00 (m, 4H), 3.05-3.18 (m, 3H), 4.29 (d, 2H, J = 5.0 Hz), 4.50-4.58 (m, 3H), 4.79-5.00 (m, 1H), 6.58 (d, 2H, J = 8.0 Hz), 7.08 (br s, 1H), 7.10 (d, 2H, J = 8.0 Hz), 7.31-7.38 (m, 2H), 8.23 (s, 1H).

TABLE 40-continued

| | |
|---|---|
| I - 148 | 1H-NMR (CDCl3) δ: 1.01 (d, 6H, J = 6.7 Hz), 1.64-1.77 (m, 4H), 2.01-2.12 (m, 1H), 2.27 (s, 3H), 2.88 (d, 2H, J = 11.4 Hz), 3.70 (d, 2H, J = 6.7 Hz), 4.19-4.28 (m, 3H), 4.36 (d, 2H, J = 5.3 Hz), 6.27 (br s, 1H), 6.84 (d, 2H, J = 8.5 Hz), 7.22 (d, 2H, J = 8.5 Hz), 7.52 (br s, 1H), 7.80 (br s, 1H). |

The following is a description of a biological test example of the compound according to the present invention.

The compound represented by the Formula (I) or Formula (II) according to the present invention may have serotonin 5-HT2A receptor inverse agonism, and may antagonize the human serotonin 5-HT2A receptor.

Specifically, in the evaluation method described below, the Ki value is preferably 5000 nM or less, more preferably 1000 nM or less, even more preferably 100 nM or less.

Test Example 1: 5-HT2A Receptor Binding Inhibition Test (Each Experimental Condition)

Cell membrane: 15 μg of Jump-In HEK cell membrane (expressing human recombinant 5-HT2A receptor) per well Assay buffer: Tris-HCl 50 mmol/L (pH 7.4) containing NaCl 120 mmol/L, MgCl$_2$·6H$_2$O 1 mmol/L, KCl 5 mmol/L, 0.1% BSA and CaCl$_2$ 2 mmol/L Radioactive ligand: [$^3$H]-Ketanserin with a final concentration of 3 nmol/L Non-specific ligand: Serotonin HCl with a final concentration of 500 μmol/L The Kd value was calculated when the lot of cell membrane was changed. In advance, 0.5 μL of a 1 mmol/L compound for non-specific binding calculation dissolved in DMSO or DMSO was dispensed into a microplate, and the cell membrane was diluted with an Assay buffer. The radioactive ligand solution was serially diluted from 16 nM at a 2-fold ratio and the count was confirmed with a liquid scintillator. Assay buffer containing diluted cell membrane was dispensed into a microplate at 50 μL/well. Then, the radioactive ligand solution was dispensed into a microplate at 50 μL/well, and the plate was sealed. It was allowed to stand at room temperature (25° C.) for 1.5 hours. During this period, 50 mmol/L Tris-HCl (pH 7.4) was dispensed into a GF/B UniFilter plate at 50 μL/well and allowed to stand at 4° C. for 1 hour or longer. After that, filtration was performed with Cell harvester (PerkinElmer). The radioactive ligand solution was dispensed into an empty well of the GF/B UniFilter plate at 10 μL/well. After the GF/B UniFilter plate was dried at room temperature, MicroScinti 20 was dispensed into the GF/B UniFilter plate at 50 μL/well to seal the plate. The GF/B UniFilter plate was allowed to stand overnight at room temperature. The radioactivity of [$^3$H]-Ketanserin bound to the 5-HT2A receptor was measured using Microbeta2 (PerkinElmer) at a measurement time of 1 min/well. The Saturation curve was drawn from the measured value, and the Kd value was calculated from the slope of the Scatchard Plot.

(Binding Test of the Compound According to the Present Invention)

In advance, 0.5 μL of the compound solution dissolved in DMSO was dispensed into a microplate, and the cell membrane and the hot ligand were diluted with Assay buffer, respectively. Then, the Assay buffer containing the diluted cell membrane was dispensed into a microplate at 50 μL/well. Then, the radioactive ligand solution was dispensed into a microplate at 50 μL/well, and the plate was sealed. Then, it was allowed to stand at room temperature (25° C.) for 1.5 hours. During this period, 50 mmol/L Tris-HCl (pH 7.4) was dispensed into a GF/B UniFilter plate at 50 μL/well and allowed to stand at 4° C., for 1 hour or longer. After that, filtration was performed with Cell harvester (PerkinElmer). After the GF/B UniFilter plate was dried at room temperature. MicroScinti 20 was dispensed into the GF/B UniFilter plate at 50 μL/well, and the plate was sealed. The GF/B UniFilter plate was allowed to stand at room temperature overnight. The radioactivity of [$^3$H]-Ketanserin bound to the 5-HT2A receptor was measured using Microbeta2 (PerkinElmer) at a measurement time of 1 min/well. The non-specific binding was calculated from the radioactivity of [$^3$H]-Ketanserin in the presence of 500 μmol/L Serotonin HCl with the unlabeled ligand, and the total binding was calculated from the radioactivity of [$^3$H]-Ketanserin in the absence of the compound according to the present invention (Vehicle). Finally, the Ki value was calculated from the dose-response curve.

(The binding activity of the compound according to the present invention was calculated from the following binding inhibition rate (%).)

Inhibition rate (%)=[1-(c-a)/(b-a)]×100 a; mean cpm of non-specific binding
b; average cpm of total binding
c; cpm in the presence of the test compound (Result)

The evaluation results regarding the human serotonin 5-HT2A receptor binding activity of the compound according to the present invention are shown below. In the table shown below, "A" means that the Ki value is less than 10 nM, "B" means that the Ki value is 10 nM or more, and less than 100 nM, and "C" means that the Ki value is 100 nM or more.

Compound I-009: 0.291 nM
Compound I-021: 0.858 nM
Compound I-037: 0.654 nM
Compound I-042: 1.15 nM
Compound I-043: 2.52 nM
Compound I-068: 6.52 nM
Compound I-071: 13.3 nM
Compound I-072: 219 nM
Compound I-075: 130 nM
Compound I-076: 62 nM
Compound I-082: 3.74 nM
Compound I-084: 5.61 nM
Compound I-085: 23.8 nM
Compound I-088: 25.7 nM
Compound I-102: 0.919 nM
Compound I-116: 1.45 nM
Compound I-124: 0.690 nM
Compound I-126: 1.92 nM
Compound I-129: 0.85 nM
Compound I-130: 15.3 nM
Compound I-134: 0.475 nM
Compound I-136: 8.02 nM
Compound I-139: 2.93 nM
Compound I-146: 1.94 nM
Compound I-147: 0.758 nM

TABLE 41

| Compound No. | h-5-HT2A Ki |
| --- | --- |
| I - 001 | A |
| I - 002 | C |
| I - 003 | C |
| I - 004 | C |
| I - 005 | C |
| I - 006 | C |
| I - 007 | C |
| I - 008 | A |
| I - 010 | A |
| I - 011 | B |
| I - 012 | A |
| I - 013 | A |
| I - 014 | A |
| I - 015 | C |
| I - 016 | B |
| I - 017 | B |
| I - 018 | B |
| I - 019 | C |
| I - 020 | B |
| I - 022 | C |
| I - 023 | C |
| I - 024 | C |
| I - 025 | A |
| I - 026 | B |
| I - 027 | A |
| I - 028 | A |
| I - 029 | A |
| I - 030 | A |
| I - 031 | A |
| I - 032 | B |
| I - 033 | C |
| I - 034 | C |
| I - 035 | B |
| I - 036 | C |
| I - 038 | B |
| I - 039 | C |
| I - 040 | A |
| I - 041 | A |
| I - 044 | A |
| I - 045 | A |
| I - 046 | A |
| I - 047 | A |
| I - 048 | A |
| I - 049 | A |
| I - 050 | A |
| I - 051 | A |
| I - 052 | A |
| I - 053 | A |
| I - 054 | A |
| I - 055 | A |
| I - 056 | A |
| I - 057 | A |
| I - 058 | A |
| I - 059 | A |
| I - 060 | A |
| I - 061 | A |
| I - 062 | A |
| I - 063 | A |
| I - 064 | A |
| I - 065 | A |
| I - 066 | A |
| I - 067 | A |

TABLE 42

| Compound No. | h-5-HT2A Ki |
| --- | --- |
| I-069 | B |
| I-070 | A |
| I-073 | B |
| I-074 | B |
| I-077 | B |
| I-078 | B |
| I-079 | C |
| I-080 | B |
| I-081 | C |
| I-083 | A |
| I-086 | C |
| I-087 | C |
| I-089 | A |
| I-090 | A |
| I-091 | A |
| I-092 | A |
| I-093 | A |
| I-094 | A |
| I-095 | A |
| I-096 | A |
| I-097 | A |
| I-098 | A |
| I-099 | A |
| I-100 | A |
| I-101 | A |
| I-103 | A |
| I-104 | A |
| I-105 | A |
| I-106 | A |
| I-107 | A |
| I-108 | A |
| I-109 | A |
| I-110 | A |
| I-111 | A |
| I-112 | A |
| I-113 | A |
| I-114 | A |
| I-115 | A |
| I-117 | A |
| I-118 | A |
| I-119 | A |
| I-120 | A |
| I-121 | B |
| I-122 | A |
| I-123 | A |
| I-125 | A |
| I-127 | C |

TABLE 43

| Compound No. | h-5-HT2A Ki |
| --- | --- |
| I - 128 | B |
| I - 131 | B |
| I - 132 | A |
| I - 133 | A |
| I - 135 | A |
| I - 137 | C |
| I - 138 | A |
| I - 140 | A |
| I - 141 | A |
| I - 142 | B |
| I - 143 | B |
| I - 144 | A |
| I - 145 | A |
| I - 148 | B |

Test Example 2: 5-HT2C Receptor Binding Inhibition Test (Each experimental condition)
Cell membrane: 0.5 μg of Jump-In HEK cell membrane (expressing human recombinant 5-HT2C receptor) per well
Assay buffer: Tris-HCl 50 mmol/L (pH 7.4) containing NaCl 120 mmol/L, $MgCl_2 \cdot 6H_2O$ 1 mmol/L, KCl 5 mmol/L, 0.1% BSA and $CaCl_2$) 2 mmol/L
Radioactive ligand: [$^3$H]-Mesulergine with a final concentration of 1 nmol/L
Non-specific ligand: Serotonin HCl with a final concentration of 500 μmol/L The Kd value was calculated when the lot of cell membrane was changed. In advance, 0.5 μL of a 1 mmol/L compound for non-specific binding calculation dissolved in DMSO or DMSO was dispensed into a microplate, and the cell membrane was diluted with an Assay buffer. The radioactive ligand solution was serially diluted from 16 nM at a 2-fold ratio and the count was confirmed with a liquid scintillator. Assay buffer containing diluted cell membrane was dispensed into a microplate at 50 μL/well. Then, the radioactive ligand solution was dispensed into a microplate at 50 μL/well, and the plate was sealed. It was allowed to stand at room temperature (25° C.) for 1.5 hours. During this period, 50 mmol/L Tris-HCl (pH 7.4) was dispensed into a GF/B UniFilter plate at 50 μL/well and allowed to stand at 4° C. for 1 hour or longer. After that, filtration was performed with Cell harvester (PerkinElmer). The radioactive ligand solution was dispensed into an empty well of the GF/B UniFilter plate at 10 μL/well. After the GF/B UniFilter plate was dried at room temperature, MicroScinti 20 was dispensed into the GF/B UniFilter plate at 50 μL/well to seal the plate. The GF/B UniFilter plate was allowed to stand overnight at room temperature. The radioactivity of [$^3$H]-Mesulergine bound to the 5-HT2C receptor was measured using Microbeta2 (PerkinElmer) at a measurement time of 1 min/well. The Saturation curve was drawn from the measured value, and the Kd value was calculated from the slope of the Scatchard Plot.

(Binding Test of the Compound According to the Present Invention)

In advance, 0.5 μL of the compound solution dissolved in DMSO was dispensed into a microplate, and the cell membrane and the hot ligand were diluted with Assay buffer, respectively. Then, the Assay buffer containing the diluted cell membrane was dispensed into a microplate at 50 μL/well. Then, the radioactive ligand solution was dispensed into a microplate at 50 μL/well, and the plate was sealed. Then, it was allowed to stand at room temperature (25° C.) for 1.5 hours. During this period, 50 mmol/L Tris-HCl (pH 7.4) was dispensed into a GF/B UniFilter plate at 50 μL/well and allowed to stand at 4° C. for 1 hour or longer. After that, filtration was performed with Cell harvester (PerkinElmer). After the GF/B UniFilter plate was dried at room temperature, MicroScinti 20 was dispensed into the GF/B UniFilter plate at 50 μL/well, and the plate was sealed. The GF/B UniFilter plate was allowed to stand at room temperature overnight. The radioactivity of [$^3$H]-Mesulergine bound to the 5-HT2A-5-HT2C receptor was measured using Microbeta2 (PerkinElmer) at a measurement time of 1 min/well. The non-specific binding was calculated from the radioactivity of [$^3$H]-Mesulergine in the presence of 500 μmol/L Serotonin HCl with the unlabeled ligand, and the total binding was calculated from the radioactivity of [$^3$H]-Mesulergine in the absence of the compound according to the present invention (Vehicle). Finally, the Ki value was calculated from the dose-response curve.

(The binding activity of the compound according to the present invention was calculated from the following binding inhibition rate (%).)

Inhibition rate (%)=[1−(c−a)/(b−a)]×100 a; mean cpm of non-specific binding
b; average cpm of total binding
c; cpm in the presence of the test compound (Result)

The evaluation results regarding the human serotonin 5-HT2C receptor binding activity of the compound according to the present invention are shown below. In the table shown below, "A" means that the Ki value is less than 10 nM, "B" means that the Ki value is 10 nM or more, and less than 100 nM, and "C" means that the Ki value is 100 nM or more.

Compound I-009: 7.92 nM
Compound I-021: 50.7 nM
Compound I-037: 28.2 nM
Compound I-042: 2.31 nM
Compound I-043: 55.7 nM
Compound I-068: 49.9 nM
Compound I-071: 60.7 nM
Compound I-072: 617 nM
Compound I-075: 1310 nM
Compound I-076: 263 nM
Compound I-082: 28.8 nM
Compound I-084: 65.2 nM
Compound I-085: 96.2 nM
Compound I-088: 134 nM
Compound I-102: 4.01 nM
Compound I-116: 12.2 nM
Compound I-124: 2.22 nM
Compound I-126: 1.09 nM
Compound I-129: 1.51 nM
Compound I-130: 348 nM
Compound I-134: 3.2 nM
Compound I-136: 148 nM
Compound I-139: 11.1 nM
Compound I-146: 4.96 nM
Compound I-147: 2.12 nM

TABLE 44

| Compound No. | h5-HT2C Ki |
|---|---|
| I - 001 | B |
| I - 002 | C |
| I - 003 | C |
| I - 004 | C |
| I - 005 | C |
| I - 006 | C |
| I - 007 | C |
| I - 008 | A |
| I - 010 | B |
| I - 011 | C |
| I - 012 | B |
| I - 013 | A |
| I - 014 | B |
| I - 015 | C |
| I - 016 | C |
| I - 017 | C |
| I - 018 | C |
| I - 019 | C |
| I - 020 | B |
| I - 022 | C |
| I - 023 | C |
| I - 024 | C |
| I - 025 | B |
| I - 026 | C |
| I - 027 | A |
| I - 028 | C |
| I - 029 | B |
| I - 030 | B |
| I - 031 | B |
| I - 032 | C |
| I - 033 | C |
| I - 034 | C |
| I - 035 | C |
| I - 036 | C |
| I - 038 | C |
| I - 039 | C |
| I - 040 | B |
| I - 041 | B |
| I - 044 | C |
| I - 045 | C |

TABLE 44-continued

| Compound No. | h5-HT2C Ki |
| --- | --- |
| I - 046 | B |
| I - 047 | A |
| I - 048 | B |
| I - 049 | B |
| I - 050 | A |
| I - 051 | A |
| I - 052 | B |
| I - 053 | A |
| I - 054 | A |
| I - 055 | A |
| I - 056 | A |
| I - 057 | A |
| I - 058 | A |
| I - 059 | A |
| I - 060 | B |
| I - 061 | A |
| I - 062 | A |
| I - 063 | A |
| I - 064 | A |
| I - 065 | A |
| I - 066 | A |
| I - 067 | A |

TABLE 45

| Compound No. | h-5-HT2C Ki |
| --- | --- |
| I-069 | C |
| I-070 | B |
| I-073 | C |
| I-074 | B |
| I-077 | C |
| I-078 | C |
| I-079 | C |
| I-080 | B |
| I-081 | C |
| I-083 | B |
| I-086 | C |
| I-087 | B |
| I-089 | B |
| I-090 | A |
| I-091 | A |
| I-092 | A |
| I-093 | A |
| I-094 | A |
| I-095 | A |
| I-096 | B |
| I-097 | B |
| I-098 | B |
| I-099 | A |
| I-100 | B |
| I-101 | B |
| I-103 | A |
| I-104 | A |
| I-105 | A |
| I-106 | A |
| I-107 | B |
| I-108 | A |
| I-109 | A |
| I-110 | A |
| I-111 | A |
| I-112 | A |
| I-113 | B |
| I-114 | A |
| I-115 | A |
| I-117 | A |
| I-118 | B |
| I-119 | A |
| I-120 | A |
| I-121 | C |
| I-122 | B |
| I-123 | B |
| I-125 | B |
| I-127 | C |

TABLE 46

| Compound No. | h-5-HT2C Ki |
| --- | --- |
| I - 128 | B |
| I - 131 | C |
| I - 132 | B |
| I - 133 | A |
| I - 135 | B |
| I - 137 | C |
| I - 138 | A |
| I - 140 | A |
| I - 141 | A |
| I - 142 | C |
| I - 143 | C |
| I - 144 | A |
| I - 145 | A |
| I - 148 | C |

Test Example 3: hERG Test

For the purpose of assessing risk of an electrocardiogram QT interval prolongation of the compound according to the present invention, effects of the compound according to the present invention on delayed rectifier K$^+$ current ($I_{Kr}$), which plays an important role in the ventricular repolarization process, was studied using CHO cells expressing human ether-a-go-go related gene (hERG) channel.

After a cell was retained at a membrane potential of −80 mV by whole cell patch clamp method using an automated patch clamp system (QPatch; Sophion Bioscience A/S) and gave a leak potential of −50 mV, IKr induced by depolarization pulse stimulation at +20 mV for 2 seconds, and further, repolarization pulse stimulation at −50 mV for 2 seconds, was recorded. A vehicle, which was the 0.1% dimethyl sulfoxide solution in extracellular solution (NaCl: 145 mmol/L, KCl: 4 mmol/L, CaCl$_2$: 2 mmol/L, MgCl$_2$: 1 mmol/L, glucose:10 mmol/L, HEPES (4-(2-hydroxyethyl)-1-piperazineethanesulfonic acid): 10 mmol/L, pH7.4), or the compound according to the present invention had been dissolved at an objective concentration in the extracellular solution, each of the extracellular solution was applied to the cell at room temperature for 15 minutes or more. From the recording $I_{Kr}$, an absolute value of the tail peak current was measured based on the current value at the resting membrane potential using analysis software (QPatch Assay software; Sophion Bioscience A/S). The % inhibition of the tail peak current after application of the compound according to the present invention relative to the tail peak current after application of the vehicle was calculated, and further correction was performed using the inhibition rate result of the negative control to assess influence of the compound according to the present invention on $I_{Kr}$.

(Results) The inhibition rate at a compound concentration of 3 μmol/L is shown below.

Compound I-129: 31.4%
Compound I-133: 6.60%
Compound I-134: 31.2%
Compound I-139: 14.2%
Compound I-141: 49.3%

Test Example 4: BA Test

Materials and methods for experiments to evaluate oral absorption
(1) Experimental animals: Mise or rats are used.
(2) Rearing condition: Mice or rats are allowed free access to solid feed and sterilized tap water.

(3) Setting of dosage and grouping: Oral administration and intravenous administration are performed with the predetermined dosage. Grouping is set as below. (Dosage can be changed per compound)
Oral administration 2 to 60 μmol/kg or 1 to 30 mg/kg (n=2 to 3)
Intravenous administration 1 to 20 μmol/kg or 0.5 to 10 mg/kg (n=2 to 3)
(4) Preparation of administration solutions: Oral administration is performed as solution or suspension. Intravenous administration is performed after solubilization.
(5) Routes of administration: Oral administration is performed mandatory into the stomach by oral sonde. Intravenous administration is performed from caudal vein by syringes with needle.
(6) Evaluation items: Blood is collected serially and concentration of a compound according to the present invention in plasma is measured by LC/MS/MS.
(7) Statistical analysis: About transition of concentration of a compound according to the present invention in plasma, the area under the plasma concentration versus time curve (AUC) is calculated by moment analysis method, and bioavailability (BA) of a compound according to the present invention is calculated from dosages and AUCs of the oral administration group and the intravenous administration group. The dilution concentration or the dilution solvent are changed as necessary.

Test Example 5: Clearance Test

Materials and Methods for Experiments (1) Experimental animals: SD rats are used.
(2) Rearing condition: SD rats are allowed free access to solid feed and sterilized tap water.
(3) Setting of dosage and grouping: Intravenous administration was performed with the predetermined dosage. Grouping is set as below.
Intravenous administration 1 μmol/kg (n=2)
(4) Preparation of administration solutions: Administration is performed after solubilization by using dimethyl sulfoxide/propylene glycol=1/1 as the solvent.
(5) Routes of administration: Intravenous administration is performed from caudal vein by syringes with needle.
(6) Evaluation items: Blood is collected serially and concentration of a compound according to the present invention in plasma is measured by LC/MS/MS.
(7) Statistical analysis: About transition of concentration of a compound according to the present invention in plasma, total clearance (CLtot) of a compound according to the present invention is calculated by the moment analysis method. The dilution concentration or the dilution solvent are changed as necessary.

Test Example 6: Metabolism Stability Test

Using commercially available pooled human hepatic microsomes, a compound according to the present invention is reacted for a constant time, and a remaining rate is calculated by comparing a reacted sample and an unreacted sample, thereby, a degree of metabolism in liver is assessed.

A reaction is performed (oxidative reaction) at 37° C., for 0 minute or 30 minutes in the presence of 1 mmol/L NADPH in 0.2 mL, of a buffer (50 mmol/L Tris-HCl pH 7.4, 150 mmol/L potassium chloride, 10 mmol/L magnesium chloride) containing 0.5 mg protein/mL of human liver microsomes. After the reaction, 50 μL of the reaction solution is added to 100 μL of a methanol/acetonitrile=1/1 (v/v), mixed and centrifuged at 3000 rpm for 15 minutes. The compound according to the present invention in the supernatant is quantified by LC/MS/MS or Solid Phase Extraction (SPE)/MS, and a remaining amount of the compound according to the present invention after the reaction is calculated, letting a compound amount at 0 minute reaction time be 100%.

Test Example 7: P-gp Substrate Test

The compound according to the present invention is added to one side of a Transwell (registered trademark, CORNING) in which human MDR1-expressing cells or parent cells are cultured in a single layer, and reacted for a certain period of time. For MDR1-expressing cells and parent cells, the membrane permeability coefficients from the Apical side to the Basolaternal side (A→B) and from the Basolaternal side to the Apical side (B→A) are calculated, and Efflux Ratio (ER: Ratio of membrane permeability coefficients of B→A and A→B) value of the MDR1-expressing cells and the parent cells are calculated. The Efflux Ratio (ER value) of the MDR1-expressing cell and the parent cell are compared to determine whether the compound according to the present, invention is a P-gp substrate or not.

The following formulation examples are merely examples, and are not intended to limit the scope of the invention.

The compound according to the present invention can be administered as a pharmaceutical composition by any conventional route, in particular enterally, for example, orally, for example, in the form of tablets or capsules, or parenterally, for example, in the form of injectable solutions or suspensions, topically, for example, in the form of lotions, gels, ointments or creams, or in a nasal or suppository form. Pharmaceutical compositions comprising a compound of the present invention in free form or in a pharmaceutically acceptable salt form in association with at least one pharmaceutically acceptable carrier or diluent can be manufactured in a conventional manner by mixing, granulating or coating methods. For example, oral compositions can be tablets, granules, or capsules containing excipients, disintegrants, binders, lubricants and the like and active ingredients. Compositions for injection can be solutions or suspension, may be sterilized, and may contain preservatives, stabilizers, buffering agents, and the like.

INDUSTRIAL APPLICABILITY

The compound according to the present invention has serotonin 5-HT2A receptor inverse agonism, and the compound is considered to be useful as a therapeutic and/or prophylactic agent for a disease or condition associated with serotonin 5-HT2A receptor.

The invention claimed is:
1. A compound represented by Formula (II):

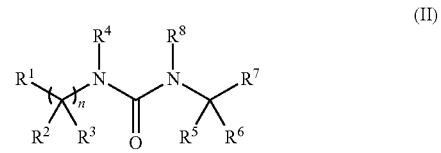

wherein $R^1$ is substituted or unsubstituted pyridyl, substituted or unsubstituted pyrrolyl, or substituted or unsubstituted pyrazolyl;
$R^2$ is a hydrogen atom;
$R^3$ is a hydrogen atom;
n is 1;
$R^4$ is a group represented by the formula:

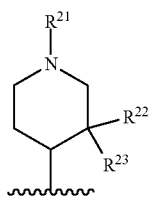

wherein $R^{21}$ is a hydrogen atom or substituted or unsubstituted alkyl;
$R^{22}$ is a hydrogen atom, halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle;
$R^8$ is a hydrogen atom;
$R^5$ is a hydrogen atom;
$R^6$ is a hydrogen atom;
$R^7$ is a group represented by the formula:

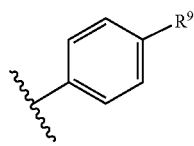

wherein $R^9$ is substituted or unsubstituted alkyloxy;
provided that the following compound is excluded:

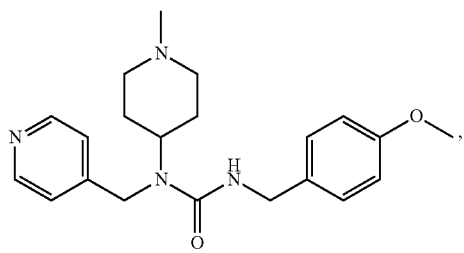 [SMILES: COc1ccc(CNC(=O)N(Cc2ccncc2)C2CCN(C)CC2)cc1]

or a pharmaceutically acceptable salt thereof.

2. The compound according to claim 1, wherein $R^1$ is pyridyl substituted with halogen, pyridyl substituted with haloalkyl, pyridyl substituted with halogen and haloalkyl, unsubstituted pyridyl, pyrazolyl substituted with haloalkyl, pyrazolyl substituted with alkyl, pyrazolyl substituted with haloalkyl and alkyl, unsubstituted pyrazolyl, pyrrolyl substituted with haloalkyl, pyrrolyl substituted with alkyl, pyrrolyl substituted with haloalkyl and alkyl, or unsubstituted pyrrolyl, or a pharmaceutically acceptable salt thereof.

3. The compound according to claim 1, wherein $R^1$ is pyridyl substituted with halogen, pyrazolyl substituted with alkyl, or pyrrolyl substituted with alkyl, or a pharmaceutically acceptable salt thereof.

4. The compound according to claim 1, wherein $R^4$ is a group represented by the formula:

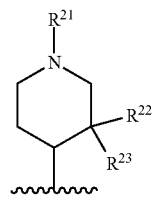

wherein $R^{21}$ is a hydrogen atom or unsubstituted alkyl;
$R^{22}$ is a hydrogen atom, halogen or unsubstituted alkyl;
$R^{23}$ is a hydrogen atom, halogen or unsubstituted alkyl; or
$R^{22}$ and $R^{23}$ are taken together with the carbon atom to which they are bonded to form an unsubstituted non-aromatic carbocycle,
or a pharmaceutically acceptable salt thereof.

5. The compound according to claim 1, wherein $R^4$ is a group represented by the formula:

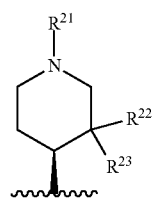

wherein $R^{21}$, $R^{22}$ and $R^{23}$ are as defined in claim 1, or a pharmaceutically acceptable salt thereof.

6. The compound according to claim 1, wherein $R^{22}$ is halogen or substituted or unsubstituted alkyl;
$R^{23}$ is a hydrogen atom, halogen or substituted or unsubstituted alkyl; or
$R^{22}$ and $R^{23}$ are taken together with the carbon atom to which they are bonded to form a substituted or unsubstituted non-aromatic carbocycle,
or a pharmaceutically acceptable salt thereof.

7. The compound according to claim 1, wherein $R^7$ is a group represented by the formula:

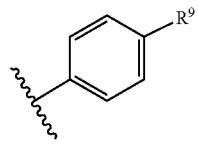

wherein $R^9$ is alkyloxy substituted with halogen or unsubstituted alkyloxy,
or a pharmaceutically acceptable salt thereof.

8. The compound according to claim 1, wherein the compound is selected from the group consisting of 173
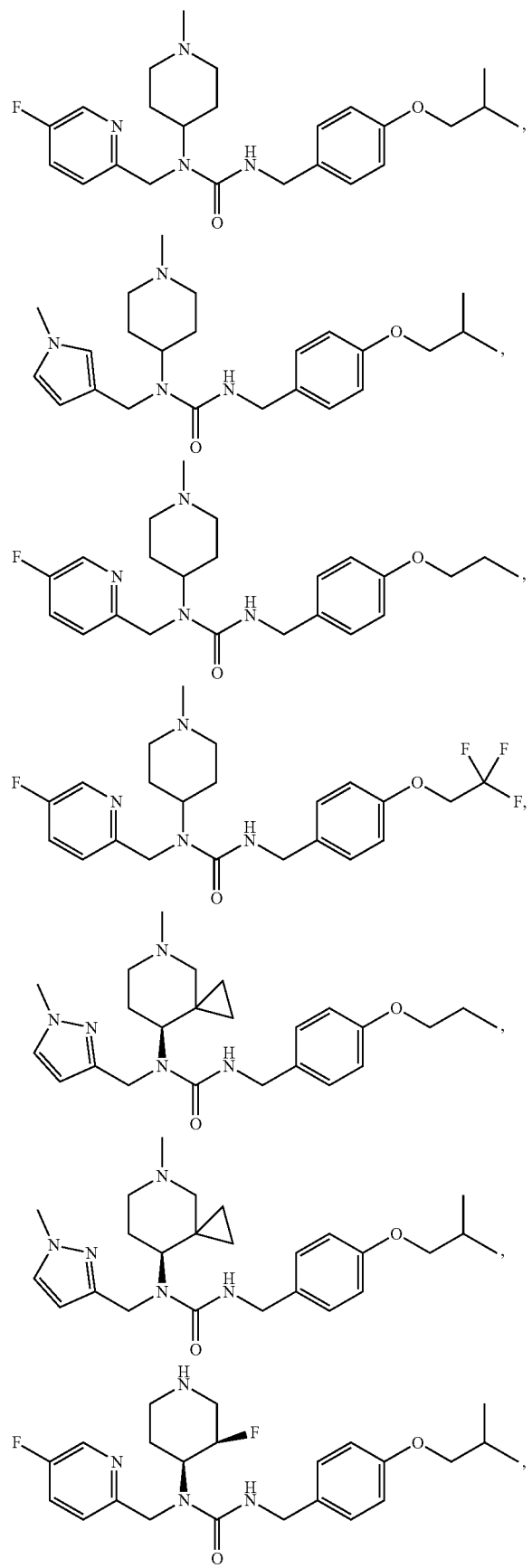
174
-continued
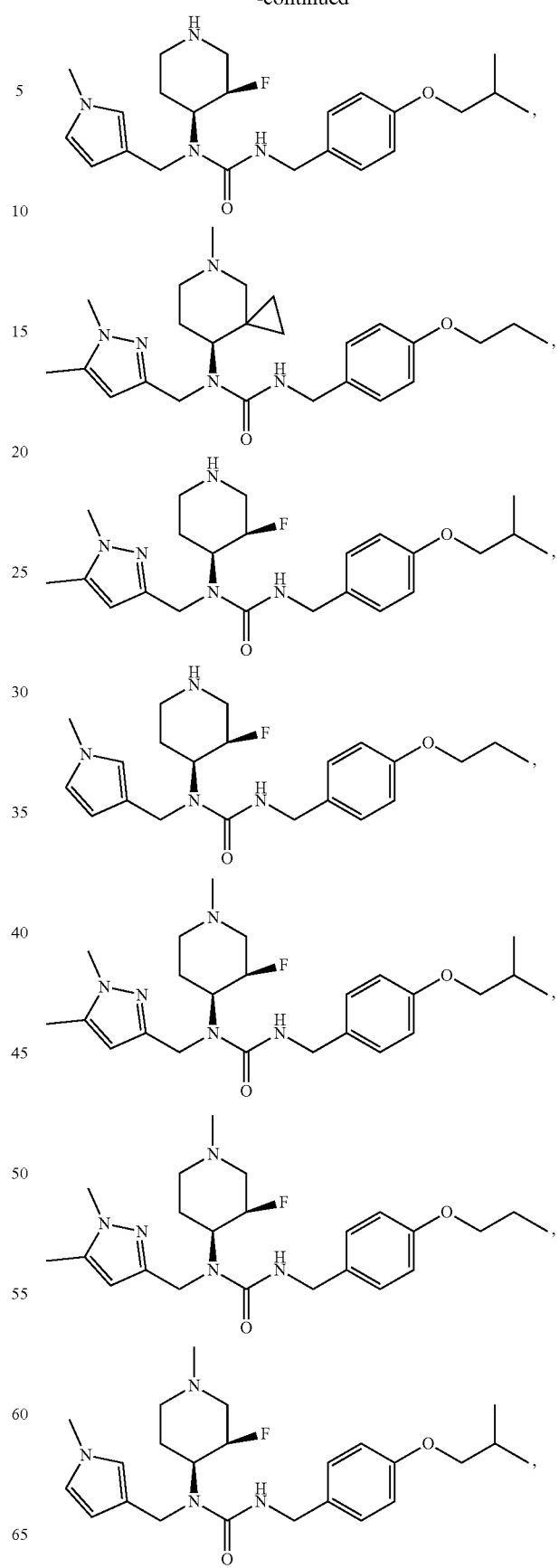

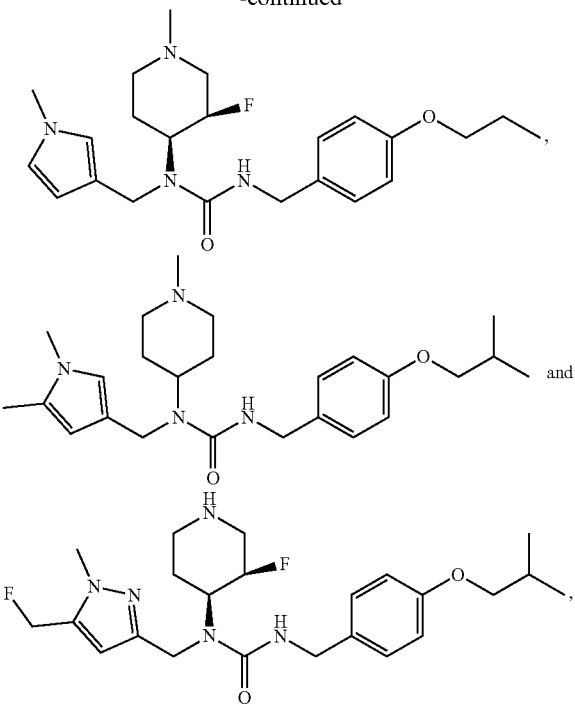

or a pharmaceutically acceptable salt thereof.

9. A pharmaceutical composition comprising the compound according to claim 8, or a pharmaceutically acceptable salt thereof, and a pharmaceutically acceptable carrier or diluent.

10. A pharmaceutical composition comprising the compound according to claim 1, or a pharmaceutically acceptable salt thereof, and a pharmaceutically acceptable carrier or diluent.

11. The pharmaceutical composition according to claim 10, wherein the composition is a serotonin 5-HT2A receptor inverse agonist.

12. A method for treating and/or preventing a disease related to serotonin 5-HT2A receptor comprising administering an effective amount of the compound according to claim 3, or a pharmaceutically acceptable salt thereof, to a patient in need thereof.

13. The compound according to claim 1, wherein $R^1$ is pyridyl substituted with halogen, pyrazolyl substituted with alkyl, or pyrrolyl substituted with alkyl;

$R^4$ is a group represented by the formula:

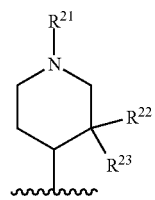

wherein $R^{21}$ is a hydrogen atom or unsubstituted alkyl;
$R^{22}$ is a hydrogen atom, halogen or unsubstituted alkyl;
$R^{23}$ is a hydrogen atom, halogen or unsubstituted alkyl; or
$R^{22}$ and $R^{23}$ are taken together with the carbon atom to which they are bonded to form an unsubstituted non-aromatic carbocycle; and $R^7$ is a group represented by the formula:

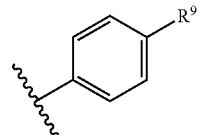

wherein $R^9$ is alkyloxy substituted with halogen or unsubstituted alkyloxy;
or a pharmaceutically acceptable salt thereof.

* * * * *